US008892467B1

(12) United States Patent
Ball

(10) Patent No.: US 8,892,467 B1
(45) Date of Patent: Nov. 18, 2014

(54) INTERACTIVE SYSTEMS AND METHODS FOR SUPPORTING FINANCIAL PLANNING RELATED ACTIVITIES

(75) Inventor: Robert Ball, Atlanta, GA (US)

(73) Assignee: Guardian Life Insurance Company of America, New York, NY (US)

( * ) Notice: Subject to any disclaimer, the term of this patent is extended or adjusted under 35 U.S.C. 154(b) by 0 days.

(21) Appl. No.: 13/529,832

(22) Filed: Jun. 21, 2012

Related U.S. Application Data

(63) Continuation-in-part of application No. 12/771,795, filed on Apr. 30, 2010, which is a continuation-in-part of application No. 12/380,564, filed on Feb. 27, 2009, which is a continuation-in-part of application No. 12/113,087, filed on Apr. 30, 2008, now Pat. No. 8,185,463, which is a continuation-in-part of application No. 11/891,616, filed on Aug. 10, 2007, which is a continuation-in-part of application No. 11/510,537, filed on Aug. 25, 2006, now Pat. No. 8,073,714.

(60) Provisional application No. 61/499,528, filed on Jun. 21, 2011, provisional application No. 60/763,200, filed on Jan. 27, 2006.

(51) Int. Cl.
*G06Q 40/06* (2012.01)

(52) U.S. Cl.
CPC .................................... *G06Q 40/06* (2013.01)
USPC .............................. 705/36 R; 705/35; 705/37

(58) Field of Classification Search
None
See application file for complete search history.

(56) References Cited

U.S. PATENT DOCUMENTS

| | | | |
|---|---|---|---|
| 3,406,467 | A | 10/1968 | Davis et al. |
| 4,750,121 | A | 6/1988 | Halley et al. |
| 4,837,693 | A | 6/1989 | Schotz |
| 4,969,094 | A | 11/1990 | Halley et al. |
| 5,182,705 | A | 1/1993 | Barr et al. |
| 5,479,344 | A | 12/1995 | Keziah, Jr. |
| 5,523,942 | A | 6/1996 | Tyler et al. |
| 5,673,402 | A | 9/1997 | Ryan et al. |
| 5,761,441 | A | 6/1998 | Bennett |
| 5,819,263 | A | 10/1998 | Bromley et al. |
| 5,884,283 | A | 3/1999 | Manos |
| 5,893,071 | A | 4/1999 | Cooperstein |
| 5,903,873 | A | 5/1999 | Peterson et al. |
| 5,956,691 | A | 9/1999 | Powers |
| 5,991,744 | A | 11/1999 | DiCresce |
| 6,009,402 | A | 12/1999 | Whitworth |

(Continued)

FOREIGN PATENT DOCUMENTS

| | | |
|---|---|---|
| WO | WO 01/33476 A2 | 5/2001 |
| WO | WO 02/056143 A2 | 7/2002 |

OTHER PUBLICATIONS

Danna Voth, Drowning in Date-Comprehensive Portfolio Management Software Throws a Lifeline to Investors Overwhelmed by the Task of Tracking.

(Continued)

*Primary Examiner* — Gregory Johnson
(74) *Attorney, Agent, or Firm* — McGuireWoods LLP

(57) ABSTRACT

An interactive financial tool is disclosed for assisting agents such as, for example, insurance professionals, estate planners, financial planners, and the like in performing activities such as, for example, marketing products or services to new or existing clients, managing client relationships, prospecting for new clients, and the like.

19 Claims, 179 Drawing Sheets

(56) References Cited

U.S. PATENT DOCUMENTS

| | | | | |
|---|---|---|---|---|
| 6,012,043 | A | 1/2000 | Albright et al. | |
| D424,541 | S | 5/2000 | Mugura | |
| 6,064,986 | A | 5/2000 | Edelman | |
| 6,076,072 | A | 6/2000 | Libman | |
| D427,576 | S | 7/2000 | Coleman | |
| 6,092,050 | A | 7/2000 | Lungren et al. | |
| 6,148,293 | A * | 11/2000 | King | 705/35 |
| D437,601 | S | 2/2001 | Utsuki et al. | |
| 6,275,807 | B1 | 8/2001 | Schiripa | |
| 6,298,334 | B1 * | 10/2001 | Burfield et al. | 705/36 R |
| 6,324,523 | B1 | 11/2001 | Killeen, Jr. et al. | |
| 6,345,261 | B1 | 2/2002 | Feidelson et al. | |
| 6,411,939 | B1 | 6/2002 | Parsons | |
| 6,430,542 | B1 | 8/2002 | Moran | |
| 6,456,979 | B1 | 9/2002 | Flagg | |
| 6,584,446 | B1 | 6/2003 | Buchanan et al. | |
| 6,611,807 | B1 | 8/2003 | Bernheim et al. | |
| 6,611,815 | B1 | 8/2003 | Lewis et al. | |
| 6,684,190 | B1 | 1/2004 | Powers et al. | |
| 6,850,252 | B1 * | 2/2005 | Hoffberg | 715/716 |
| 6,968,316 | B1 * | 11/2005 | Hamilton | 705/36 R |
| 6,996,782 | B2 | 2/2006 | Parker et al. | |
| 7,062,458 | B2 | 6/2006 | Maggioncalda et al. | |
| D526,323 | S | 8/2006 | McDougall et al. | |
| D526,324 | S | 8/2006 | McDougall et al. | |
| D526,653 | S | 8/2006 | McDougall et al. | |
| 7,089,201 | B1 | 8/2006 | Dellinger et al. | |
| D527,735 | S | 9/2006 | McDougall et al. | |
| 7,113,913 | B1 | 9/2006 | Davis et al. | |
| 7,231,362 | B2 | 6/2007 | Wilce et al. | |
| 7,260,548 | B1 | 8/2007 | Allsup | |
| 7,328,183 | B1 | 2/2008 | Leisle | |
| 7,398,241 | B2 | 7/2008 | Fay et al. | |
| D586,821 | S | 2/2009 | Koh | |
| D589,522 | S | 3/2009 | Jewitt et al. | |
| D589,528 | S | 3/2009 | Koh | |
| 7,509,274 | B2 * | 3/2009 | Kam et al. | 705/35 |
| 7,537,153 | B2 * | 5/2009 | Hurwitz et al. | 235/379 |
| 7,640,202 | B2 | 12/2009 | Foti et al. | |
| 7,664,700 | B1 | 2/2010 | Fisher | |
| 7,720,729 | B2 | 5/2010 | Wilce et al. | |
| 7,752,070 | B2 * | 7/2010 | Hatcher et al. | 705/7.38 |
| 7,765,116 | B1 | 7/2010 | Allsup | |
| 7,801,748 | B2 | 9/2010 | Bonissone et al. | |
| 7,848,978 | B2 | 12/2010 | Imrey et al. | |
| 8,010,433 | B1 | 8/2011 | Fisher, III | |
| 8,073,714 | B1 | 12/2011 | Ball | |
| 8,185,463 | B1 * | 5/2012 | Ball | 705/36 R |
| 8,271,336 | B2 * | 9/2012 | Mikurak | 705/22 |
| 8,296,208 | B2 | 10/2012 | Roche et al. | |
| 8,799,066 | B1 * | 8/2014 | Nesladek et al. | 705/14.23 |
| 2001/0009004 | A1 * | 7/2001 | Groat et al. | 705/36 |
| 2001/0011242 | A1 * | 8/2001 | Allex et al. | 705/36 |
| 2001/0014873 | A1 | 8/2001 | Henderson et al. | |
| 2001/0023414 | A1 | 9/2001 | Kumar et al. | |
| 2001/0044762 | A1 * | 11/2001 | Nault | 705/30 |
| 2002/0007332 | A1 | 1/2002 | Johnson et al. | |
| 2002/0046110 | A1 | 4/2002 | Gallagher | |
| 2002/0072936 | A1 | 6/2002 | Newman | |
| 2002/0095363 | A1 * | 7/2002 | Sloan et al. | 705/36 |
| 2002/0103677 | A1 | 8/2002 | Sexton et al. | |
| 2002/0103679 | A1 | 8/2002 | Burkhalter et al. | |
| 2002/0103733 | A1 | 8/2002 | Barrington et al. | |
| 2002/0123949 | A1 * | 9/2002 | VanLeeuwen | 705/35 |
| 2002/0138389 | A1 | 9/2002 | Martone et al. | |
| 2002/0143680 | A1 | 10/2002 | Walters et al. | |
| 2002/0147618 | A1 | 10/2002 | Mezrah et al. | |
| 2002/0184129 | A1 * | 12/2002 | Arena et al. | 705/35 |
| 2002/0198743 | A1 | 12/2002 | Ariathurai et al. | |
| 2003/0036989 | A1 * | 2/2003 | Bhatia | 705/36 |
| 2003/0038840 | A1 * | 2/2003 | Stern | 345/760 |
| 2003/0167220 | A1 | 9/2003 | Schoen et al. | |
| 2003/0182230 | A1 * | 9/2003 | Pessin | 705/39 |
| 2003/0216991 | A1 * | 11/2003 | Baker | 705/36 |
| 2004/0030589 | A1 * | 2/2004 | Leisher et al. | 705/4 |
| 2004/0039588 | A1 | 2/2004 | Libman | |
| 2004/0054610 | A1 * | 3/2004 | Amstutz et al. | 705/36 |
| 2004/0128171 | A1 | 7/2004 | Rees et al. | |
| 2004/0148202 | A1 | 7/2004 | Siefe et al. | |
| 2004/0177022 | A1 | 9/2004 | Williams et al. | |
| 2004/0205008 | A1 * | 10/2004 | Haynie et al. | 705/31 |
| 2004/0215493 | A1 | 10/2004 | Koppes et al. | |
| 2004/0243451 | A1 | 12/2004 | Winklevoss et al. | |
| 2004/0254881 | A1 | 12/2004 | Kumar et al. | |
| 2004/0267579 | A1 | 12/2004 | Markman | |
| 2005/0010510 | A1 | 1/2005 | Brose et al. | |
| 2005/0027632 | A1 | 2/2005 | Zeitoun et al. | |
| 2005/0096986 | A1 * | 5/2005 | Taylor et al. | 705/16 |
| 2005/0187851 | A1 * | 8/2005 | Sant | 705/36 |
| 2006/0041455 | A1 | 2/2006 | Dehais | |
| 2006/0090141 | A1 | 4/2006 | Loui et al. | |
| 2006/0129468 | A1 * | 6/2006 | Lovesy et al. | 705/35 |
| 2006/0155590 | A1 | 7/2006 | Graham | |
| 2006/0155622 | A1 | 7/2006 | Laux | |
| 2006/0224487 | A1 * | 10/2006 | Galdi | 705/35 |
| 2006/0247995 | A1 * | 11/2006 | Childs et al. | 705/35 |
| 2007/0021986 | A1 | 1/2007 | Cheung et al. | |
| 2007/0027736 | A1 | 2/2007 | Reynolds et al. | |
| 2007/0094108 | A1 * | 4/2007 | Nault | 705/30 |
| 2007/0130060 | A1 * | 6/2007 | Ariarajah et al. | 705/38 |
| 2007/0192728 | A1 * | 8/2007 | Finley et al. | 715/782 |
| 2007/0214022 | A1 | 9/2007 | Hagelman et al. | |
| 2008/0103916 | A1 * | 5/2008 | Camarador et al. | 705/26 |
| 2008/0147447 | A1 | 6/2008 | Roche et al. | |
| 2008/0167903 | A1 | 7/2008 | Hall et al. | |
| 2008/0172260 | A1 | 7/2008 | Thacker et al. | |
| 2008/0177580 | A1 | 7/2008 | Gabriel | |
| 2008/0183636 | A1 | 7/2008 | Walsh et al. | |
| 2009/0094070 | A1 | 4/2009 | Harris et al. | |
| 2009/0112632 | A1 | 4/2009 | Belliveau et al. | |
| 2009/0150189 | A1 | 6/2009 | Barron et al. | |
| 2009/0204441 | A1 | 8/2009 | Read et al. | |
| 2009/0276247 | A1 | 11/2009 | Howell | |
| 2009/0276369 | A1 | 11/2009 | Marby et al. | |
| 2010/0004957 | A1 | 1/2010 | Ball | |
| 2010/0030583 | A1 | 2/2010 | Fievoli et al. | |
| 2010/0185548 | A1 | 7/2010 | Wilce et al. | |
| 2010/0305976 | A1 | 12/2010 | Fischer et al. | |

OTHER PUBLICATIONS

Bob Ball and Kathy Readinger, "Producers Eye Account Aggrefatio As Key to Service Philosophy", National Underwriter Life & Health, Jul. 2007.

Robert Regis Hyle, "Guardian Offers Customers Daily Look at New Worth", (Industry Intelligence, News, Insights, Innovations, Financial Tools), National Underwriter Publication, TechDecisions For Insurance, vol. 8, No. 5, Apr. 2006.

"GBS Agency Expert" GBS, Inc., http://www.gbsinc.com (Feb. 16, 2006), 122 pages.

"WebWritertm," Insurance Systems, Inc., http://www.insurancesystems.ca/insurancesoftware.htm, pp. 1-4 (Feb. 14, 2006).

"ProSpector tm," Sintech Software, Inc., http://www.sintechsoft.com (Feb. 14, 2006), 32 pages.

"IncomeMAX," Cygnus Software, Inc., http://www.cygnussoft.com (Feb. 14, 2006), 46 pages.

"AccountantsWorld/Financial Calculators" AccountantsWorld, LLC, http://www.accountantsoffice.com (Aug. 18, 2006), 49 pages.

Korn, Donald J., Financial Planning, pp. 65-68, Jun. 1, 2000, Insurance-Signing Bonus: "Credit-Enhanced" variable annuities, which give inventors a little something extra for signing a contract, are shaking up that industry.

Gruel, Kelly, "Insurance firms rush to offer "bonus" Vas", Fund Marketing Alert, Jan. 11, 1999, vol. 4, Iss. 2, p. 1.

Pizaani, Lori, "Fidelity Drops Surrender Charges", Annuity Market News, Oct. 1, 1999, pp. 1-2.

Sondergelt, Eric T., "Cashing In: The Other Side of Annuities,": LIMRA'S Market Facts, Nov./Dec. 1995, vol. 14, Issue 6, pp. 45-48.

Hargrave, Stanley E., "An Update and More," Journal of Financial Planning, Denver, Oct. 1998, vol. 11, Issue 5, pp. 36-38.

Koco, Linda, "New England Annuities Unit Unveils 4th Generation VA," National Underwriter (Life, Health/Financial Services Ed.), Erlanger, Sep. 25, 1995, vol. 99, Issue 39; pp. 11-12.

(56) References Cited

OTHER PUBLICATIONS

McDonnell Steve, More Vas Introduce Liquidity Options During Annuitization, Annuity insight Weekly, Apr. 20, 2001, Strategic Insight, www.sionline.com.
Anonymous, National Underwriter, Oct. 27, 1997. vol. 101, Iss. 43; 1 page "Penn Mutual offers asset-based comp. on variable UL".
James F. Reeves, The CPA Journal; Sep. 1998; vol. 68, Issue 9; 3 pages "Growing your practice beyond financial planning: the CPA as investment adviser".
American Banker, May 24, 1999, v. 7, 2 pages "Credit-Enhanced Variable Annuities Storm Market".
Catherine Newton, Journal of Financial Planning; Mar. 1999; 12, 3; 7 pages "Weighing in on the variable annuity debate".

* cited by examiner

4400

7700

Fig. 81
8100
Start Client Tools Data
Introduction
Data Gathering
Presentation
Delivery
Calculators
Jump To...
Legacy Strategies
The following information illustrates the value of maintaining Permanent Life insurance as a means toward improving retirement cash flow.
Locked Out of Wealth
Interest
Retirement Savings
Living on interest only
Reluctant to enjoy benefits of principal
This module contains video with sound. Please adjust your speaker volume to a comfortable level.
Back to PLI Story
Next: Action Steps
Click Here To Restore Toolbar

8200

8300

8600

8700

8900

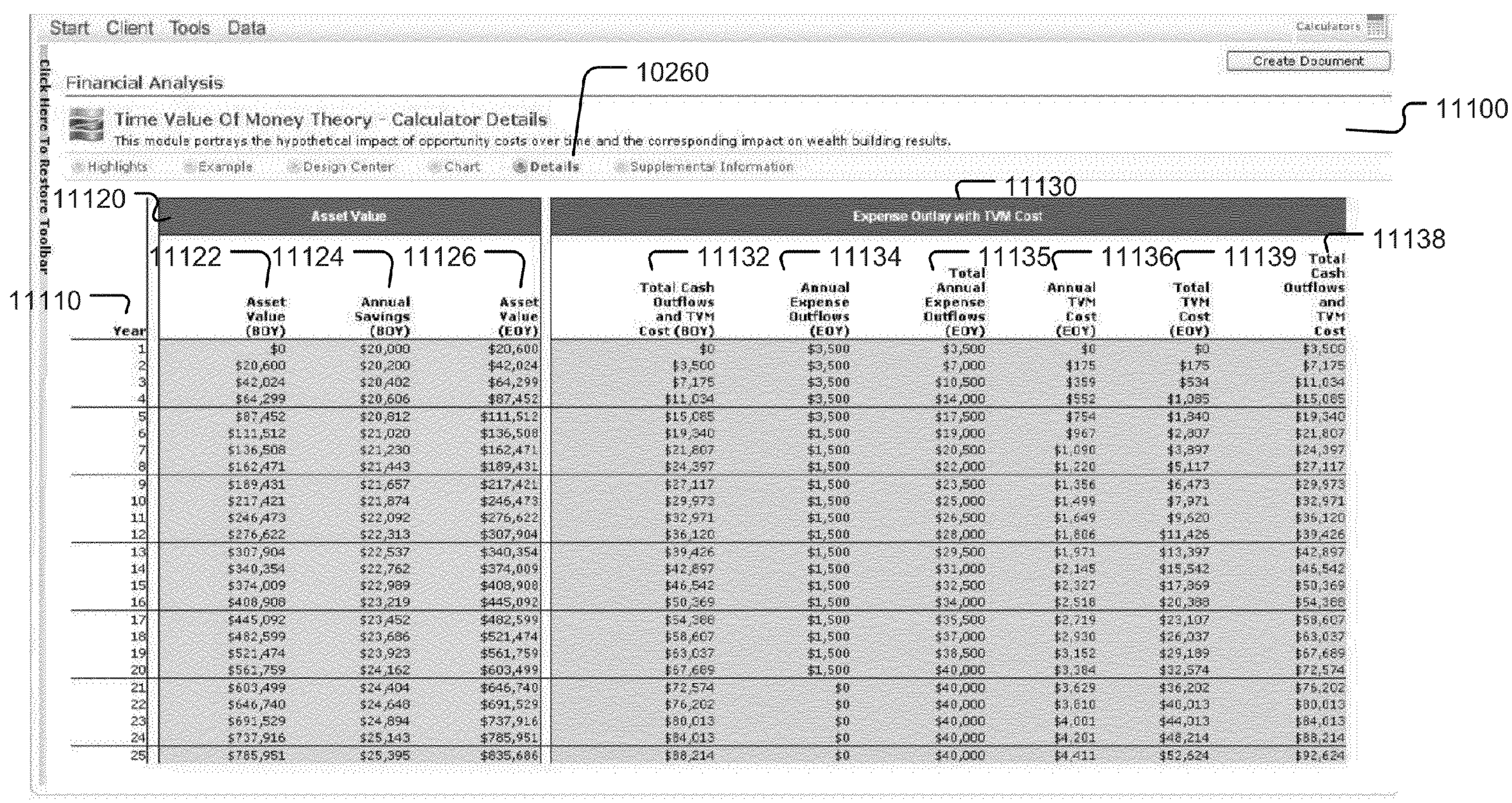

| Year | Asset Value (BOY) | Annual Savings (BOY) | Asset Value (EOY) | Total Cash Outflows and TVM Cost (BOY) | Annual Expense Outflows (EOY) | Total Annual Expense Outflows (EOY) | Annual TVM Cost (EOY) | Total TVM Cost (EOY) | Total Cash Outflows and TVM Cost |
|---|---|---|---|---|---|---|---|---|---|
| 1 | $0 | $20,000 | $20,600 | $0 | $3,500 | $3,500 | $0 | $0 | $3,500 |
| 2 | $20,600 | $20,200 | $42,024 | $3,500 | $3,500 | $7,000 | $175 | $175 | $7,175 |
| 3 | $42,024 | $20,402 | $64,299 | $7,175 | $3,500 | $10,500 | $359 | $534 | $11,034 |
| 4 | $64,299 | $20,606 | $87,452 | $11,034 | $3,500 | $14,000 | $552 | $1,085 | $15,085 |
| 5 | $87,452 | $20,812 | $111,512 | $15,085 | $3,500 | $17,500 | $754 | $1,840 | $19,340 |
| 6 | $111,512 | $21,020 | $136,508 | $19,340 | $1,500 | $19,000 | $967 | $2,807 | $21,807 |
| 7 | $136,508 | $21,230 | $162,471 | $21,807 | $1,500 | $20,500 | $1,090 | $3,897 | $24,397 |
| 8 | $162,471 | $21,443 | $189,431 | $24,397 | $1,500 | $22,000 | $1,220 | $5,117 | $27,117 |
| 9 | $189,431 | $21,657 | $217,421 | $27,117 | $1,500 | $23,500 | $1,356 | $6,473 | $29,973 |
| 10 | $217,421 | $21,874 | $246,473 | $29,973 | $1,500 | $25,000 | $1,499 | $7,971 | $32,971 |
| 11 | $246,473 | $22,092 | $276,622 | $32,971 | $1,500 | $26,500 | $1,649 | $9,620 | $36,120 |
| 12 | $276,622 | $22,313 | $307,904 | $36,120 | $1,500 | $28,000 | $1,806 | $11,426 | $39,426 |
| 13 | $307,904 | $22,537 | $340,354 | $39,426 | $1,500 | $29,500 | $1,971 | $13,397 | $42,897 |
| 14 | $340,354 | $22,762 | $374,009 | $42,897 | $1,500 | $31,000 | $2,145 | $15,542 | $46,542 |
| 15 | $374,009 | $22,989 | $408,908 | $46,542 | $1,500 | $32,500 | $2,327 | $17,869 | $50,369 |
| 16 | $408,908 | $23,219 | $445,092 | $50,369 | $1,500 | $34,000 | $2,518 | $20,388 | $54,388 |
| 17 | $445,092 | $23,452 | $482,599 | $54,388 | $1,500 | $35,500 | $2,719 | $23,107 | $58,607 |
| 18 | $482,599 | $23,686 | $521,474 | $58,607 | $1,500 | $37,000 | $2,930 | $26,037 | $63,037 |
| 19 | $521,474 | $23,923 | $561,759 | $63,037 | $1,500 | $38,500 | $3,152 | $29,189 | $67,689 |
| 20 | $561,759 | $24,162 | $603,499 | $67,689 | $1,500 | $40,000 | $3,384 | $32,574 | $72,574 |
| 21 | $603,499 | $24,404 | $646,740 | $72,574 | $0 | $40,000 | $3,629 | $36,202 | $76,202 |
| 22 | $646,740 | $24,648 | $691,529 | $76,202 | $0 | $40,000 | $3,810 | $40,013 | $80,013 |
| 23 | $691,529 | $24,894 | $737,916 | $80,013 | $0 | $40,000 | $4,001 | $44,013 | $84,013 |
| 24 | $737,916 | $25,143 | $785,951 | $84,013 | $0 | $40,000 | $4,201 | $48,214 | $88,214 |
| 25 | $785,951 | $25,395 | $835,686 | $88,214 | $0 | $40,000 | $4,411 | $52,624 | $92,624 |

Fig. 111

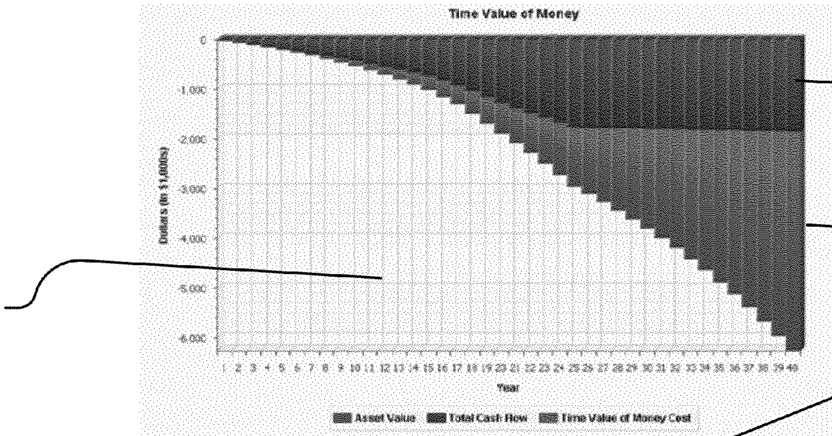

| SUMMARY | |
|---|---|
| **ASSETS** | |
| Beginning Asset Value | $0 |
| Future Asset Value @ 0% | $0 |
| **CASH FLOW** | |
| Expenses | $1,851,368 |
| Time Value of Money @ 5% | $4,413,508 |
| Total Costs | $6,264,876 |

11240

Selecting a TVOM Rate

The establishment of a Time Value of Money rate is not an exact science. In fact, it varies from person to person and also fluctuates over a person's lifetime. By definition, the hypothetical TVOM rate is the best annual, after tax rate of return that is available to that individual or household.

If a person "feels" that their best investment opportunity is 5% net over the long run, then this might be the price tag associated with losses due to various financial costs. Alternatively, if a person carries substantial credit card balances as a liability on their balance sheet, then the interest costs (perhaps 18% or higher) on this debt may be an appropriate TVOM factor. The rationale is that cost avoidance in another financial area may free up cash flow to avoid paying these high interest costs.

Identify, Calculate, and Recover 11242

As part of a thorough financial evaluation, it is important to identify where certain costs exist that are eroding, or pulling against, any wealth building progress that is expected. Next, a TVOM rate should be applied to these actual costs to more accurately understand the magnitude and total financial impact. Finally, efforts should be made to reduce (or avoid) these costs or, where possible, recover these costs in time for future lifetime enjoyment.

11200B

11244

Wealth Building Choices

Fig. 113

The graphical representation 14120 may be based, at least in part, on one or more assumptions including, e.g., an original principal investment (e.g., $100,000), a rate of return (e.g., 6%), and an income tax rate (e.g., 35%).

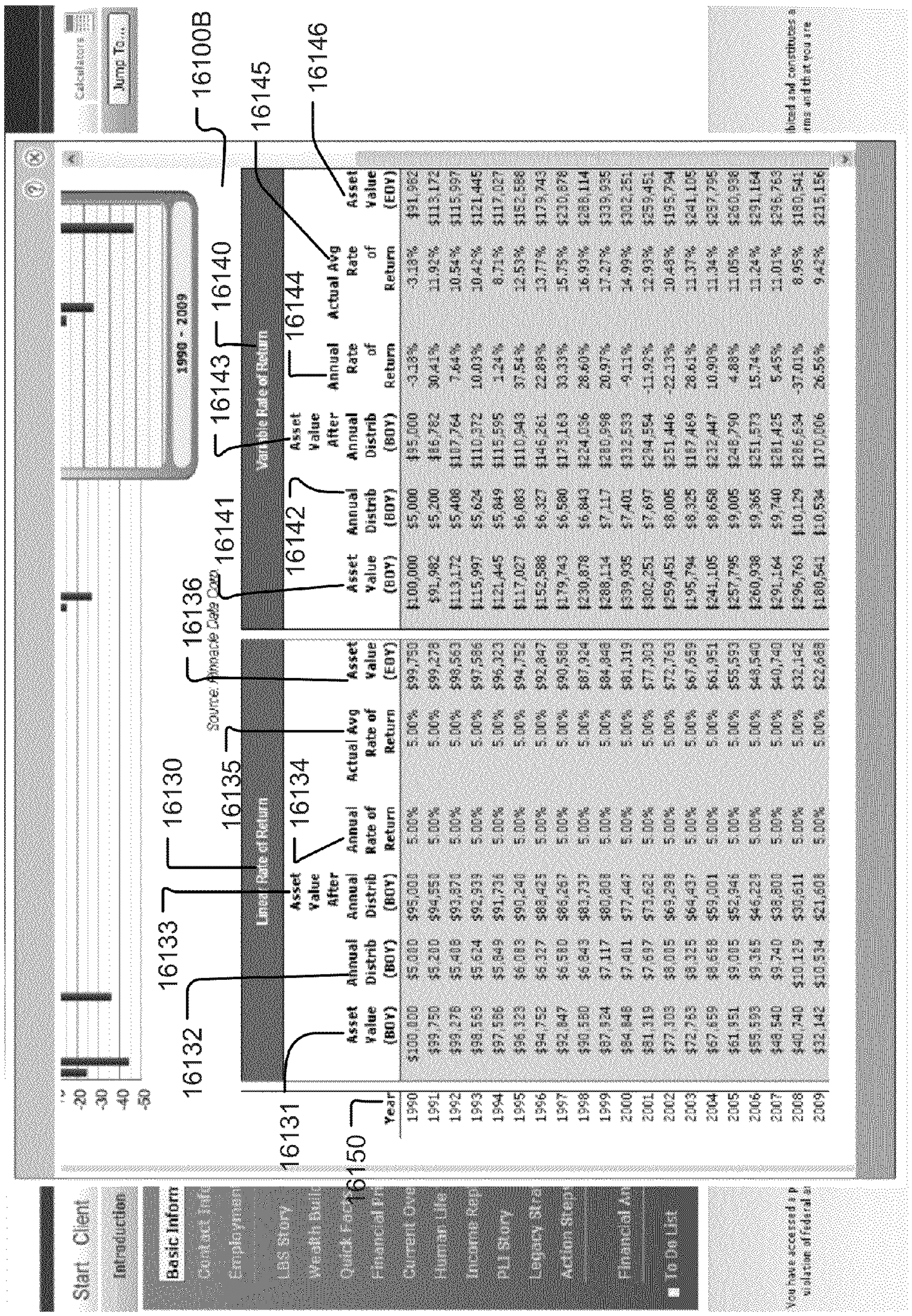

| Year | Linear: Asset Value (BOY) | Annual Distrib (BOY) | Asset Value After Annual Distrib (BOY) | Annual Rate of Return | Actual Avg Rate of Return | Asset Value (EOY) | Variable: Asset Value (BOY) | Annual Distrib (BOY) | Asset Value After Annual Distrib (BOY) | Annual Rate of Return | Actual Avg Rate of Return | Asset Value (EOY) |
|---|---|---|---|---|---|---|---|---|---|---|---|---|
| 1990 | $100,000 | $5,000 | $95,000 | 5.00% | 5.00% | $99,750 | $100,000 | $5,000 | $95,000 | -3.18% | -3.18% | $91,982 |
| 1991 | $99,750 | $5,200 | $94,550 | 5.00% | 5.00% | $99,278 | $91,982 | $5,200 | $86,782 | 30.41% | 11.92% | $113,172 |
| 1992 | $99,278 | $5,408 | $93,870 | 5.00% | 5.00% | $98,563 | $113,172 | $5,408 | $107,764 | 7.64% | 10.54% | $115,997 |
| 1993 | $98,563 | $5,624 | $92,939 | 5.00% | 5.00% | $97,586 | $115,997 | $5,624 | $110,372 | 10.03% | 10.42% | $121,445 |
| 1994 | $97,586 | $5,849 | $91,736 | 5.00% | 5.00% | $96,323 | $121,445 | $5,849 | $115,595 | 1.24% | 8.71% | $117,027 |
| 1995 | $96,323 | $6,083 | $90,240 | 5.00% | 5.00% | $94,752 | $117,027 | $6,083 | $110,943 | 37.54% | 12.53% | $152,588 |
| 1996 | $94,752 | $6,327 | $88,425 | 5.00% | 5.00% | $92,847 | $152,588 | $6,327 | $146,261 | 22.89% | 13.77% | $179,743 |
| 1997 | $92,847 | $6,580 | $86,267 | 5.00% | 5.00% | $90,580 | $179,743 | $6,580 | $173,163 | 33.33% | 15.75% | $230,878 |
| 1998 | $90,580 | $6,843 | $83,737 | 5.00% | 5.00% | $87,924 | $230,878 | $6,843 | $224,036 | 28.60% | 16.93% | $288,114 |
| 1999 | $87,924 | $7,117 | $80,808 | 5.00% | 5.00% | $84,848 | $288,114 | $7,117 | $280,998 | 20.97% | 17.27% | $339,935 |
| 2000 | $84,848 | $7,401 | $77,447 | 5.00% | 5.00% | $81,319 | $339,935 | $7,401 | $332,533 | -9.11% | 14.99% | $302,251 |
| 2001 | $81,319 | $7,697 | $73,622 | 5.00% | 5.00% | $77,303 | $302,251 | $7,697 | $294,554 | -11.92% | 12.93% | $259,451 |
| 2002 | $77,303 | $8,005 | $69,298 | 5.00% | 5.00% | $72,763 | $259,451 | $8,005 | $251,446 | -22.13% | 10.48% | $195,794 |
| 2003 | $72,763 | $8,325 | $64,437 | 5.00% | 5.00% | $67,659 | $195,794 | $8,325 | $187,469 | 28.61% | 11.37% | $241,105 |
| 2004 | $67,659 | $8,658 | $59,001 | 5.00% | 5.00% | $61,951 | $241,105 | $8,658 | $232,447 | 10.90% | 11.34% | $257,795 |
| 2005 | $61,951 | $9,005 | $52,946 | 5.00% | 5.00% | $55,593 | $257,795 | $9,005 | $248,790 | 4.88% | 11.05% | $260,938 |
| 2006 | $55,593 | $9,365 | $46,229 | 5.00% | 5.00% | $48,540 | $260,938 | $9,365 | $251,573 | 15.74% | 11.24% | $291,164 |
| 2007 | $48,540 | $9,740 | $38,800 | 5.00% | 5.00% | $40,740 | $291,164 | $9,740 | $281,425 | 5.45% | 11.01% | $296,763 |
| 2008 | $40,740 | $10,129 | $30,611 | 5.00% | 5.00% | $32,142 | $296,763 | $10,129 | $286,634 | -37.01% | 8.95% | $180,541 |
| 2009 | $32,142 | $10,534 | $21,608 | 5.00% | 5.00% | $22,688 | $180,541 | $10,534 | $170,006 | 26.56% | 9.42% | $215,156 |

Fig. 162

INTERACTIVE SYSTEMS AND METHODS FOR SUPPORTING FINANCIAL PLANNING RELATED ACTIVITIES

RELATED PATENT APPLICATIONS

This application claims the benefit of U.S. Provisional Patent Application No. 61/499,528 filed Jun. 21, 2011, which is hereby incorporated herein in its entirety. Further, this application is a continuation-in-part of U.S. patent application Ser. No. 12/771,795, filed Apr. 30, 2010, which is a continuation-in-part of U.S. patent application Ser. No. 12/380,564, filed Feb. 27, 2009, which is a continuation-in-part of U.S. patent application Ser. No. 12/113,087, filed Apr. 30, 2008, which is a continuation-in-part of U.S. patent application Ser. No. 11/891,616, filed Aug. 10, 2007, which is a continuation-in-part of U.S. patent application Ser. No. 11/510,537, filed Aug. 25, 2006, which claims the benefit of U.S. Provisional Patent Application No. 60/763,200, filed Jan. 27, 2006, which are all hereby incorporated herein by reference in their entireties. U.S. patent application Ser. No. 11/510,537 issued as U.S. Pat. No. 8,073,714 on Dec. 16, 2011. U.S. patent application Ser. No. 12/113,087 issued as U.S. Pat. No. 8,185,463 on May 22, 2012.

COPYRIGHT NOTICE

The present application includes material that is subject to copyright protection. The copyright owner does not object to the facsimile reproduction of the application by any person as the application appears in the records of the U.S. Patent and Trademark Office, but otherwise reserves all rights in the copyright.

FIELD OF THE DISCLOSURE

The present disclosure relates to interactive tools for assisting agents (such as, for example, insurance professionals, estate planners, financial planners, and the like) in performing activities such as, for example, marketing products or services to new or existing clients, managing client relationships, prospecting for new clients, and the like.

BACKGROUND OF THE DISCLOSURE

Historically agents (such as, for example, insurance professionals, estate planners, financial planners, and the like) have relied on traditional paper and notebook type techniques for tasks such as client management, organization, sales, marketing, and the like. Transitioning to computer-based solutions can be complex and confusing to such professionals who may not already have familiarity with using personal computers and the Internet. In addition, many who are presently practicing in the financial planning field, which may include, for example, the insurance field, the estate planning field, and the like, commenced their careers well before the prevalence of personal computers and the Internet. The insurance field, for example, is one in which professionals (agents) practicing in that field tend to adopt and maintain the traditional ways of conducting business. However, many of those who are entering the financial planning field as agents are typically individuals who are accustomed to, and more comfortable interacting with an electronic world of personal computers and the Internet than traditional techniques. As such, electronic solutions and features that can meet the variable needs of interested parties are needed in the financial planning field.

Moreover, known software applications for the financial planning field do not provide adequate support for a broad range of activities or services that are needed by the agents who practice in the field. For example, known software applications are inadequate in meeting the needs of agents in areas such as interactive financial planning reports, client organizers, interactive financial calculators, client data gathering tools, automatic configuration based on client data, and the like.

As such, a need exists for improved software and system solutions in the financial planning filed, which may include, for example, the insurance field, the estate planning field, and the like.

SUMMARY OF THE DISCLOSURE

In accordance with the principles of the present disclosure, methods and systems for providing interactive financial planning related tools and applications are provided.

In accordance with one aspect of the disclosure a system for displaying financial data is disclosed. The system may include: a module configured to obtain financial data; a module configured to display a first visual representation, wherein the first visual representation includes a container, wherein the container includes a second visual representation associated with a value of a client's retirement assets; a module configured to display a third visual representation, wherein the third visual representation includes an inflow channel, wherein the inflow channel provides a fourth visual representation of an inflow associated with the value of a client's earned income; and, a module configured to display a fifth visual representation, wherein the fifth visual representation includes an outflow channel, wherein the outflow channel provides a sixth visual representation of an outflow associated with the value of a client's lifestyle costs.

The visual representations may include a video or moving picture graphic.

The financial data may include a cash flow associated with a financial domain.

The financial domain may include one or more of assets, protections, liabilities, or cash flow.

The system may also include a module configured to adjust the second visual representation associated with a value of a client's retirement assets, based at least in part, on a difference between the flow in the inflow channel and the flow in the outflow channel.

The system may also include a module configured to decrease the second visual representation associated with a value of a client's retirement assets if the outflow is greater than the inflow.

The system may also include a module configured to increase the second visual representation associated with a value of a client's retirement assets if the inflow is greater than the outflow.

Another aspect of the present disclosure provides a method of displaying financial data, the method comprising: obtaining financial data; associating at least a portion of the financial data with a feature of a visual display; generating a display that includes financial data flowing from a first financial domain into a second financial domain.

The financial data may include a cash flow associated with a financial domain.

The financial domain may include one or more of a protections domain, a liabilities domain, an assets domain, and/or a cash flow domain.

The financial domains may include financial domains that are interdependent.

The first financial domain and the second financial domain may include one or more of a protections domain, a liabilities domain, an assets domain, and/or a cash flow domain.

The method may also include: displaying a first visual representation, wherein the first visual representation includes a container, wherein the container includes a second visual representation associated with a value of a client's retirement assets; displaying a third visual representation, wherein the third visual representation includes an inflow channel, wherein the inflow channel provides a fourth visual representation of an inflow associated with the value of a client's earned income; displaying a fifth visual representation, wherein the fifth visual representation includes an outflow channel, wherein the outflow channel provides a sixth visual representation of an outflow associated with the value of a client's lifestyle costs.

The method may also include adjusting the second visual representation, based at least in part, on the difference between the flow in the inflow channel and the flow in the outflow channel.

Another aspect of the disclosure provides a method of managing a client's financial resources, the method comprising: receiving financial data; associating the financial data with two or more interdependent financial domains; and, managing the client's financial assets in a manner that achieves an optimal balance of the at least two or more interdependent financial domains without considering a client's financial goals.

The financial domains may include a protection domain, a liability domain, an assets domain, and a cash flow domain.

The financial domains may include one or more subdomains.

The method may also include wherein the step of achieving an optimal financial balance of the two or more interdependent financial domains includes minimizing risk.

The method may also include wherein the step of achieving an optimal financial balance includes considering one or more scenarios based upon assumptions associated with expected life events.

The method may also include wherein the step of achieving an optimal balance of the two or more interdependent financial domains includes adhering to a plurality of financial rules.

The financial rules may facilitate maintaining protection to fully replace the item or items being insured, minimizing tax burdens, reducing debt, and/or improving cash flow.

Additional features, advantages, and embodiments of the disclosure may be set forth or apparent from consideration of the detailed description and drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIGS. 102-113 illustrate examples of display pages that show aspects of a time value of money (TVOM) portion of the financial analysis tool, in accordance with one embodiment of the disclosure;

FIGS. 157-162 illustrate examples of display pages that show aspects of a variable interest rate portion of the financial analysis tool, in accordance with one embodiment of the disclosure.

Figure 1:
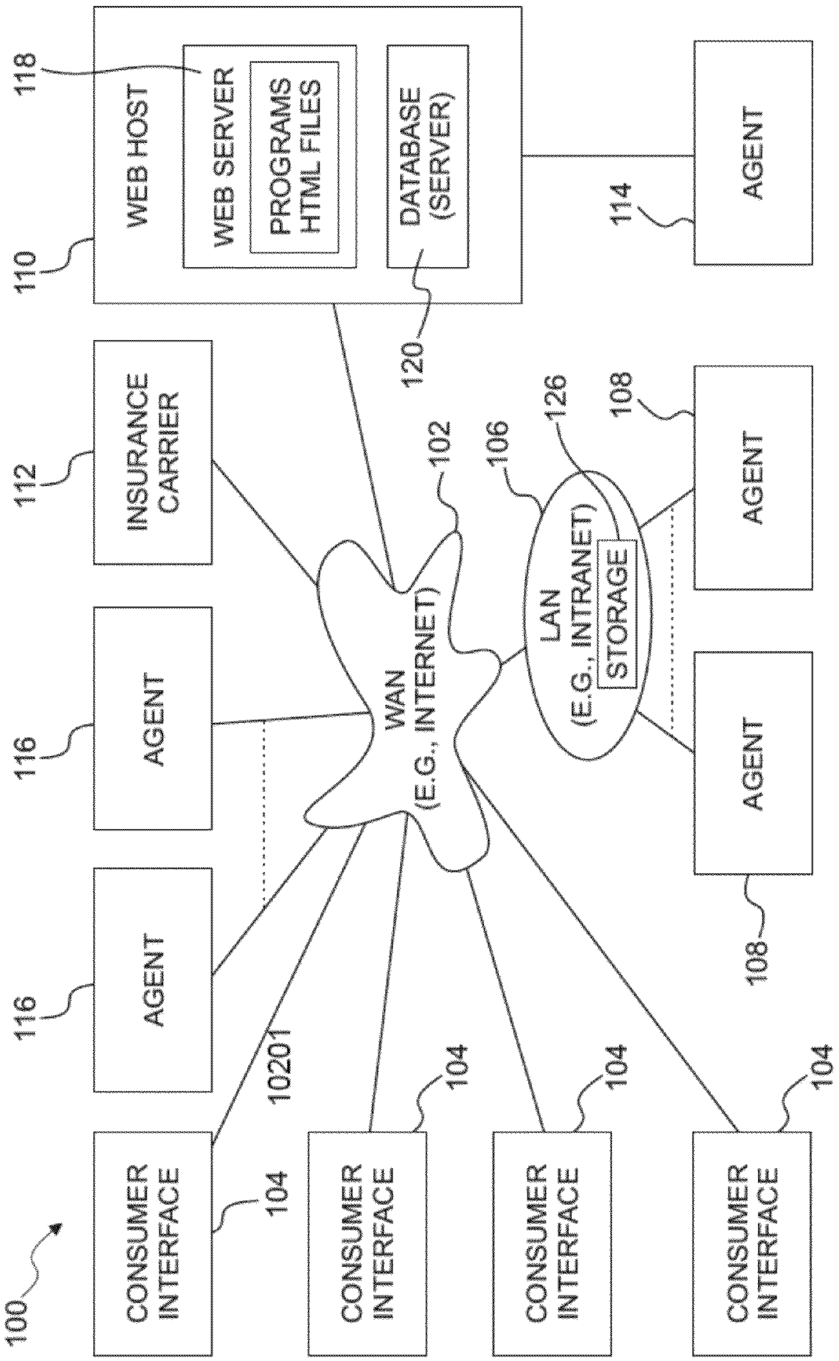
FIG. 1 is a functional block diagram of illustrative systems for providing software-implemented financial planning support services, in accordance with one embodiment of the disclosure.

The present disclosure is further described in the detailed description that follows.

DETAILED DESCRIPTION OF PREFERRED EMBODIMENTS

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Software applications, tools, or features are provided that are intuitive, easy to comprehend, and easy to install. Software, for example, is implemented that can aid those with little software or Internet experience to collect client information, manage clients, track progress with respect to clients, generate reports, and evaluate weaknesses in financial planning. A networked solution can be provided to alleviate data storage needs of users and to increase marketing opportunities by way of sharing information. Aggregation services can be combined with software features to increase the usefulness of the software over time in analyzing financial planning needs. Software can also be implemented with color coordination and navigation tools to ease a user's comprehension and interaction with the software. Another aspect can involve detailed data collection and automatic use of collected data and the automatic configuration of the software (e.g., options, pages) based on the collected data. These and other features that show a general step forward in the financial planning field are also described herein.

A "computer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a smart phone, a cellular telephone, a tablet, a web-book, a notebook computer, a desktop computer, a workstation computer, a server, a cloud, or the like, or an array of processors, microprocessors, central processing units, general purpose computers, super computers, personal computers, laptop computers, palmtop computers, notebook computers, desktop computers, workstation computers, servers, or the like.

A "database," as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "network," as used in this disclosure, means any combination of software and/or hardware, including any machine, device, circuit, component, or module, or any system of machines, devices, circuits, components, modules, or the like, which are capable of transporting signals from one location to another location, where the signals may comprise information, instructions, data, and the like. A network may include, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), or the like, any of which may be configured to communicate data via a wireless and/or a wired communication medium.

A "server," as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any of its computers, may also be used as a workstation.

A "communication link," as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, and the like. One or more communication links may be used in an environment 100 (shown in FIG. 1) to allow sufficient data throughput and interaction between end-users (such as, e.g., agents, consumers, insurance carriers, estate planners, financial providers, web host providers, and the like). Techniques for implementing such communications links are known to those of ordinary skilled in the art.

The terms "including," "comprising," "having," and variations thereof, as used in this disclosure, mean "including, but not limited to," unless expressly specified otherwise.

The terms "a," "an," and "the," as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium," as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer-readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

A "client," as used in this disclosure, means any individual who is interested in or is potentially interested in financial planning utilizing the tools described herein, except where the term "client" refers to a device such as, for example, a computer in a client-server architecture as made clear by the context within which the term is used. A client can refer to an individual, a couple, a married couple, or other combinations of individuals. A client can be the user of the system. In some embodiments, an agent can be the user of the system and the client can be the agent's client. A client can be a grantor.

An "agent," as used in this disclosure, means an insurance professional, an estate planner, a financial adviser, or the like. An agent may refer to an individual, an entity or a device. The entity may include, for example, an insurance company, an investment company, a bank, an estate planner, or the like. The device may include, for example, a computer, which may include artificial intelligence, such as, for example, fuzzy logic, a neural network, or the like.

A "carrier," as used in this disclosure, means a financial product or financial service provider. The financial product or service may include, for example, an insurance product or service, an estate planning product or service, an investment product or service, or the like. The carrier may refer to an individual or an entity. The entity may include, for example, an insurance company, an investment company, a bank, an estate planner, or the like.

With reference to FIG. 1, an environment such as the environment 100 may be used by an agent for receiving financial planning related products and/or services to, for example, assist the agent in managing, marketing, and providing financial planning related products and/or services. The environment 100 may include a wide area network (WAN) 102 (e.g., the Internet), one or more WAN consumer interface 104, carrier equipment 112, web host equipment 110, and agent equipment 116. If desired, a configuration may be implemented in which the carrier equipment 112 and the web host equipment 110 are combined (e.g., to provide the carrier as also the web host). If desired, the environment 100 may be configured to include, for example, a local area network (LAN) 106 (e.g., an intranet) and LAN agent interface equipment 108. If desired, the environment 100 may be configured to include agent equipment 114, which may be directly connected to the web host equipment 110, or to include a direct connection from the carrier equipment 112 to the web host equipment 110. If desired, the environment 100 may also be configured in other ways. For example, there may be a fewer or a greater number of components (e.g., equipment or consumer interfaces) in the environment 100. The components of the environment 100 may be coupled through communication links 10201. The environment 100 may include software applications implemented in the environment 100 to support interactive tools for agents and to provide an interface for consumers.

The web host equipment 110 may be central to providing a combination of financial planning tools, which may include interactive insurance tools, interactive estate planning tools, and the like. If desired, a distributed architecture may be used. The web host equipment 110 may include equipment such as, for example, the web server 118 and a database 120. The database 120 may be part of the web server 118, a separate database server, multiple servers, or other such host equipment. The database 120 may be a separate unit that may be located proximate to the server 118, or located at a remote location. One or more applications for providing interactive financial planning tools may be implemented on the web server 118 to provide financial planning related services. The database 120 may store information related to consumers (e.g., clients, customers, and the like), agents (e.g., insurance professionals, estate planners, financial planners, and the like), and carriers (e.g., insurance carriers, insurance companies, estate planners, and the like) that use the tools and services that are available in the environment 100.

The web host equipment 110 may have been implemented by, for example, an insurance carrier, estate planner, financial planner, or the like, to assist its agents and representatives by providing interactive tools available through the agent equipment 116 that may drive and manage business for the agents.

Agents may interact with the financial planning related services, which may be available via the WAN 102, such as services tools using the agent interface equipment 116. The agent interface equipment 116 may include a computer that comprises a suitable interface for implementing one or more of the financial planning tools available via the environment 100. For example, for tools related to data collection and compilation, a computer that provides a convenient interface for data entry such as a full keyboard may be desirable. However, the use of other features may not require such functionality for each instance of their use. The LAN 106 may be an enterprise platform implementation in which some or all of the functionality and services available from the web host 110 is implemented in the LAN 106 to supplement or replace the web host equipment 110. The agent interface equipment 108 may comprise equipment such as that mentioned above in connection with the agent interface equipment 116. As mentioned above, the web host equipment 110 may be configured to include a direct connection with the agent interface equipment 114. The agent interface equipment 114 may comprise equipment such as that mentioned above in connection with the agent interface equipment 116.

Consumers may preferably interact with financial planning related products and/or services available via the WAN 102 using the consumer interfaces 104. The consumer interfaces 104 may each include a computer that is coupled to the WAN 102 via the communication link 10201.

The carrier equipment 112 may include an interface for a carrier to interact with the web host equipment 110. If desired, the carrier equipment 112 may allow a carrier to interact with the agents via the WAN 102. If desired, the carrier equipment 112 may be configured to have a direct connection or a private network connection to the web host equipment 110 that is in addition or an alternative to a WAN connection. The carrier equipment 112 may comprise a computer that may communicate with the web host equipment 10 over the communication link 10201.

One or more carriers may participate in the environment 100 such as through a plurality of the carrier equipment 112. However, the environment 100 may be configured to include a private communications network that is sponsored by, for example, a particular entity, such as, e.g., an insurance company, an estate planner, an investment company, or the like, to provide tools and assistance to its agents through networked applications and databases. The private communications network can be implemented at least partially through a public packet data network such as the Internet. The applications and services may be branded with the entity's logo and details.

The environment 100 may provide a variety of financial planning products and/or services to agents. For example, the environment 100 may be used to provide financial planning services tools to agents to assist them in marketing products, managing information, educating clients, generating presentations, managing clients or developing prospects, managing insurance options for a client with estate interests, or other tools or services illustratively described herein.

Figure 2:
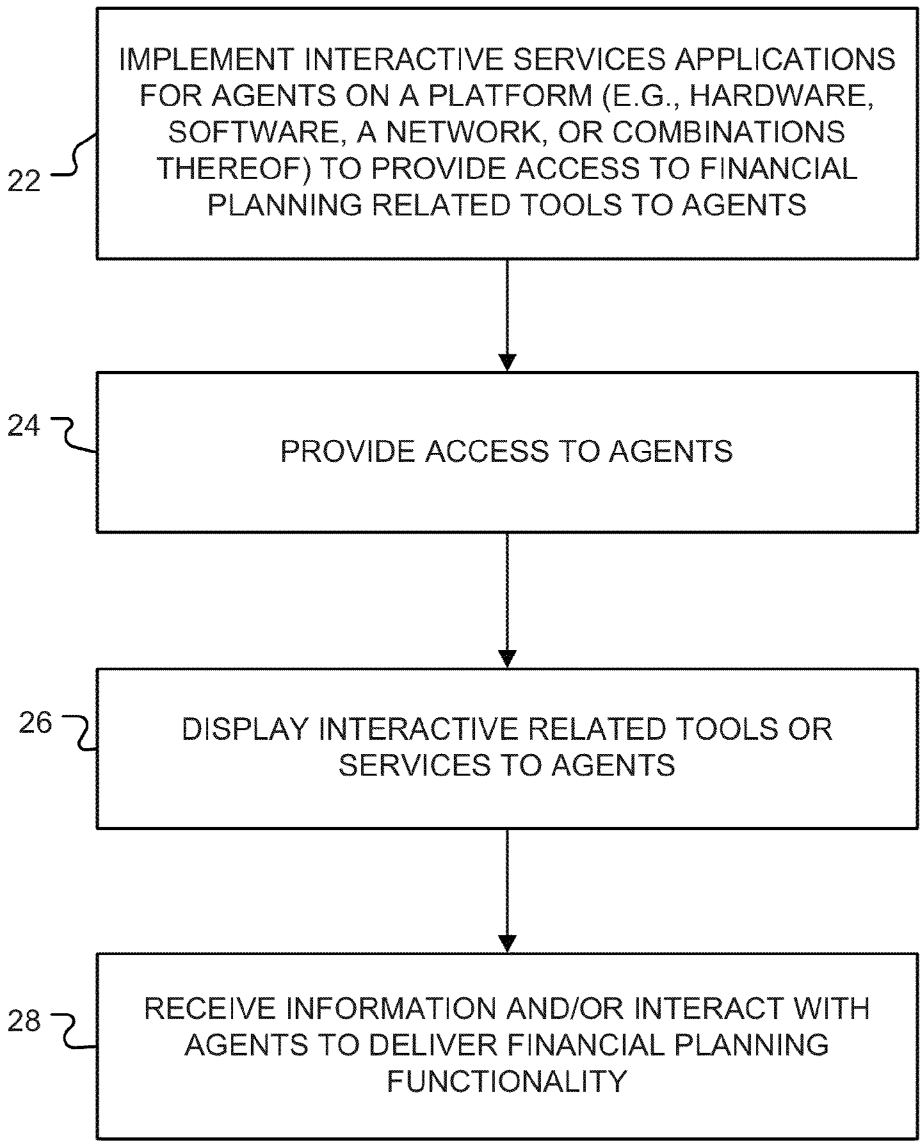
FIG. 2 is a flow chart for providing interactive financial planning support services, in accordance with one embodiment.

An interactive application for providing financial planning related tools and functionality for agents can be provided at least based in part on a process illustratively shown in FIG. 2.

With reference to FIG. 2, at step 22, an interactive financial planning related services application specifically configured for agents or one or more such applications is implemented on a platform to provide access to financial planning related tools or services to the agents. The platform may comprise hardware, software, a network, or combinations thereof. For example, the combination of the application and the platform may be considered the agent-interface equipment (e.g., the agent interface equipment 116 of FIG. 1).

At step 24, agents may be provided access to the application. In providing access, authentication techniques may preferably be implemented to provide access only to intended types of users and, in addition, only to those users who are registered to use the application. As such, the general public would not be provided access to the application.

At step 26, interactive tools or services may be displayed to the agents. For example, after a user is authenticated, an application that implements financial planning related interactive tools or services displays the tools or services to the user.

At step 28, the application receives information and/or interacts with one or more of the agents to deliver financial planning related functionality to the agent(s). Accordingly, through interaction with the application, functionality, such as client tracking, data organization, data collection, or preparation of presentations, an agent can benefit from financial planning related services that are designed to enhance and improve the agent's business operations, including its efficiency and speed of service.

Figure 3:
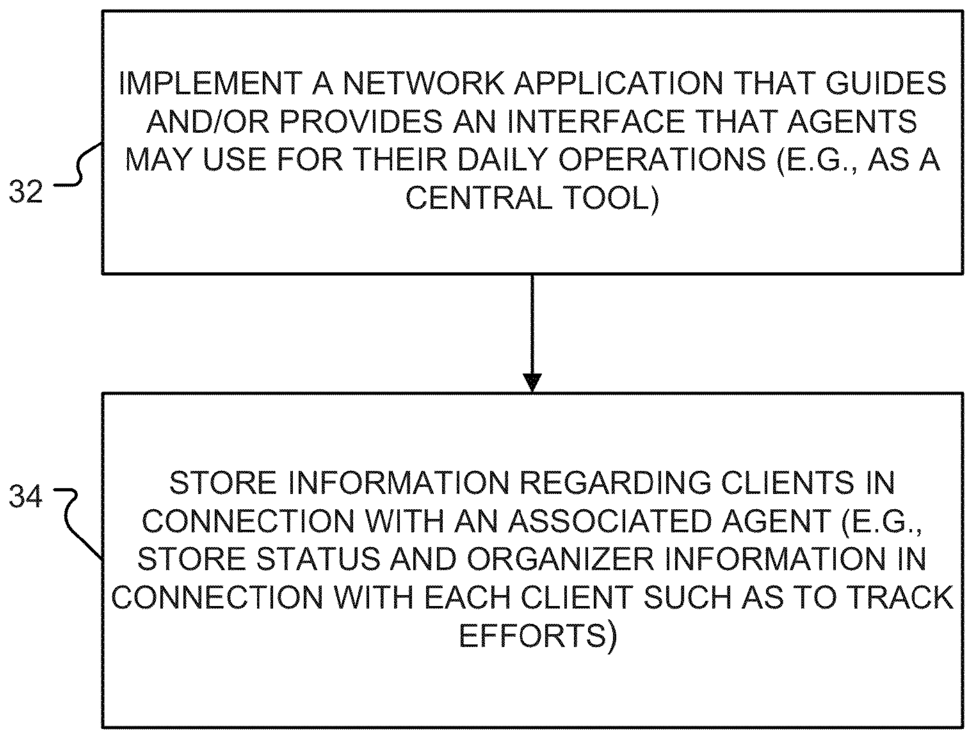
FIG. 3 is a flow chart for providing a network application, in accordance with one embodiment.

Illustrative steps involved in, for example, providing network-based financial planning related software tools or services to agents are shown in FIG. 3.

With reference to FIG. 3, at step 32, a network-based application is implemented that is configured to guide and/or provide a user interface for an agent. The network-based application may include, for example, a web application that is configured using HTTP communications in a client-server arrangement. The application may be configured to be a central interface for agents in conducting their daily business operations. As such, agents may interact with the application to use its various features to achieve their business needs.

At step 34, in response to interaction with the agents, information may be stored regarding clients or potential clients in connection with an associated agent. The information may include status information, such as, for example, regarding a particular client or status information regarding the extent of progress with respect to a particular client.

Further, by way of example, an organizer tool may be provided that stores information for organizing an agent's client information, tasks, reminders, alerts, etc. (e.g., with respect to an individual client). This implementation allows an agent to review information on the state of discussions with a particular client and to, for example, pick up on discussions from where the agent left off without having to recall from personal memory or by maintaining notes on such activity. For example, the application may provide a record of activity completed with respect to a particular client, and the application may further provide a record of desired activity that remains to be completed, such as, e.g., using a to-do list feature.

An application may be implemented to provide a combination of different tools and services to the agents. The application may include a single application, a combination of different applications (e.g., that are electronically connected, that are separately selectable for execution, etc.), or the application may comprise one or more modules, applets, applications, or other software that is executable for providing desired functionality.

Figure 4:
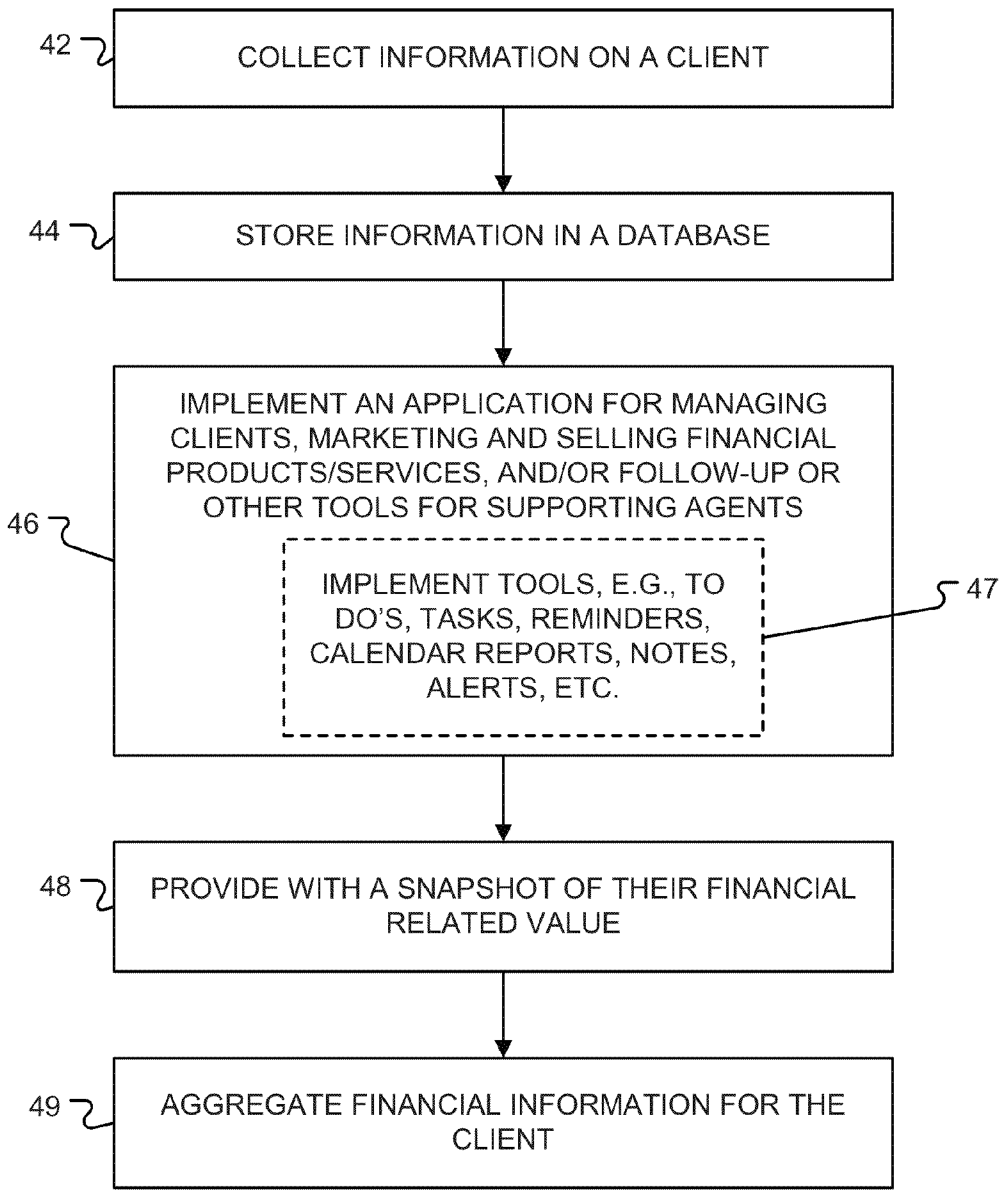
FIG. 4 is a flow chart for providing a software application, in accordance with one embodiment.

Illustrative steps in providing an application that provides various tools and services including a snapshot of a client's financial planning related value are shown in FIG. 4.

Referring to FIG. 4, at step 42, a user interface and an input functionality may be implemented to collect information with respect to a client. For example, an agent may interact with the user interface to collect and input data regarding a particular client and may do so for multiple clients.

At step 44, the information may be stored in a database for later retrieval by the agent, or possibly by the client. The database may be located locally or remotely from the agent.

At step 46, financial planning related tools and services may be implemented and/or provided for performing activities such as, for example, managing clients, marketing, and selling products, providing follow-up, or other tools for supporting the agents. The application may be a central source or outlet for the agent such that it may provide a comprehensive and sole resource or interface for the agent. This, for example, would provide the advantage of simplifying computer interactions for agents such that they only need to interact with this application (e.g., as a dedicated terminal) rather than navigate multiple applications and interact with the operating system, which can often times be confusing for less experienced computer users.

Step 46 may, for example, include step 47. At step 47, various specific tools or services may be provided to users. The tools or services may, for example, include a "to do" or tasks feature, reminders, calendar, reports, notes, alerts, etc., which may be configurable to be specific to each particular client.

At step 48, a snapshot feature may be provided. The snapshot feature may provide a tool for both presenting information and illustrating the financial planning related needs or value of a client, which may include an individual or a family, in connection with the information. The snapshot may be interactive to allow variations of the information to illustratively present different scenarios, e.g., levels of insurance protection needed to meet desired financial goals, which may include, for example, a tax burden for an estate. The snapshot feature may include, e.g., a current value snapshot feature that may be specifically implemented for financial planning, including, for example, insurance or estate planning.

The snapshot may be configured as a tool for illustrating, in connection with a particular category of financial planning (e.g., life insurance, disability, estate planning, etc.), a real life impact on the financial state (e.g., income difference) if an event that would typically trigger the insurance coverage occurred. Thus, the snapshot would be able to display financial planning and its insurance related values that would exist before and after the triggering event. In addition, the snapshot may be configured to provide financial planning related parameters. The financial planning parameters may, for example, be used for controlling how the insurance proceed(s) would be applied or managed, controlling how death benefit proceed(s) would be applied or managed, determining an heir's share, and the like, and to illustratively vary a snapshot view for analysis by the agent to illustrate for the client.

The snapshot feature may be implemented as a module or a component of a network application. In one embodiment, the module may require communications from an agent's computer to a remote processor that performs the calculations and transmits information, such as, the resultant data to the agent for display. In another embodiment, or in combination with such an embodiment, processing and calculations may be performed locally such that a noticeable delay between selecting a calculate button and the display of the resulting information is minimized (e.g., in a network application, there may be a delay involved in sending and receiving information in connection with the calculation). A benefit of the network-based implementation is that a user would not need to install a resident application on their computer.

Enhanced functionality of the financial planning snapshot feature may be realized by combining this feature with an aggregation feature (step 49). Aggregation provides a functionality in which current financial information about an individual (client) can be aggregated, stored, and updated. For example, a client may provide account or personal information to an agent. The aggregate feature, in combination with the snapshot feature, provides a tool by which the client or the agent may periodically evaluate, for example, whether the client's insurance coverage matches the client's current financial situation (e.g., should the client increase or decrease his or her insurance or other death benefit coverage). The aggregated information may also be provided to the agent to conduct such an analysis. The information may be used to automatically access electronic information (e.g., nightly, in real time, periodically, etc.) to provide a resource for viewing the current financial state of a client in various categories (e.g., bank accounts, investments, mortgage, credit card debts, investment property, etc.) and preferably in all categories. The aggregate feature in combination with the snapshot feature provides a tool by which a client or an agent may periodically evaluate whether, for example, the client's insurance coverage matches the client's current financial state (e.g., should the individual now increase or decrease his or her insurance coverage). The aggregated information may also be provided to the agent to conduct such an analysis.

An application (e.g., a network application) may be specifically configured to match or present a carrier's approach for marketing insurance. The application may, thus, integrate the carrier's techniques, its insurance approach, and concepts from its instructions and teaching materials for its agents. Consequently, the application may facilitate an integrated interface for the agents, which provides a seamless connection in thought from instructions and teaching materials to the information displayed in the application, and the interactions and "look-and-feel" therein. Such an approach, for example, provides continuity with the carrier's business approach and presents an intuitive application to the user, who may be well familiar with the carrier's philosophy, but may not be as well versed in computers, the Internet, or software applications. Illustrative steps involved for implementing such an approach are shown in FIG. 5.

Figure 5:
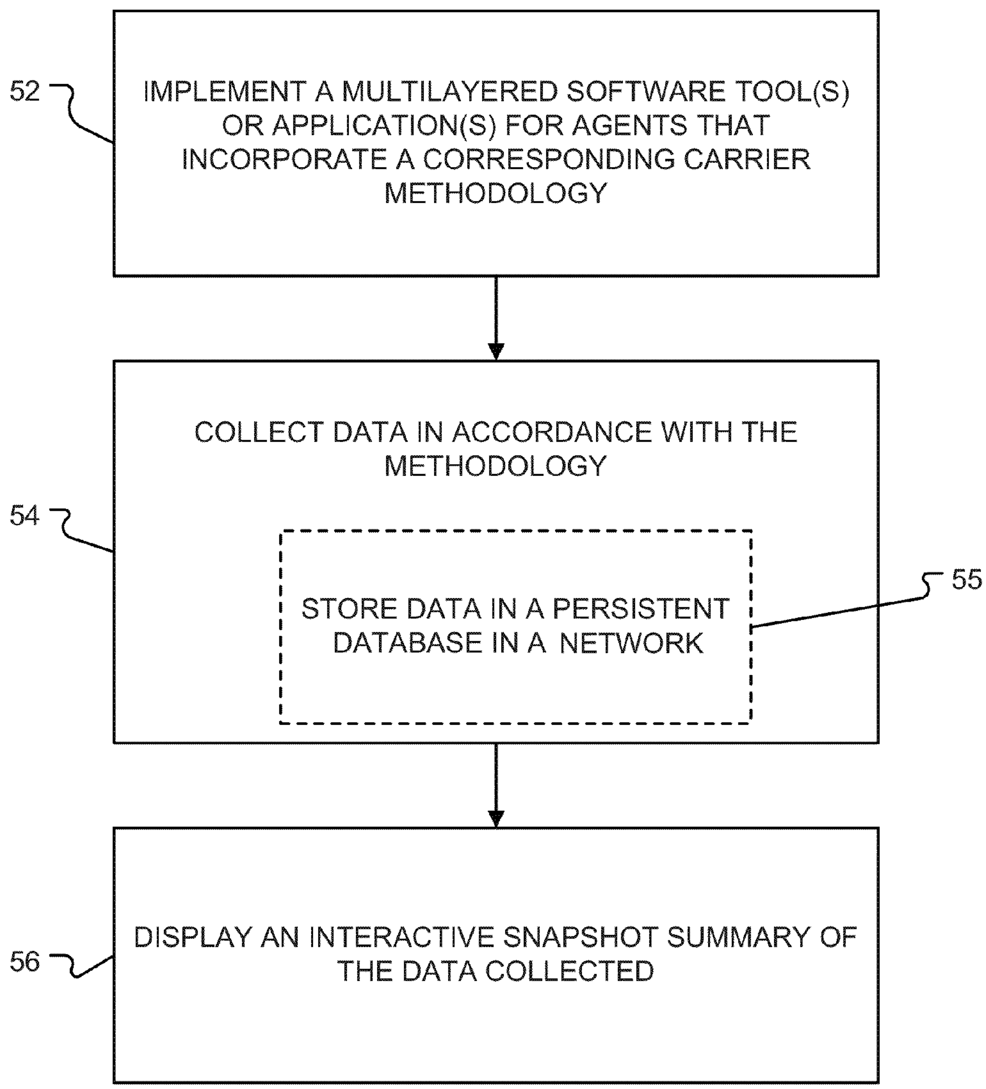
FIG. 5 is a flow chart for implementing a multi-layered software tool, in accordance with one embodiment.

With reference to FIG. 5, at step 52, a multi-layered software tool(s) or application(s) for agents is implemented that incorporates a particular financial planning methodology. The methodology may be that in which the focus is on the life value or current life value of an individual and providing commensurate insurance protection on the estate planning burden of an individual and providing commensurate planning tools using protection. For example, the evaluation of an individual's insurance protection would be based on whether the protection is commensurate with the individual's current financial value (e.g., what would be required, taking into consideration the future wages, expected time of death and year of retirement of an individual, to provide the same financial picture for the individual's family). Such an approach may exclude from consideration the individuals' goals or objectives such as goals with respect to financial condition, savings, or investment goals, which are future term activity which may not be germane to better understanding the current financial picture of that individual. A benefit of providing a multilayered software tool or application is that it provides a convenient interface for the agent to implement the many different but related functions. Thus, for example, issues that often times arise with respect to interoperability of applications and inheritance of persistent data from one application to another can be automatically solved.

At step 54, the software tool(s) or application(s) may be implemented to collect data in accordance with the methodology (e.g., focus on current life value and commensurate protection, or focus on current estate tax burden without collecting financial or investment goal information). For example, the software tool may provide an agent with a data entry section specifically configured to match the carrier's methodology. The data collection may, for example, include a sequence that matches the carrier methodology. The data collection may, for example, focus on the current life value of the individual without collecting or prompting for information on investment needs, needs of the heirs, charitable contributions, out of estate trusts, educational funding for descendents, and the like. A look and feel through colors can be implemented to match the methodology. Step 54 may include step 55.

At step 55, the collected data may be stored in a persistent database in a network that is accessible by the agents. For example, the information may be collected by way of computer input by an agent at an agent's computer and stored in a database that is accessible from the Internet using the multilayered software tool or application.

At step 56, an interactive snapshot summary of the financial planning information of the individual collected or aggregated at step 54 may be displayed. The information may be displayed in a single page in a hierarchy that matches the methodology. In addition, color schemes may be used to provide a display that may intuitively connect the methodology and the configuration of the software. The feature may be interactive in that items of information displayed in the snapshot may be selected to display underlying information with respect to the selected information.

A component of the software application may be an interactive financial planning information display page that is specific to an individual. Illustrative steps involved in providing such a software feature are shown in FIG. 6.

Figure 6:
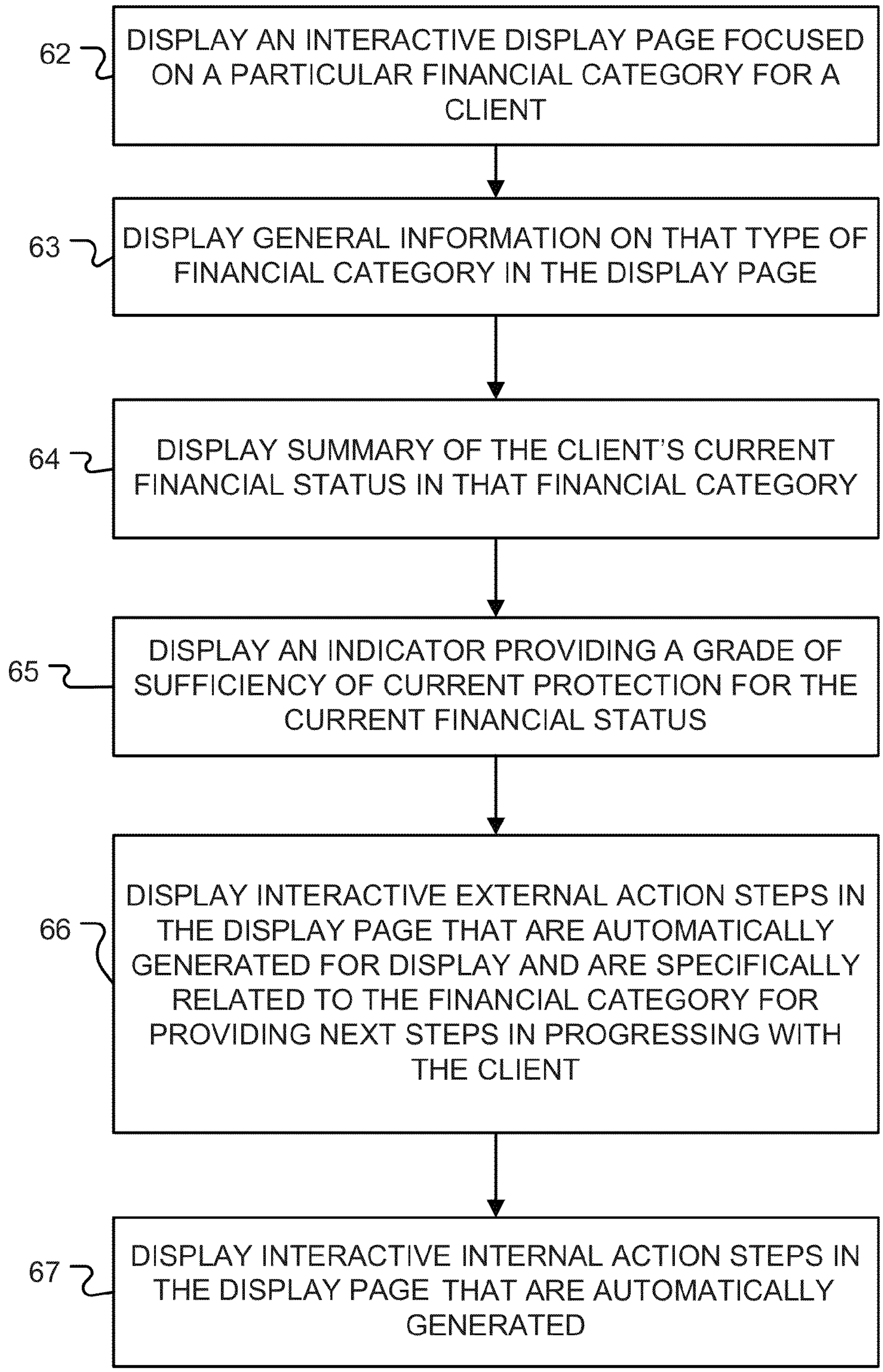
FIG. 6 is a flow chart for providing insurance category focused display pages, in accordance with one embodiment.

Referring to FIG. 6, at step 62, an interactive display page may be displayed that is focused on a particular financial category (e.g., an insurance category, an estate category, or the like) for an individual. The insurance category may include, for example, life insurance, disability insurance, or the like.

At step 63, general information relating to the financial category may be displayed in the display page. The general information may be displayed so as to, e.g., occupy one section of the display page that is dedicated to such information.

At step 64, a summary of the individual's current financial situation may be displayed in the display page. The summary may be displayed so as to, e.g., occupy one section of the display page that is dedicated to such information. Step 64 may include retrieving information that was previously collected on the individual from a network database and displaying the information at the user terminal. Alternatively, the information can be stored or cached locally.

At step 65, an indicator may be displayed that provides a grade of sufficiency for the current protection for the financial status (e.g., insurance needs, current estate, and the like) of the individual. The indicator may be displayed so as to, e.g., occupy one section of the display page that is dedicated to such information. The indicator may be displayed in the display page to provide a convenient sufficiency indicator to the viewer. The grade that is assigned may be subjective or objective. For example, the grade may be selected by the agent after reviewing the individual's financial information or, if desired, it may be automatically selected based on an algorithm that compares the individual's financial information to a database of financial information to perform an evaluation. The indicator may be set from the interactive financial planning display page or from a different page as a precursor to generating the interactive financial planning display page.

At step 66, interactive action steps that are related to external tasks may be automatically generated and displayed (e.g., so as to occupy one section of the display page that is dedicated to such information). The action steps may be specifically related to the financial planning category of the current interactive display page. The action steps may include a list of steps suggested for interaction with the client in connection with a current financial planning category. For example, a database may be implemented that would store sets of action items in association with different insurance or estate planning categories. Each set may be configured to cover the steps needed to, for example, gather, analyze, or consider relevant information in connection with a particular financial planning category with respect to a client. This would provide a tool for an agent such that an automatic list may be generated and tracked for each client. If implemented as a network application, the list may be automatically updated without a need for periodic upgrades, such that new strategies or legal requirements may be compiled and addressed with the database of action steps. The external action steps may provide intuitive next steps but may also be implemented as a comprehensive list of actions for the agent's consideration. The external action steps may relate to activities that the client needs to perform with an agent, some other client representative or acquaintance, or individually. The action steps displayed in the display page may be displayed on the basis of some level of intelligence or filtering. For example, steps that were selected and marked as being completed are preferably not displayed again when an agent returns to the same page. Thus, the action steps can reflect the state of interaction or progress with respect to a particular client. The information can be persistent. Therefore, an agent would not need to personally track progress or what has been covered with each client. The software may automatically provide such functionality and allow the agent to pick up where he or she left off with each client. In addition, filtering based on the information collected on a client may be implemented such as to not display action items that are not applicable to the client.

At step 67, interactive internal action steps may be automatically generated and displayed (e.g., so as to occupy one section of the display page that is dedicated to such information). Internal action steps may include actions that are suggested to the agent to be performed in the software application. The internal action steps may be specifically related to the financial planning category of the current interactive display page. For example, a database may be implemented that would store sets of internal action items in association with different insurance or estate planning categories. Each set may be configured to cover the steps needed to support the agent to market the current financial planning category (e.g., the displayed insurance or estate planning category) or to market other products. This would provide a tool for an agent such that an automatic list may be generated and tracked for each client. If implemented as a network application, the list may be automatically updated without the need for periodic upgrades of a resident application such that new strategies or legal requirements can be complied within the database of internal action steps. The internal action steps may provide intuitive next steps but may also be implemented as a comprehensive list of actions for the agent's consideration. The internal action steps displayed in the display page may be displayed on the basis of some level of intelligence or filtering. For example, steps that were selected and marked as being completed are preferably not displayed again when an agent returns to the same page. Thus, the action steps can reflect the state of interaction or progress with respect to a particular client. The information can be persistent. Therefore, an agent would not need to personally track the progress or what has been covered with each client. The software tool may automatically provide such functionality and allow the agent to pick up where he or she left off for each client. In addition, filtering based on the information collected on a client may be implemented such as to not display internal action items that are not applicable to the client (e.g., if the client does not have children, certain action steps may not be applicable and should not be displayed). By implementing an interactive display page for a particular financial planning category that includes a general information section, a client summary section, a grade indicator, external action steps, and internal action steps, a software tool can be provided that integrates information, organizational needs, client specific data, and grade indicators together as a convenient tool for quickly viewing information and status with respect to a client for a particular financial planning category and to generate a report on the basis of the information.

For example, where the financial planning category is a particular insurance category, by implementing an interactive display page for the particular insurance category, which may include a general information section, a client summary section, a grade indicator, external action steps, and internal action steps, a software tool can be provided that integrates information, organizational needs, client specific data, and grade indicators together as a convenient tool for quickly viewing information and status with respect to a client for a particular insurance category and to generate a report on the basis of the information.

Interactive estate planning display pages may be implemented to provide a particular software tool. For example, a sequential methodology may be implemented such that the pages for different financial planning categories may be implemented to be displayed in sequence and automatically summarized at the end of the sequence.

Figure 7:
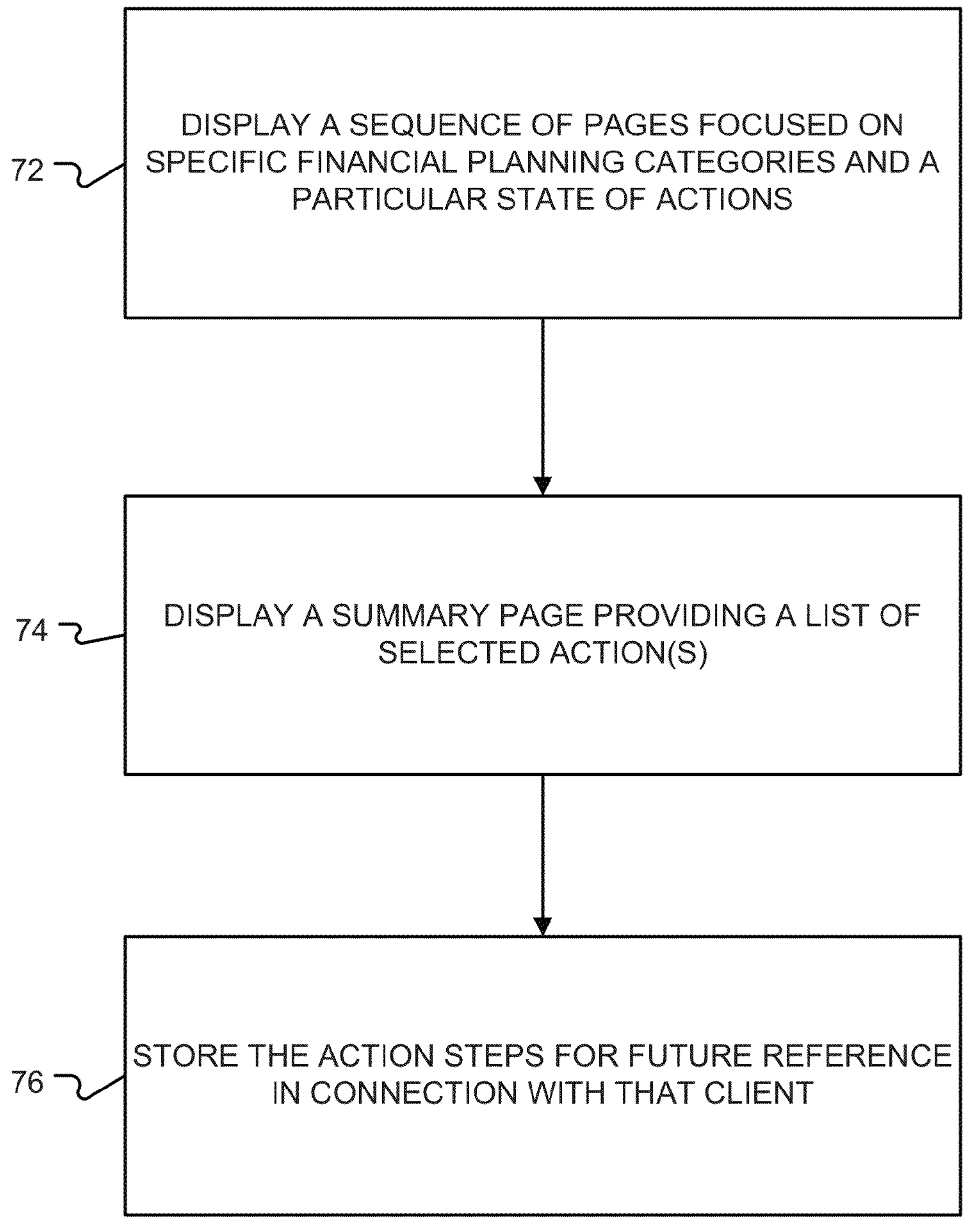
FIG. 7 is a flow chart of a software tool, in accordance with one embodiment.

For example, with reference to FIG. 7, a sequence of interactive financial planning display pages that are each focused on a specific financial planning category and include action steps that reflect the state of interactions with the application associated with a particular client (e.g., such as that illustratively described in connection with FIG. 6) may be displayed (step 72). Alternatively, or in addition, the actions steps may reflect one or more action steps that may be associated with a particular financial category (e.g., regardless of the identity of a particular client).

At step 74, an interactive summary page may be displayed that provides a list of selected action steps. The summary page may display a compilation of the actions selected in each interactive financial planning display page as a summary of selected actions to be completed. At step 74, the action steps may be selectable so as to allow the user to reconsider a selected item and to remove that step from the list.

At step 76, information with respect to the action steps (e.g., which ones selected or not selected) may be stored for future reference in connection with that client (e.g., to reflect the status of work with that client).

Figure 8:
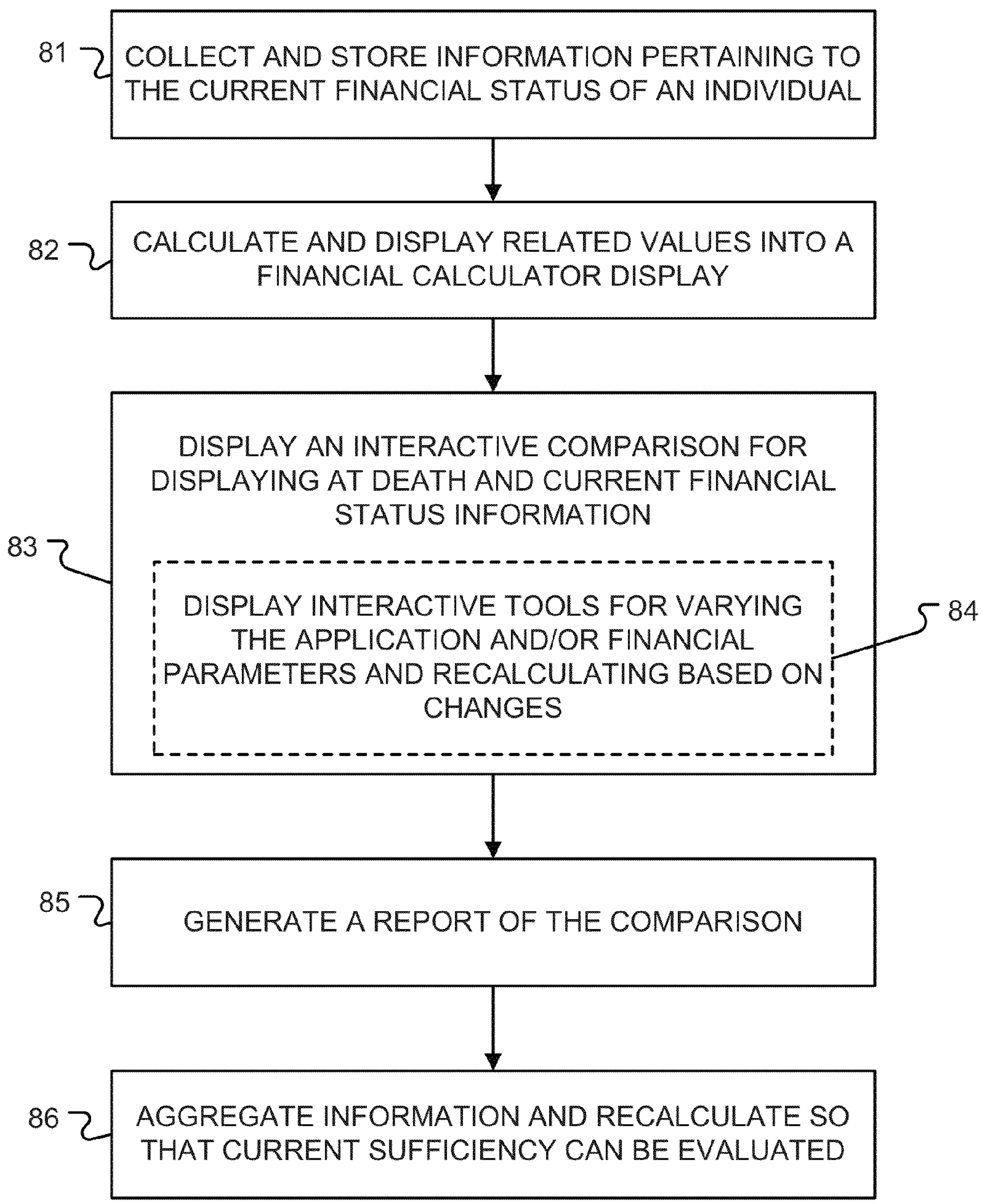
FIG. 8 is a flow chart directed to a financial tool, in accordance with one embodiment.

For example, with reference to FIG. 8, at step 81, information pertaining to a current financial status of an individual may be collected and stored. The information pertaining to the current financial status may include, for example, information pertaining to the current insurance coverage and/or the current estate of the individual.

At step 82, the software, may calculate financial values relating to the current financial planning category. The financial values may include, for example, the current life value, the current estate value, or the like, which may be calculated based on the collected information. The financial values may be displayed in an interactive financial value calculator display page.

At step 83, an interactive comparison for illustrating the at-death and the current financial value (e.g., current estate related information or the current life value related information) of a particular individual are displayed in the interactive financial value calculator display page based on the information that was inputted and calculated. Step 83 may include step 84, which may be implemented to allow for user variation of the displayed values, which may result, e.g., in the varying of the displayed at-death financial value, current financial value, or any other displayed financial information that may be derived from the input received from the user.

At step 84, interactive tools for varying the application and/or parameters of the financial category (e.g., life insurance or estate problem) may be displayed and recalculations may be performed based on the changes.

At step 85, a report option may be included as part of the page for generating a report of the current comparison information.

At step 86, an aggregation feature may be used to update and recalculate relevant values so that the current sufficiency of the client's protection (e.g., client's estate's protection or client's life insurance protection) may be periodically evaluated. In one embodiment, this feature may be part of a network application in which recalculation may require communications to and from a server to redisplay the information. In other words, relevant signals and data may be transmitted to a server that calculates and returns the relevant results.

Referring back to FIG. 1, the environment 100 may provide an account and a data aggregation tool that electronically organizes and displays financial holdings identified by and/or associated with the client in a consolidated format and may provide part of a process for determining the client's financial planning needs. Such information may be entered, determined, or otherwise generated on any of the components in the environment (or system) 100, including, e.g., the web host 110. Processes for providing such information are described in further detail in conjunction with FIGS. 2-8.

The environment 100 may be used by an agent to assist a client with recommendations that are suitable for the client's situation. In one embodiment, non-specific strategic advice or product recommendations may be provided, for example, between the web host 110 and the consumer interfaces 104, and references may be made to property and casualty insurance, estate planning, wills or other legal documents or reports prepared or produced with the insurance, plan, will, or other legal documents. The system may provide indications or suggestions that, e.g., certain estate planning should be determined by a properly licensed property and casualty insurance agent, legal counsel, or tax advisor when and where appropriate. In one embodiment, the web host 110 may receive available insurance options for providing to the consumer interfaces 104 from, for example, the carrier equipment 112.

The environment 100 may maintain the proper form and level of protection and assist a client to achieve optimum financial balance for the client and the client's business. The implementation of a sound protection program may be provided, for example, through storing client data on a database server 120/storage 126, generating protection suggestions based on the client's current and/or desired financial situation, including the current insurance coverage and estate protection, over the networks 102/106 to the agents 116, the carrier 112 and/or the consumer interfaces 104.

The system 100 may be directed to educating the client of the primary role of insurance to fully indemnify against losses that, if left uninsured, would otherwise create financial hardship, and the general desirability to insure all or substantially all assets and/or all or substantially all future income in an amount equal to, or substantially equal to their full and complete replacement value against taxes and expenses associated with disbursing an estate.

The system 100 may be directed to educating a client on maintenance of insurance equal to, or substantially equal to, existing liabilities such as taxes and expenses associated with an estate problem. This strategy can protect against the possibility of forced liquidation of assets or unnecessary cash flow expense following a particular loss. The suggested strategy may be selected, computed, and generated on the web host 110, stored in the database server 120/storage 126, and/or sent over the networks 102/106 to other devices of the system 100.

The system 100 may assist agents and/or clients in providing protection, decisions and the insurance protections coordinated with important legal documentation to insure that financial planning objectives can be realized. The effective use of legal documents can maximize a share of each heir. The important documents or information about the important documents can be received by the web host 110 over the networks 102/106 from any device (e.g., the agents 108, the consumer interface 104). The document information may be associated with the client within, for example, the database server 120/storage 126. In one embodiment, the documents may be parsed to retrieve information about the documents (e.g., type of document, such as buy-sell agreements, business formation agreements, etc.). Suggestions for insurance protections or trust vehicles can be provided based on the documents, as described herein, communicated over, for example, the networks 102/106.

The system 100 may display representations of current insurance or other protection coverage highlights, asset and liability values, cash flow scenarios, and other financial holdings on, for example, any interface, including the consumer interfaces 104. The displayed data can be input from information provided by the client (e.g., through the consumer interfaces 104), or obtained by electronic feeds, for example, over the networks 102/106, from the client's financial institutions, third-party sources, or the like. Statistical data and/or historical data provided can be received from third-party sources prior to the operations of the interfaces or in real time, e.g., through electronic feeds.

The data that is input or received may indicate current information, which was provided by the client, or his or her financial institutions, or other third party sources as of the date and time noted. Current information, however, can reflect valuations obtained from an earlier date and time. Actual current valuations can be different, perhaps by a significant amount. Information, data, and valuations obtained from either the client or electronically from his or her financial institutions or third party sources may be, but need not be, verified by an agent or the system 100, thus simplifying the process for providing advice about a client's financial needs.

The system 100 may periodically request the client to review and update the list of financial holdings appearing in the system materials and/or any valuations or input data that the client provided and was not obtained from electronic feeds (e.g., home, personal property, illiquid securities). The request to review may occur through email reminders, calendar reminders, or the like. The review request may be generated by the web host 110 and/or sent over the networks 102/106.

The consumer interfaces 104 may display figures, assumptions, and calculations, described herein. This information may be hypothetical in nature and may be used for illustrative purposes. The charts and calculations described herein may ignore or may take into account deductions for fees, expenses, sales charges, or taxes on certain assets or products. Certain hypothetical calculations may also be based on assumptions provided by the client concerning income level, applicable tax rates, tax basis, or the like. The calculations may be performed by, for example, the web host 110.

The calculations used in embodiments of the system 100 can produce summaries and reports—for example, portfolio comparisons, Efficient Frontier analysis, e.g., graphs displaying the best possible return against lowest possible risk, and Monte Carlo analysis, or other analyses known in the art. The calculations may be performed in, for example, the consumer interfaces 104, the agent equipment 116, or the web host 110. The summaries may be hypothetical in nature and if different assumptions are used, the actual values, cash flows, summaries and results may differ, thereby displaying to the client a possible need for different life insurance, other insurance options, in estate death benefits, out of estate death benefits, and the like, for different scenarios. In addition, the client may provide certain data assumptions, such as, e.g. his or her current protection coverage, asset and liability values, cash flow scenarios, after tax results, rate of return, reserve fund, debt, mortgage payoff, estate taxes, and the like, through the interfaces described herein. If different data or assumptions are input, summaries and reports may be affected.

Calculations of estate taxes may be based on taxing information, such as tax rates and estate values. Tax information may be stored in the database server 120/storage 126 and may be used to compute taxable values, described herein. The taxing information may be changed periodically or received over a computer network to reflect changes in law, or even changed/received in realtime on an on-demand basis when the taxing information is required by the tax based calculations described herein.

Calculations may utilize a complex series of information, including but not limited to information from clients, agents, government entities, such as, for example, the Internal Revenue Service (IRS) and the United States Congress, in a variety of algorithms in order to aid an agent in properly planning a client's financial needs. Information from which calculators function (e.g., interest rates, tax code requirements, stock market data) can be automatically updated via scheduled updates, or can be manually adjusted. User accessible fields can have maximum and minimum values that may be entered. Attempting to enter information outside of an acceptable range (e.g., maximum or minimum) may result in an error message. User accessible fields can have specific alpha or numeric values that may be entered. Attempting to enter information not specific to an alpha or numeric data entry field (e.g., attempting to enter letters into a numerical data entry field) may result in an error message. The error message may occur at the time the data is input, or when the user selects a calculate button. The calculations may be used, without limitation, for estimating insurance coverage, life expectancies, estate values, legacy values, estate liquidity, cash flow, life style realization, or combinations thereof. Information entered into one calculator may be accessible to another calculator so that a client does not need to reenter similar information.

Figure 9:
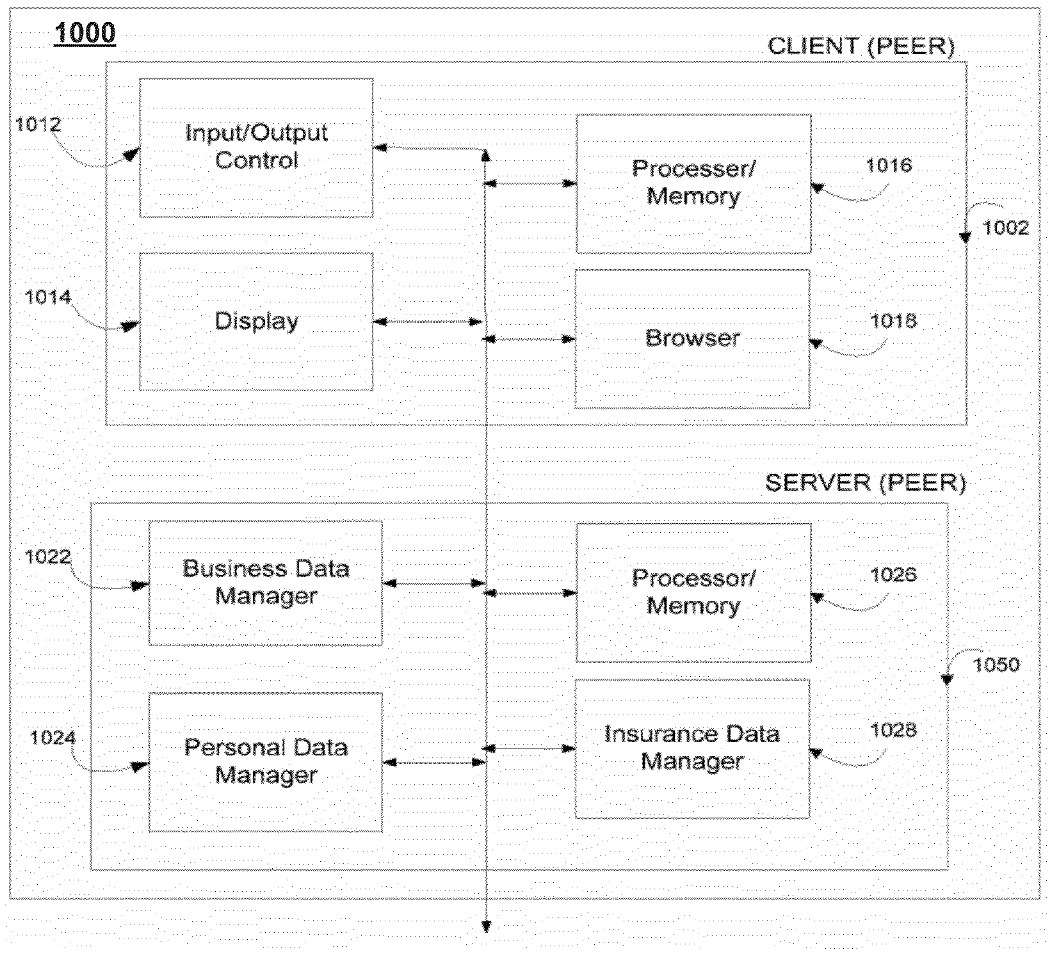
FIG. 9 shows a block diagram for one or more apparatuses for providing financial planning support services, in accordance with one embodiment.

FIG. 9 shows a block diagram for one or more apparatuses 1000 for providing financial planning related services to agents in accordance with one embodiment of the disclosure. As seen in FIG. 9, the apparatus 1000 includes a client device 1002 that may be in communication with a server 1050 over a communication link. In one embodiment, the client device 1002 and the server 1050 may be separate devices in communication over a computer network. The network communications may be via network interfaces. In one embodiment, the client device 1002 and the server 1050 may be components of the apparatus 1000, wherein the client device 1002 and the server 1050 are in communication over communication interfaces, such as, for example, a bus. There can be more or fewer components without departing from the scope of the disclosure. For example, there can be other processors computing different aspects of the operations of the modules of the server 1050. In other embodiments, the processor of the client and the server can be the same processor. Also, other communication configurations may also be used besides a client-server configuration, such as, for example, a peer-to-peer configuration with a plurality of interconnected peers, wherein any node in the peer-to-peer network may perform the actions of the client device 1002 or the server 1050.

The client device 1002 comprises components that are in communication with each other, including an input/output control 1012, a processor/memory 1016, a display 1014 and a browser 1018. The input/output control 1012 provides an interface for entering user commands and/or receiving feedback from the apparatus 1000. The input/output control 1012 may comprise a keyboard, a mouse, a sound output, a haptic output, a visual output, and the like. The processor/memory 1016 may include a computing component and/or a computer memory component. For example, the processor/memory 1016 may include any device for performing computerized operations, such as running a program based on processor-readable instructions stored within a memory such as a RAM, a ROM, an EEPROM, a hard-disk drive, or the like. The browser 1018 may include any component for providing a user interface. The browser 1018 may provide interfaces for providing insurance related services as described herein. The browser 1018 may provide business data management interfaces, personal data management interfaces, insurance interfaces, or the like. A user may manage the services provided in the browser 1018 and over the display 1014 using the input/output control 1012.

The server 1050 comprises components that are in communication with each other, including a business data manager 1022, a processor/memory 1026, a personal data manager 1024, and an insurance data manager 1028. The processor/memory 1026 may include a computing component and/or a computer memory component that are suitable or sufficient for performing processing. In one embodiment, the processor/memory 1026 may perform at least some of the operations of the processes of FIGS. 2-8.

The components of the apparatus 1000 may be managed by separate functional multi-layer components, wherein the layers may include software and/or hardware and may be rendered or represented as visual components, for example, on a display. For example, a layer may manage a specific domain of an estate problem associated with a client. Another (sub) layer may manage a sub-domain of the domain, and the like. For example, an estate's protection domain may include a layer directed to managing a type of insurance protection for the business and personal financial information in the estate, wherein the layer can be represented visually and enabled in hardware, software and/or over a network.

The business data manager 1022 includes a component for managing information related to a client, including information about the domains of the client (e.g., assets, liabilities, cash flow, and protections). The database may include an SQL database, a flat file, an XML file, or any formatted data. Fields of the business database may be associated with procedures, such as stored procedures, triggers, event based routines, or the like. When business data is entered into the database, the routines may trigger and compute other information for the database or other databases (e.g., for business, personal, or insurance data), such as net worth, tax amounts, valuation, etc., automatically, and store such computed information in the business database associated with the entered business data.

The personal data manager 1024 includes a component for managing information related to the client, the client's family, home, or other personal data. The personal information may include information about the domains of the client (e.g., assets, liabilities, cash flow, and protections). The personal data may be stored in a database, indexed by the identity of the client, or the like, substantially similar to the business data described above. Routines and/or triggers may be associated with the fields of the database such that when personal data is entered, other data can be computed, such as personal tax rates, mortgage amounts, projected incomes, etc.

The business data may be based on or related to the financial condition or state of the business including the ownership of the business (e.g., corporation, corporate entity, LLP, LLC, partnership, sole proprietorship, etc.), tax structure for the business, and obligations unique to the business such as paying taxes for employees, stock or bonds obligations, etc. The business information may enable a user or client to understand the unique problems of a business and to manage the future financial conditions of the business with respect to insurance and insurability.

As described herein, the apparatuses, processes, user interfaces, or other mechanisms for providing business data may provide the added benefit of also displaying associated personal data (e.g., provided by personal data manager 1024). Providing business data in conjunction with personal data allows the user or client to understand the interrelationship between the business financial condition and the personal financial condition.

The insurance data manager 1028 includes a component for managing information related to mechanisms for solving the estate problem for the client. The insurance information may be data associated with the protection domains for the client and/or the client's business(es). The insurance information may include actual current insurance owned by the client and/or in a trust to cover a financial situation such as, for example, an estate problem. Scenarios at death and/or disability may also be stored and managed by the manager 1028. The insurance information may be stored in a database substantially similar to business and/or personal information as described above. The information about projected insurance protection coverage to reduce the impact of an estate tax problem may also be stored. Routines and/or triggers may be associated with the fields of the database such that when insurance data is entered, other data can be computed, such as adequate insurance coverage for particular at-death scenarios, a change in cash flow, owner's equity, and/or net worth due to more or fewer protections, or the like.

Figure 10:
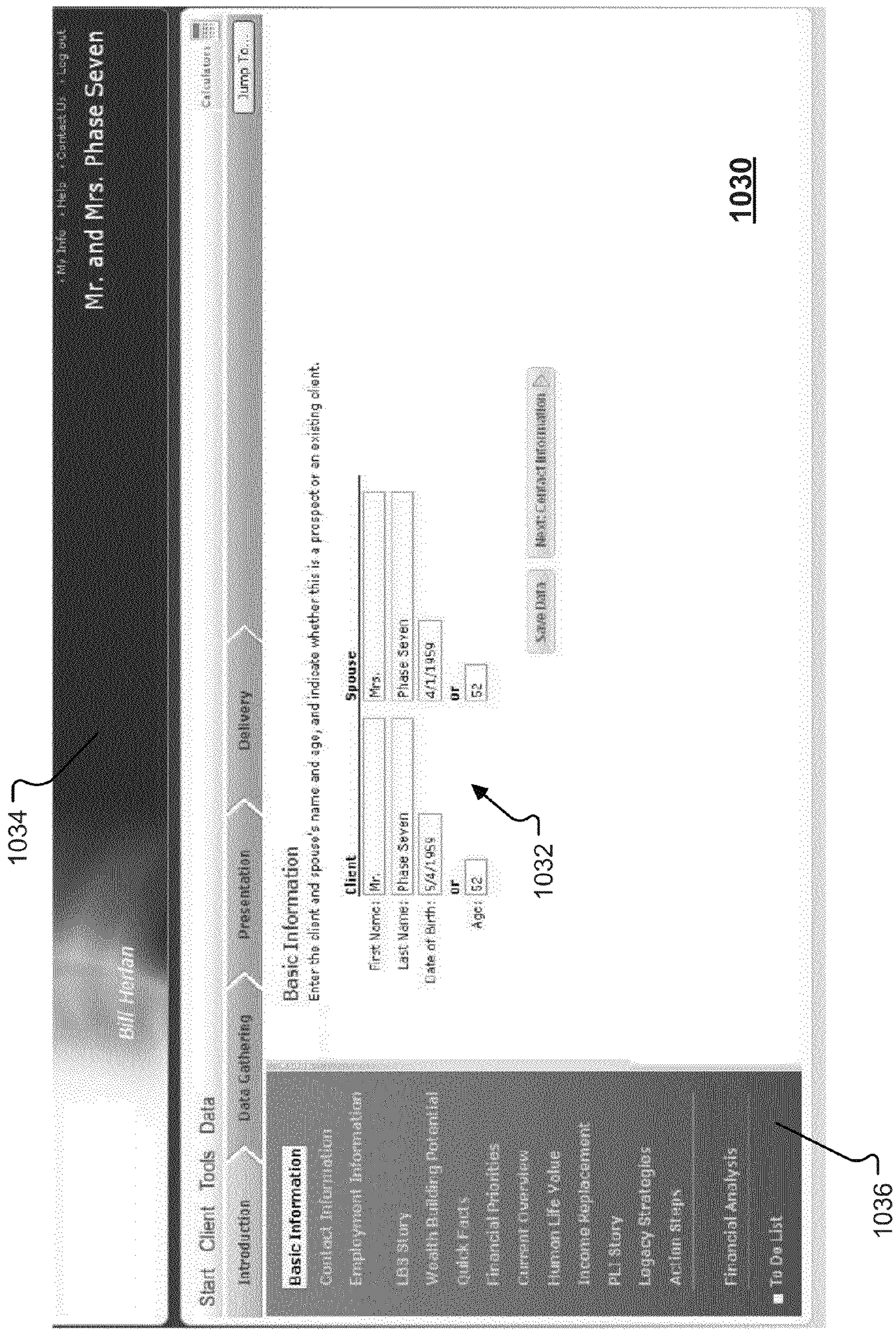
FIG. 10 illustrates an example of a basic information display page for a user, in accordance with one embodiment.
Figure 179:
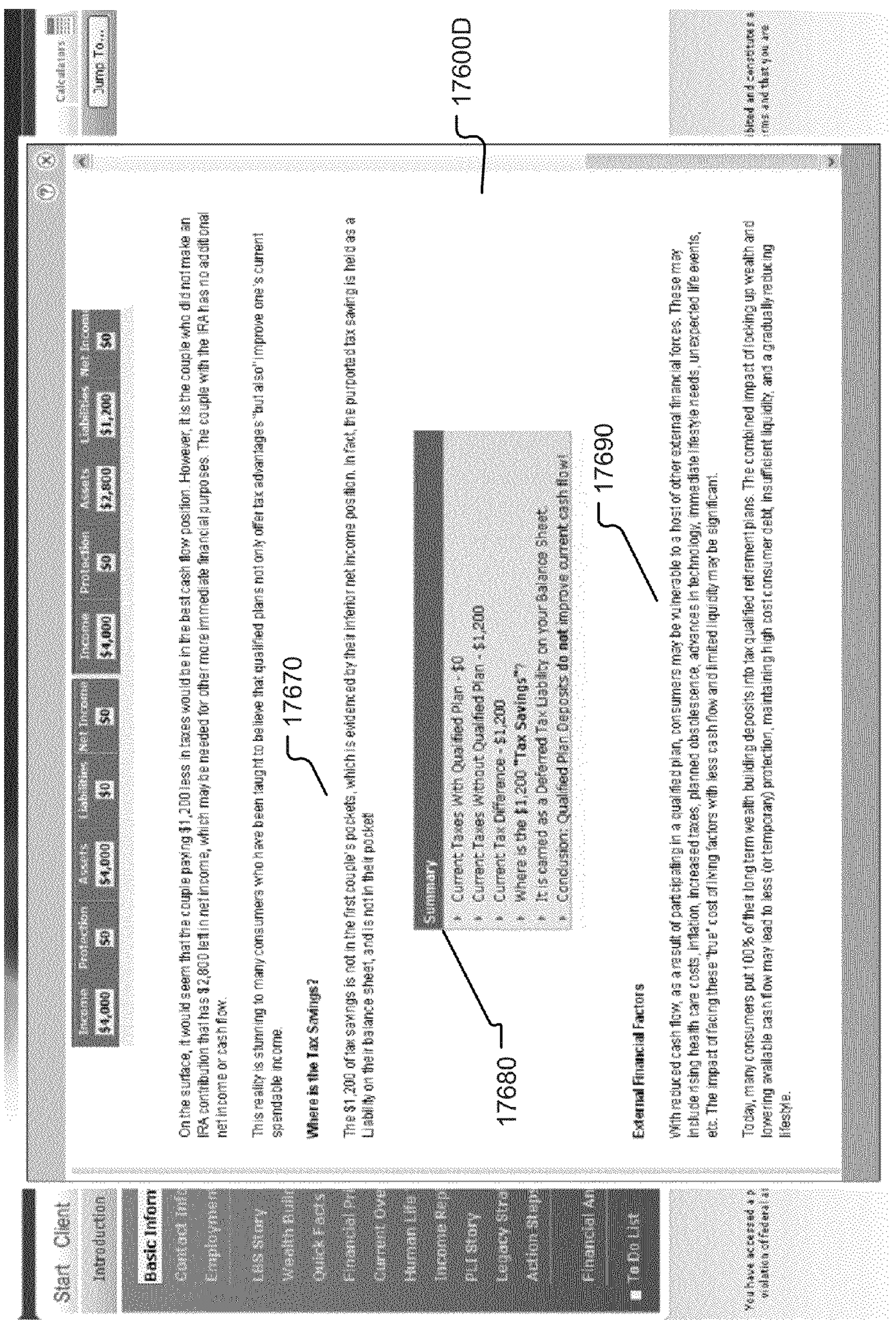

FIGS. 10-179 show examples of display pages showing implementations of interactive methods and systems using the herein described apparatuses, processes, user interfaces, and the like, in the environment 100. The display pages may be generated and reproduced on, for example, the consumer interface 104, the agent 108, 114, or the like, in communication with, for example, the web host 110. A computer readable medium may be provided that comprises code sections or segments for each of the processes disclosed herein, which, when executed on the consumer interface 104, agent 108, agent 114, agent 116, and/or webhost 110 may cause the display pages shown in FIGS. 10-179 to be generated and displayed, and the information received and collected by, e.g., the webhost 118 to be processed and displayed in the display pages.

FIGS. 10-24 are diagrams of illustrative display pages for implementing interactive methods and systems for hypothetical asset building strategies, including cash flow effects, in accordance with embodiments of the disclosure. FIGS. 10-24 show examples of user interfaces and processes for hypothetical asset building strategies.

The components, systems, apparatuses, processes, user interfaces, reports, and other mechanisms described herein may be used in conjunction with any one or more components, systems, apparatuses, processes, user interfaces, reports, and other mechanisms described in U.S. patent application Ser. Nos. 61/590,187, 12/771,795 12/380,564, 12/113,087, 11/891,616, 11/510,537, and/or 60/763,200, all of which are hereby incorporated herein by reference. Generally, the interfaces partition the pages into different stages, including an introduction stage, a data gathering stage, a presentation stage, and/or a delivery stage.

The unique components, systems, apparatuses, processes, user interfaces, reports, and other mechanisms described herein provide comprehensive, user-friendly realistic short and long term estimations of financial wealth by considering cumulatively, the client's and spouse's health and realistic life expectancy, the client's assets and liabilities, the client's protection, what the client's estate value and estimated tax burden may be in 1, 5, 10, 20, 30, or more years, and the like, while minimizing the tax burden on the estate, determining whether the client's estate can carry the estimated tax burden and other transfer costs, maximizing the amount of the client's legacy that may be realistically transferable to heirs, and the like. The client may assess key assets and determine which financial planning tools may best be utilized in order to protect those key assets, while maximizing the amount transferable to heirs while minimizing transfer costs in order to ensure the client's legacy is rightfully transferable to the client's intended heirs.

FIG. 10 illustrates an example of a basic information display page 1030 for a user. In this example, the interface illustrates a plurality of fields 1032 for receiving basic information for a client or a prospective client, as well as a spouse of the client or the prospective client. The basic information may include, for example, the client's name, date of birth and/or age, as well as the spouse's (if any) name, date of birth, and/or age. The display page 1030 may include different colors for the different portions 1034, 1036 of the page to provide a user friendly interface. For example, the portions 1034, 1036 may include a green background with white or yellow foreground lettering, and the remainder of the display page may be primarily white to facilitate easy reading of the displayed information by the user. Other colors and color combinations may be used for the various portions of the display page 1030, including the background and the foreground, without departing from the scope or spirit of the disclosure.

FIGS. 11-24 illustrate various examples of display pages 1100A-1100N, respectively, arranged sequentially to show aspects of the cash flow effects of hypothetical asset building strategies. The illustrated display pages are used for implementing a deployment module for a cash flow design subcategory. FIGS. 11-24 show user interfaces and processes for managing current and alternate deployment scenarios, as well as current and alternate retirement deployment scenarios. The cash flow design subcategory may include cash flow design reports as a financial assessment tool that may be used by an agent as part of a process for determining various cash flow opportunities and potential insurance needs of a particular client. The cash flow design reports may facilitate recommendations of suitable insurance products based on a client's particular cash flow strategies.

Figure 11:
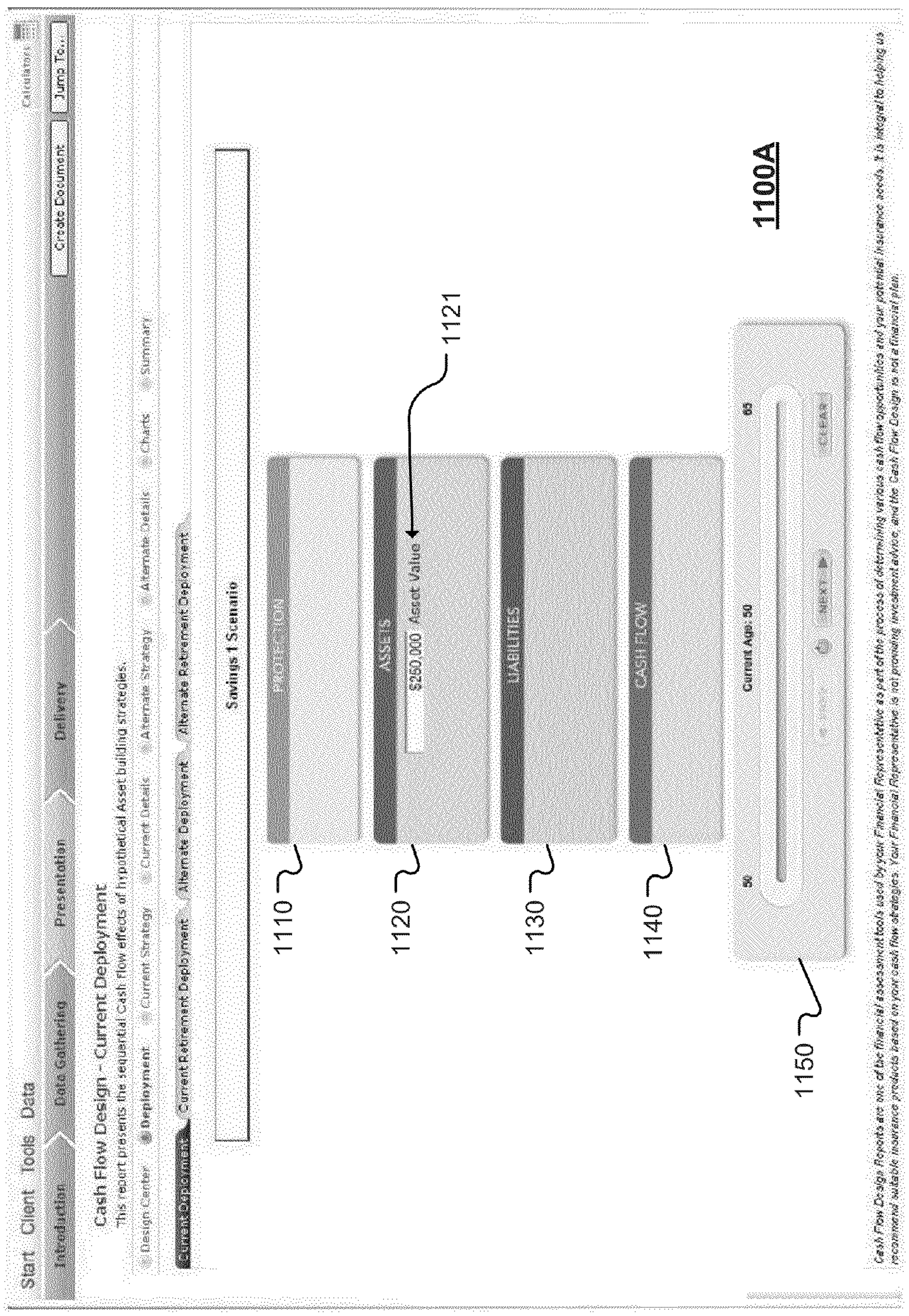
FIGS. 11-24 illustrate various examples of display pages that are arranged sequentially to show cash flow effects of hypothetical asset building strategies, in accordance with one embodiment.

FIG. 11 illustrates an example of a current scenario deployment display page 1100A, which may be displayed after scenario data is entered for a current scenario in a design center display page (not shown). The scenario data may include, for example, protection data, assets data, liabilities data, protection cash flow data, assets cash flow data, liabilities cash flow data and asset annuitization data. The protection data may include, for example, a coverage type (e.g., term coverage), a benefit amount, a gender, an age, a spouse gender, a spouse age, years to pay a permanent protection design premium, year a permanent protection design is removed from an estate, and the like. The assets data may include, for example, an asset value, a tax status (e.g., taxable, tax free, tax deferred, a combination of the foregoing), a tax basis, an asset return rate, a taxable rate, a realized rate, an unrealized rate, a time-value money rate, and the like. The liabilities data may include, for example, an income tax rate, a calculate estate tax rate, an estate tax rate, a tax deferred type, a loan type (e.g., short term, mortgage, or the like), a short term loan amount, a short term loan rate, a number of years to payoff a short term loan, a mortgage amount, a mortgage term (e.g., 5 years, 10 years, 15 years, 30 years, or the like), a mortgage rate, a current balance amount, a number of years to payoff the mortgage amount, a home exclusion (e.g., yes or no). The protection cash flow data may include, e.g., an annual premium amount, an include term premium select/deselect radio button (or field), an FDP import file, a use FDP illustration select/deselect radio button (or field). The assets cash flow data may include, for example, an annual contribution amount, an annual inflow amount, funds transfer changes type (e.g., interest only, amortization, flat withdrawal, annuitization), and the like. The liabilities cash flow data may include a loan payment amount, an additional loan payment amount, a one-time loan payment amount, a cash flow savings amount. The asset annuitization data may include, for example, an annuity type (e.g., guaranteed or variable), an annuity option type, an annuity type (e.g., single life), a variable annuity gross variable rate, a variable annuity payout period amount, and the like. The cash flow design report may include one of the financial assessment tolls that may be used by an agent as part of a process of determining various cash flow opportunities and potential insurance needs for a particular client. The cash flow design report may be integral in helping to recommend suitable insurance products to clients based on their cash flow strategies. However, the cash flow design reports are not a financial plan, but a tool that may be used to facilitate financial planning. When providing the cash flow design reports to a client, the agent may not be providing investment advice.

After protection data, assets data, liabilities data, protection cash flow data, assets cash flow data, and liabilities cash flow data are entered into associated fields in the design center page (not shown), the data is processed and the current scenario deployment display page 1100A may be displayed, which includes a report that presents the sequential cash flow effects of hypothetical asset building strategies. The current scenario deployment display page 1100A includes display portions 1110-1140 for each of the four interdependent financial domains (or categories), including a protection domain portion 1110, an assets domain portion 1120, a liabilities domain portion 1130 and a cash flow domain portion 1140. The current scenario deployment display page 1100A may also include an age slider portion 1150. The age slider portion 1150 may be moveable in a range that includes the client's current age (e.g., age 50) at one end and an identified retirement age at the other, opposite end (e.g., age 65). If applicable, the values in the current scenario deployment display page 1100A may dynamically recalculate in accordance with the position of the slider portion 1150.

As seen in FIG. 11, an asset value 1121 may be shown (e.g., $250,000) where an asset value data is entered in the design center display page (not shown) for the current scenario asset value amount (e.g., $250,000).

Figure 12:
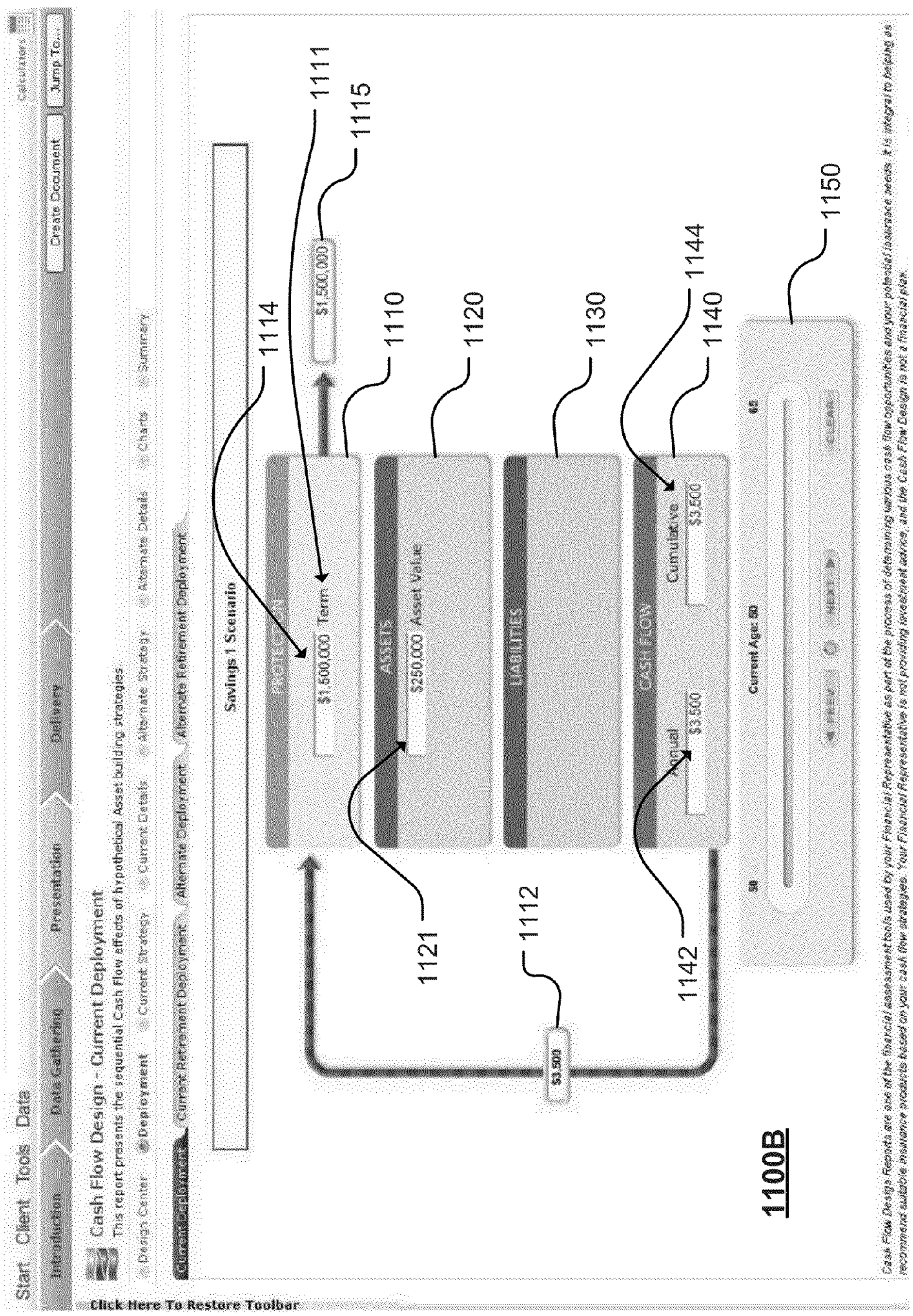

FIG. 12 illustrates an example of a current scenario deployment display page 1100B, where the scenario data further includes a current scenario protection benefit amount 1114 (e.g., $1,500,000), a current scenario projected protection benefit amount 1115 (e.g., $1,500,000), and a current scenario protection coverage type 1111 (e.g., term or permanent). In this example, the scenario data may also include, for example, a current scenario annual cash flow amount 1142 (e.g., $3,500), a current scenario cumulative cash flow amount 1144 (e.g., $3,500), and a current scenario protection cash flow amount 1112 (e.g., $3,500).

Figure 13:
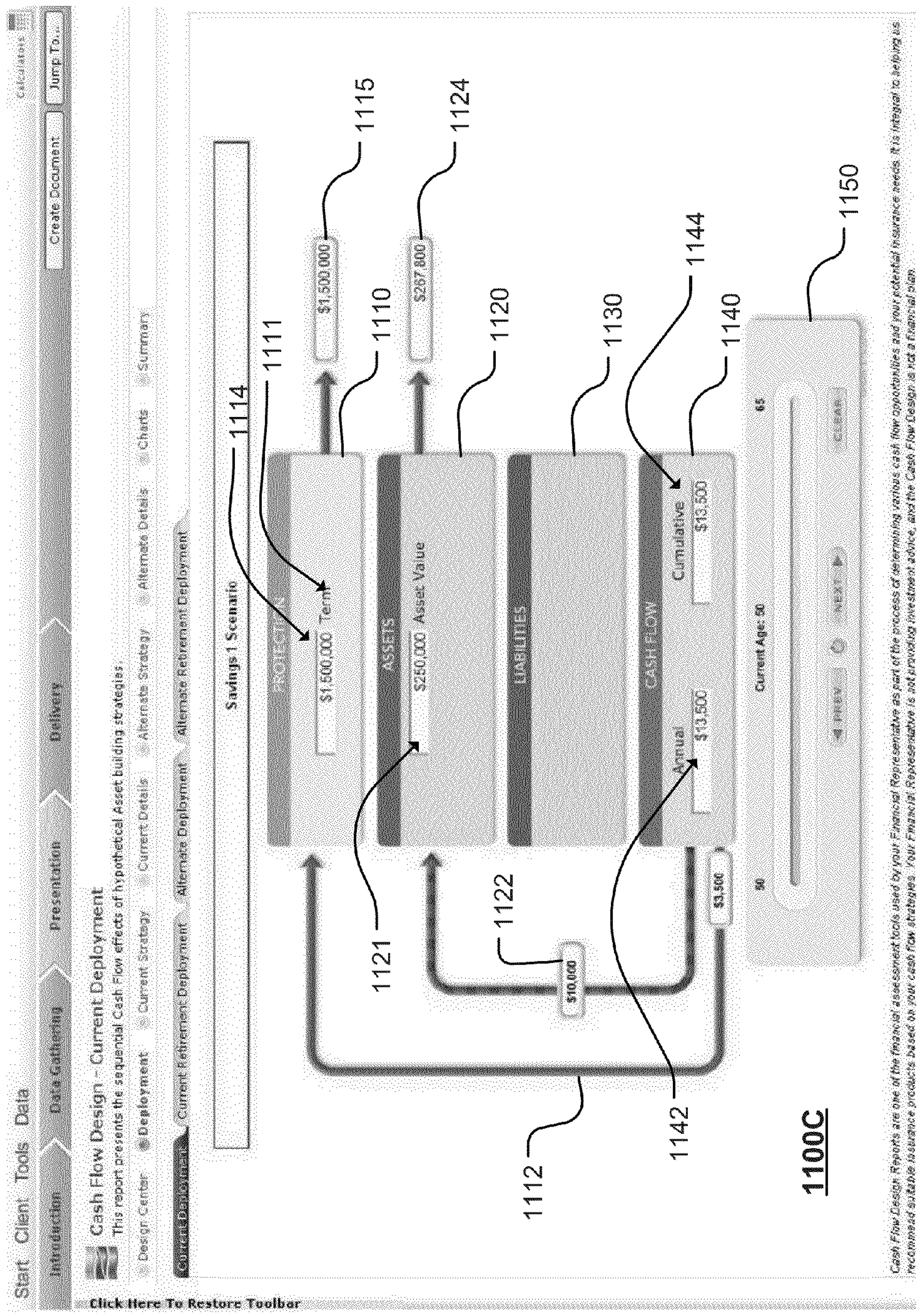

FIG. 13 illustrates a further example of a current scenario deployment display page 1100C, where the scenario data further includes, for example, a current scenario projected asset value 1124 (e.g., $267,800), a current scenario annual cash flow amount 1142 (e.g., $13,500), a current scenario cumulative cash flow amount 1144 (e.g., $13,500), and a current scenario assets cash flow amount 1122 (e.g., $10, 000). The current scenario projected asset value 1124 (e.g., $267,800) may be based on, e.g., the current scenario asset value 1121 (e.g., $250,000), the current scenario assets cash flow 1122 (e.g., $10,000), an asset return rate, and the like.

Figure 14:
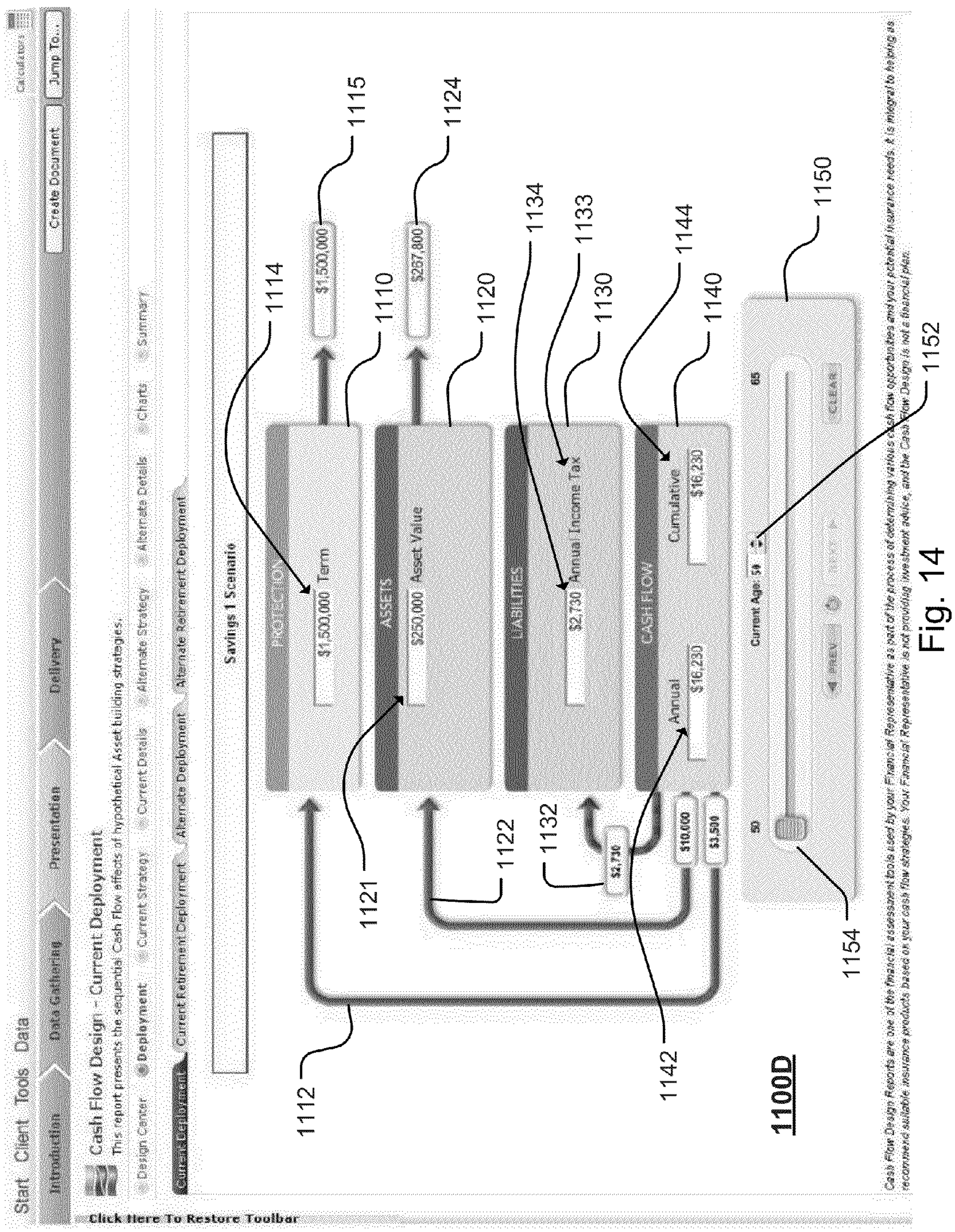

FIG. 14 illustrates a further example of a current scenario deployment display page 1100D, where the scenario data further includes, for example, a current scenario liability type 1133 (e.g., annual income tax), a current scenario liability amount 1134 (e.g., $2,730), a current scenario annual cash flow amount 1142 (e.g., $16,230), a current scenario cumulative cash flow amount 1144 (e.g., $16,230), and a current scenario liabilities cash flow amount 1132 (e.g., $2,730). As seen, the current scenario age may be set to the client's current age (e.g., 50). The age slider portion 1150 may include an age up/down radio button 1152 and/or a slider radio button 1154 to adjust the scenario age of the client. If applicable, the values in the current scenario deployment display page 1100D may dynamically recalculate in accordance with the adjustments to the age up/down radio button 1152 and/or a slider radio button 1154.

Figure 15:
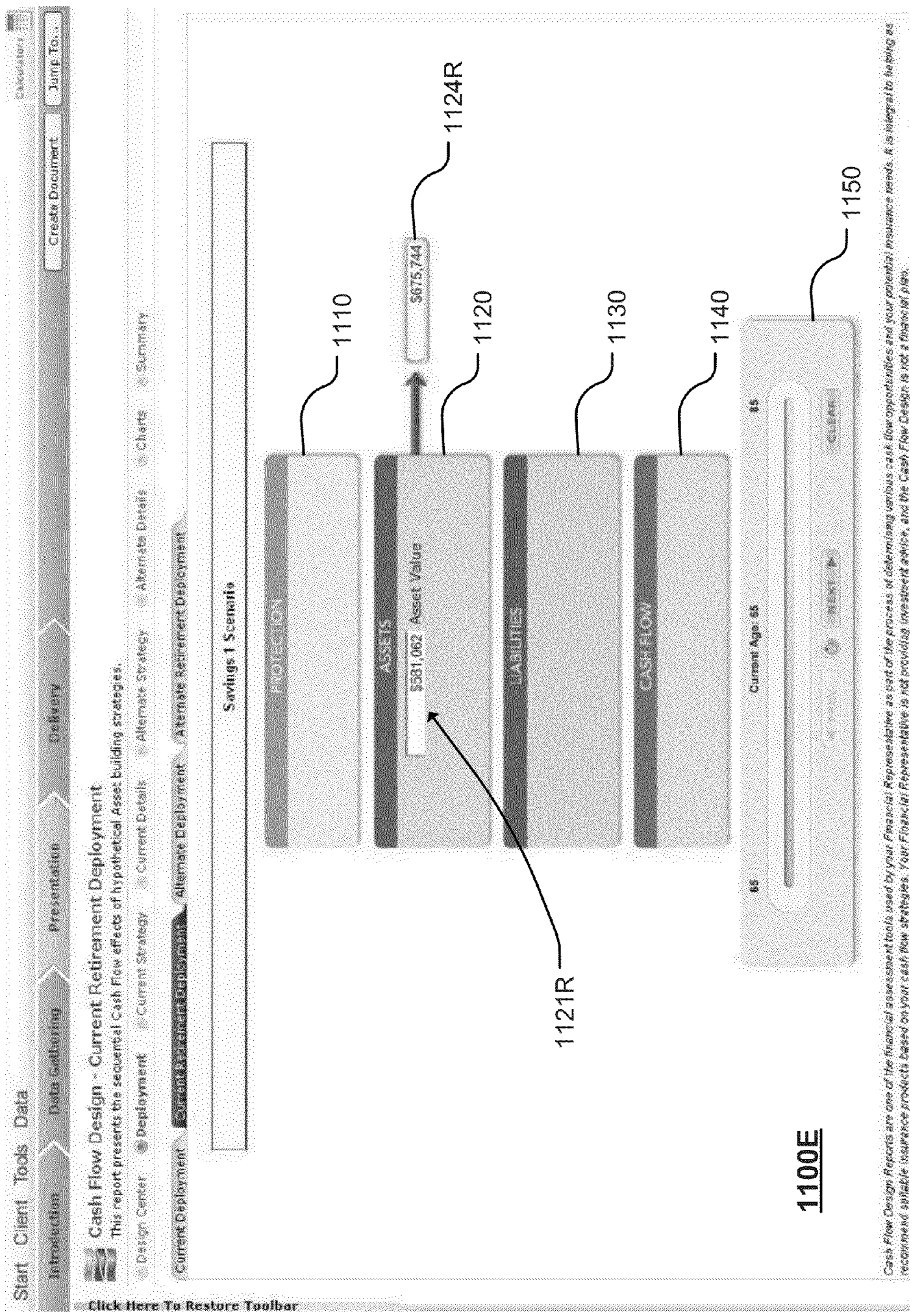

FIG. 15 illustrates an example of a current retirement scenario deployment display page 1100E, which includes the display portions 1110-1140 for each of the four interdependent financial domains, including the protection domain portion 1110, the assets domain portion 1120, the liabilities domain portion 1130 and the cash flow domain portion 1140. The current retirement scenario deployment display page 1100E may also include the age slider portion 1150.

As seen in FIG. 15, the scenario data may include a current retirement scenario asset value amount 1121R (e.g., $581, 062) and a current retirement scenario projected asset amount 1124R (e.g., $675,744). The current retirement scenario projected asset value 1124R (e.g., $675,744) may be based on, e.g., the current retirement scenario asset value 1121R (e.g., $581,062), an asset return rate, and the like.

Figure 16:
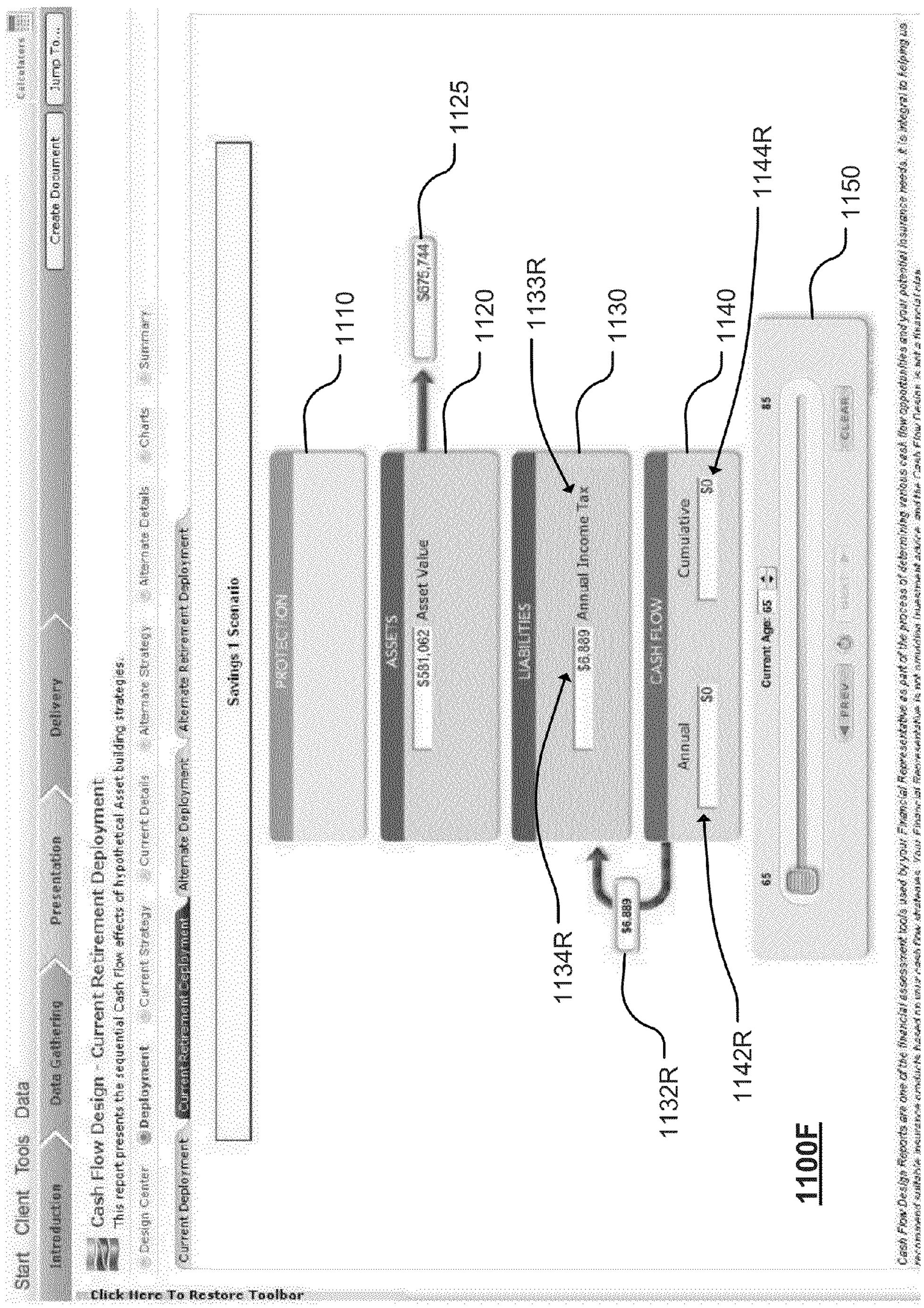

FIG. 16 illustrates a further example of a current retirement scenario deployment display page 1100F, where the retirement scenario data further includes, for example, a current retirement scenario liability type 1133R (e.g., annual income tax), a current retirement scenario liability amount 1134R (e.g., $6,889), a current retirement scenario annual cash flow amount 1142R (e.g., $0), a current retirement scenario cumulative cash flow amount 144R (e.g., $0), and a current retirement scenario liabilities cash flow amount 1132R (e.g., $6.889). As seen, the current retirement scenario age may be set to a future client's age (e.g., 65).

Figure 17:
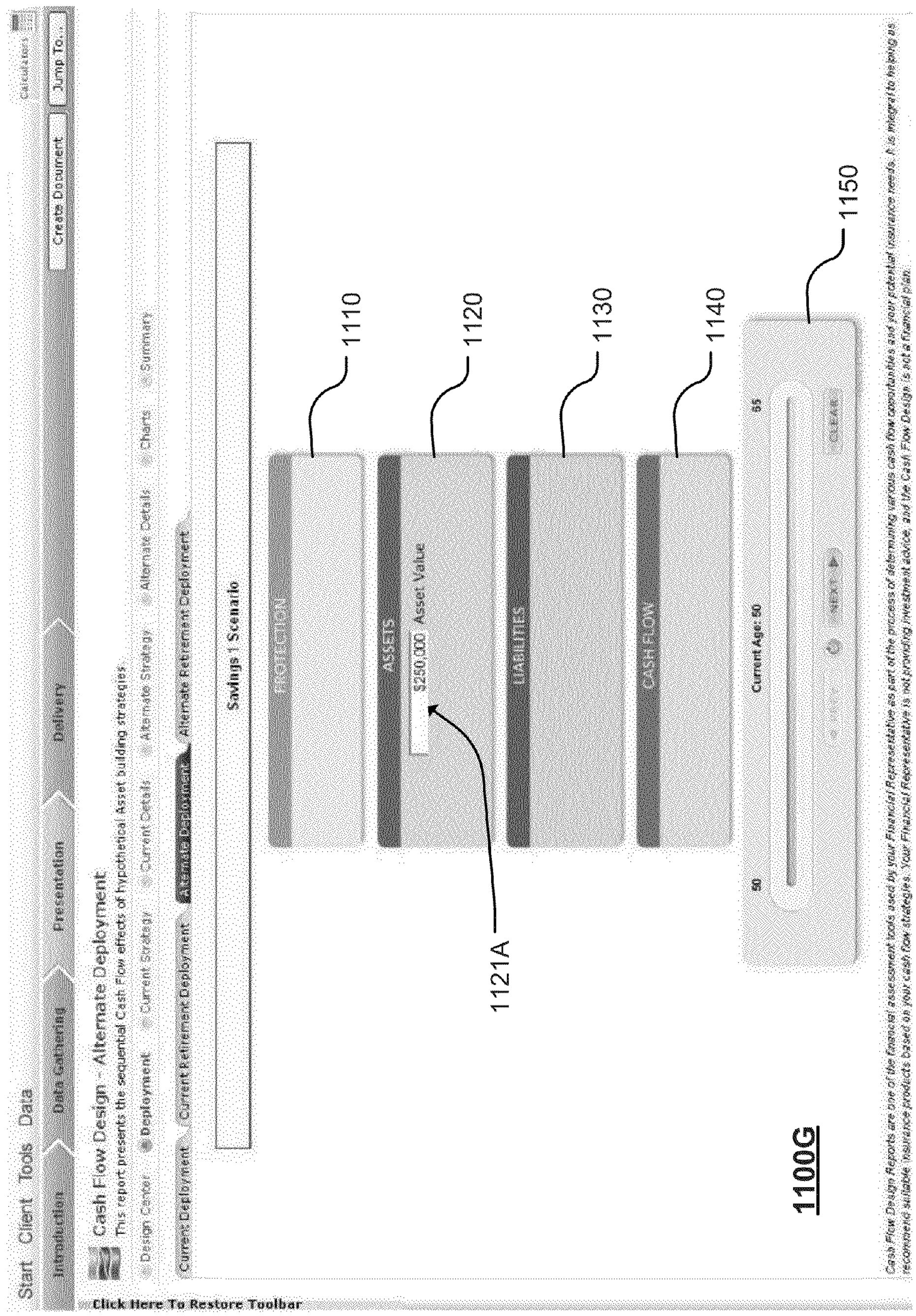

FIG. 17 illustrates an example of an alternate scenario deployment display page 1100G. As seen in FIG. 17, the alternate scenario data may include an alternate scenario asset value amount 1121A (e.g., $250,000).

Figure 18:
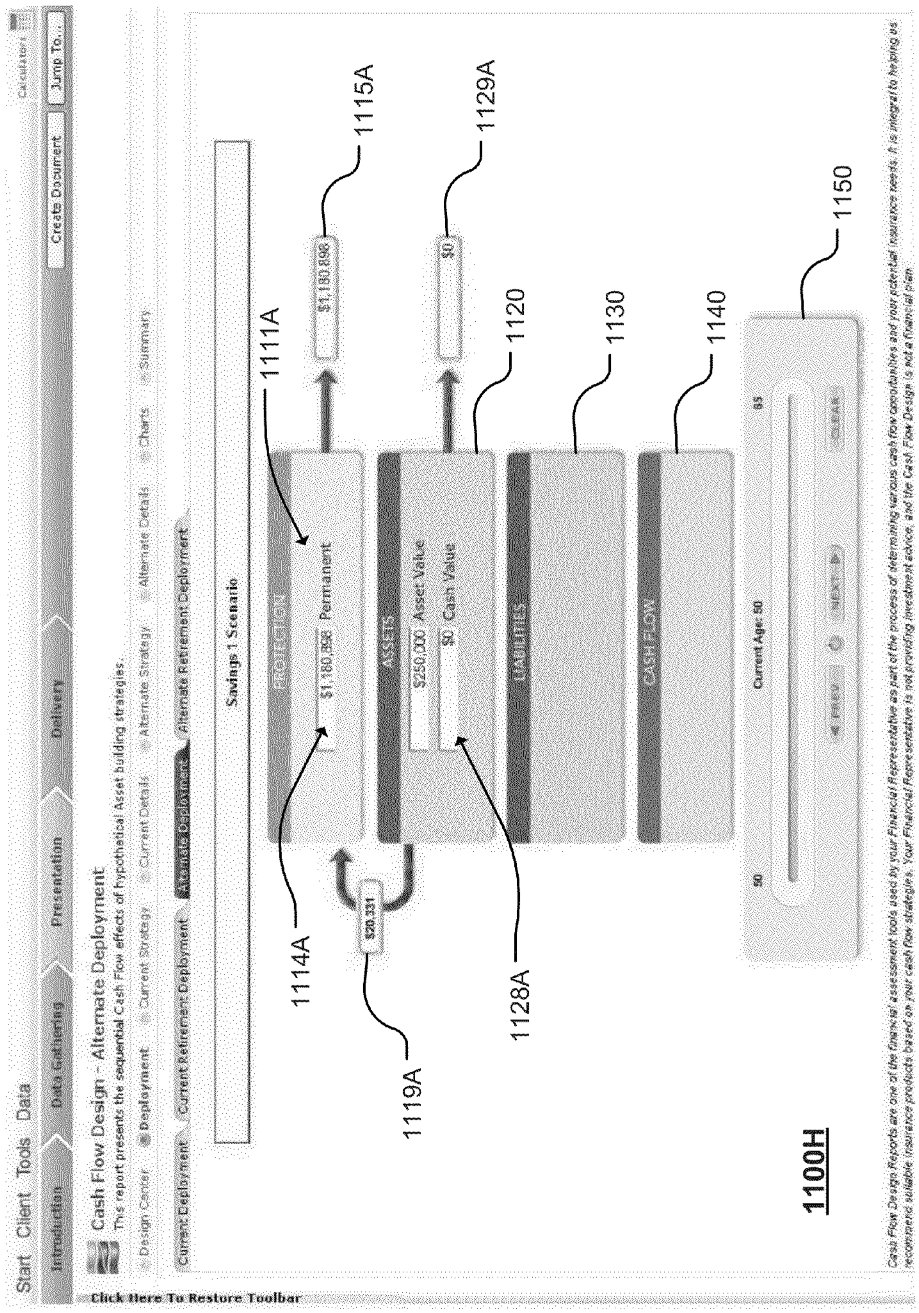

FIG. 18 illustrates a further example of an alternate scenario deployment display page 1100H, where the alternate scenario data further includes, for example, an alternate scenario asset cash amount 1128A (e.g., $0), an alternate scenario projected asset amount 1129A (e.g., $0), an alternate scenario protection benefit amount 1114A (e.g., $1,180,898), an alternate scenario projected protection benefit amount 1115A (e.g., $1,180,898), an alternate scenario protection coverage type 1111A (e.g., term or permanent), and an alternate scenario protection input amount 1119A (e.g., $20,331).

Figure 19:
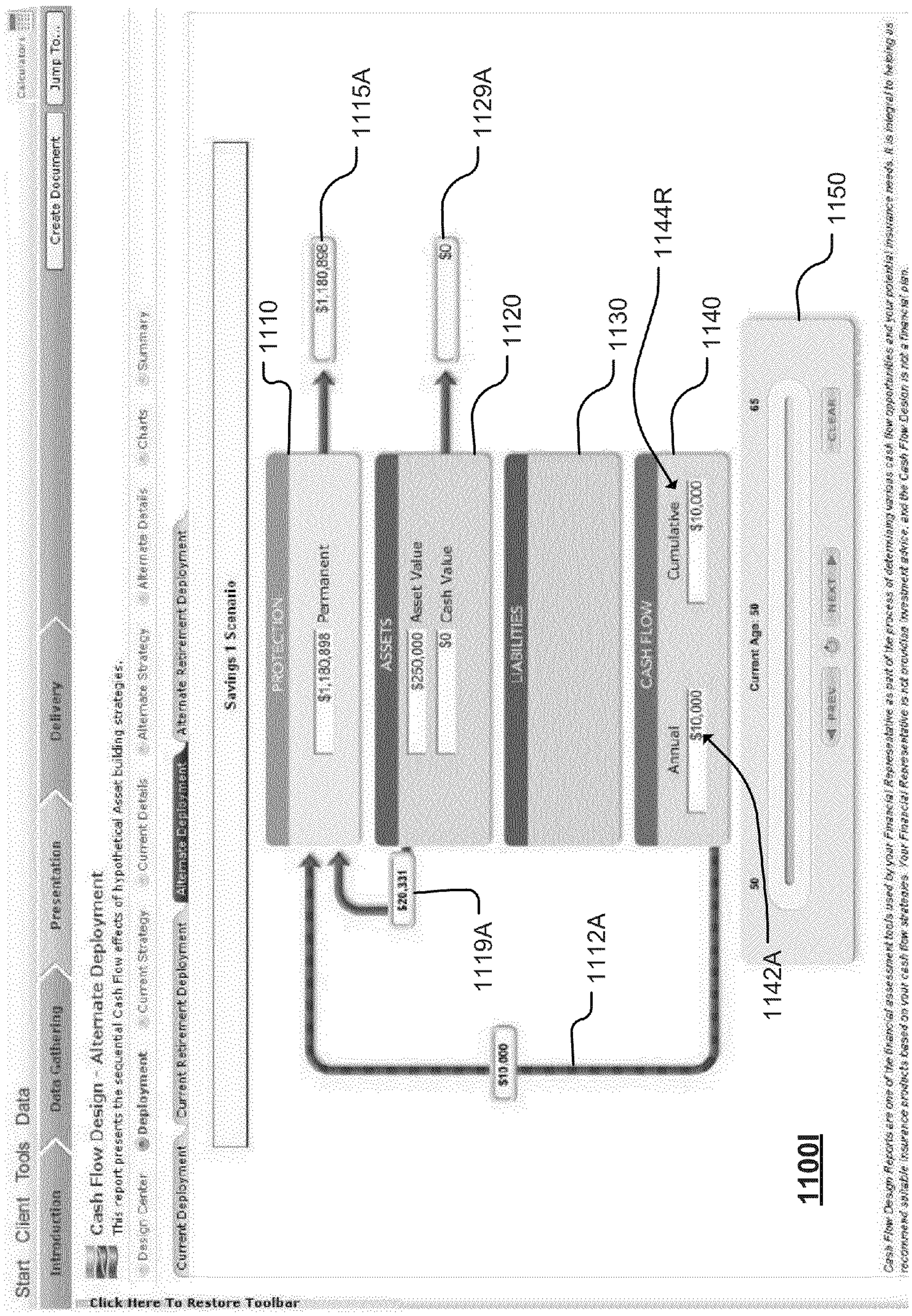

FIG. 19 illustrates a further example of an alternate scenario deployment display page 1100I, where the alternate scenario data further includes, for example, an alternate scenario annual cash flow amount 1142A (e.g., $10,000), an alternate scenario cumulative cash flow amount 1144R (e.g., $10,000), and an alternate scenario protection cash flow amount 1112A (e.g., $10,000).

Figure 20:
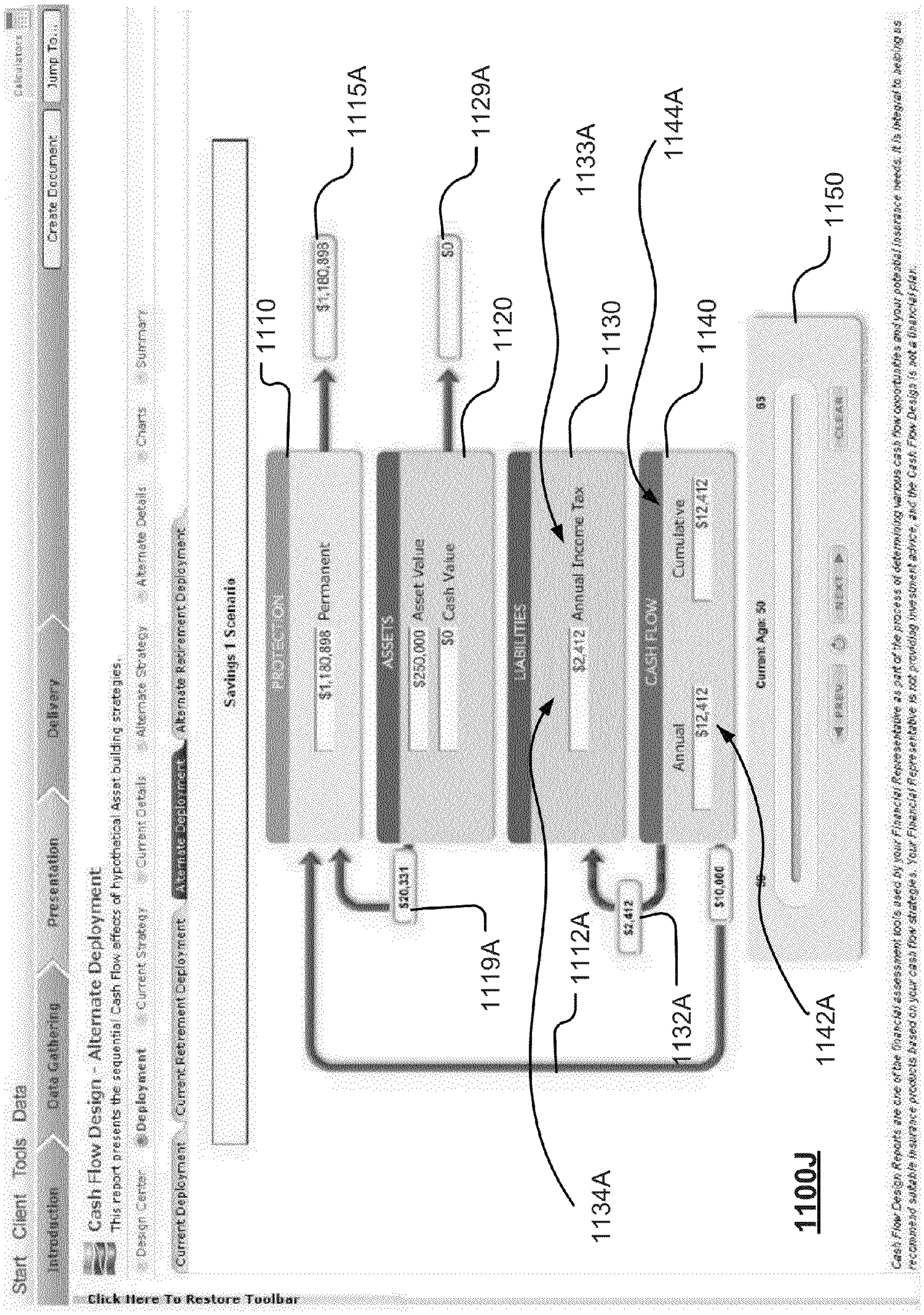

FIG. 20 illustrates a further example of an alternate scenario deployment display page 1100J, where the alternate scenario data further includes, for example, an alternate scenario annual cash flow amount 1142A (e.g., $12,412), an alternate scenario cumulative cash flow amount 1144A (e.g., $12,412), an alternate scenario liability type 1133A (e.g., annual income tax), an alternate scenario liability amount 1134A (e.g., $2,412), and an alternate scenario liabilities cash flow amount 1132A (e.g., $2,412).

Figure 21:
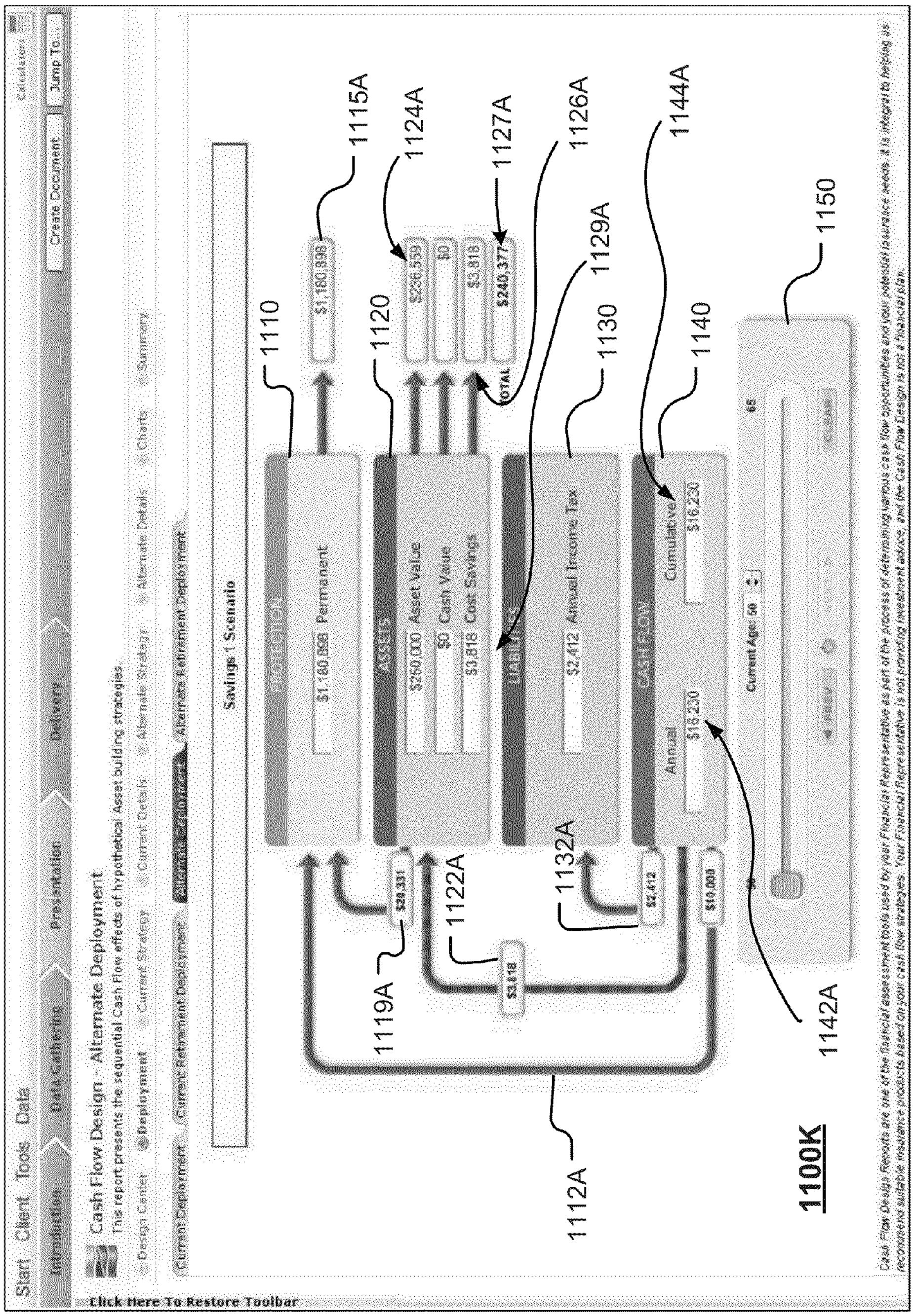

FIG. 21 illustrates a further example of an alternate scenario deployment display page 1100K, where the alternate scenario data further includes, for example, an alternate scenario annual cash flow amount 1142A (e.g., $16,230), an alternate scenario cumulative cash flow amount 1144A (e.g., $16,230), an alternate scenario assets cash flow amount 1122A (e.g., $3,818), an alternate scenario projected asset value 1124A (e.g., $236,559), an alternate scenario assets cost savings amount 1129A (e.g., $3,818), an alternate scenario projected assets cost savings amount 1126A, an alternate scenario projected total assets amount 1127A (e.g., $240,377), and an alternate scenario current age (e.g., 50).

Figure 22:
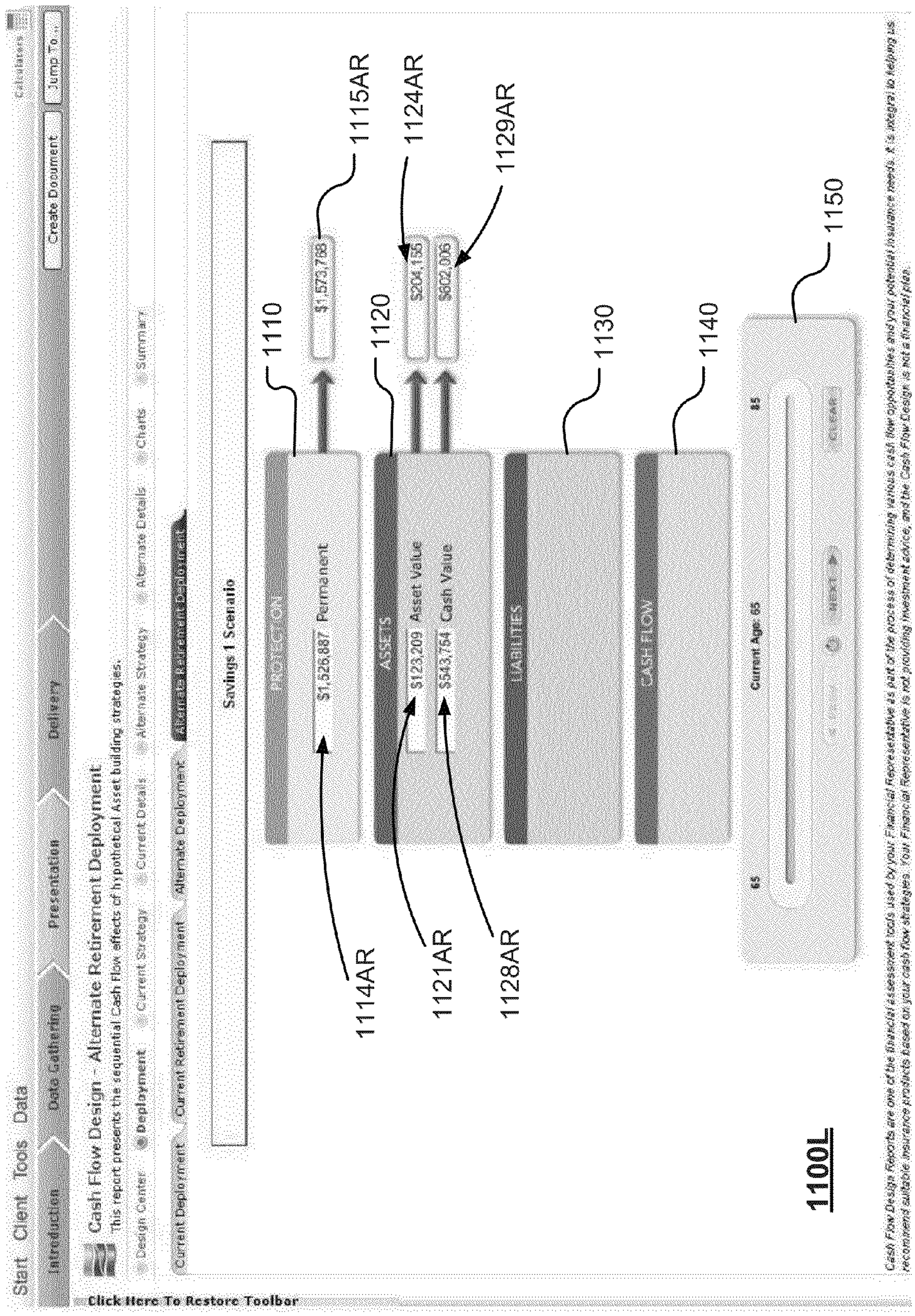

FIG. 22 illustrates an example of an alternate retirement scenario deployment display page 1100L, which includes the display portions 1110-1140 for each of the four interdependent financial domains, including the protection domain portion 1110, the assets domain portion 1120, the liabilities domain portion 1130 and the cash flow domain portion 1140. The current retirement scenario deployment display page 1100L may also include the age slider portion 1150.

As seen in FIG. 22, the alternate retirement scenario data may include an alternate retirement scenario asset value amount 1121AR (e.g., $123,209), an alternate retirement scenario cash asset value amount 1128AR (e.g., $543,754), an alternate retirement scenario projected asset value amount 1124AR (e.g., $204,155), an alternate retirement scenario projected cash asset value amount 1129AR (e.g., $602,006), an alternate retirement scenario protection benefit amount 1114AR (e.g., $1,526,887), and an alternate retirement scenario projected protection benefit amount 1115AR (e.g., 1,573,768).

Figure 23:
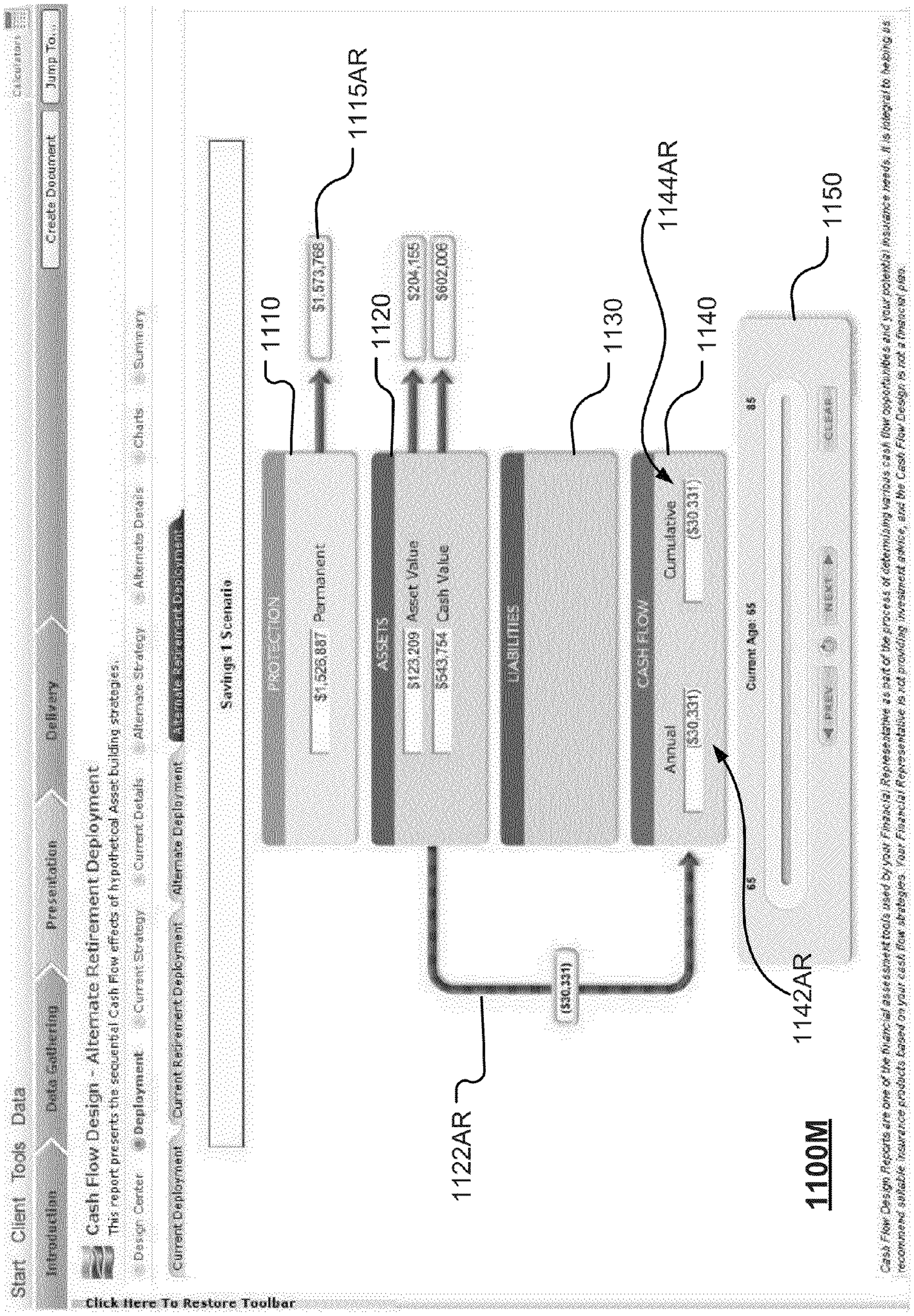

FIG. 23 illustrates a further example of an alternate retirement scenario deployment display page 1100M, where the alternate retirement scenario data further includes, for example, an alternate retirement scenario annual cash flow amount 1142AR (e.g., –$30,331), an alternate retirement scenario cumulative cash flow amount 1144AR (e.g., –$30,331), and an alternate retirement scenario assets cash flow amount 1122AR (e.g., –$30,331).

Figure 24:
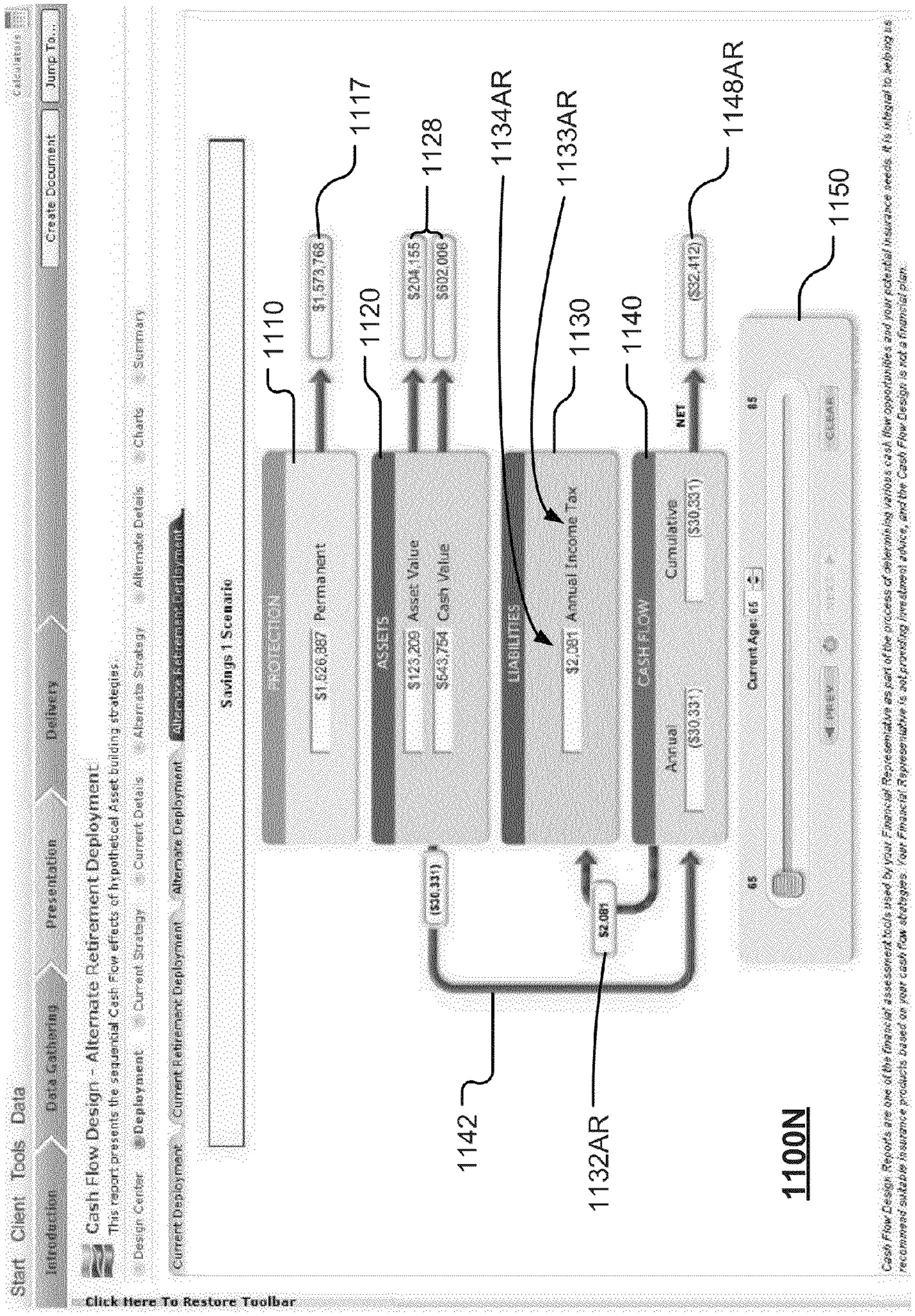

FIG. 24 illustrates a further example of an alternate retirement scenario deployment display page 1100N, where the alternate retirement scenario data further includes, for example, an alternate retirement scenario liabilities cash flow amount 1132AR (e.g., $2,081), an alternate retirement scenario liability type 1133AR (e.g., annual income tax), an alternate retirement scenario liability amount 1134AR (e.g., $2,081), and an alternate retirement scenario net cash flow amount 1148AR (e.g., –$32,412). As seen, the current retirement scenario age may be set to a future client's age (e.g., 65).

Figure 25:
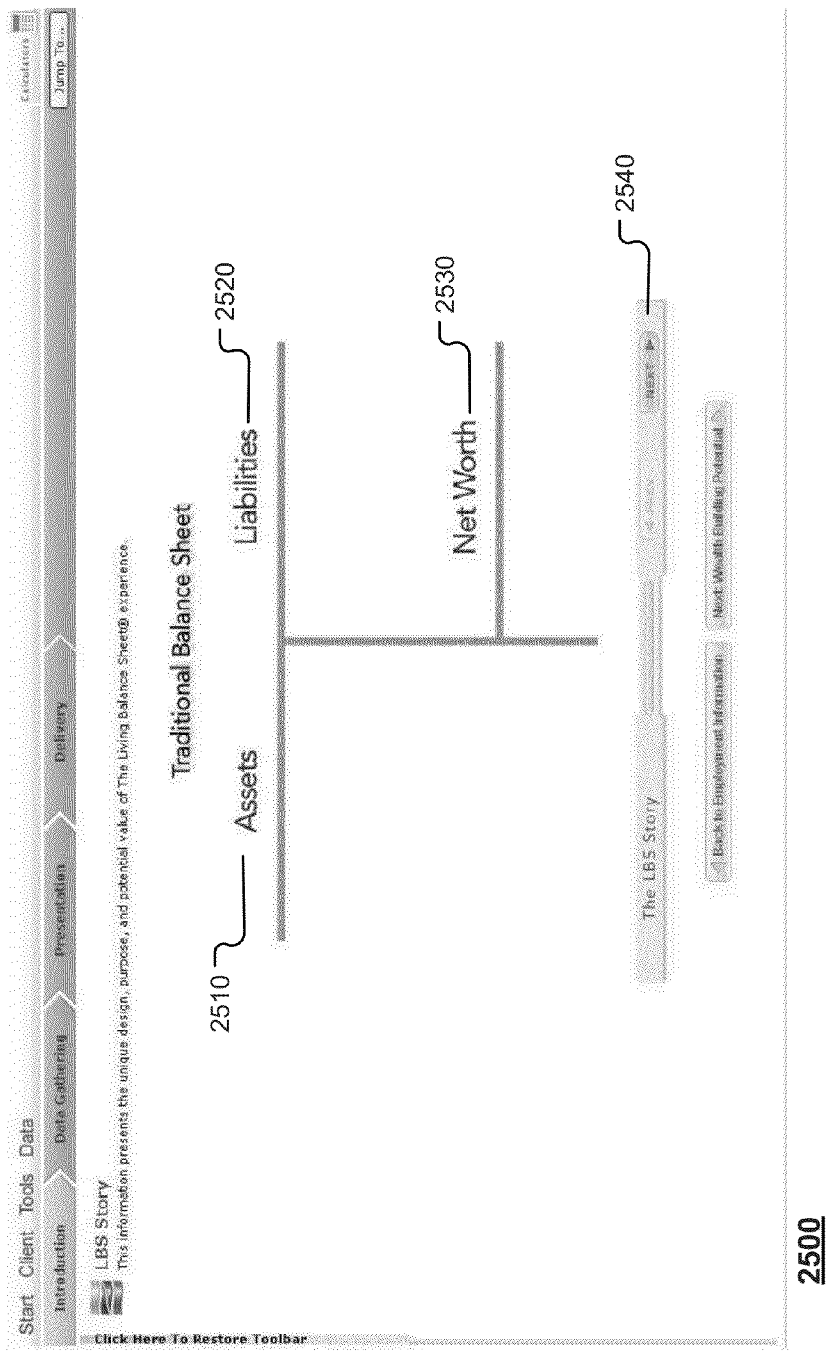
FIGS. 25-36 illustrate various examples of display pages arranged so as to show aspects of a teaching portion of an introduction module of a workflow wizard tool, in accordance with one embodiment.
Figure 94:
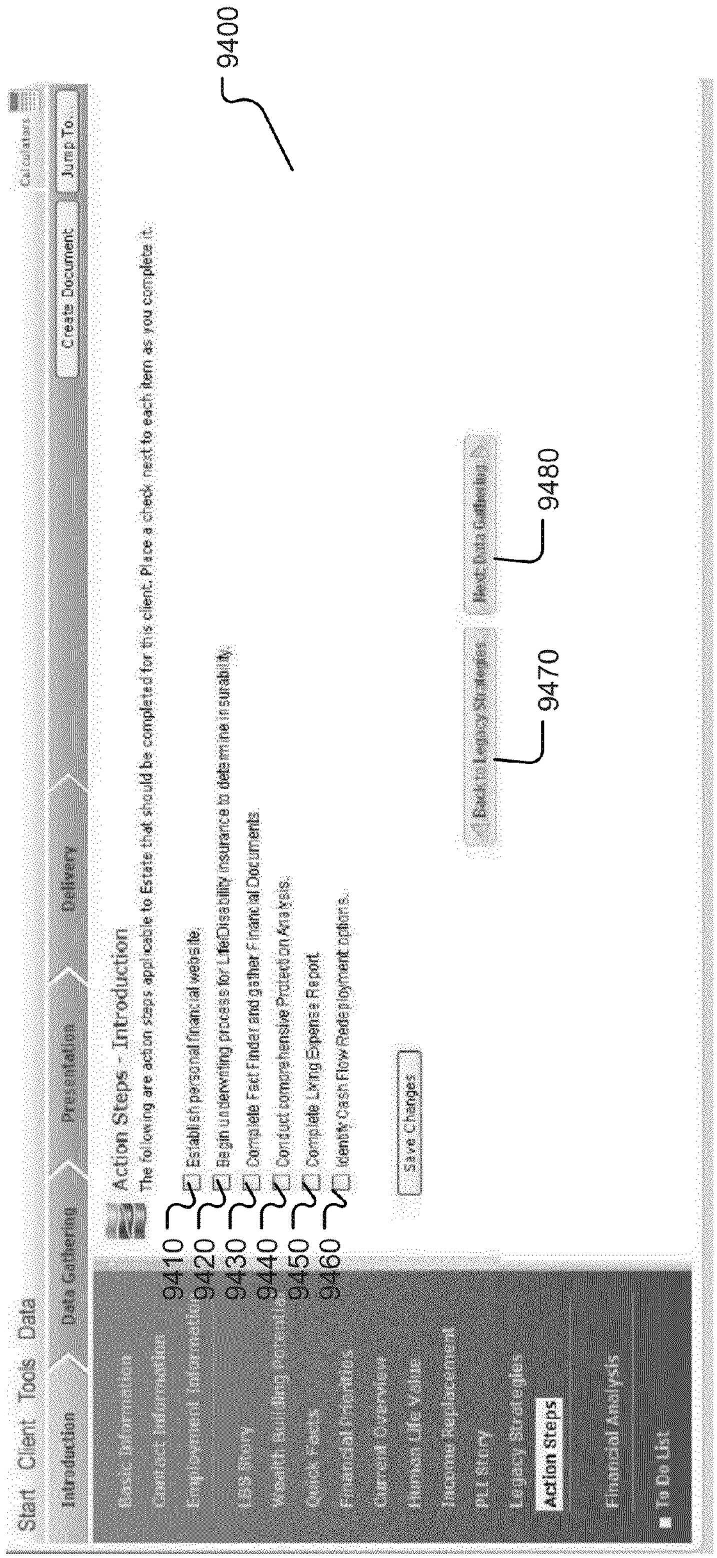
FIG. 94 illustrates an example of a display page that shows an aspect of an action step portion of the introduction module, in accordance with one embodiment.

FIGS. 25-94 illustrate various examples of display pages arranged so as to show various aspects of an introduction module of a workflow wizard tool, according to aspects of the disclosure. The illustrated display pages are used for implementing the introduction module of the workflow wizard tool.

FIGS. 25-36 illustrate examples of display pages 2500-3600 that show aspects of an educational portion of the introduction module of a workflow wizard tool. The educational portion of the introduction module presents the unique design, purpose, and potential value of a system that is configured in accordance with the principles of the disclosure.

Referring to FIG. 25, the educational portion of the introduction module may begin with the display page 2500, which displays an example of a traditional balance sheet with its two separate domains of assets 2510 and liabilities 2520, with the difference between the assets domain 2510 and the liabilities domain 2520 resulting in a net worth 2530. The display page 2500 may include a navigation tool bar 2540 to allow a user to transition to a next display page 2600 by selecting, e.g., a radio button marked "NEXT>" or a previous page by selecting, e.g., a radio button marked "<PREV".

Figure 26:
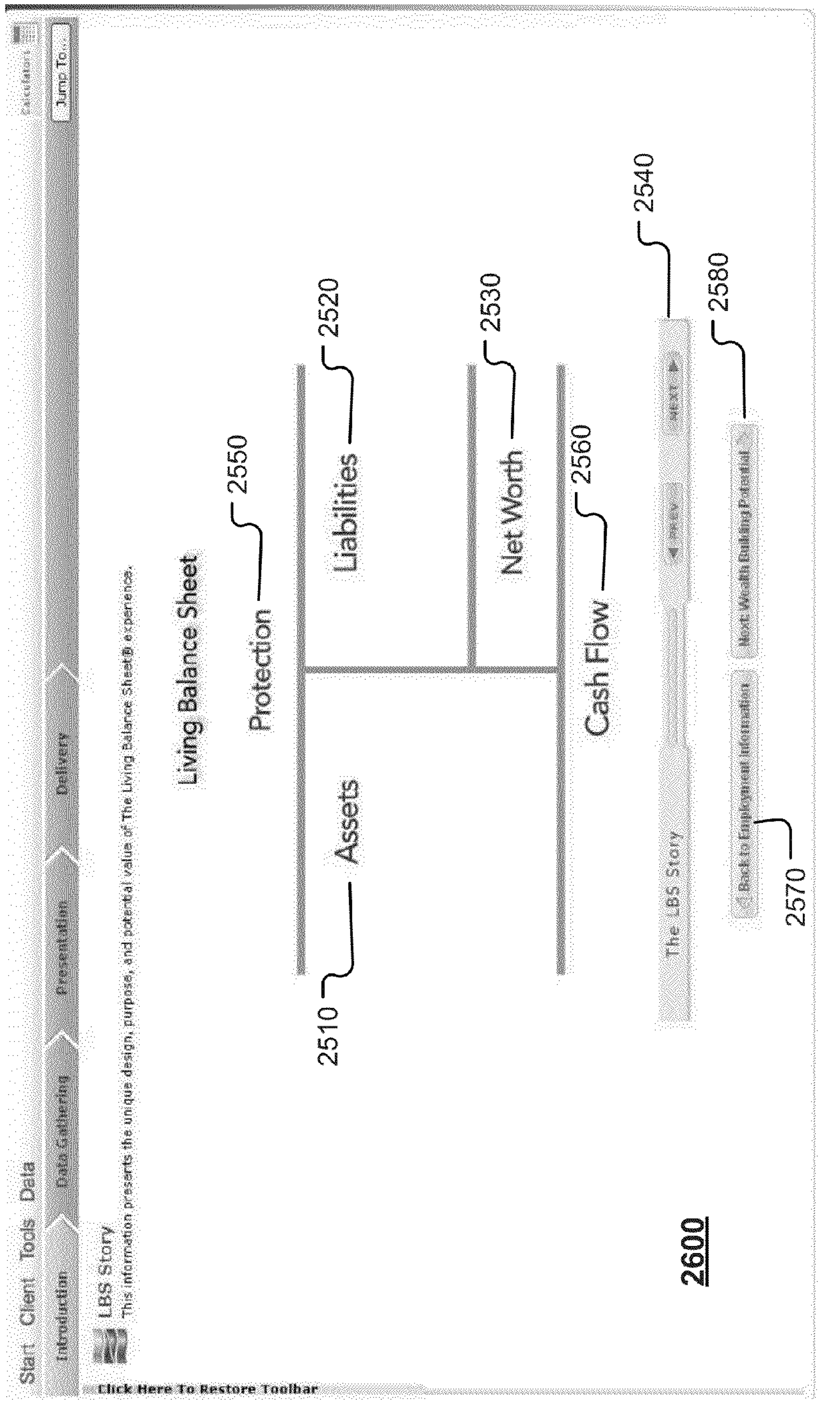

FIG. 26 shows an example of the display page 2600 that may be presented to a user after, e.g., the navigation tool bar 2540 is manipulated to select the next display page in the educational portion of the introduction module. The display page 2600 may include four interdependent financial domains (or categories), including a protection domain 2550 and a cash flow domain 2560, in addition to the two traditional balance sheet domains, i.e., the assets domain 2510 and the liabilities domain 2520. The display page 2600 may further include additional navigation tool bars 2570, 2580 to facilitate navigation to other tools, interfaces, displays, and the like, including, for example, a "Back to Employment Information" interface and a "Next: Wealth Building Potential" interface.

Figure 27:
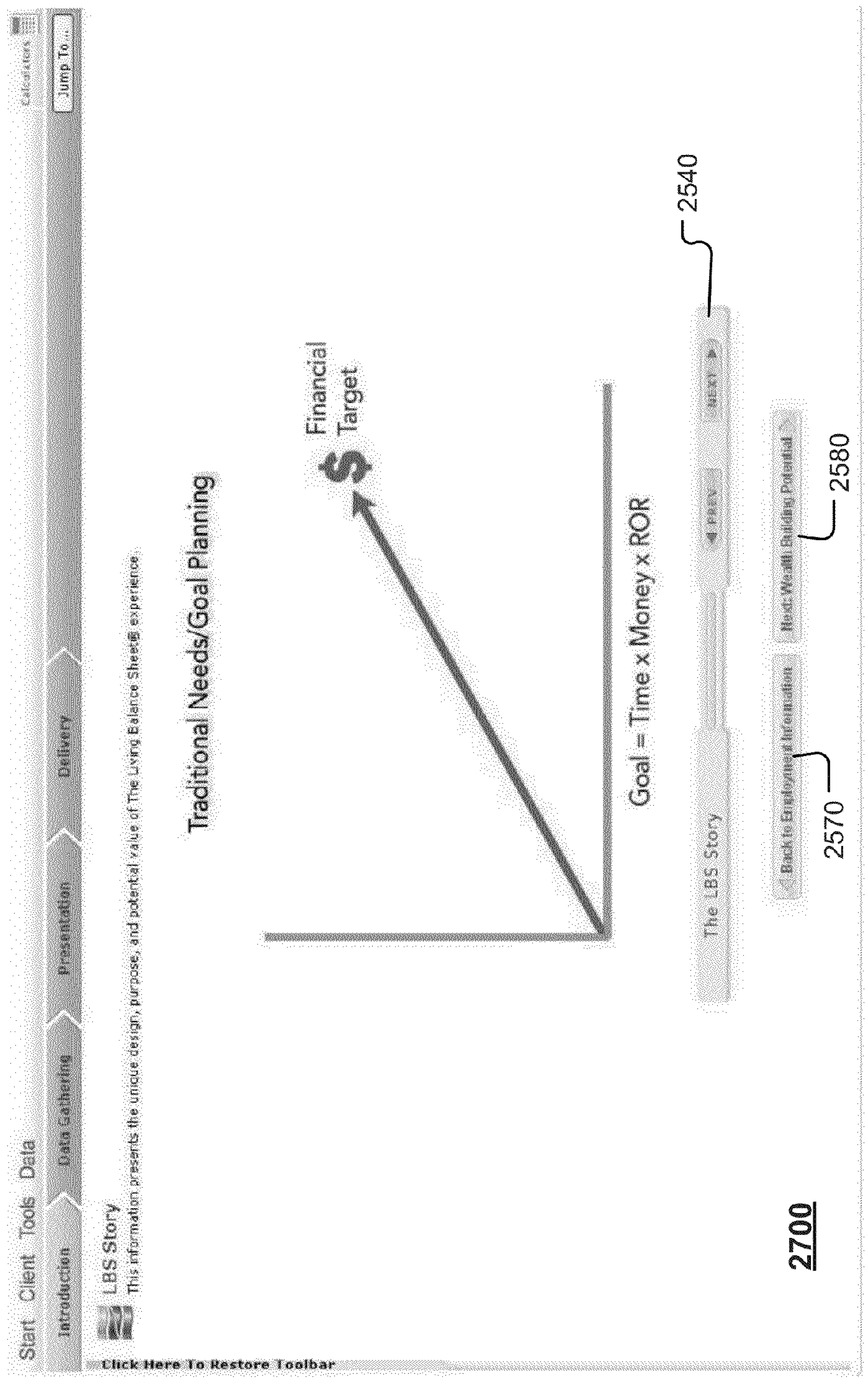

FIG. 27 shows an example of the display page 2700 that may be presented to a user after, e.g., the navigation tool bar 2540 is again manipulated to select the next display page in the educational portion of the introduction module, after the display page 2600. The display page 2700 may include a bar graph that provides a representation of traditional needs versus goal planning, the slope of which may represent a financial target. As seen in FIG. 27, the goal may be a function of, or equal to time×money×rate-of-return (ROR).

Figure 28:

FIG. 28 shows an example of the display page 2800 that may be presented to a user after, e.g., the navigation tool bar 2540 is again manipulated to select the next display page in the educational portion of the introduction module, after the display page 2700. The display page 2800 may include a list of factors that may be associated with a traditional needs/goal driven financial planning approach that is conventionally known in the art, and characterized by, e.g., an approach that is goal oriented, may be inefficient, requires guesswork, promotes risk, linear math, minimum protection, no financial cushion, reviews and updates, etc.

Figure 29:
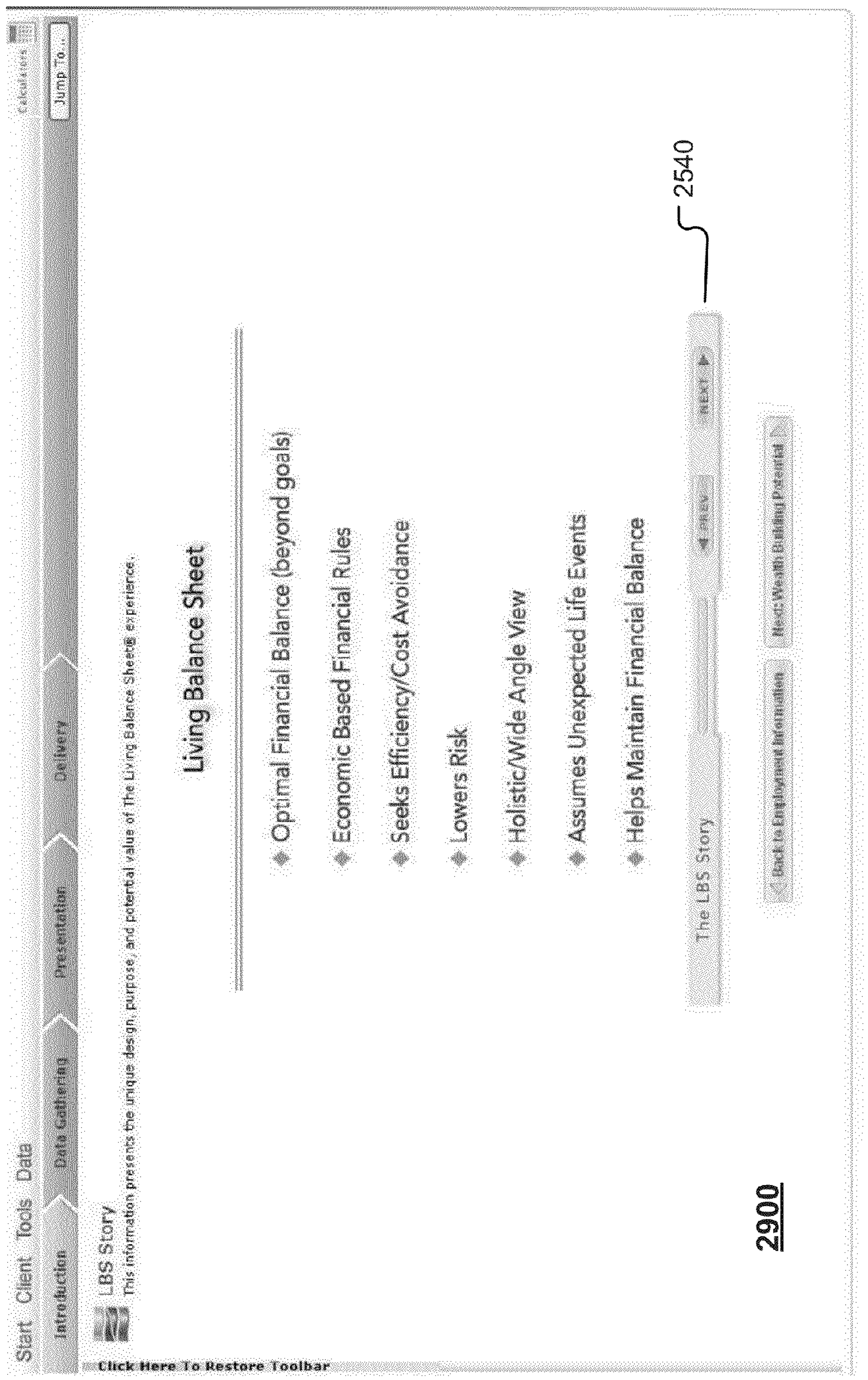

FIG. 29 shows an example of the display page 2900 that may be presented to a user after, e.g., the navigation tool bar 2540 is again manipulated to select the next display page in the educational portion of the introduction module, after the display page 2800. The display page 2900 may include a list of factors that may be associated with a balance sheet that is configured according to the principles of the disclosure. The display page 2900 may be characterized by, for example, the following factors: optimal financial balance (e.g., beyond, apart from, or without goals); economic based financial rules; seeks efficiency/cost avoidance; lowers risk; holistic/wide angle view; assumes unexpected life events; helps maintain financial balance, etc.

Therefore, it will be readily apparent to one of ordinary skill in the art that, unlike conventional methods of financial planning that are goal oriented (e.g., a client desires $3 million in savings at the time of retirement), the financial planning methods set forth herein according to the principles of the disclosure rely upon achieving an optimal balance of one or more of a plurality of interdependent financial domains, e.g., a protection domain, a liabilities domain, an assets domain, and/or a cash flow domain, etc.

Figure 30:
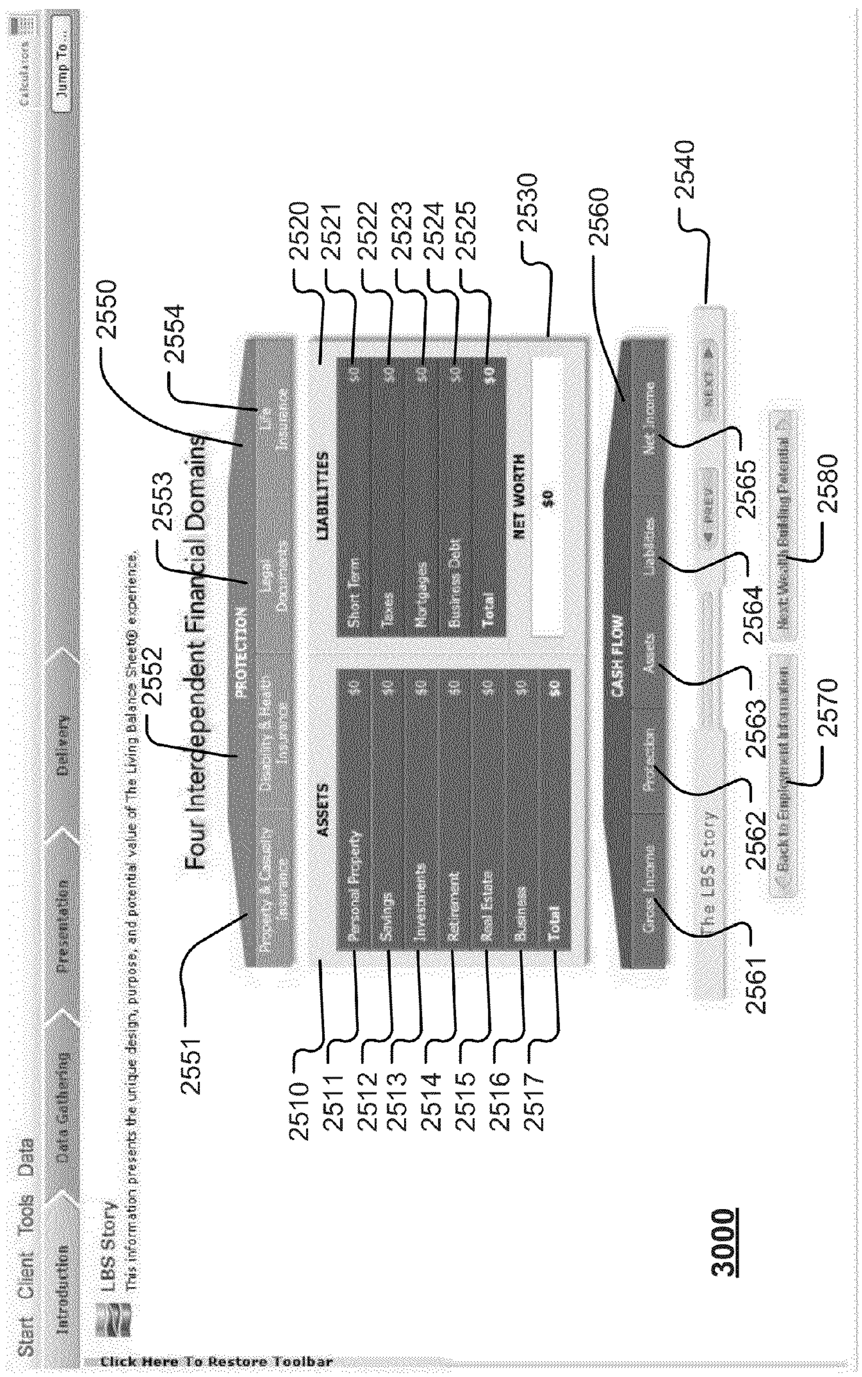

FIG. 30 shows an example of the display page 3000 that may be presented to a user after, e.g., the navigation tool bar 2540 is again manipulated to select the next display page in the educational portion of the introduction module, after the display page 2900. The display page 3000 may include a representation of the four interdependent financial domains—i.e., the assets domain 2510, the liabilities domain 2520, the protection domain 2550, and the cash flow domain 2560. As seen in FIG. 30, each of the domains 2510, 2520, 2550, 2560 may include one or more subdomains.

The assets domain 2510, for example, may include a personal property subdomain 2511, a savings subdomain 2512, an investments subdomain 2513, a retirement subdomain 2514, a real estate subdomain 2515, a business subdomain 2516, and a total 2517, which may include an aggregate value of all of the subdomains in the assets domain 2510.

The liabilities domain 2520, for example, may include a short term subdomain 2521, a taxes subdomain 2522, a mortgages subdomain 2523, a business debt subdomain 2524, and a total 2525, which may include an aggregate value of all of the subdomains in the liabilities domain 2520.

The protection domain 2550, for example, may include a property and casualty insurance subdomain 2551, a disability and health insurance subdomain 2552, a legal documents subdomain 2553, and a life insurance subdomain 2554.

The cash flow domain 2560, for example, may include a gross income subdomain 2561, a protection subdomain 2562, an assets subdomain 2563, a liabilities subdomain 2564, and a net income subdomain 2565.

Figure 31:
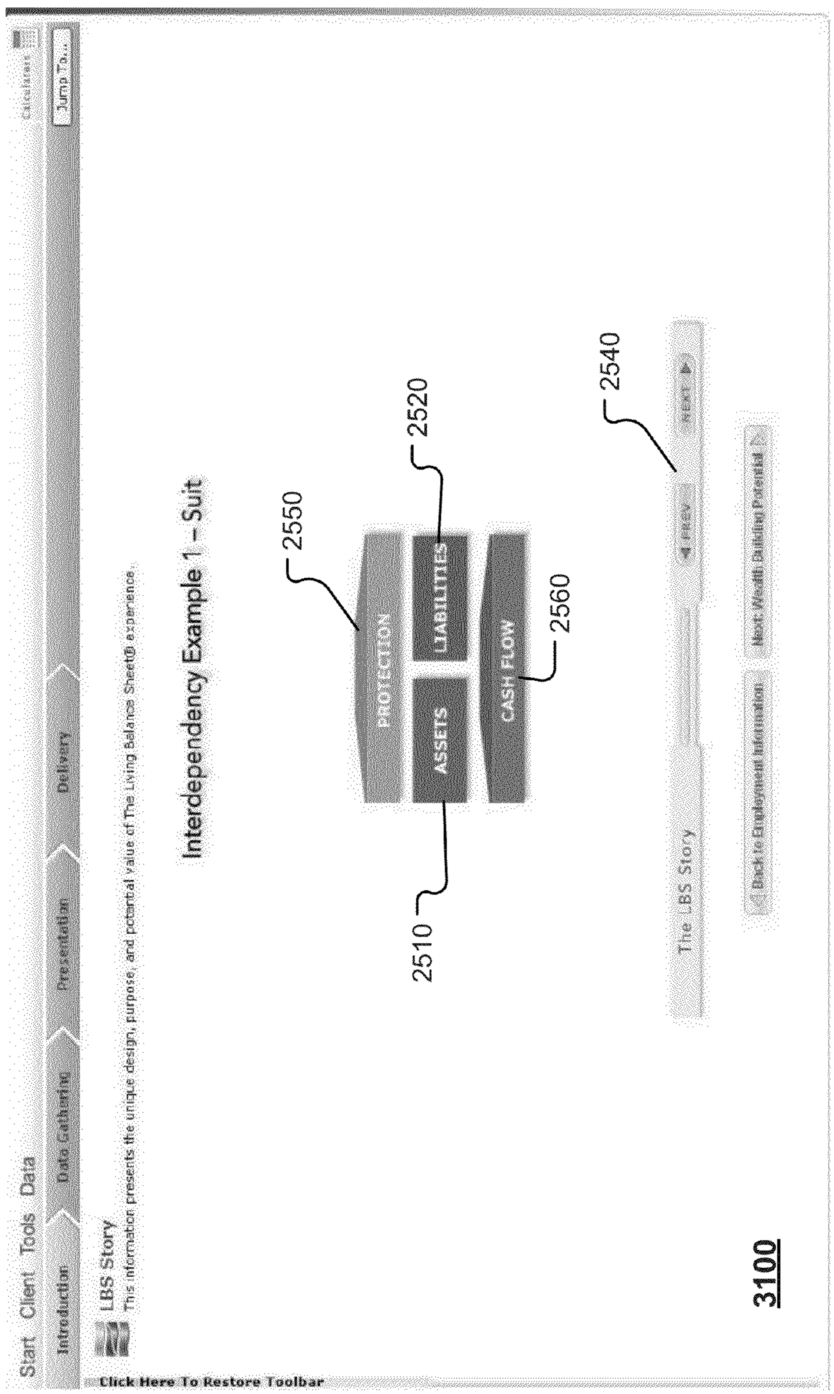

FIG. 31 shows an example of the display page 3100 that may be presented to a user after, e.g., the navigation tool bar 2540 is again manipulated to select the next display page in the educational portion of the introduction module, after the display page 3000. The display page 3100 may include a representation of the four interdependent financial domains, including the assets domain 2510, the liabilities domain 2520, the protection domain 2550, and the cash flow domain 2560. The display page 3100 may be the first in a sequence of display pages to present a first example of the interdependency of the four interdependent domains 2510, 2520, 2550, and 2560.

Figure 32:
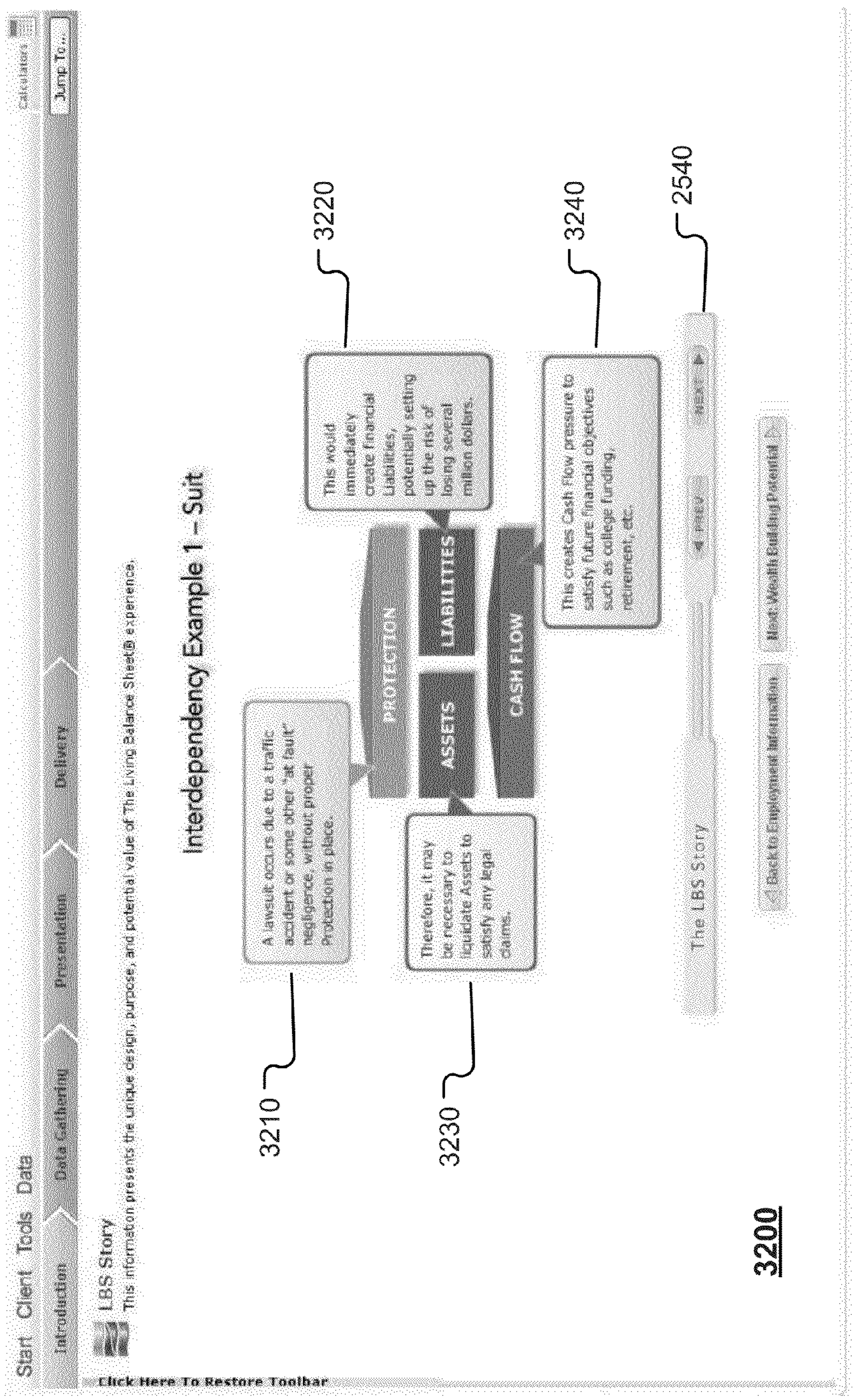

FIG. 32 shows an example of the display page 3200 that may be presented to a user after, e.g., the navigation tool bar 2540 is again manipulated to select the next display page in the educational portion of the introduction module, after the display page 3100. The display page 3200 may include the representation of the four interdependent financial domains assets, liabilities, protection, cash flow, and display a plurality of messages 3210-3240. The plurality of messages 3210-3240 may be displayed sequentially (one display page at a time) or substantially simultaneously. The display message 3210 may be displayed first, noting an example where a lawsuit (or suit) may occur due to a traffic accident or some other "at fault" negligence, without proper protection in place. The display message 3220 may next be displayed, noting the example in display message 3210 may immediately create financial liabilities, potentially setting up a risk of losing, e.g., several million dollars. The display message 3230 may next be displayed, noting that, therefore, it may be necessary to liquidate assets to satisfy any legal claims. The display message 3240 may next be displayed, noting that the foregoing example may create cash flow pressures to satisfy future financial objectives such as, e.g., college funding, retirement, and the like.

Figure 33:
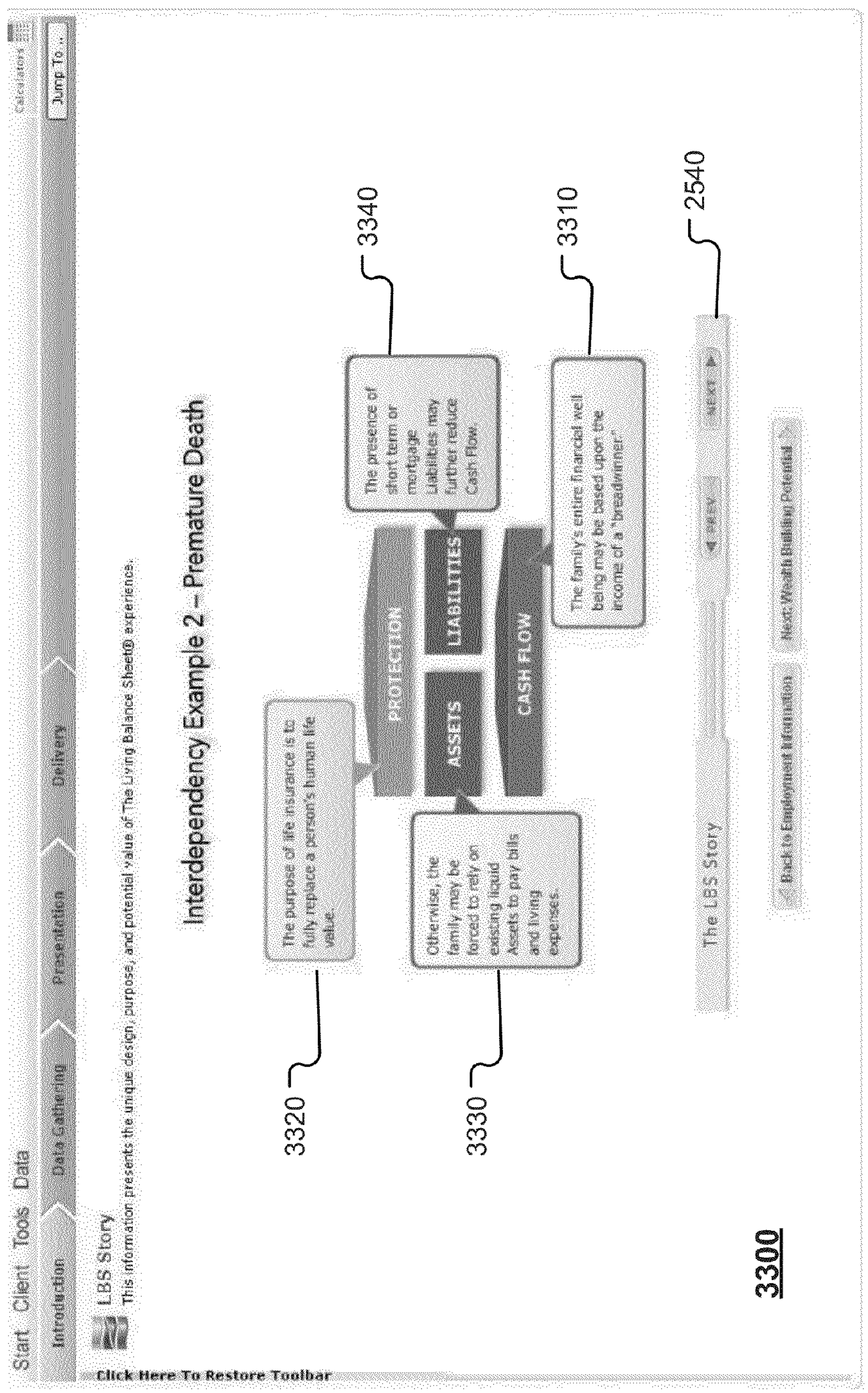

FIG. 33 shows an example of the display page 3300 that may be presented to a user after, e.g., the navigation tool bar 2540 is again manipulated to select the next display page in the educational portion of the introduction module, after the display page 3200. The display page 3300 may include the representation of the four interdependent financial domains assets, liabilities, protection, cash flow, and a sequential production of a plurality of messages 3310-3340 related to another example, where a premature death occurs. The plurality of messages 3310-3340 may be displayed sequentially (one display page at a time) or substantially simultaneously. The display message 3310 may be displayed first, noting an example where a family's entire financial well being may be based upon the income of a "breadwinner." The display message 3320 may next be displayed, noting that the purpose of life insurance is to fully replace a person's monetary life value. The display message 3330 may next be displayed, noting that, without protection, the family may be forced to rely on existing liquid assets to pay bills and living expenses. The display message 3440 may next be displayed, noting that the presence of short term or mortgage liabilities may further reduce cash flow.

Figure 34:
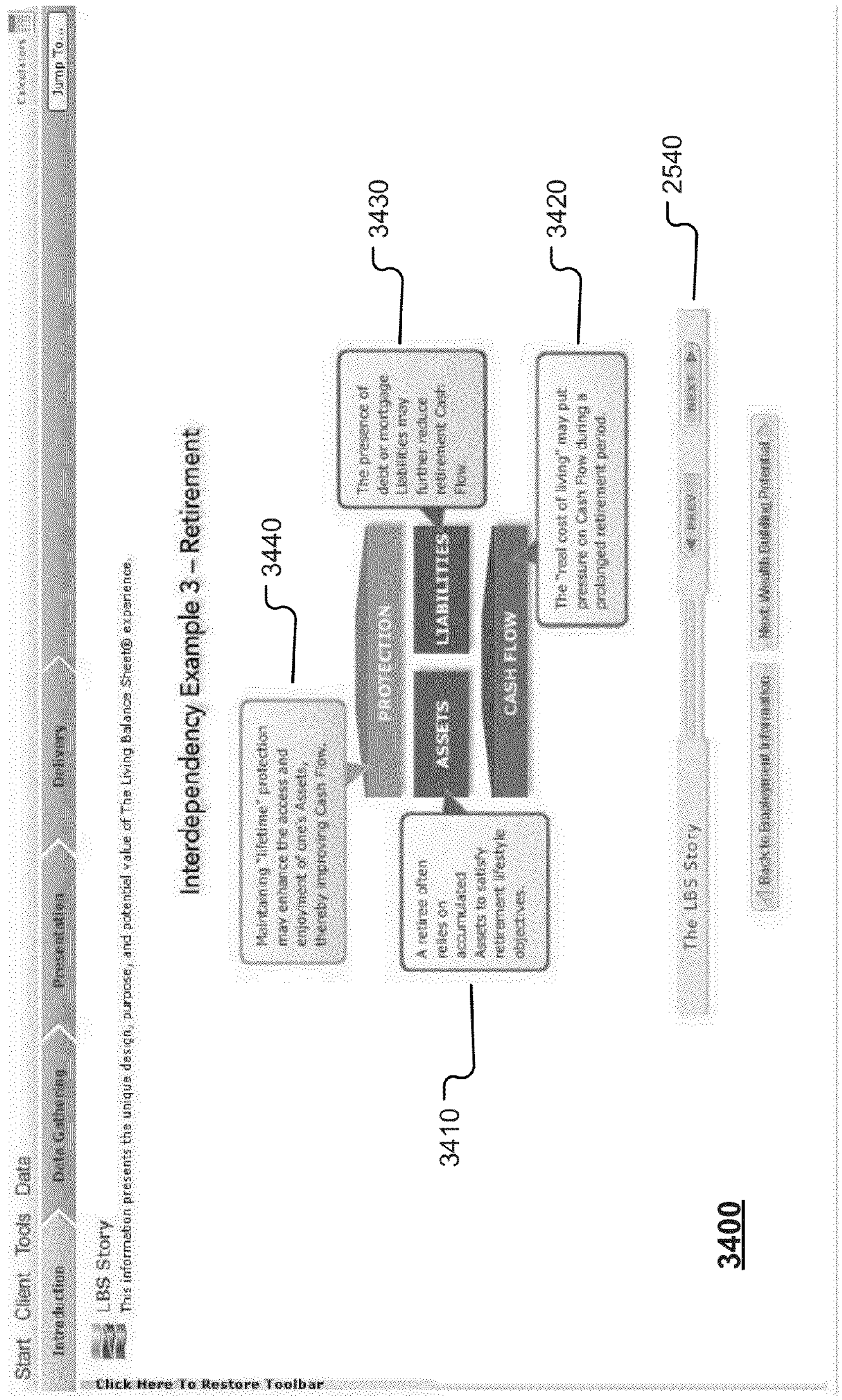

FIG. 34 shows an example of the display page 3400 that may be presented to a user after, e.g., the navigation tool bar 2540 is again manipulated to select the next display page in the educational portion of the introduction module, after the display page 3300. The display page 3400 may include the representation of the four interdependent financial domains assets, liabilities, protection, cash flow, and a sequential production of a plurality of messages 3410-3440 related to another example, retirement. The plurality of messages 3410-3440 may be displayed sequentially (one display page at a time) or substantially simultaneously. The display message 3410 may be displayed first, noting an example where a retiree often relies on accumulated assets to satisfy retirement lifestyle objectives. The display message 3420 may next be displayed, noting that the "real cost of living" may put pressure on cash flow during a prolonged retirement period. The display message 3430 may next be displayed, noting that the presence of debt or mortgage liabilities may further reduce retirement cash flow. The display message 3440 may next be displayed, noting that maintaining "lifetime" protection may enhance the access and enjoyment of one's assets, thereby improving cash flow.

Figure 35:
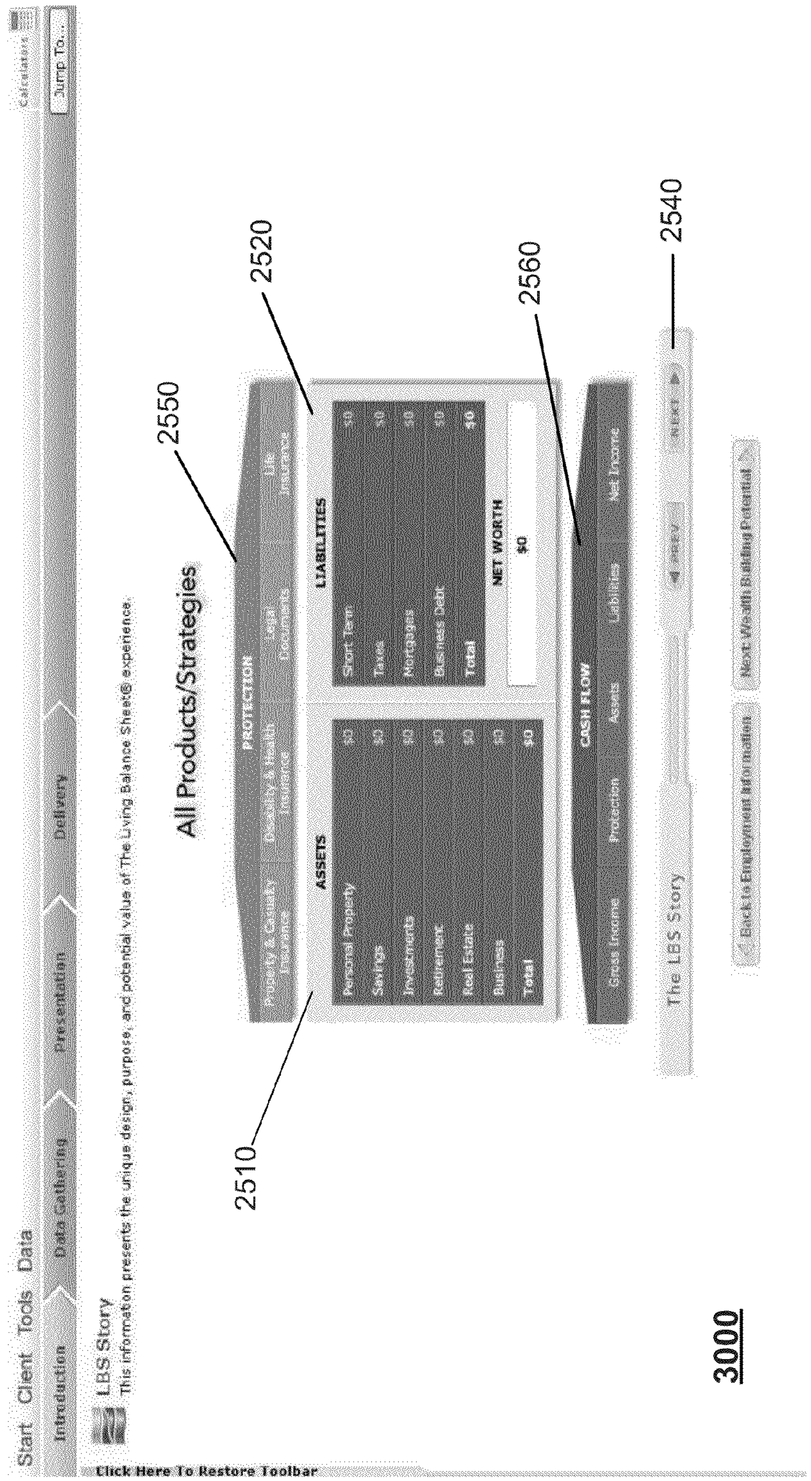

FIG. 35 shows the display page 3000, which may be presented to a user after, e.g., the navigation tool bar 2540 is again manipulated to select the next display page in the educational portion of the introduction module, after the display page 3400. The display page 3000 may include a legend—"All Products/Strategies"—noting that the four interdependent financial domains 2510, 2520, 2550, 2560, may cover substantially all products and/or strategies.

Figure 36:
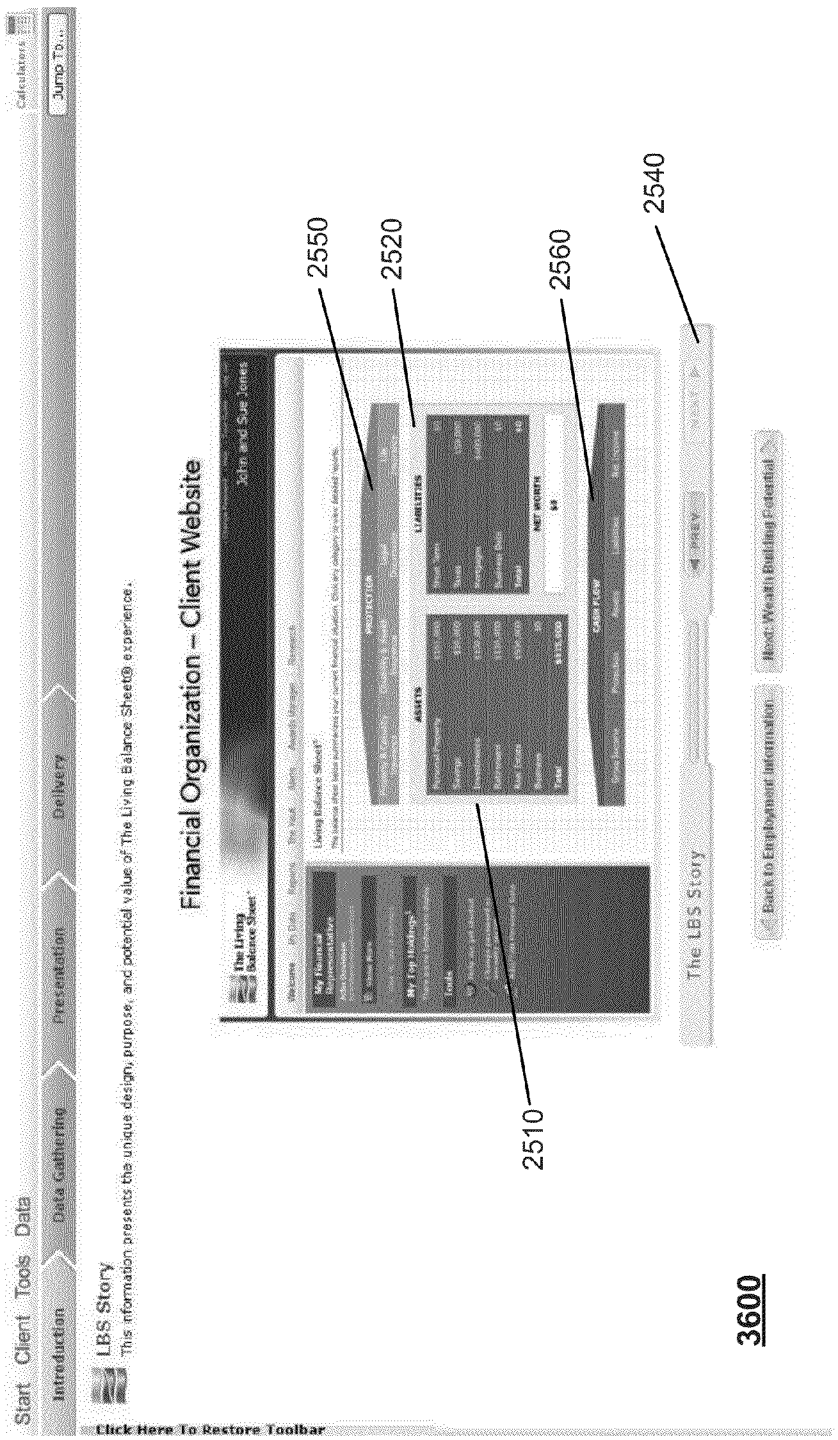

FIG. 36 shows the display page 3600, which includes an example of a client website page that may be displayed to a client, including the four interdependent financial domains 2510, 2520, 2550, 2560, as well as other information that may be of interest to the client, such as, for example, a name of the client's financial representative, the client's top holdings, tools, and the like.

FIGS. 37-40 illustrate examples of display pages 3700-4000 that show aspects of a wealth building potential portion of the introduction module of the workflow wizard. The wealth building potential portion of the introduction module presents an example of hypothetical wealth building impact that may be created by typical eroding factors.

Figure 37:
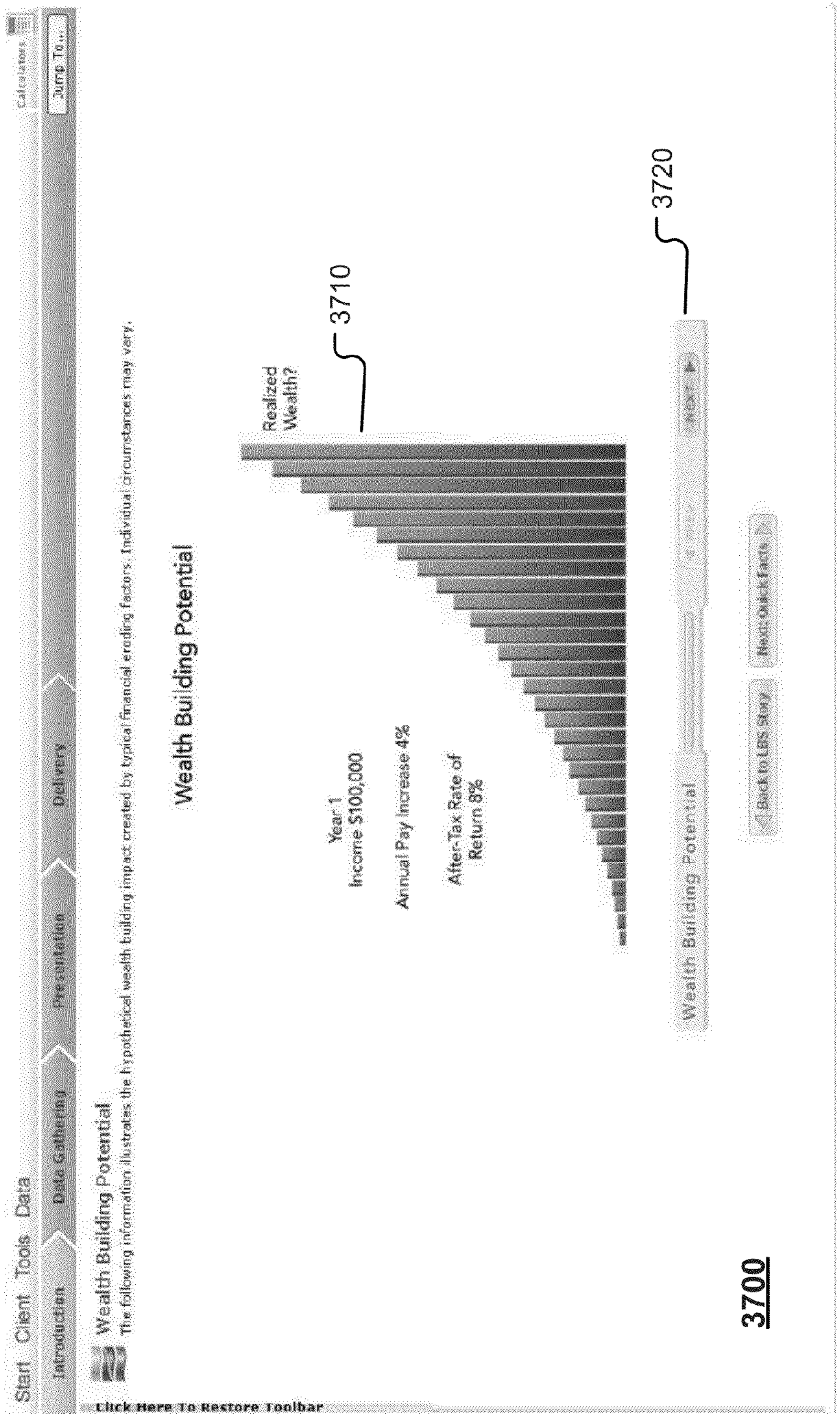
FIGS. 37-40 illustrate various examples of display pages arranged to show aspects of a wealth building potential portion of an introduction module, in accordance with one embodiment.

Referring to FIG. 37, the wealth building potential portion of the introduction module may begin with the display page 3700, which displays an example of a bar graph 3710 that represents realized wealth (or savings) with an income of, e.g., $100,000 for the first year with an annual pay increase of, e.g., 4% and an after-tax rate of return of, e.g., 8%. The display page 3700 may include a navigation tool bar 3720 to allow a user to transition to a next display page 3800 by selecting, e.g., a radio button marked "NEXT>" or a previous page by selecting, e.g., a radio button marked "<PREV".

Figure 38:
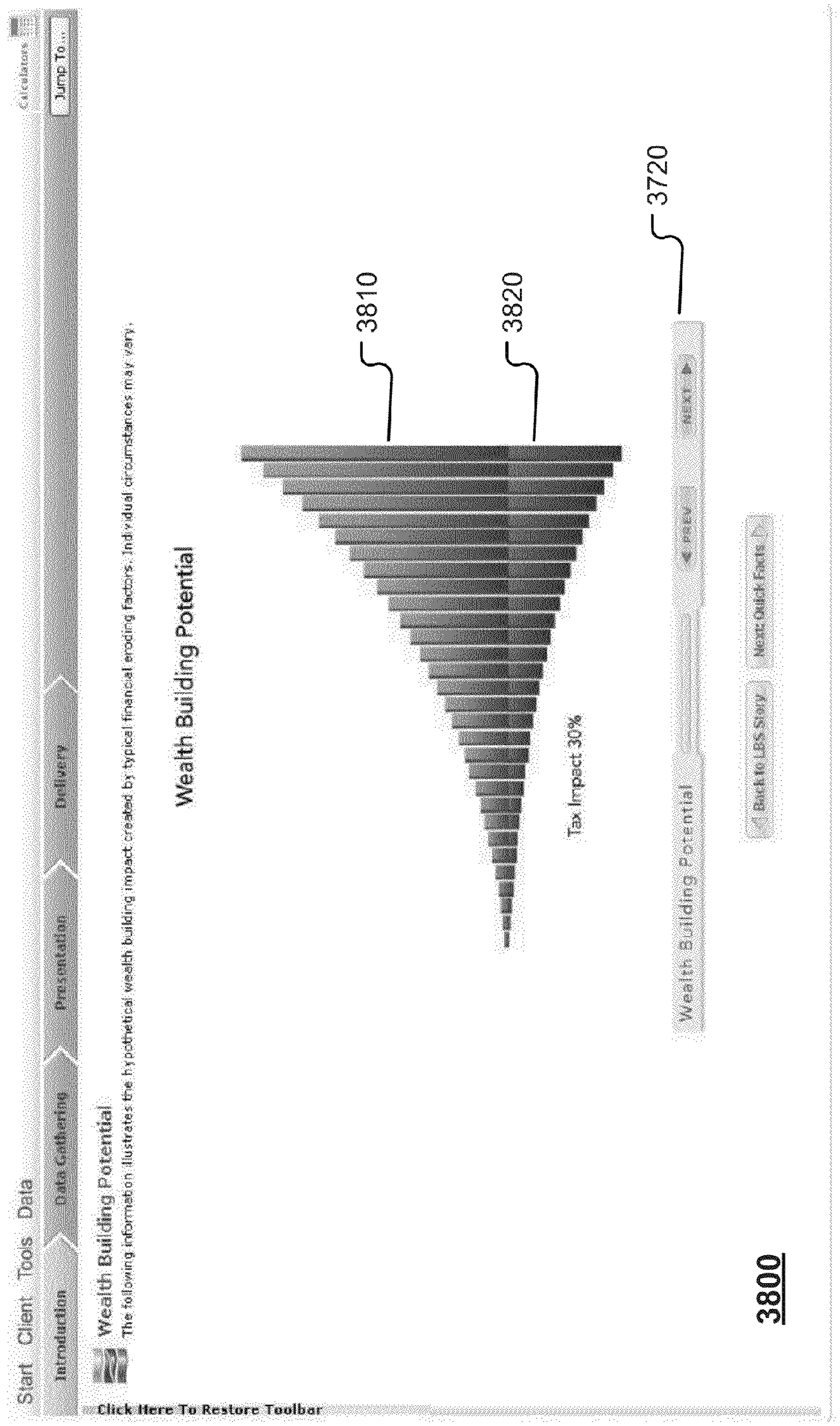

FIG. 38 shows an example of the display page 3800 that may be presented to a user after, e.g., the navigation tool bar 3720 is manipulated to select the next display page in the wealth building potential portion of the introduction module, after the display page 3700. The display page 3800 presents an example of a tax impact of, e.g., 30% on the realized wealth. The display page 3800 may include a realized wealth bar graph 3810 and a tax impact bar graph 3820, which may be presented in a different color, shade, pattern, or the like, from the realized wealth bar graph 3810. Comparing display pages 3700 and 3800, it may be evident to a user that the tax impact, which is represented by tax impact bar graph 3820, may have a significant eroding effect on the realized wealth, which is represented by the bar graphs 3710 and 3810.

Figure 39:
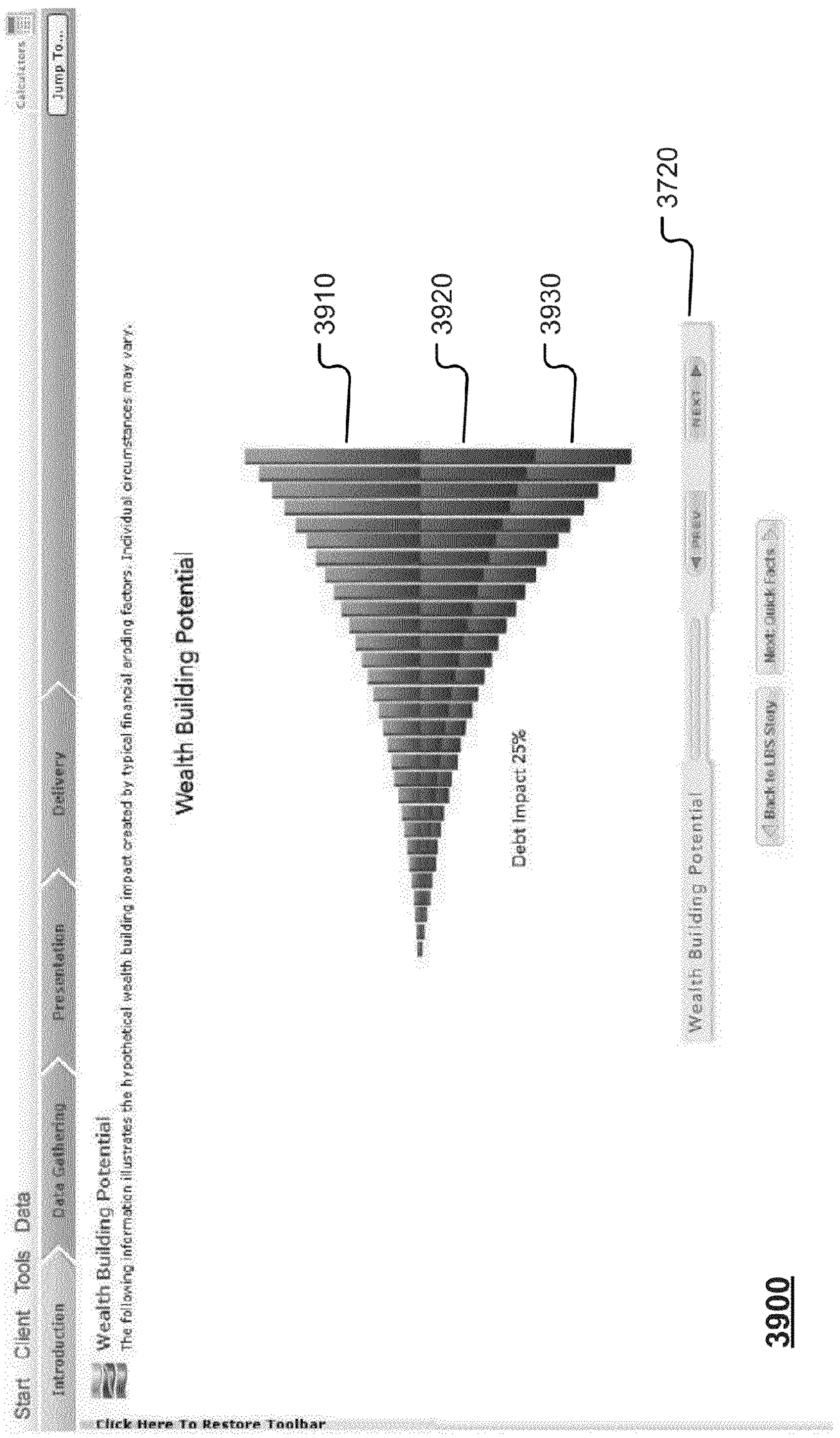

FIG. 39 shows an example of the display page 3900 that may be presented to a user after, e.g., the navigation tool bar 3720 is again manipulated to select the next display page in the wealth building potential portion of the introduction module, after the display page 3800. The display page 3900 may include a realized wealth bar graph 3910, a tax impact bar graph 3920, and a debt impact bar graph 3930, which may be presented in different colors, shades, patterns, or the like, to facilitate easier reading by the user. The display page 3900 presents an example of a tax impact of, e.g., 30%, and a debt impact of, e.g., 25% on the realized wealth. Comparing display pages 3700, 3800, and 3900, it may be evident to a user that the tax impact and debt impact, which are represented by the tax impact bar graph 3920 and debt impact bar graph 3930, respectively, may have a significant eroding effect on the realized wealth, which is represented by the bar graph 3710, 3810 and 3910.

Figure 40:
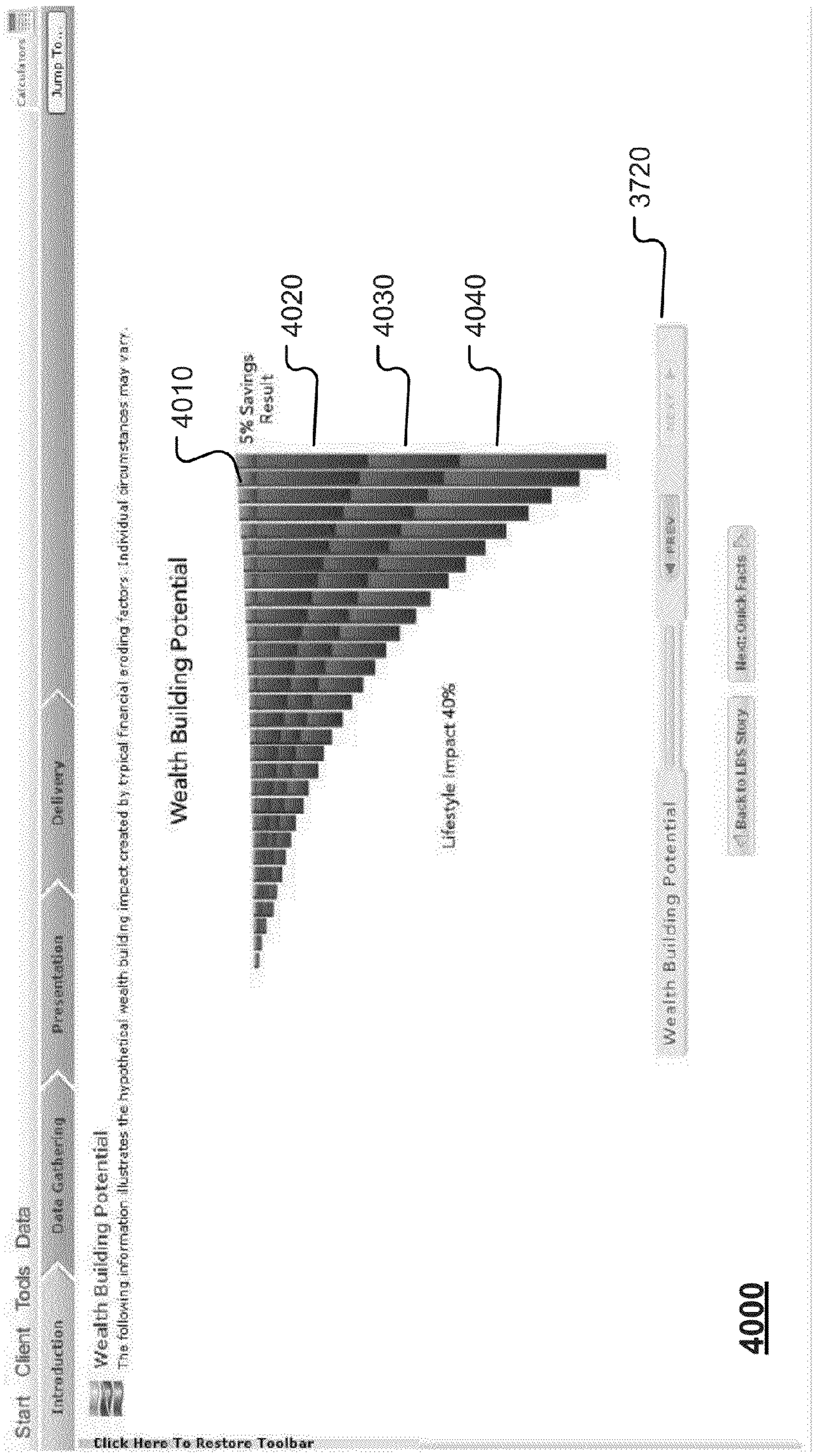

FIG. 40 shows an example of the display page 4000 that may be presented to a user after, e.g., the navigation tool bar 3720 is again manipulated to select the next display page in the wealth building potential portion of the introduction module, after the display page 3900. The display page 4000 may include a realized wealth bar graph 4010, a tax impact bar graph 4020, a debt impact bar graph 4030, and a lifestyle impact bar graph 4040, which may be presented in different colors, shades, patterns, or the like, to facilitate easier reading by the user. The display page 4000 presents an example of a tax impact of, e.g., 30%, a debt impact of e.g., 25%, and a lifestyle impact of, e.g., 40% on the realized wealth. Comparing display pages 3700, 3800, 3900, and 4000, it may be evident to a user that the tax impact, debt impact, and the lifestyle impact, which are represented by the tax impact bar graph 4020, the debt impact bar graph 4030, and the lifestyle impact bar graph 4040, respectively, may have a significant eroding effect on the realized wealth, which is represented by the bar graphs 3710, 3810, 3910, and 4010.

Figure 41:
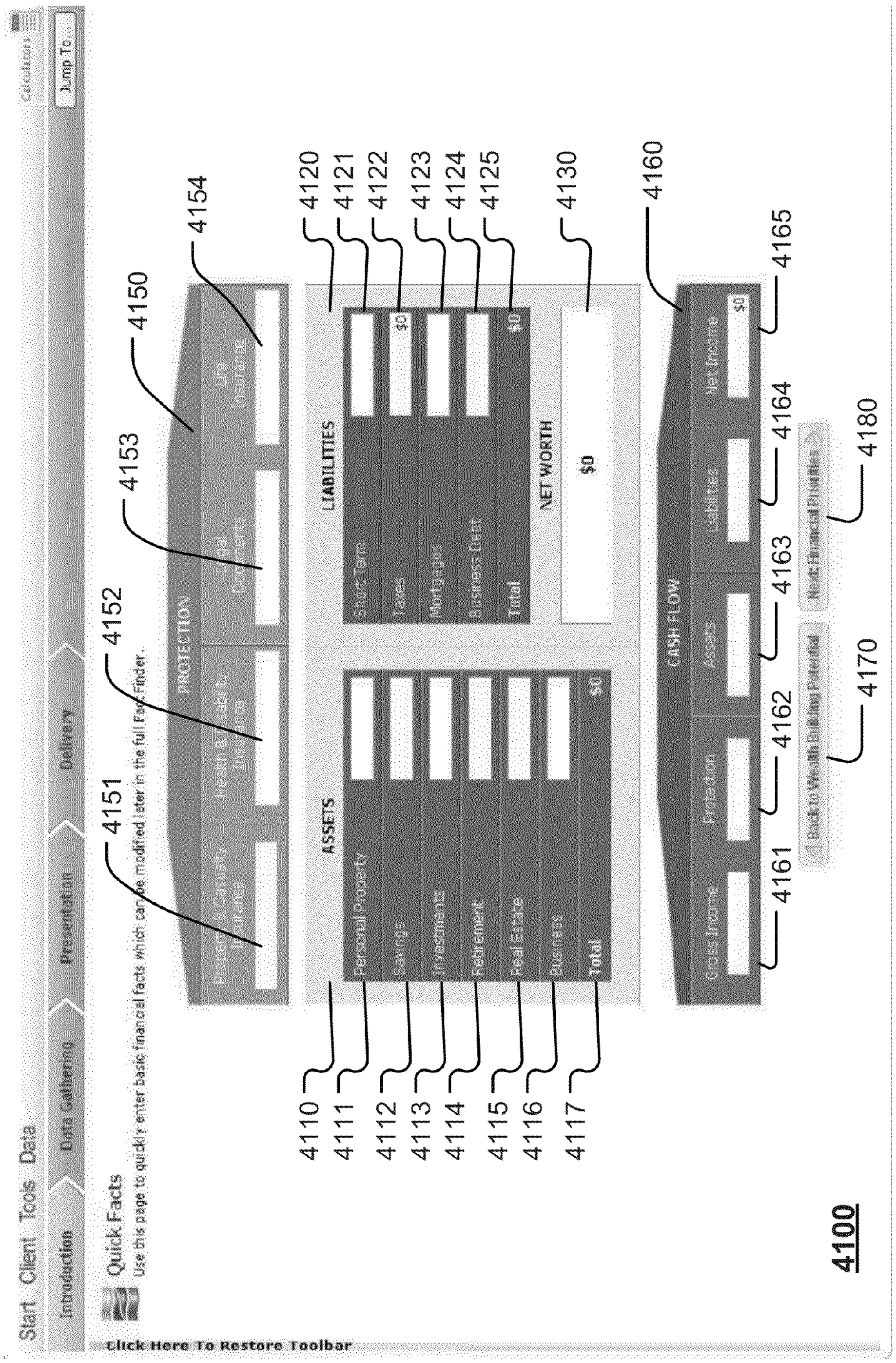
FIG. 41 illustrates an example of a display page that shows an aspect of a quick facts portion of the introduction module, in accordance with one embodiment.

FIG. 41 illustrates an example of a display page 4100 that shows an aspect of a quick facts portion of the introduction module of the workflow wizard tool. The display page 4100 includes a representation of the four interdependent financial domains (i.e., the assets domain 4110, the liabilities domain 4120, the protection domain 4150, and the cash flow domain 4160). Each of the financial domains may include a plurality of editable fields 4111-4116, 4121-4124, 4151-4154, and 4161-4165, each of which is configured to receive a basic financial fact that can be modified later in a full fact finder portion of, for example, a data gathering module. The plurality of fields include, e.g., a personal property assets field 4111, a savings assets field 4112, an investments assets field 4113, a retirement assets field 4114, a real estate assets field 4115, a business assets field 4116, a short term liability field 4121, a taxes liability field 4122, a mortgage liability field 4123, a business debt liability field 4124, a property and casualty insurance protection field 4151, a health and disability insurance protection field 4152, a legal protection documents field 4153, a life insurance protection field 4154, a gross income cash flow field 4161, a protection cash flow field 4162, an assets cash flow field 4163, a liabilities cash flow field 4164, and a net income cash flow field 4165. The display page 4100 may further include a net worth 4130 and navigation tool bars 4170, 4180 to facilitate navigation to other tools, interfaces, displays, and the like, including, for example, a "Back to Wealth Building Potential" interface and a "Next: Financial Priorities" interface.

FIGS. 42-45 illustrate examples of display pages 4200-4500 that show aspects of a financial priorities portion of the introduction module of the workflow wizard tool. The financial priorities portion of the introduction module presents examples of hypothetical impact of life events, such as, for example, retirement, premature death, permanent disability, and the like, on financial status based on current financial information.

Figure 42:
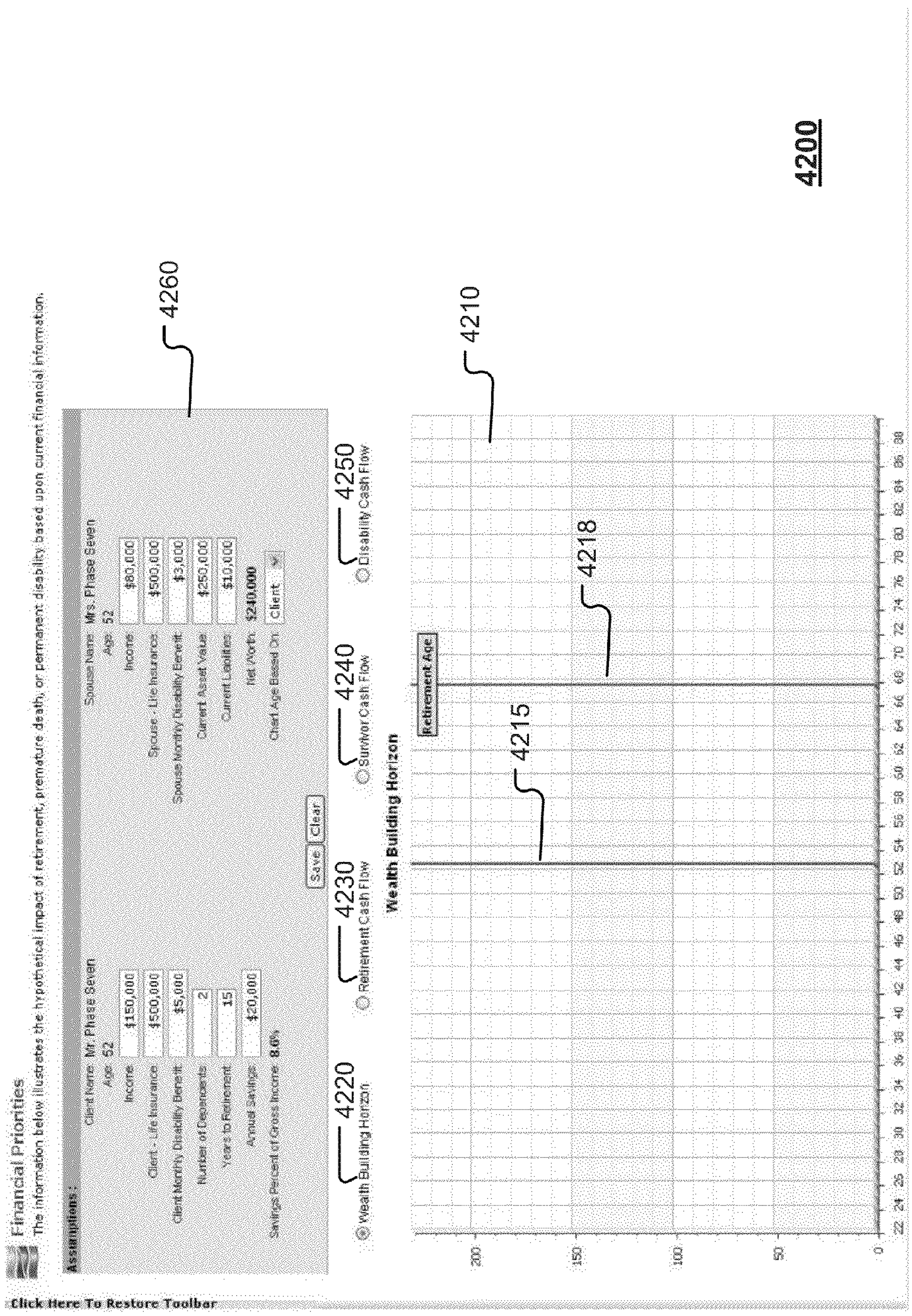
FIGS. 42-45 illustrate various examples of display pages that show aspects of a financial priorities portion of the introduction module, in accordance with one embodiment.

Referring to FIG. 42, the financial priorities portion of the introduction module may begin with the display page 4200, which displays an example of a chart portion 4210, a plurality of selectable cash flow portions 4220-4250, and an assumptions portion 4260. The display page 4200 may include a navigation tool bar (not shown) to facilitate navigation to other tools, interfaces, displays, and the like, including, for example, a "Back to Quick Facts" interface and a "Next: Current Overview" interface. The selectable cash flow portions 4220-4250 may include, for example, a wealth building horizon portion 4220, a retirement cash flow portion 4230, a survivor cash flow portion 4240, and a disability cash flow portion 4250. The assumptions portion 4260 may include a summary of financial information for the client and spouse—e.g., Mr. and Mrs. Phase Seven. The financial information may include, for example, income, life insurance, monthly disability benefit, a number of dependents, a number of years to retirement, an annual savings amount, a savings percent of gross income rate, a current asset value, a current liabilities value, a net worth value, a chart age based on client/spouse selectable field, and the like.

The chart 4210 on the display page 4200 displays a wealth building horizon line 4215 when the wealth building horizon portion 4220 is selected. As seen in FIG. 42, the chart 4210 includes the wealth building horizon line 4215 and a retirement age reference line 4218. The wealth building horizon line 4215 may represent, for example, the point at which a life event may occur, such as, e.g., a premature death, a permanent disability, or the like. The retirement age reference line 4218 may represent the intended retirement age of the client (or spouse). The ordinate axis of chart 4210 may represent a monetary value and the abscissa axis may represent the client's (or spouse's) age.

Figure 43:
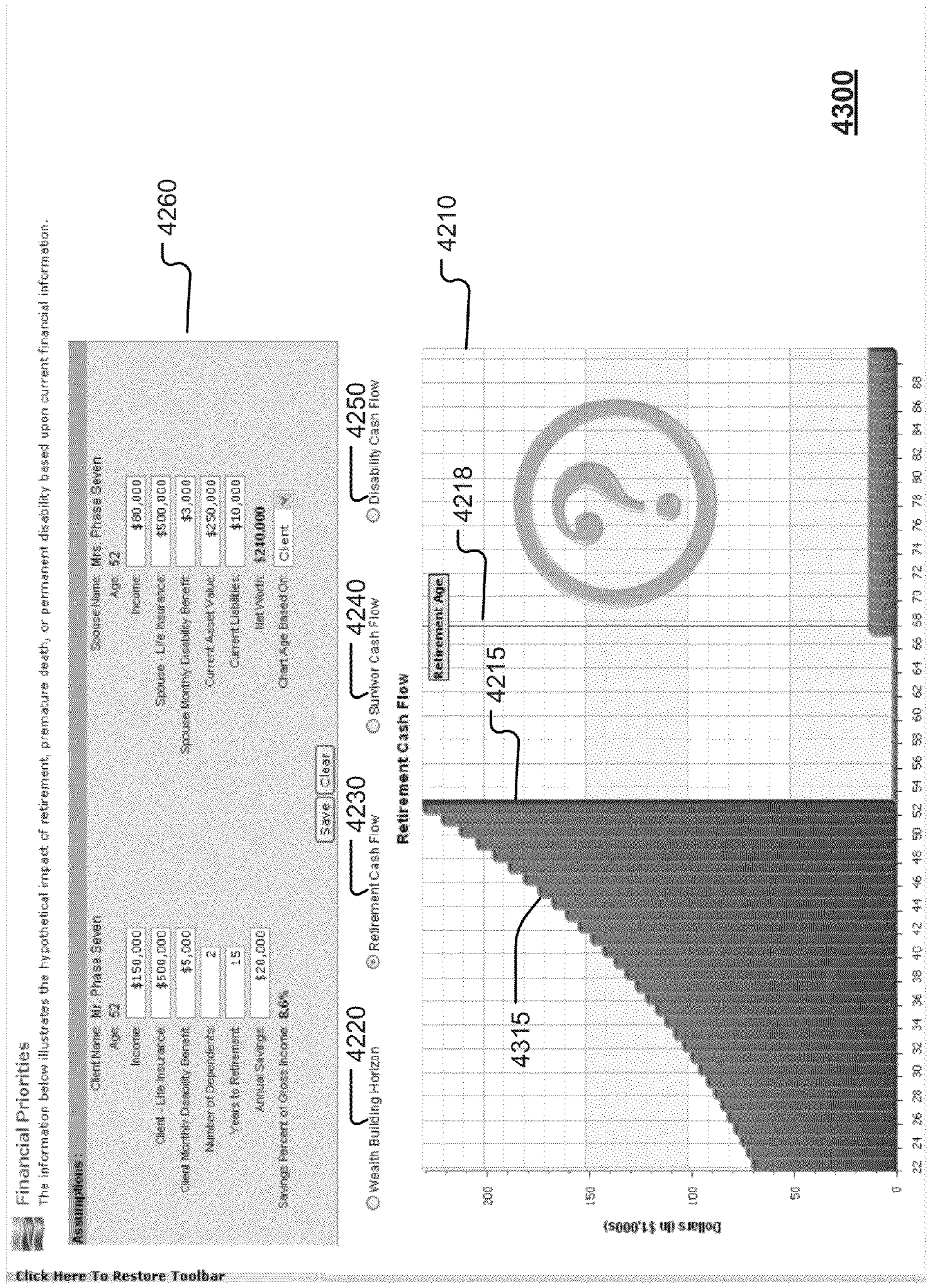

FIG. 43 shows an example of the display page 4300 that may be presented to a user after, e.g., the retirement cash flow portion 4230 has been selected for display. The display page 4300 may include the wealth building horizon line 4215, a retirement cash flow bar graph 4315 and the retirement age reference line 4218. The retirement cash flow bar graph 4315 may represent a pre-life event income of the client (or spouse) for any given age of the client (or spouse). The display page 4300 may include a fly-over feature, which may display an age value and an income value for each point where, e.g., a cursor is positioned on the retirement cash flow bar graph 4315.

Figure 44:
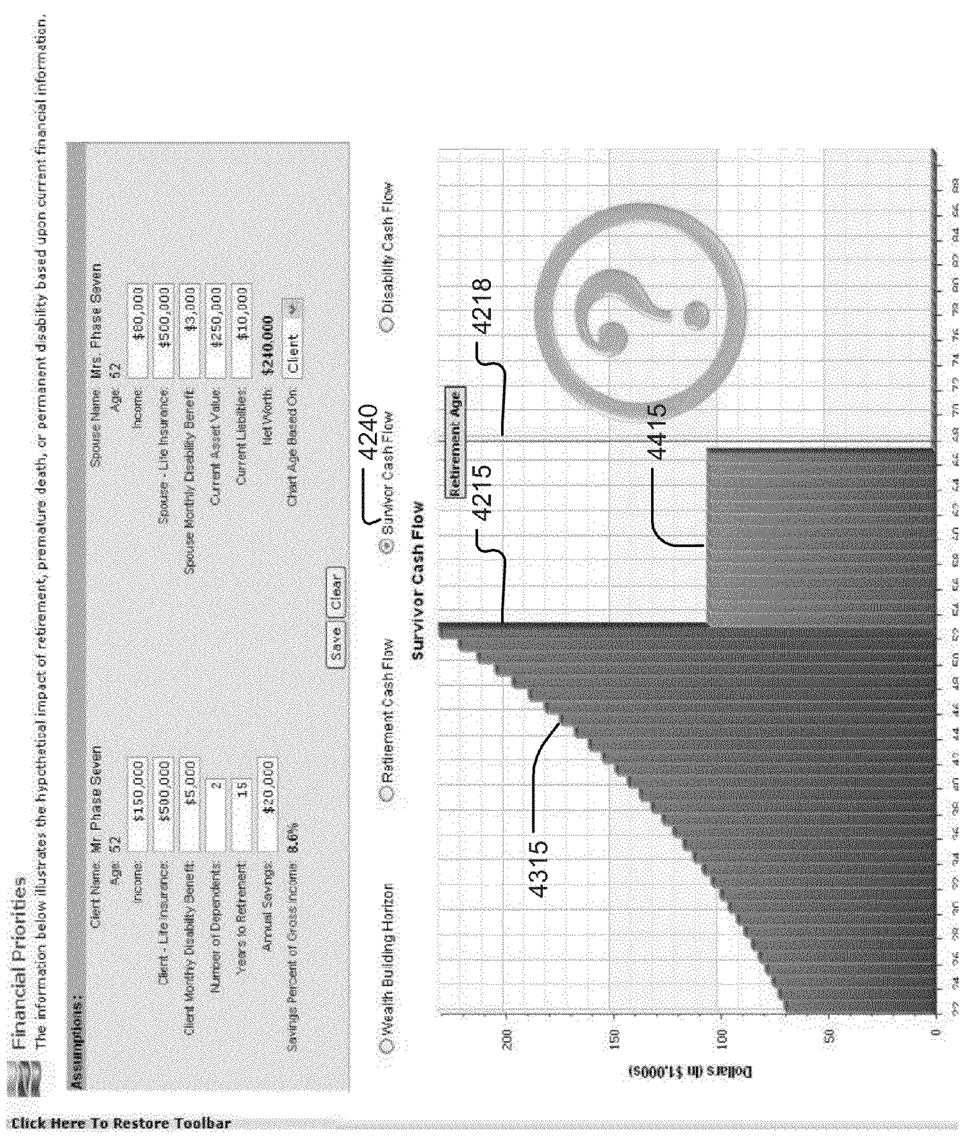

FIG. 44 shows an example of the display page 4400 that may be presented to a user after, e.g., the survivor cash flow portion 4240 has been selected for display. The display page 4400 may include the wealth building horizon line 4215, the retirement cash flow bar graph 4315, the retirement age reference line 4218, and a survivor cash flow graph 4415. The survivor cash flow graph 4415 may represent a post-life event (e.g., premature death) and pre-retirement income of the client (or spouse). The display page 4300 may include a fly-over feature, which may display an age value and a survivor cash flow value for each point where, e.g., a cursor is positioned on the survivor cash flow graph 4415.

Figure 45:
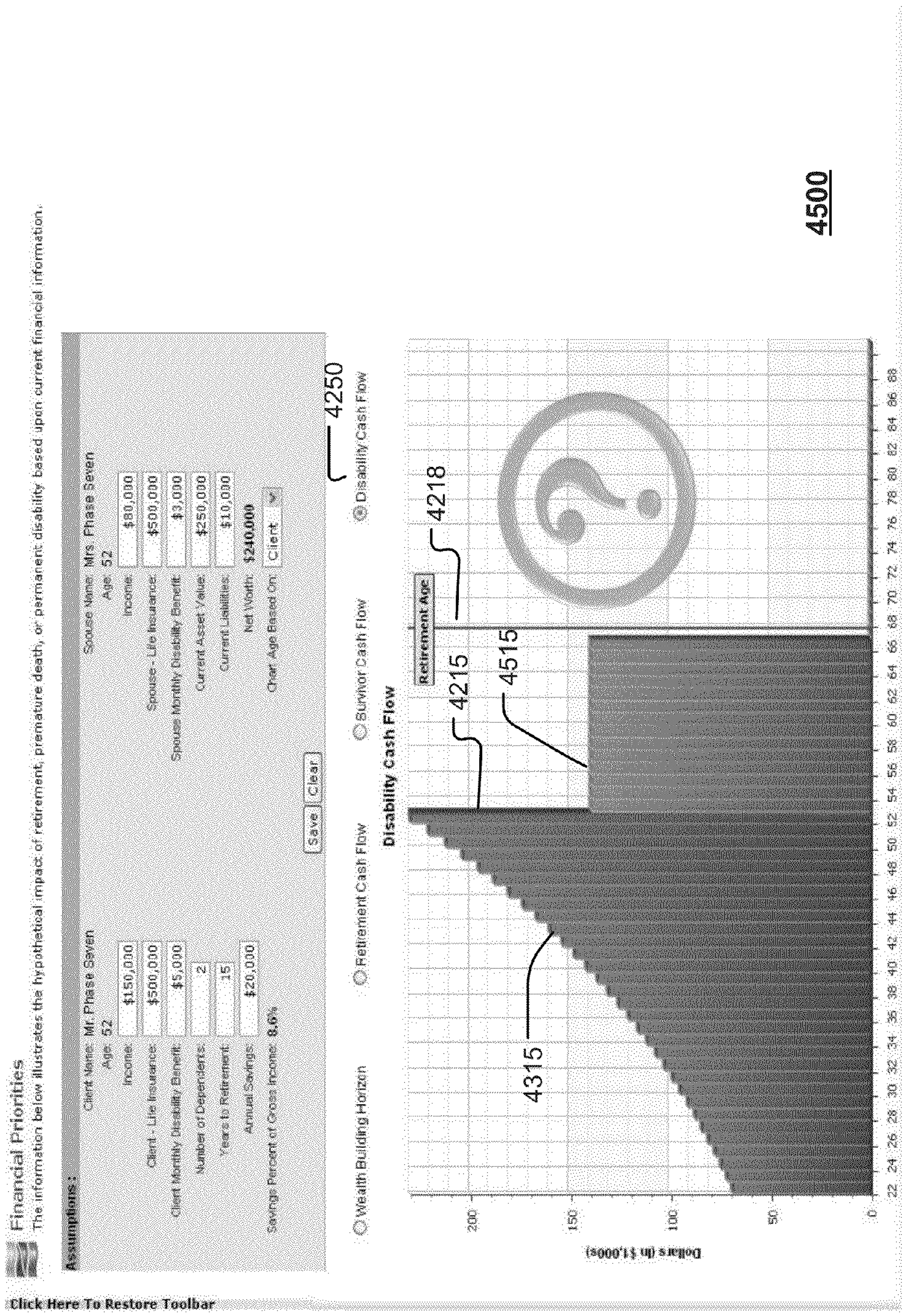

FIG. 45 shows an example of the display page 4500 that may be presented to a user after, e.g., the disability cash flow portion 4250 has been selected for display. The display page 4500 may include the wealth building horizon line 4215, the retirement cash flow bar graph 4315, the retirement age reference line 4218, and a disability cash flow graph 4515. The disability cash flow graph 4515 may represent a post-life event (e.g., permanent disability) and pre-retirement income of the client (or spouse). The display page 4500 may include a fly-over feature, which may display an age value and a disability cash flow value for each point where, e.g., a cursor is positioned on the disability cash flow graph 4515.

Figure 46:
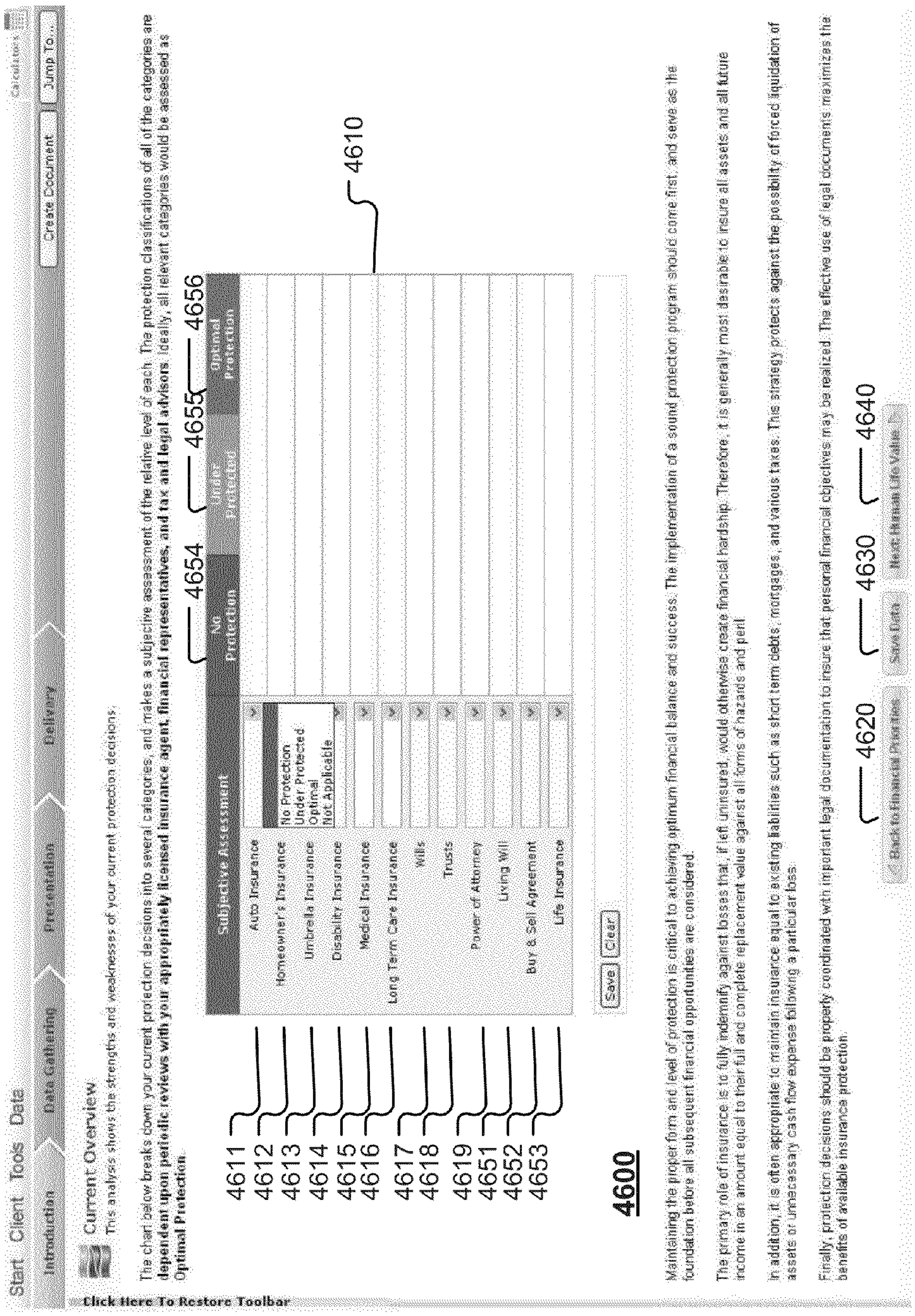
FIGS. 46-47 illustrate various examples of display pages that show aspects of an overview portion of the introduction module, in accordance with one embodiment.
Figure 47:
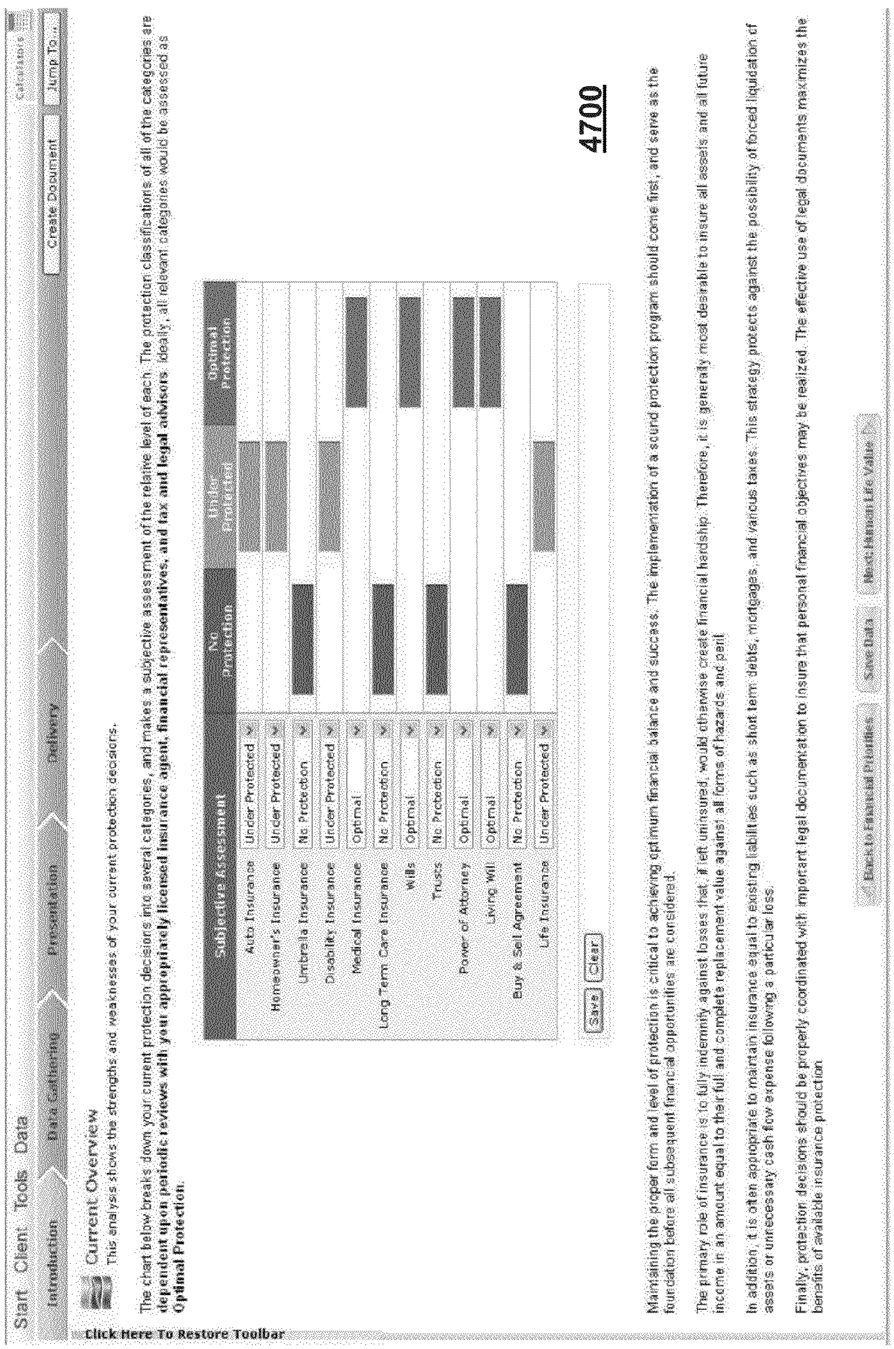

FIGS. 46-47 illustrate examples of display pages 4600-4700 that show aspects of a current overview portion of the introduction module of the workflow wizard tool. The current overview portion of the introduction module presents the strengths and weaknesses of the client's current protection decisions.

Referring to FIG. 46, the current overview portion of the introduction module may begin with the display page 4600, which displays an example of a chart portion 4610. The display page 4600 may include navigation tool bars 4620, 4630, 4640, to facilitate navigation to other tools, interfaces, displays, and the like, including, for example, a "Back to Financial Priorities" interface navigation tool bar 4620, a "Save Data" navigation tool bar 4630, and a "Next: Human Life Value" interface navigation tool bar 4640. The chart portion 4610 may include a plurality of subjective assessment fields 4611-4619 and 4651-4653, including, e.g., an auto insurance field 4611, a homeowner's insurance field 4612, an umbrella insurance field 4613, a disability insurance field 4614, a medical insurance field 4615, a long term care insurance field 4616, a wills field 4617, a trusts field 4618, a power of attorney field 4619, a living will field 4651, a buy and sell agreement field 4652, a life insurance field 4653, and the like. Each field may include, e.g., a drop down menu that may allow a user to select one of a plurality of subjective assessments, including, e.g., "no protection," "under protected," "optimal," and "not applicable." The chart portion 4610 may further include a plurality of columns that may present the subjective assessment for each of the plurality of subjective assessment fields, as seen, e.g., in FIG. 47.

FIG. 47 shows an example of the display page 4700 that may be presented to a user after, e.g., the user has entered a subjective assessment for each of the plurality of subjective assessment fields 4611-4619 and 4651-4653.

FIGS. 48-55 illustrate examples of display pages 4800-5500 that show aspects of a human life value portion of the introduction module. The human life value portion of the introduction module presents a calculator that illustrates a benefit of appropriate life insurance protection.

Figure 48:
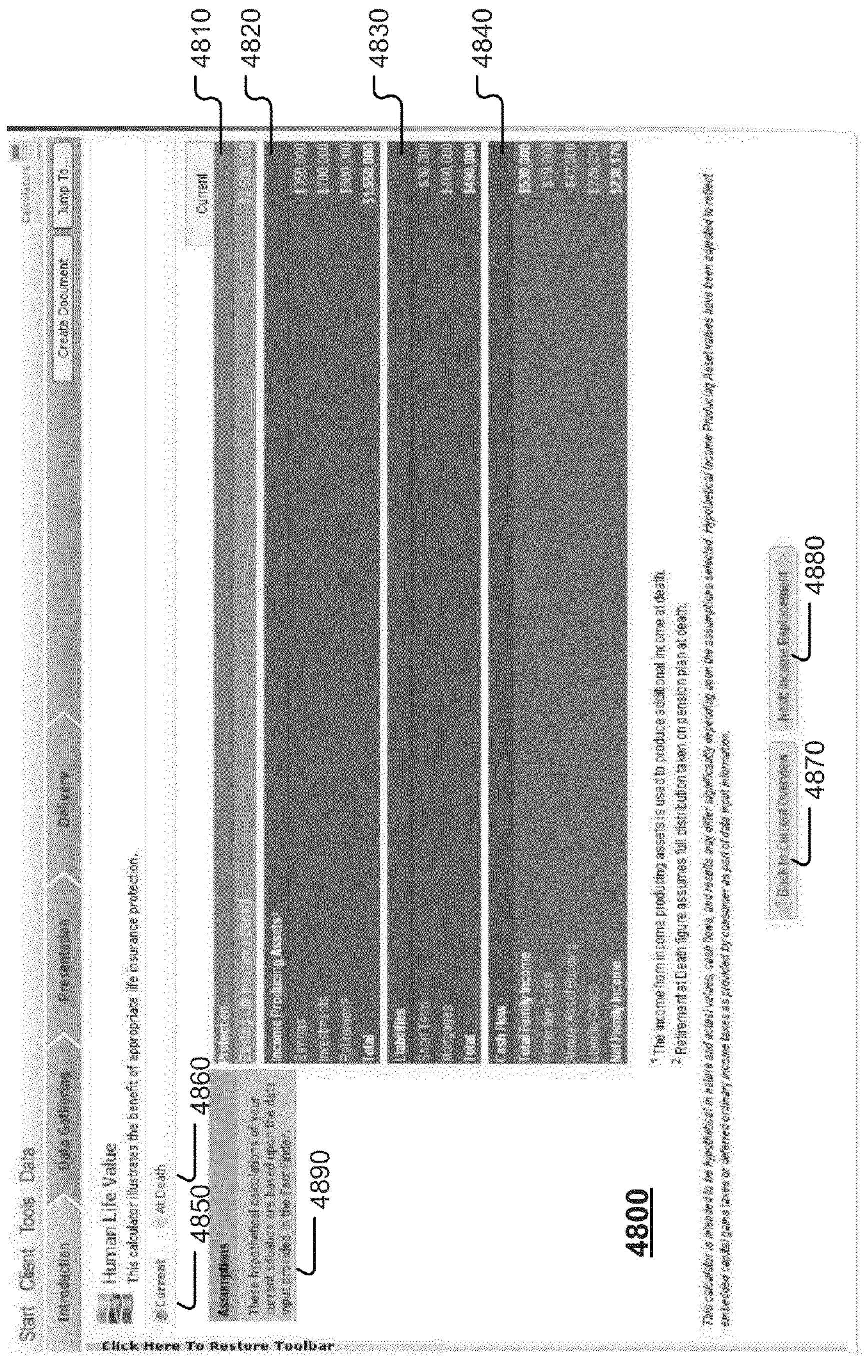
FIG. 48-55 illustrate various examples of display pages that show aspects of a human life value portion of the introduction module, in accordance with one embodiment.

Referring to FIG. 48, the human life value portion of the introduction module may begin with the display page 4800, which displays an example of a current human life value for each of the four interdependent financial domains, including the protection domain 4810, the assets domain 4820, the liabilities domain 4830, and the cash flow domain 4840. The display page 4800 may include a selectable current human life value selector 4850 and a selectable at death human life value selector 4860. The display page 4800 may include navigation tool bars 4870, 4880, to facilitate navigation to other tools, interfaces, displays, and the like, including, for example, a "Back to Current Overview" interface navigation tool bar 4870, and a "Next: Income Replacement" interface navigation tool bar 4880. The display page 4800 may include an assumptions message 4890, which may inform the user that the hypothetical calculations of the user's current situation are based upon the data input provided in the fact finder portion of e.g., a data gathering module.

When the current human life value selector 4850 is selected, the protection domain 4810 may include a current, existing life insurance benefit amount; the assets domain 4820 may include a current savings amount, a current investments amount, a current retirement amount, and a total current income producing assets amount; the liabilities domain 4830 may include a current short term liabilities amount, a current mortgage amount, and a current total liabilities amount; and the cash flow domain 4840 may include a current total family income amount, a current protection costs amount, a current annual asset building amount, a current liability costs amount, and a current net family income amount.

Figure 49:
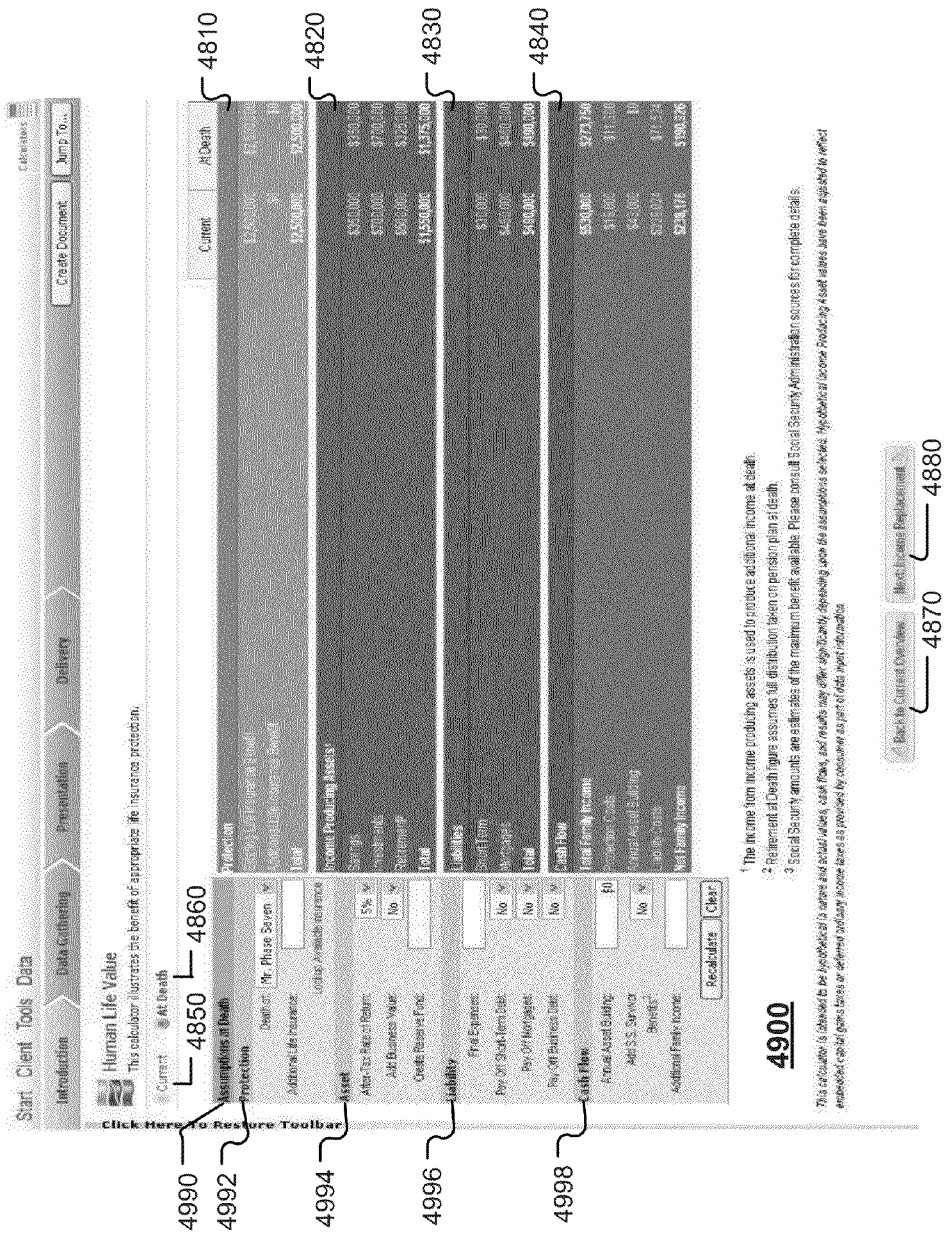

FIG. 49 shows an example of the display page 4900 that may be presented to a user after, e.g., the user has selected the at death human life value selector 4860. The display page 4900 may include the four interdependent financial domains 4810-4840, which may present both current and at death values. For example, the protection domain 4810 may include a current and an at death value for an existing life insurance benefit amount, a current and an at death value for an additional life insurance benefit amount, and a current and an at death value for a total protection amount. The assets domain 4820 may include a current and an at death value for a savings amount, a current and an at death value for an investments amount, a current and an at death value for a retirement amount, and a current and an at death value for a total income producing assets amount. The liabilities domain 4830 may include a current and an at death value for a short term liabilities amount, a current and an at death value for a mortgage amount, and a current and an at death value for a total liabilities amount. The cash flow domain 4840 may include a current and an at death value for a total family income amount, a current and an at death value for a protection costs amount, a current and an at death value for an annual asset building amount, a current and an at death value for a liability costs amount, and a current and an at death value for a net family income amount.

The display page 4900 may include an assumptions at death portion 4990, which may include a listing of assumptions for the client (or spouse), including, e.g., protection assumptions 4992, asset assumptions 4994, liability assumptions 4996, and cash flow assumptions 4998. The assumptions at death portion 4990 may include, e.g., the assumption fields shown in FIG. 49, which may be completed by the user. The four interdependent financial domains 4810-4840 of the display page 4900 may include both current and at death values for Mr. Phase Seven based on the particular values shown to be entered in the assumption fields of the assumptions at death portion 4990 of the display page 4900.

Figure 50:
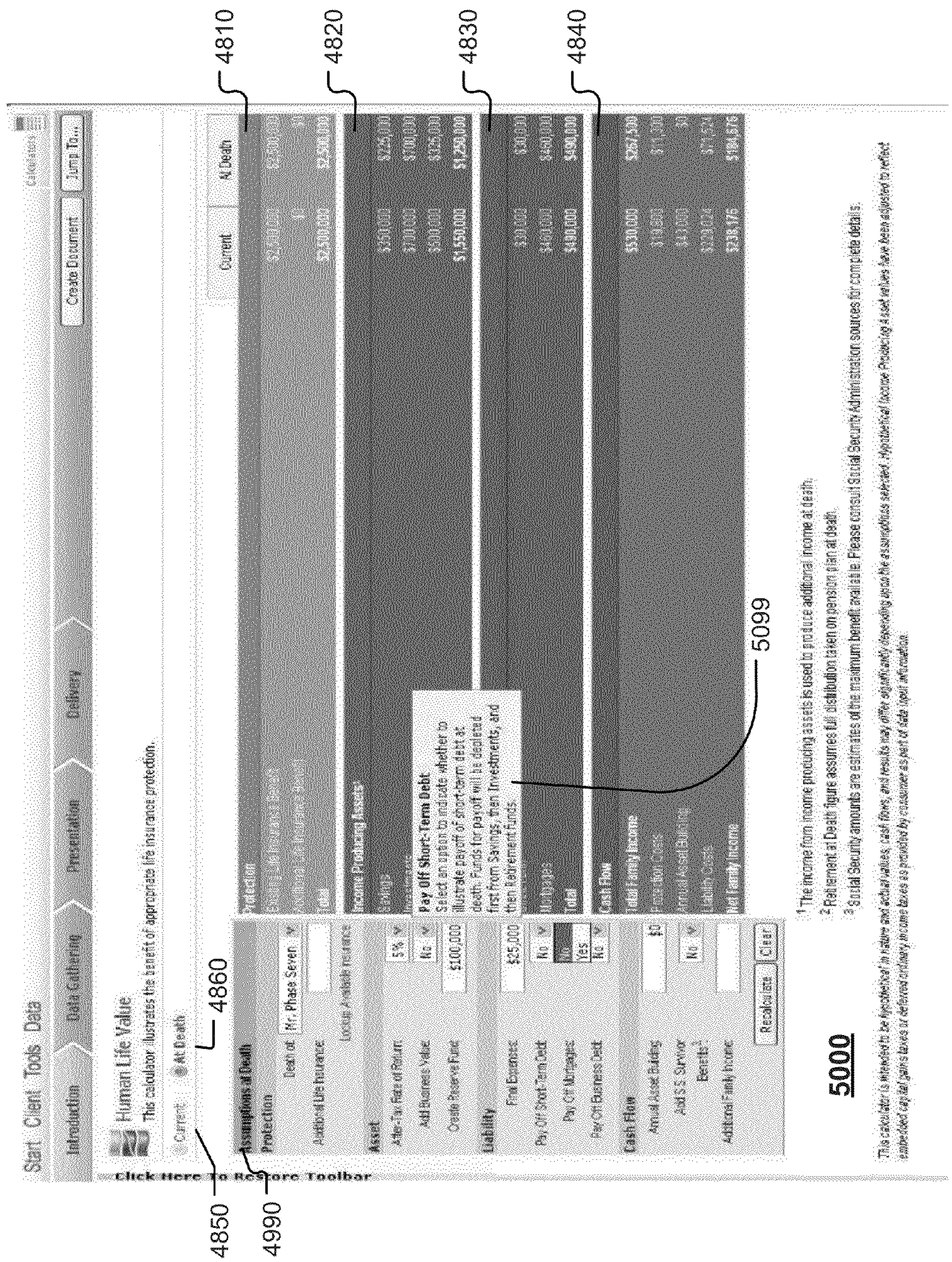

FIG. 50 shows an example of the display page 5000 that may be presented to a user after, e.g., the user has selected the at death human life value selector 4860 and completed certain of the assumption fields of the assumptions at death portion 4990. In the example shown in FIG. 50, the user has entered a final expense amount of, e.g., $25,000 and is in the process of electing to pay off (YES) or not to pay off (NO) short-term debt. A message portion 5099 may be presented to inform the user that an option may be selected to pay off short-term debt at death. The message portion 5099 may inform the user that, by electing to pay off (or not to pay off) the short-term debt at death, funds for payoff will be depleted first from saving, then from investments, and then from retirement funds. The four interdependent financial domains 4810-4840 of the display page 5000 may include both current and at death values for Mr. Phase Seven based on the particular values shown to be entered in the assumption fields of the assumptions at death portion 4990 of the display page 5000.

Figure 51:
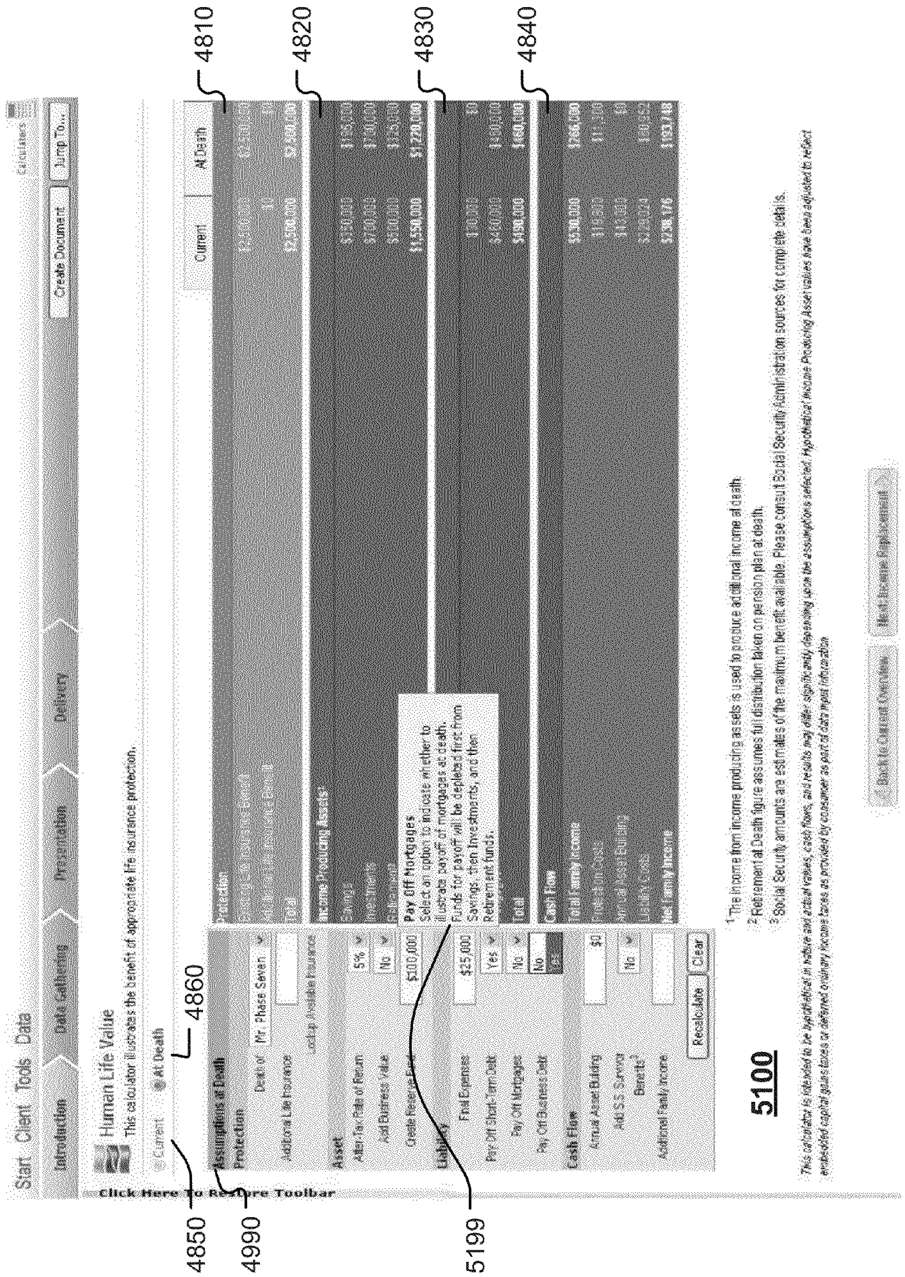

FIG. 51 shows an example of the display page 5100 that may be presented to a user after, e.g., the user has selected the at death human life value selector 4860 and completed certain of the assumption fields of the assumptions at death portion 4990. In the example shown in FIG. 51, the user has entered a final expense amount of, e.g., $25,000 and is in the process of electing to pay off (YES) or not to pay off (NO) mortgages. A message portion 5199 may be presented to inform the user that an option may be selected to pay off (or not to payoff) the mortgages at death. The message portion 5199 may inform the user that, by electing to pay off the mortgages at death, funds for payoff will be depleted first from saving, then from investments, and then from retirement funds. The four interdependent financial domains 4810-4840 of the display page 5100 may include both current and at death values for Mr. Phase Seven based on the particular values shown to be entered in the assumption fields of the assumptions at death portion 4990 of the display page 5100.

Figure 52:
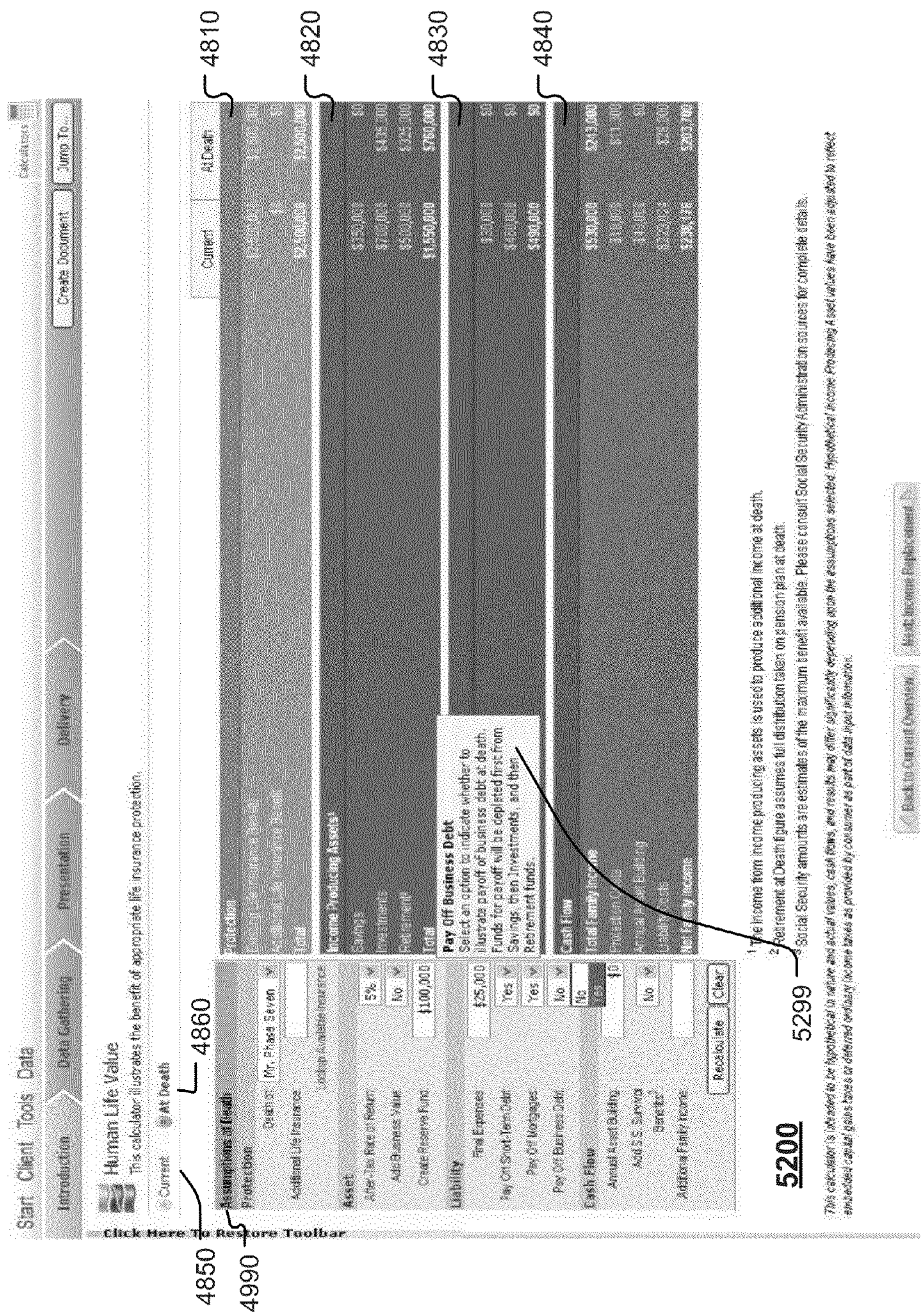

FIG. 52 shows an example of the display page 5200 that may be presented to a user after, e.g., the user has selected the at death human life value selector 4860 and completed certain of the assumption fields of the assumptions at death portion 4990. In the example shown in FIG. 52, the user has entered a final expense amount of, e.g., $25,000 and is in the process of electing to pay off (YES) or not to pay off (NO) business debt. A message portion 5299 may be presented to inform the user that an option may be selected to pay off (or not to payoff) the business debt at death. The message portion 5299 may inform the user that, by electing to pay off the business debt at death, funds for payoff will be depleted first from saving, then from investments, and then from retirement funds. The four interdependent financial domains 4810-4840 of the display page 5200 may include both current and at death values for Mr. Phase Seven based on the particular values shown to be entered in the assumption fields of the assumptions at death portion 4990 of the display page 5200.

Figure 53:
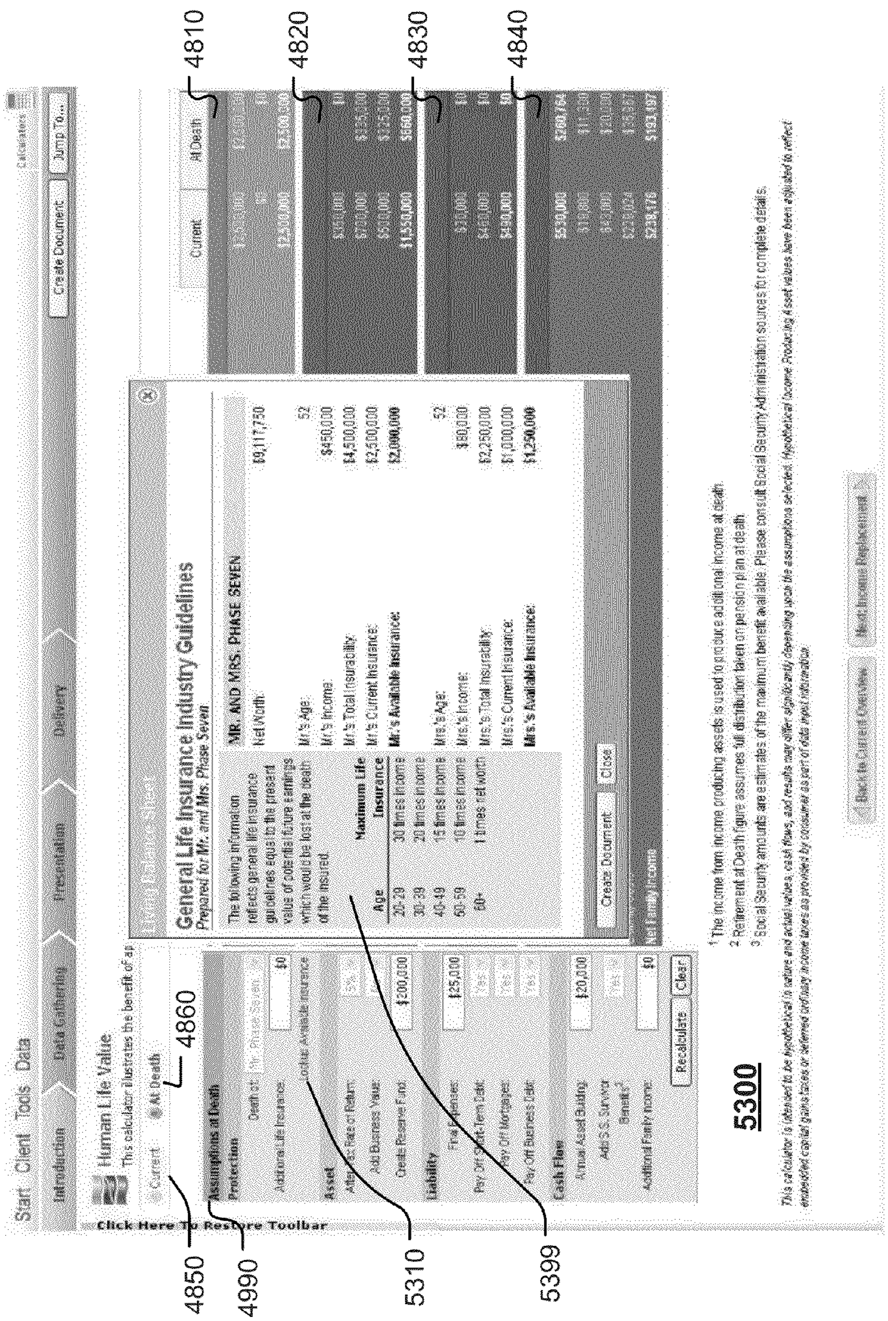

FIG. 53 shows an example of the display page 5300 that may be presented to a user after, e.g., the user has selected the at death human life value selector 4860 and completed certain of the assumption fields of the assumptions at death portion 4990. In the example shown in FIG. 53, the user has entered an additional life insurance amount of, e.g., $0 and is in the process of looking up available insurance. A general life insurance industry guidelines message portion 5399 may be presented to the user after the user selects, e.g., by clicking, double-clicking, or the like, a hyperlink 5310 provided on the display page 5300. The hyperlink 5310 may have the legend, "Lookup Available Insurance," as seen in FIG. 53. The message portion 5399 may include a listing of ages, maximum life insurance, and financial information for the client and the client's spouse, as shown in FIG. 53. The four interdependent financial domains 4810-4840 of the display page 5300 may include both current and at death values for Mr. Phase Seven based on the particular values shown to be entered in the assumption fields of the assumptions at death portion 4990 of the display page 5300.

Figure 54:
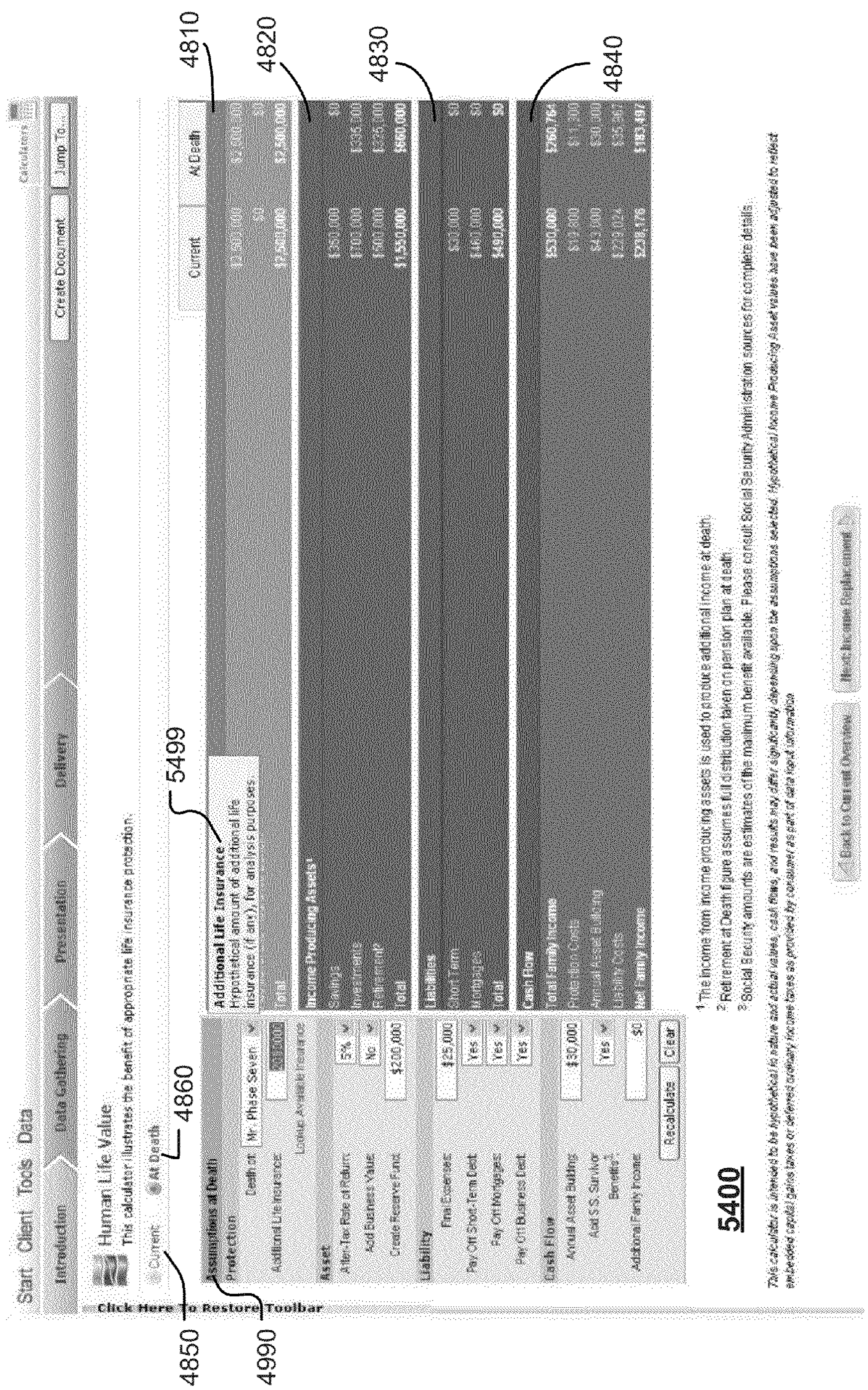

FIG. 54 shows an example of the display page 5400 that may be presented to a user after, e.g., the user has selected the at death human life value selector 4860 and completed certain of the assumption fields of the assumptions at death portion 4990. In the example shown in FIG. 54, the user has entered an additional life insurance amount of, e.g., $2,000,000. An additional life insurance message portion 5499 may be presented to the user as (or after) the user selects the respective field and begins to enter an additional life insurance amount. The message portion 5499 may inform the user that the entered amount is a hypothetical amount of additional life insurance (if any), for analysis purposes. The four interdependent financial domains 4810-4840 of the display page 5400 may include both current and at death values for Mr. Phase Seven based on the particular values shown to be entered in the assumption fields of the assumptions at death portion 4990 of the display page 5400.

Figure 55:
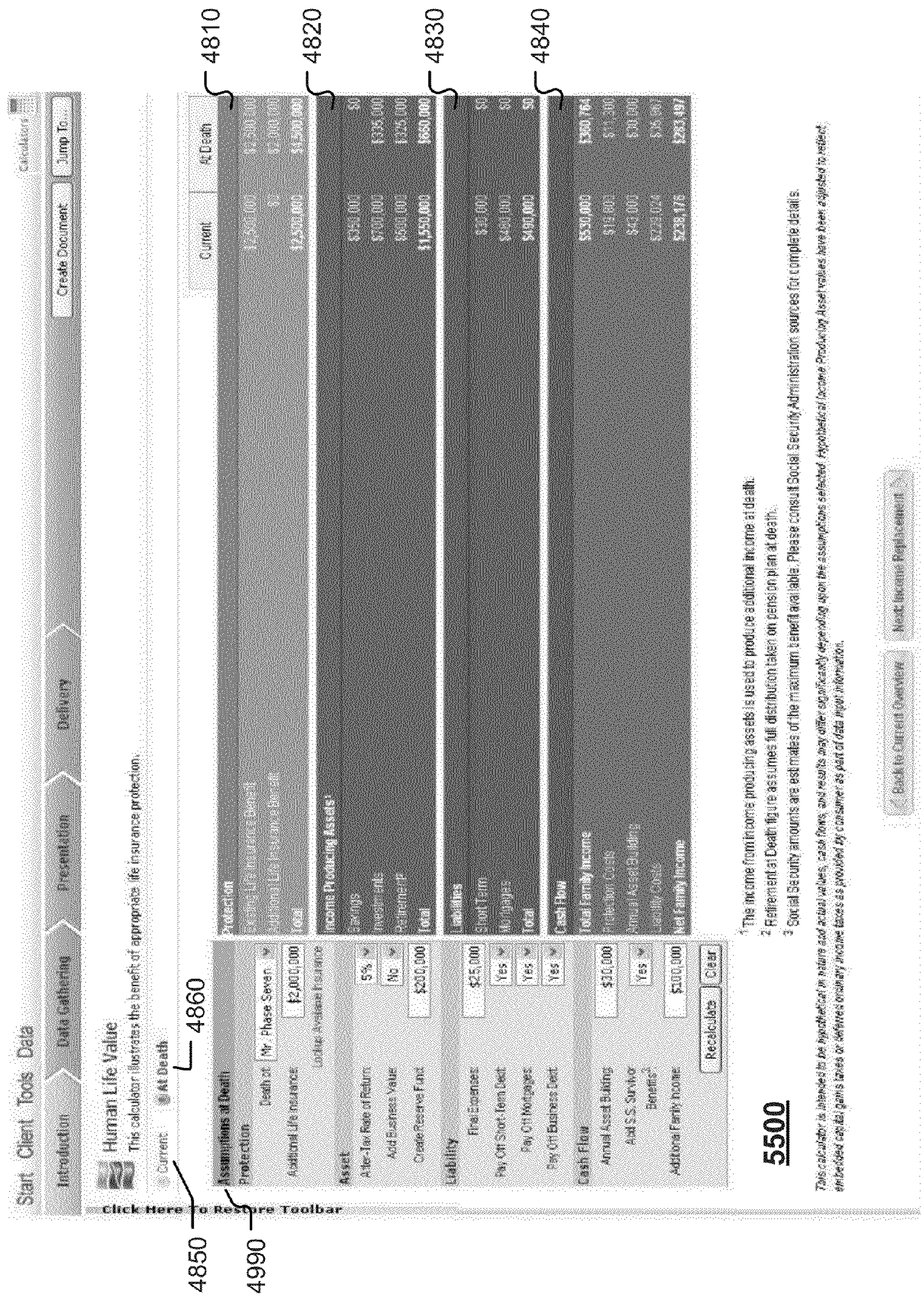

FIG. 55 shows an example of the display page 5500 that may be presented to a user after, e.g., the user has selected the at death human life value selector 4860 and completed all of the assumption fields of the assumptions at death portion 4990. The four interdependent financial domains 4810-4840 of the display page 5500 may include both current and at death values for Mr. Phase Seven based on the particular values shown to be entered in the assumption fields of the assumptions at death portion 4990 of the display page 5500.

FIGS. 56-60 illustrate examples of display pages 5600-6000 that show aspects of an income replacement portion of the introduction module of the workflow wizard tool. The income replacement portion of the introduction module presents a calculator that illustrates a benefit of appropriate disability insurance protection.

Figure 56:
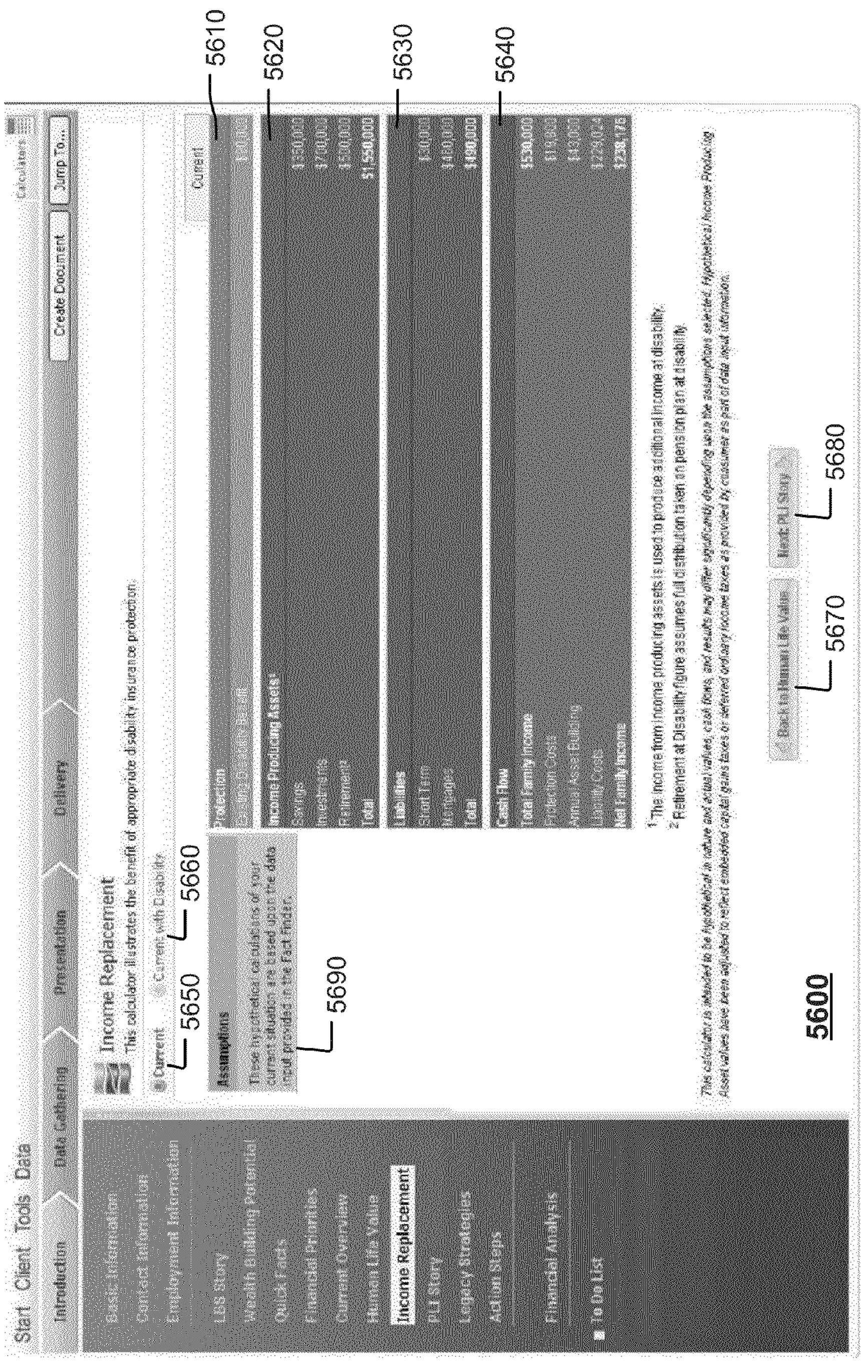
FIGS. 56-60 illustrate various examples of display pages that show aspects of an income replacement portion of the introduction module, in accordance with one embodiment.

Referring to FIG. 56, the income replacement portion of the introduction module of the workflow wizard tool may begin with the display page 5600, which displays an example of a current income replacement for each of the four interdependent financial domains, including the protection domain 5610, the assets domain 5620, the liabilities domain 5630, and the cash flow domain 5640. The display page 5600 may include a selectable current income replacement selector 5650 and a selectable current with disability selector 5660. The display page 5600 may include navigation tool bars 5670, 5680, to facilitate navigation to other tools, interfaces, displays, and the like, including, for example, a "Back to Human Life Value" interface navigation tool bar 5670, and a "Next: PLI Story" interface navigation tool bar 5680. The display page 5600 may include an assumptions message 5690, which may inform the user that the hypothetical calculations of the user's current situation are based upon the data input provided in the fact finder portion of, e.g., a data gathering module.

When the current income replacement selector 5650 is selected, the protection domain 5610 may include a current, existing disability benefit amount; the assets domain 5620 may include a current savings amount, a current investments amount, a current retirement amount, and a total current income producing assets amount; the liabilities domain 5630 may include a current short term liabilities amount, a current mortgage amount, and a current total liabilities amount; and the cash flow domain 5640 may include a current total family income amount, a current protection costs amount, a current annual asset building amount, a current liability costs amount, and a current net family income amount.

Figure 57:
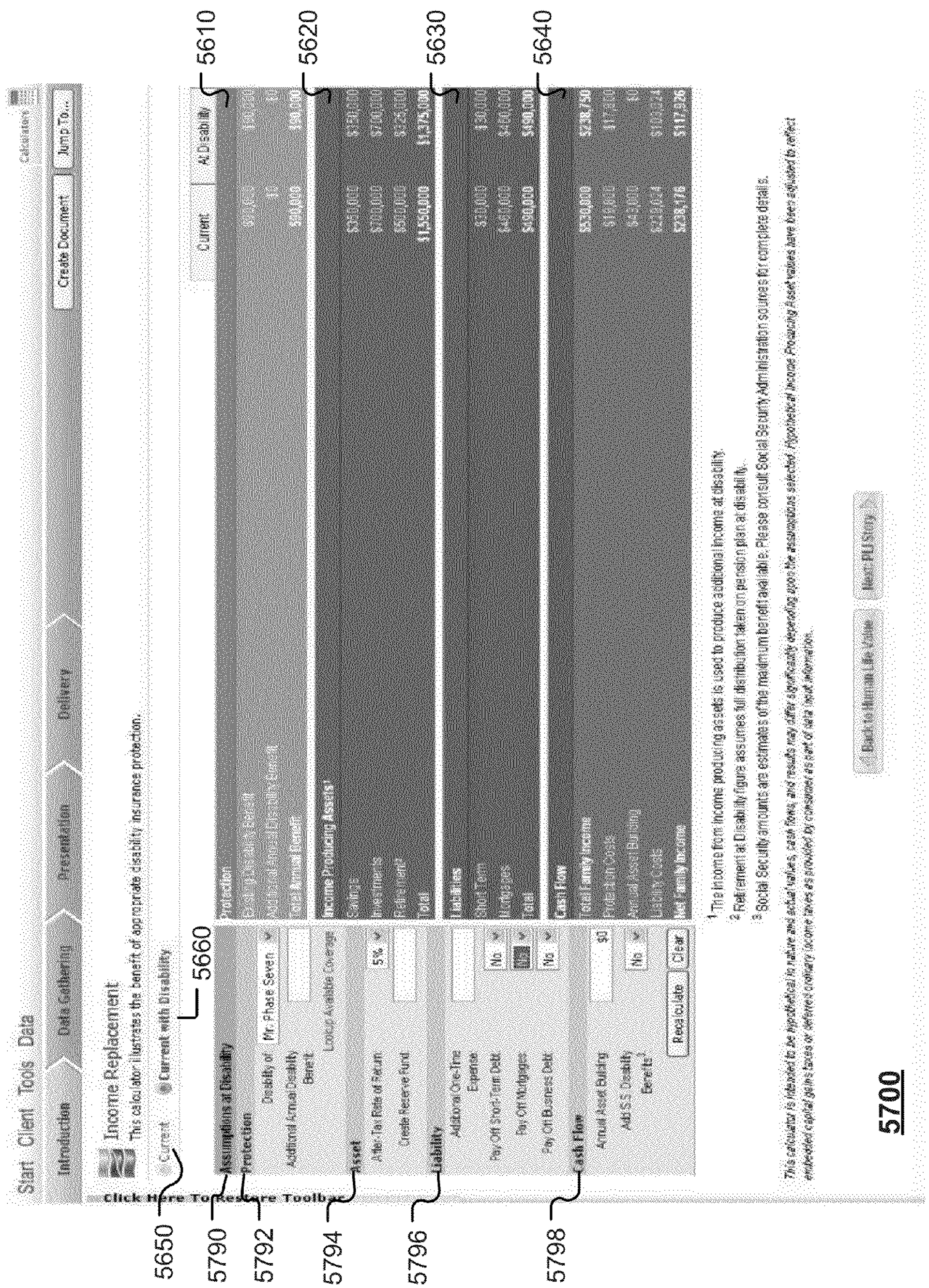

FIG. 57 shows an example of the display page 5700 that may be presented to a user after, e.g., the user has selected the current with disability selector 5660. The display page 5700 may include the four interdependent financial domains 5610-5640, which may present both current and at disability values. For example, the protection domain 5610 may include a current and an at disability value for an existing disability benefit amount, a current and an at disability value for an additional annual disability benefit amount, and a current and an at disability value for a total protection amount. The assets domain 5620 may include a current and an at disability value for a savings amount, a current and an at disability value for an investments amount, a current and an at disability value for a retirement amount, and a current and an at disability value for a total income producing assets amount. The liabilities domain 5630 may include a current and an at disability value for a short term liabilities amount, a current and an at disability value for a mortgage amount, and a current and an at disability value for a total liabilities amount. The cash flow domain 5640 may include a current and an at disability value for a total family income amount, a current and an at disability value for a protection costs amount, a current and an at disability value for an annual asset building amount, a current and an at disability value for a liability costs amount, and a current and an at disability value for a net family income amount.

The display page 5700 may include an assumptions at disability portion 5790, which may include a listing of assumptions for the client (or spouse), including, e.g., protection assumptions 5792, asset assumptions 5794, liability assumptions 5796, and cash flow assumptions 5798. The assumptions at disability portion 5790 may include, e.g., the assumption fields shown in FIG. 57, which may be completed by the user. The four interdependent financial domains 5610-5640 of the display page 5700 may include both current and at disability values for Mr. Phase Seven based on the particular values shown to be entered in the assumption fields of the assumptions at disability portion 5790 of the display page 5700.

Figure 58:
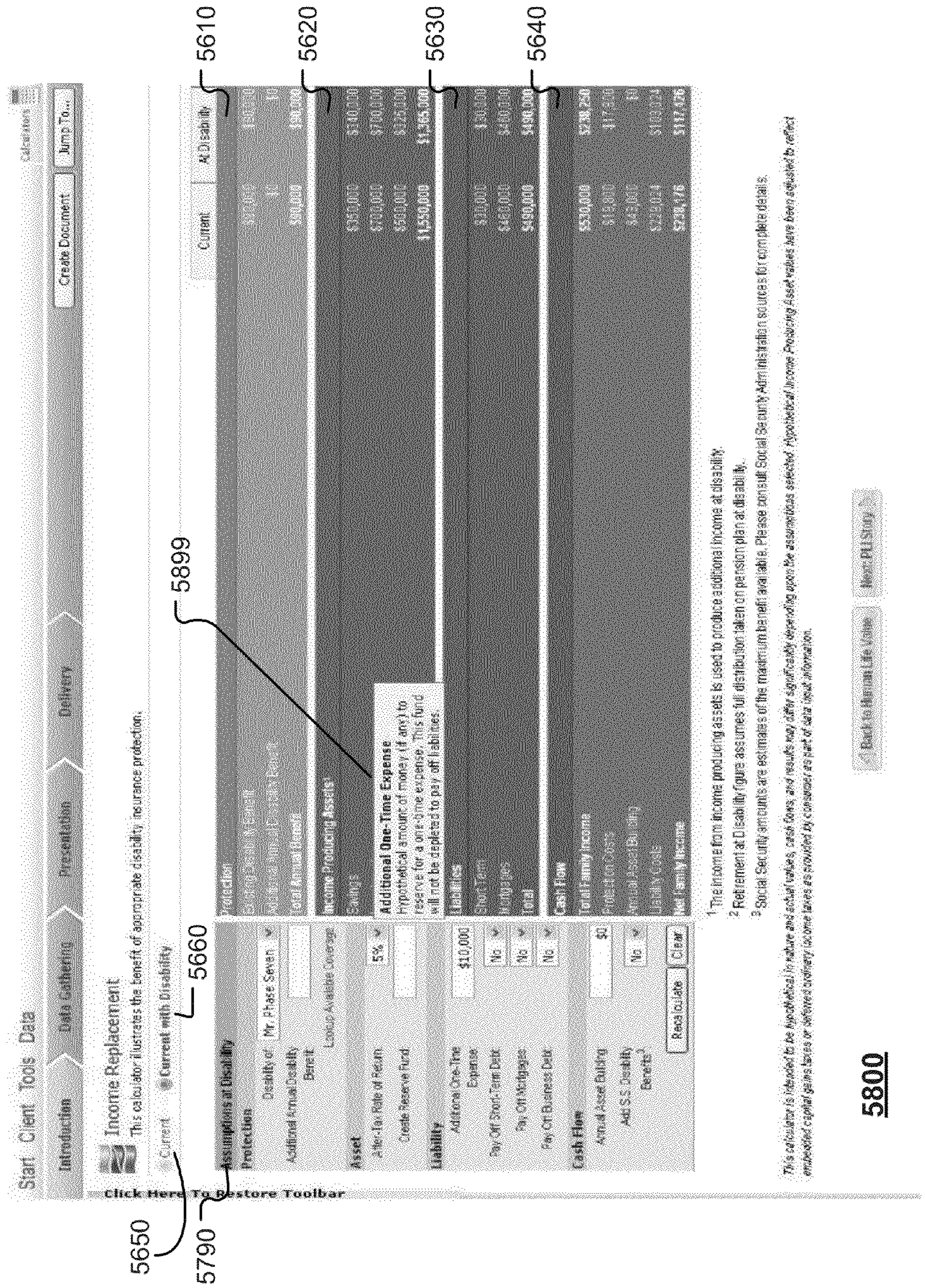

FIG. 58 shows an example of the display page 5800 that may be presented to a user after, e.g., the user has selected the current with disability selector 5660 and completed certain of the assumption fields of the assumptions at death portion 5790. In the example shown in FIG. 58, the user has entered a hypothetical additional one-time amount of, e.g., $10,000. A message portion 5899 may be presented to inform the user that of an additional one-time expense for a hypothetical amount of money (if any) and that this fund will not be depleted to pay off liabilities. The four interdependent financial domains 5610-5640 of the display page 5800 may include both current and at disability values for Mr. Phase Seven based on the particular values shown to be entered in the assumption fields of the assumptions at disability portion 5790 of the display page 5800.

Figure 59:
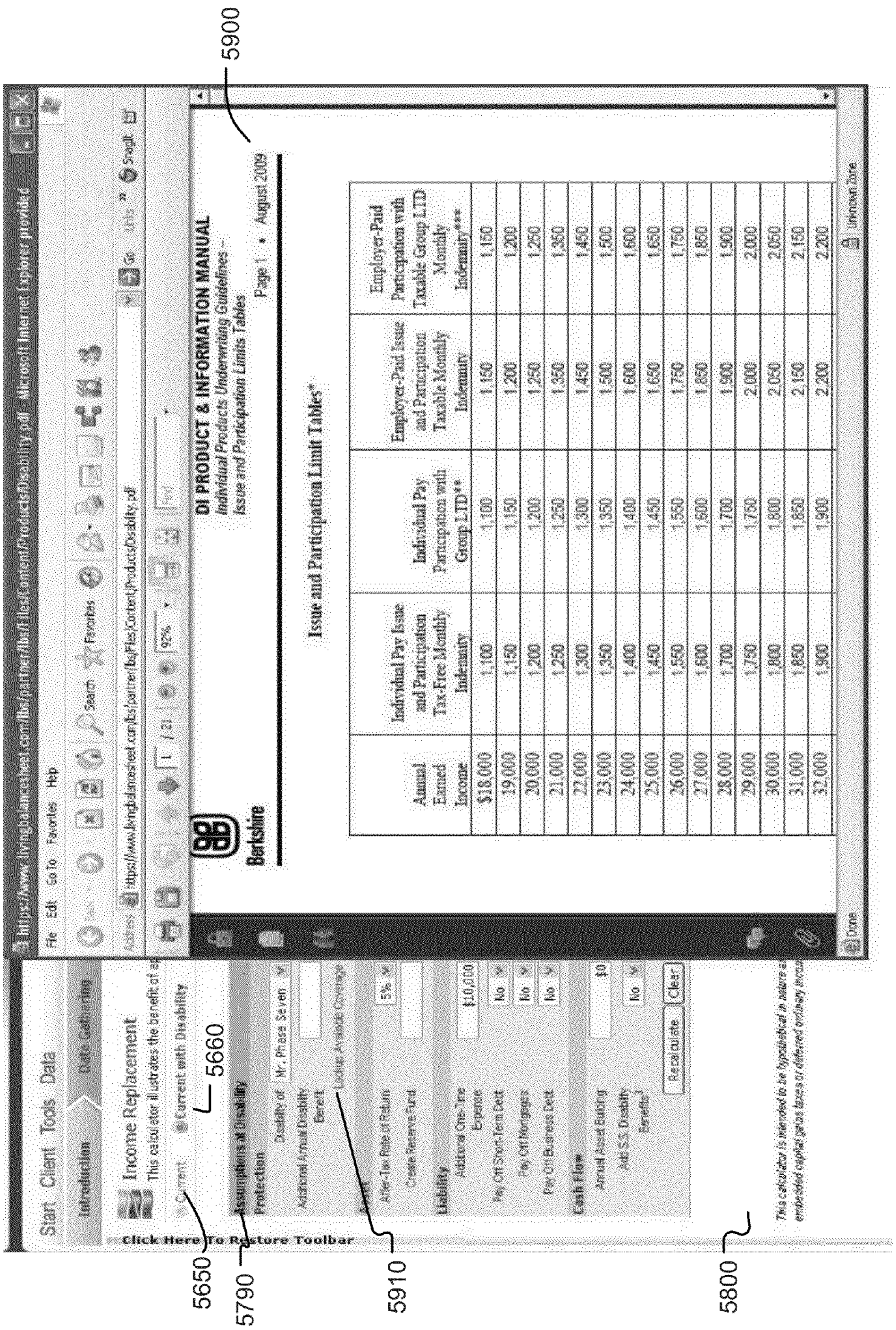

FIG. 59 shows an example of the display pages 5800 and 5900 that may be presented to a user after, e.g., the user has selected the current with disability selector 5660 and completed certain of the assumption fields of the assumptions at disability portion 5790. In the example shown in FIG. 59, the user has selected a hyperlink 5910 provided on the display page 5800, which has caused the display page 5900 to be displayed as a separate window. The hyperlink 5910 may have the legends, "Lookup Available Coverage," as seen in FIG. 59. The display page 5900 may include an issue and participation limit tables from, e.g., a disability insurance (DI) product and information manual.

Figure 60:
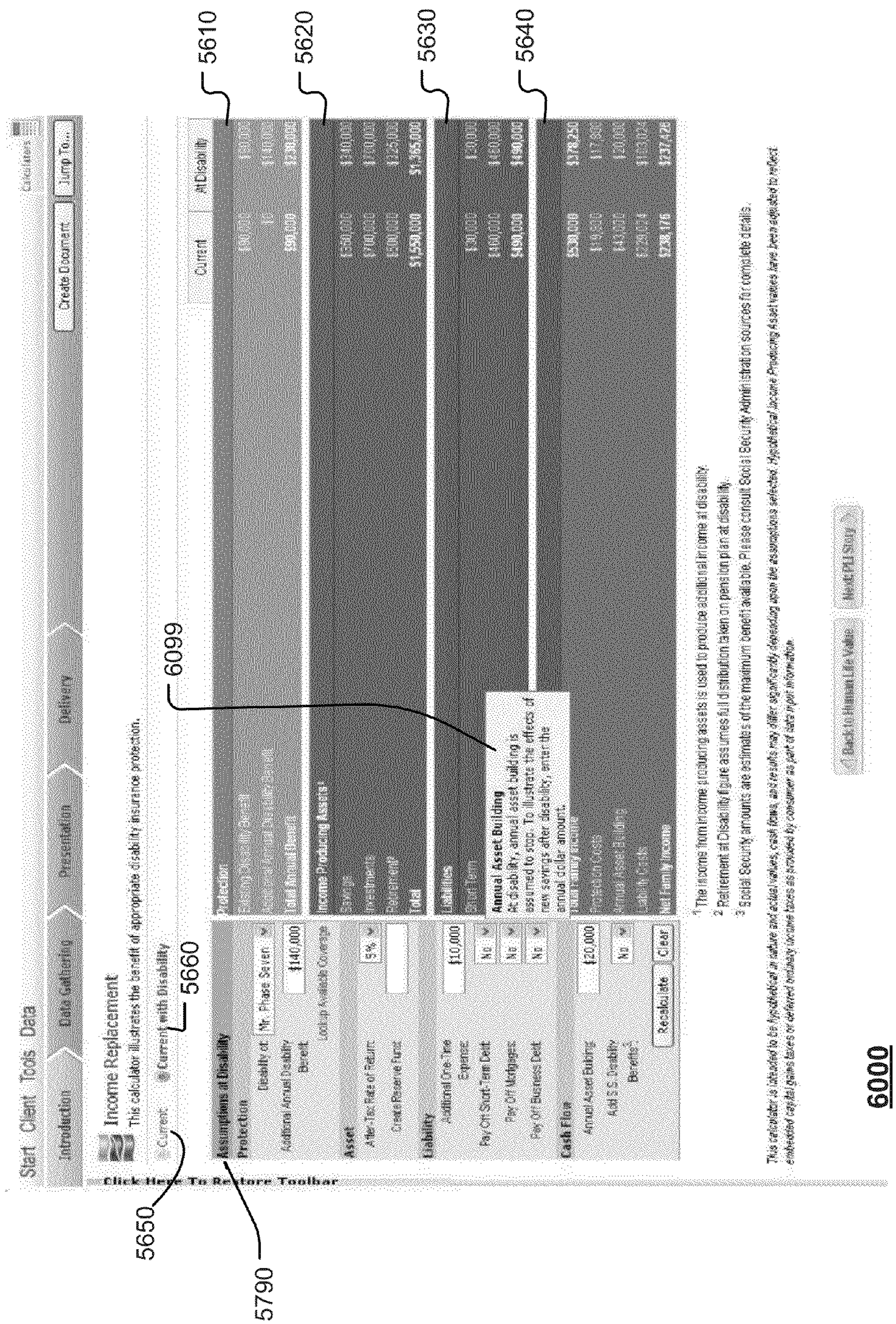

FIG. 60 shows an example of the display page 6000 that may be presented to a user after, e.g., the user has selected the current with disability selector 5660 and completed certain of the assumption fields of the assumptions at disability portion 5790. In the example shown in FIG. 60, the user has entered an additional annual disability benefit amount of, e.g., $140,000, and the user is in the process (or has entered) an annual asset building amount of, e.g., $20,000. An annual asset building message portion 6099 may be presented to the user as (or after) the user selects the respective field and begins to enter the annual asset building amount. The message portion 6099 may inform the user that, at disability, annual asset building is assumed to stop, and to illustrate the effects of new savings after disability, the user will need to enter the annual dollar amount. The four interdependent financial domains 5610-5640 of the display page 6000 include both current and at disability values for Mr. Phase Seven based on the particular values shown to be entered in the assumption fields of the assumptions at disability portion 5790 of the display page 6000.

FIGS. 61-70 illustrate examples of display pages 6100-7000 that show aspects of a personal liability insurance (PLI) story portion of the introduction module of the workflow wizard tool. The PLI story portion of the introduction module of the workflow wizard tool presents information that compares the benefits and primary features of various financial alternatives.

Figure 61:
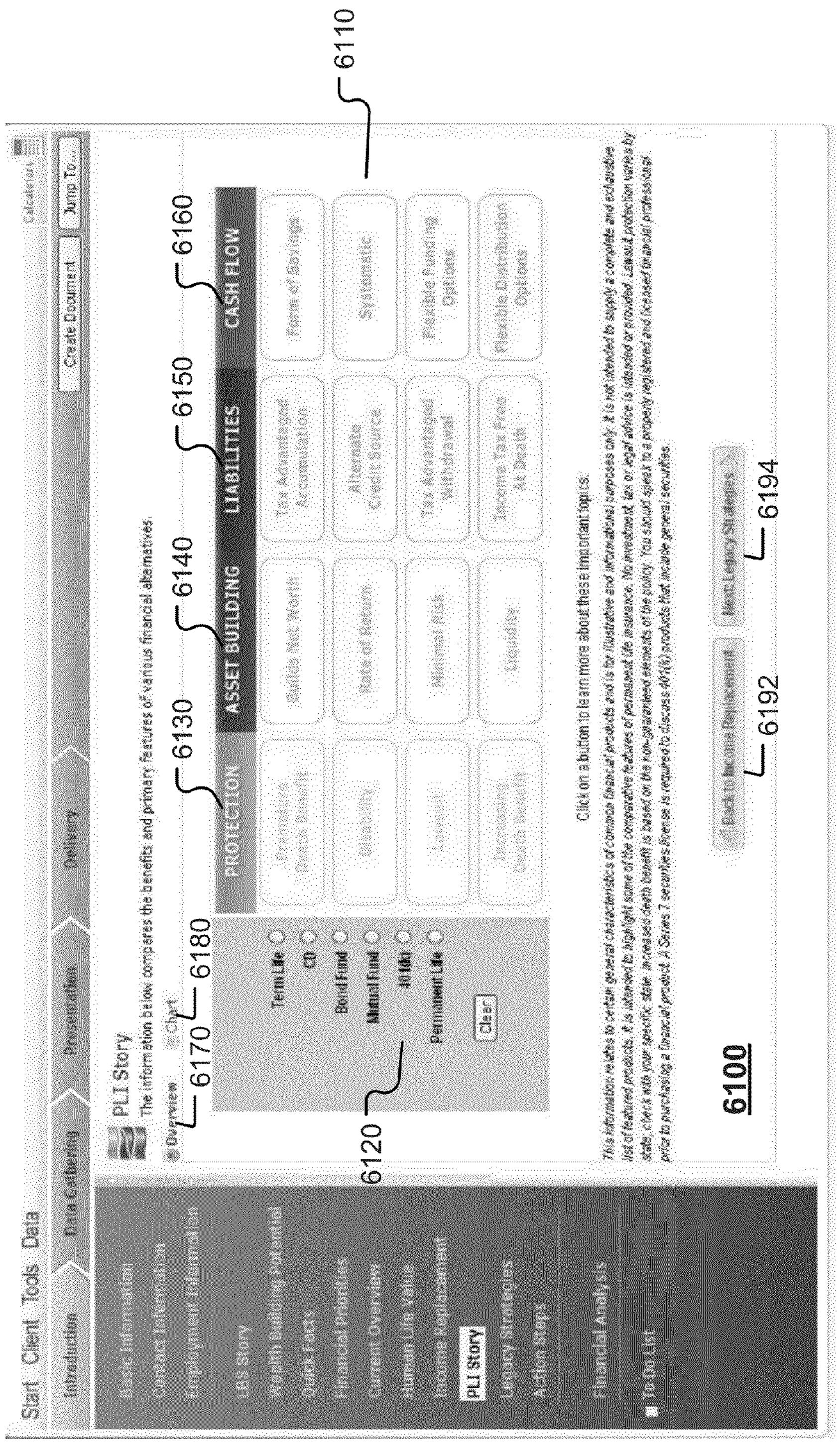
FIGS. 61-70 illustrate various examples of display pages that show aspects of a personal liability insurance (PLI) portion of the introduction module, in accordance with one embodiment.

Referring to FIG. 61, the PLI story portion of the introduction module of the workflow wizard tool may begin with the display page 6100, which displays an example of an overview of the benefits and primary features 6110 of various financial alternatives 6120 for each of the four interdependent financial domains, including the protection domain 6130, the asset domain 6140, the liabilities domain 6150, and the cash flow domain 6160. The display page 6100 may include a selectable overview selector 6170 and a selectable chart selector 6180. The display page 6100 may include navigation tool bars 6192, 6194, to facilitate navigation to other tools, interfaces, displays, and the like, including, for example, a "Back to Income Replacement" interface navigation tool bar 6192, and a "Next: Legacy Strategies" interface navigation tool bar 6194. The various financial alternatives 6120 may include, e.g., term life insurance, a certificate of deposit (CD), a bond fund, a mutual fund, a 401(k), permanent life insurance, and the like. The benefits and primary features 6110 may include, e.g., premature death benefit, disability, lawsuit, increasing death benefit, builds net worth, rate of return, minimal risk, liquidity, tax advantaged accumulation, alternate credit source, tax advantaged withdrawal, income tax free at death, form of savings, systematic, flexible funding options, flexible distribution options, and the like. The plurality of benefits and primary features 6110 may be displayed in one or more columns of each of the four interdependent domains 6130-6160. The various financial alternatives 6120 may each be displayed with a selector (e.g., a radio button), which a user may select to view the associated benefits and primary features 6110.

Figure 62:
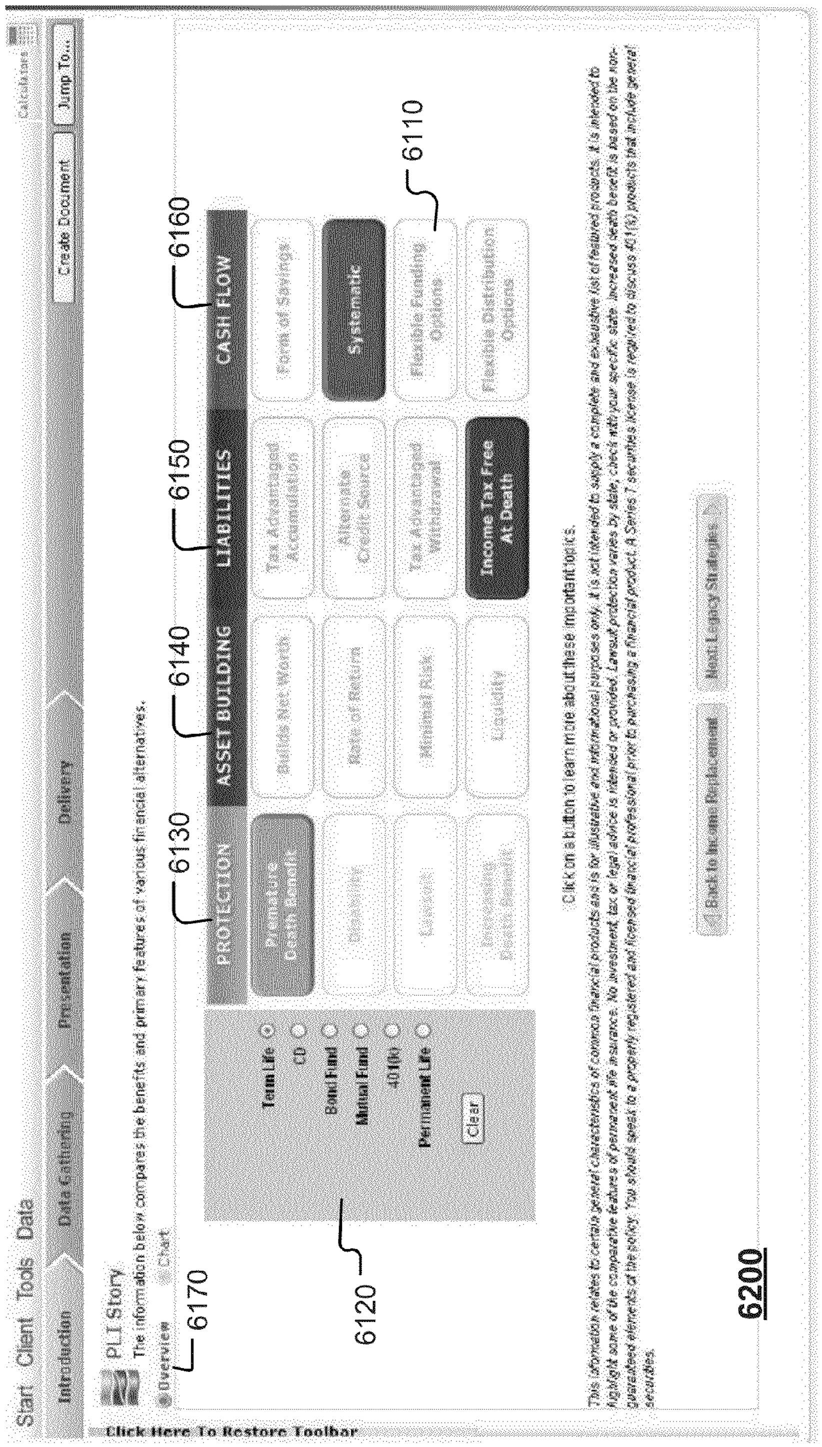

FIG. 62 shows an example of the display page 6200 that may be presented to a user after, e.g., the user has selected the overview selector 6170 and a term life selector from the various financial alternatives 6120. In response to the user's selections, the display page 6200 may present three benefits and primary features 6110 that may be associated with term life, including, e.g., premature death benefit, income tax free at death, and systematic, which are associated with the protection domain 6130, the liabilities domain 6150, and the cash flow domain 6160, respectively.

Figure 63:
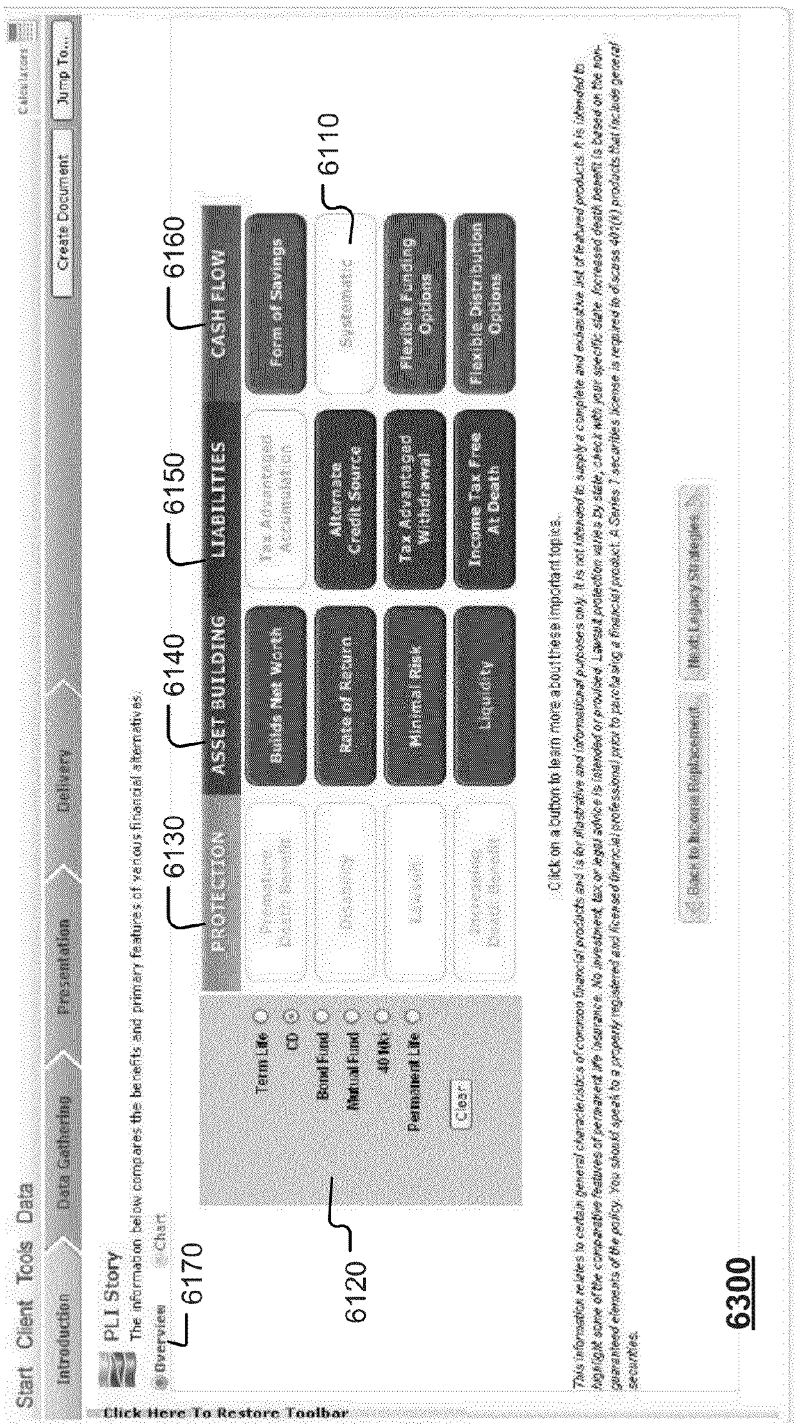

FIG. 63 shows an example of the display page 6300 that may be presented to a user after, e.g., the user has selected the overview selector 6170 and a CD selector from the various financial alternatives 6120. In response to the user's selections, the display page 6300 may present ten different benefits and primary features 6110 that may be associated with a CD, including, e.g., builds net worth, rate of return, minimal risk, liquidity, alternate credit source, tax advantaged withdrawal, income tax free at death, form of savings, flexible funding options, and flexible distribution options. The ten benefits and primary features 6110 that are associated with a CD may be arranged as shown in FIG. 63, with regard to the asset (or asset building) domain 6140, the liabilities domain 6150, and the cash flow domain 6160.

Figure 64:
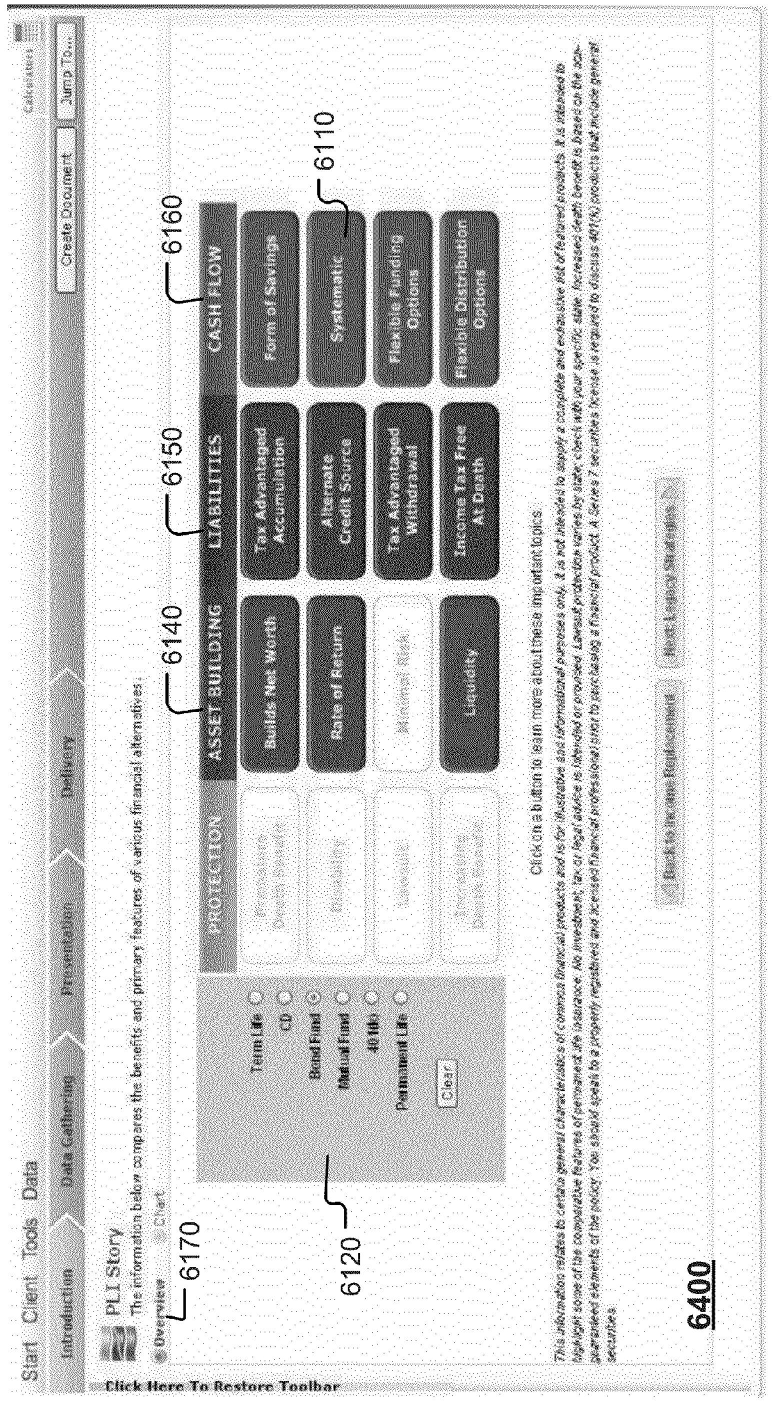

FIG. 64 shows an example of the display page 6400 that may be presented to a user after, e.g., the user has selected the overview selector 6170 and a bond fund selector from the various financial alternatives 6120. In response to the user's selections, the display page 6400 may present eleven different benefits and primary features 6110 that may be associated with a bond fund, including, e.g., builds net worth, rate of return, liquidity, tax advantaged accumulation, alternate credit source, tax advantaged withdrawal, income tax free at death, form of savings, systematic, flexible funding options, and flexible distribution options. The eleven benefits and primary features 6110 that are associated with a bond fund may be arranged as shown in FIG. 64, with regard to the asset (building) domain 6140, the liabilities domain 6150, and the cash flow domain 6160.

Figure 65:
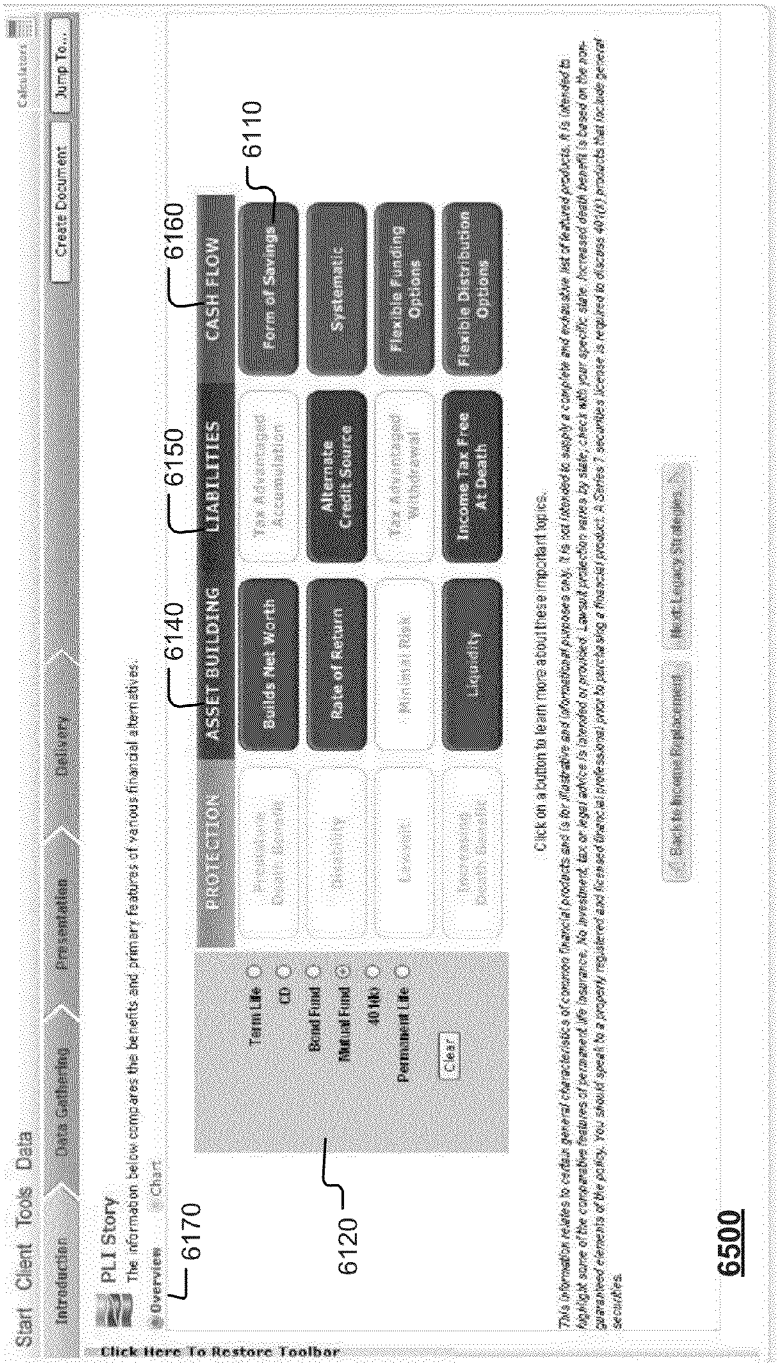

FIG. 65 shows an example of the display page 6500 that may be presented to a user after, e.g., the user has selected the overview selector 6170 and a mutual fund selector from the various financial alternatives 6120. In response to the user's selections, the display page 6500 may present nine different benefits and primary features 6110 that may be associated with a mutual fund, including, e.g., builds net worth, rate of return, liquidity, alternate credit source, income tax free at death, form of savings, systematic, flexible funding options, and flexible distribution options. The nine benefits and primary features 6110 that are associated with a mutual fund may be arranged as shown in FIG. 65, with regard to the asset (building) domain 6140, the liabilities domain 6150, and the cash flow domain 6160.

Figure 66:
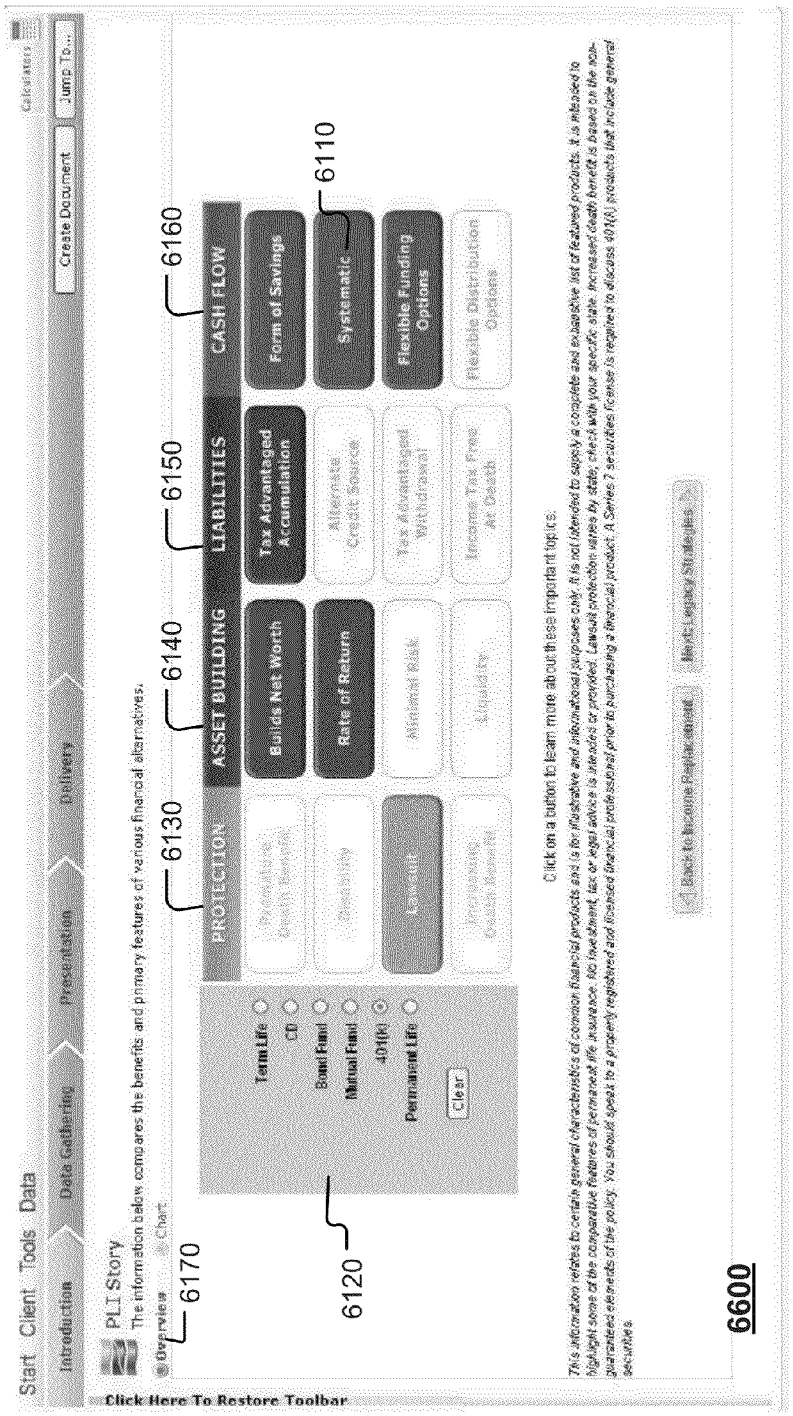

FIG. 66 shows an example of the display page 6600 that may be presented to a user after, e.g., the user has selected the overview selector 6170 and a 401(k) selector from the various financial alternatives 6120. In response to the user's selections, the display page 6600 may present seven different benefits and primary features 6110 that may be associated with a 401(k), including, e.g., lawsuit, builds net worth, rate of return, tax advantaged accumulation, income, form of savings, systematic, and flexible funding options. The seven benefits and primary features 6110 that are associated with a 401(k) may be arranged as shown in FIG. 66, with regard to the protection domain 6130, the asset (building) domain 6140, the liabilities domain 6150, and the cash flow domain 6160.

Figure 67:
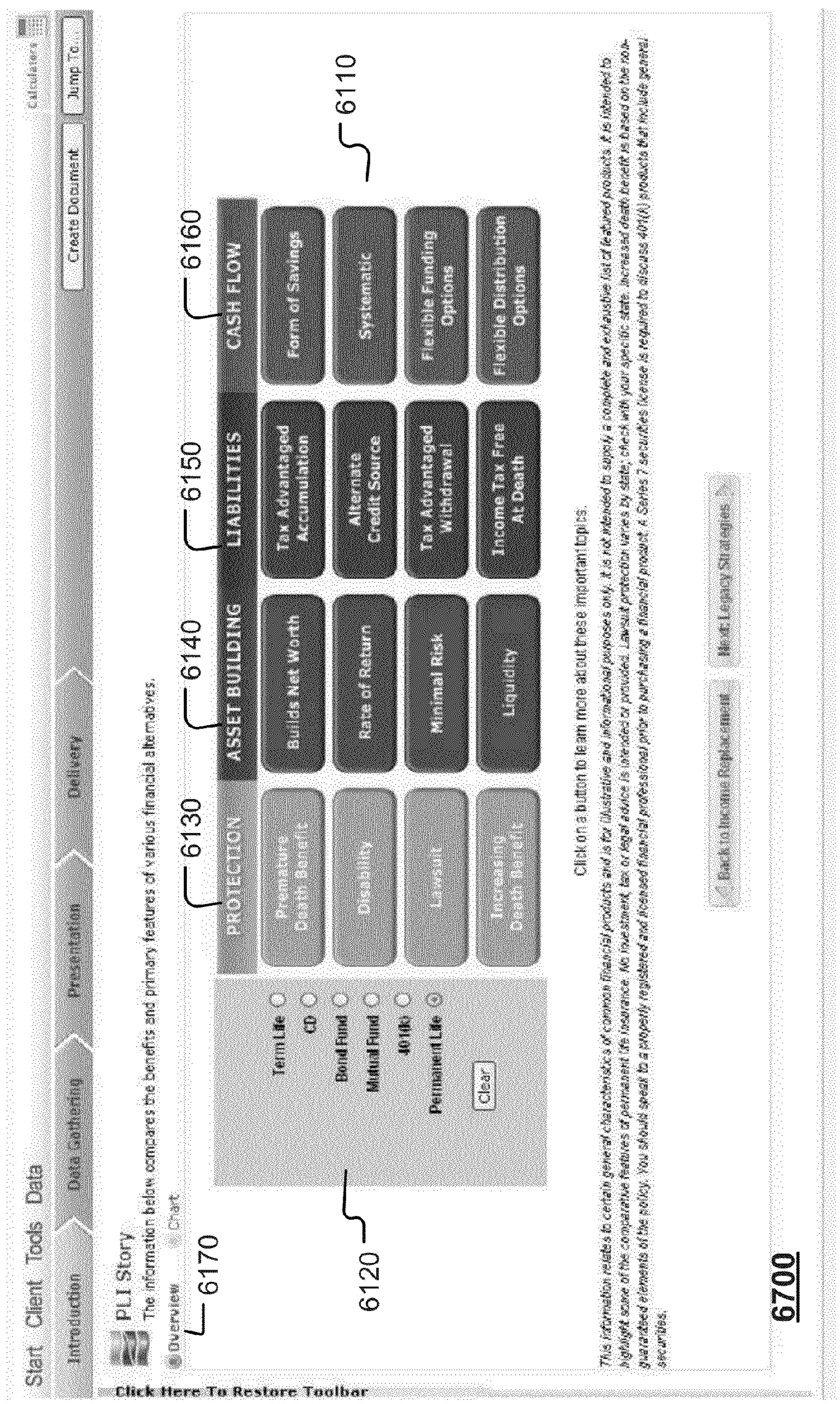

FIG. 67 shows an example of the display page 6700 that may be presented to a user after, e.g., the user has selected the overview selector 6170 and a permanent life selector from the various financial alternatives 6120. In response to the user's selections, the display page 6700 may present sixteen different benefits and primary features 6110 that may be associated with permanent life insurance, including, e.g., premature death benefit, disability, lawsuit, increasing death benefit, builds net worth, rate of return, minimal risk, liquidity, tax advantaged accumulation, alternate credit source, tax advantaged withdrawal, income tax free at death, form of savings, systematic, flexible funding options, and flexible distribution options. The sixteen benefits and primary features 6110 that are associated with permanent life insurance may be arranged as shown in FIG. 67, with regard to the protection domain 6130, the asset (or asset building) domain 6140, the liabilities domain 6150, and the cash flow domain 6160.

Figure 68:
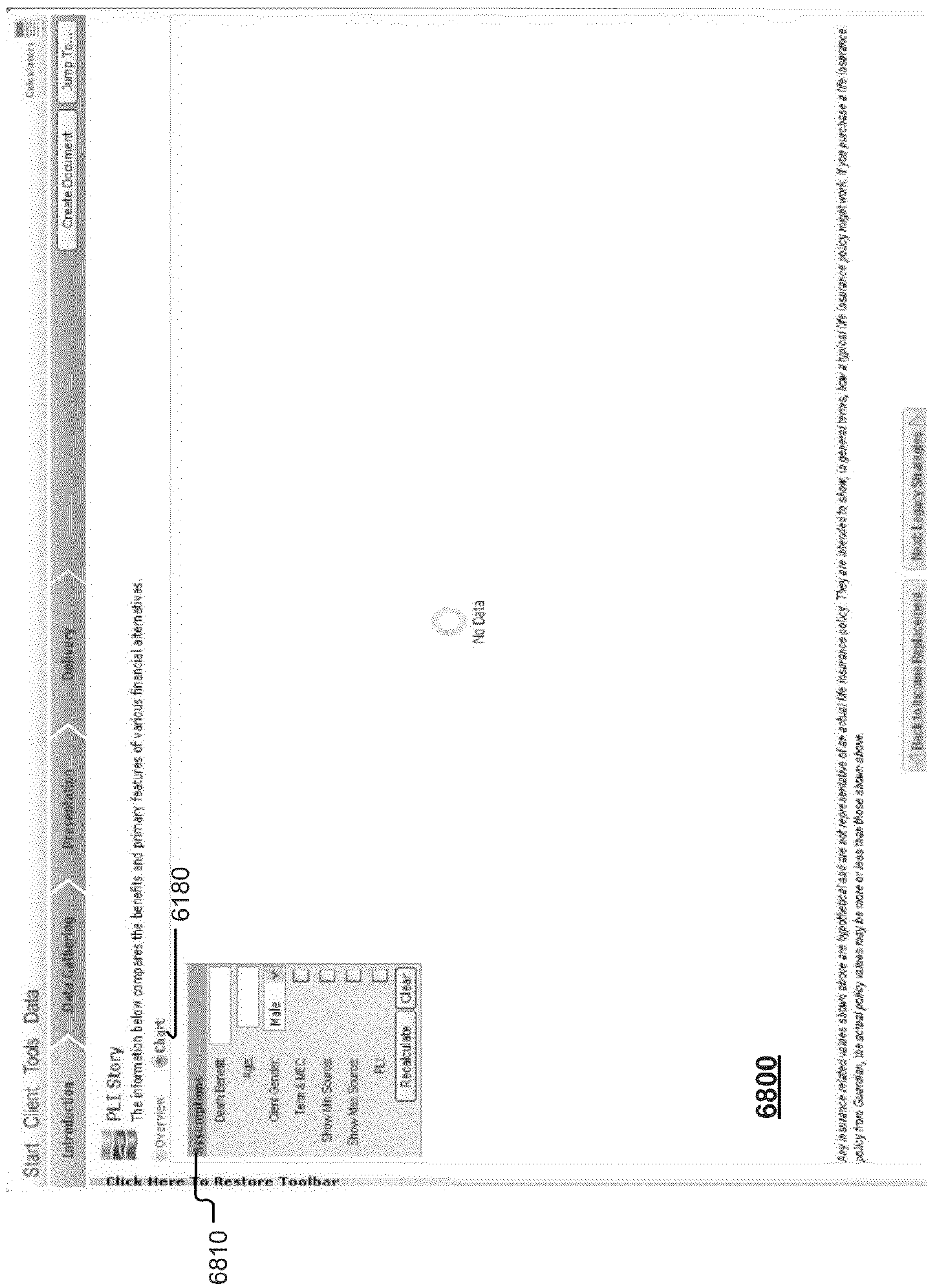

FIG. 68 shows an example of the display page 6800 that may be presented to a user after, e.g., the user has selected the chart selector 6180. In this example, the display page 6800 includes an assumptions portion 6810, which may include data entry fields for the information identified in FIG. 68.

Figure 69:
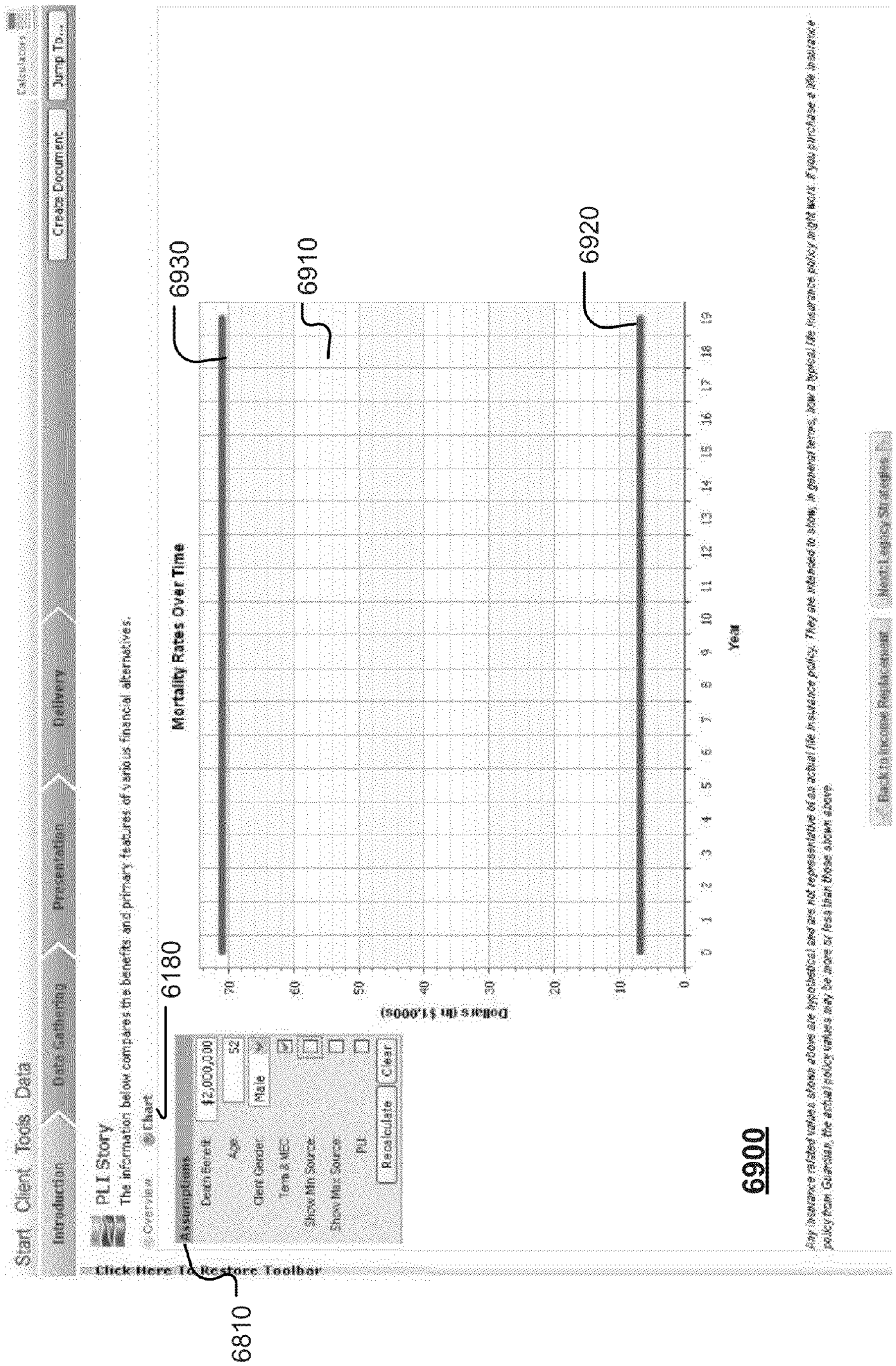

FIG. 69 shows an example of the display page 6900 that may be presented to a user after, e.g., the user has selected the chart selector 6180 and completed certain of the fields in the assumptions portion 6810. In response to the user's selection of the chart selector 6180 and completion of a death benefit filed, an age field, and selection of a term and MEC field, the display page 6900 may present, e.g., a chart 6910 that shows mortality rates over time. The ordinate axis of the chart 6910 may include, e.g., Dollars (in $1,000s). The abscissa of the chart 6910 may include years. The chart 6910 may include a minimum funding limit (term) graph 6920 and a maximum funding limit (MEC) graph 6930. In the example shown in FIG. 69, the minimum funding limit graph 6920 may have a constant value of, e.g., $6,760, and the maximum funding limit graph 6930 may have a constant value of, e.g., $71,000.

Figure 70:
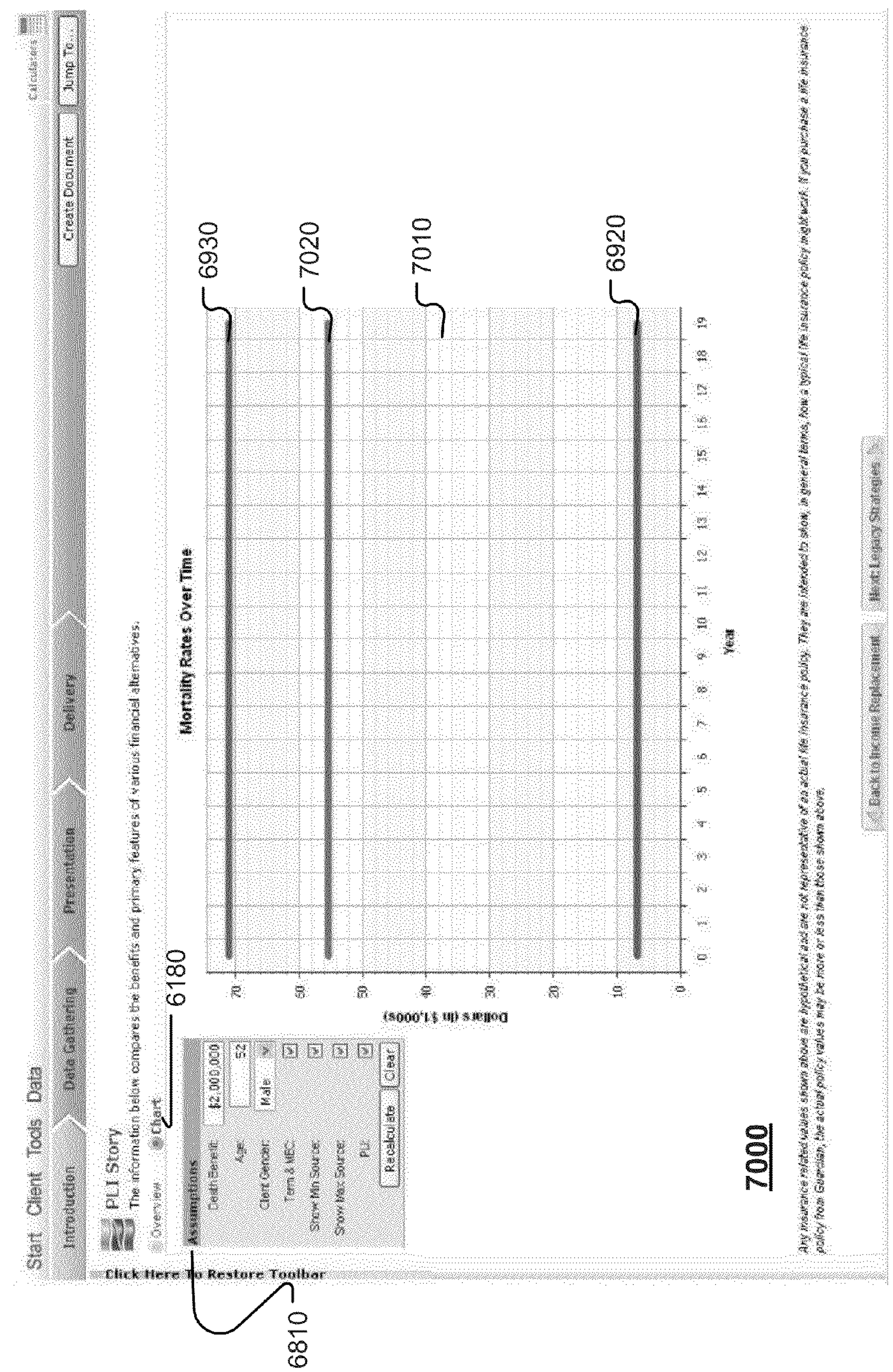

FIG. 70 shows an example of the display page 7000 that may be presented to a user after, e.g., the user has selected the chart selector 6180 and completed the death benefit field, the age field, and selected the term and MEC field, the show min. source field, show max. source field, and the PLI field on the display page 7000. The display page 7000 may present, e.g., a chart 7010 that shows mortality rates over time, which includes the minimum funding limit (term) graph 6920, the maximum funding limit (MEC) graph 6930, and a whole life premium preferred class (PLI) graph 7020. In the example shown in FIG. 70, the whole life premium preferred class (PLI) graph 7020 may have a constant value of, e.g., $55,360.

FIGS. 71-93 illustrate examples of display pages 7100-9300 that show aspects of a legacy strategies portion of the introduction module of the workflow wizard tool. The legacy strategies portion of the introduction module of the workflow wizard tool presents information that illustrates the value of maintaining permanent life insurance as a means towards improving retirement cash flow.

Figure 71:
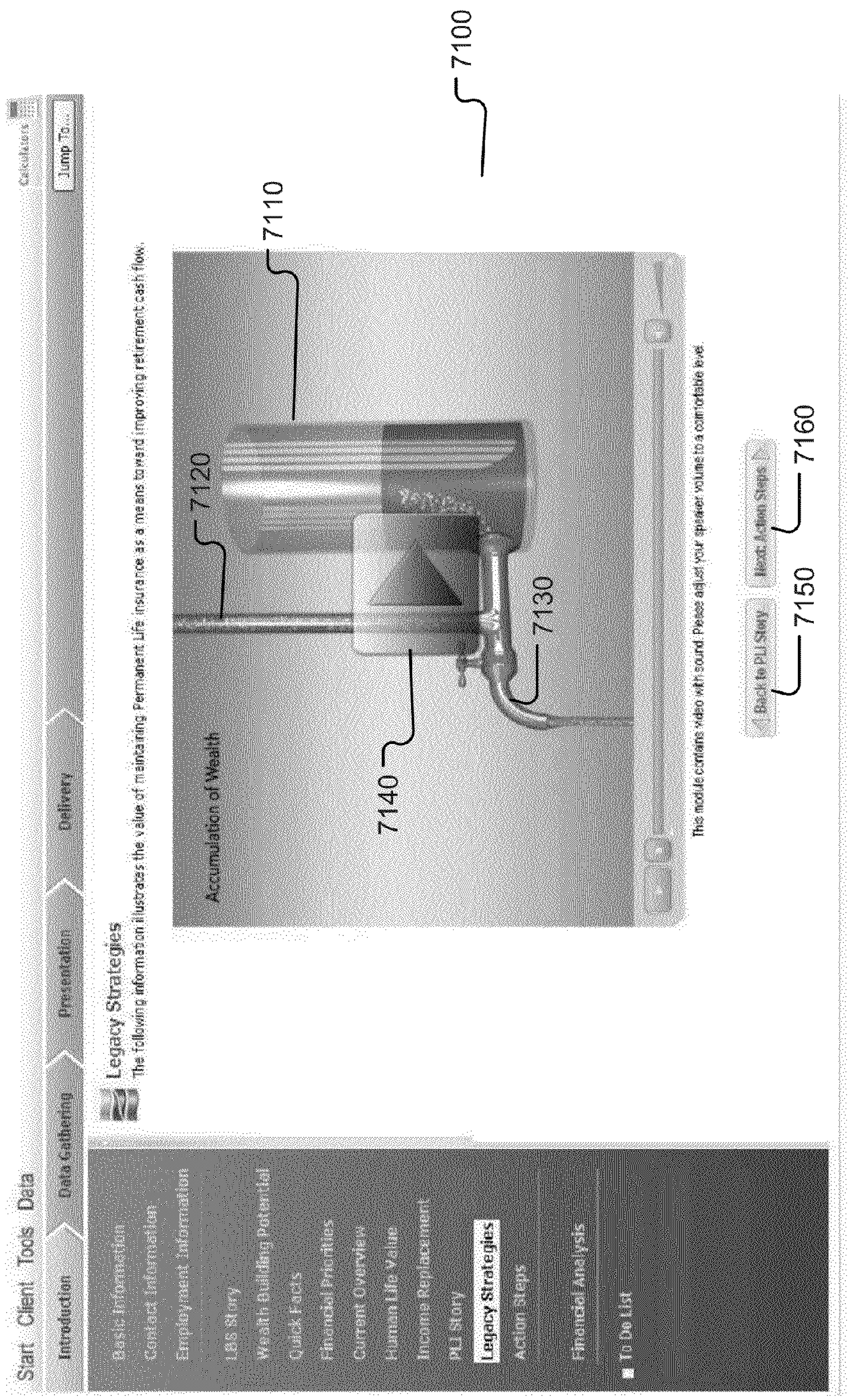
FIGS. 71-93 illustrate various examples of display pages that show aspects of a legacy strategies portion of the introduction module, in accordance with one embodiment.

Referring to FIG. 71, the legacy strategies portion of the introduction module of the workflow wizard tool may begin with the display page 7100, which displays a video that describes an example of an accumulation of wealth. The video may be accompanied by sound. The video displayed by display page 7100 may include, e.g., one or more visual representations of flow of liquid assets. The display page 7100 may include a container 7110, an inflow channel 7120, an outflow channel 7130, and a play button 7140. The container 7110 may represent retirement assets, the inflow channel 7120 may represent earned income and the outflow channel 7130 may represent lifestyle costs. A difference in the flow in the inflow channel 7120 compared to the flow in the outflow channel 7130 may represent increasing or decreasing (or steady state) retirement assets in the container 7110. The display page 7100 may include navigation tool bars 7150, 7160 to facilitate navigation to other tools, interfaces, displays, and the like, including, for example, a "Back to PLI Story" interface and a "Next: Action Steps" interface.

Figure 72:
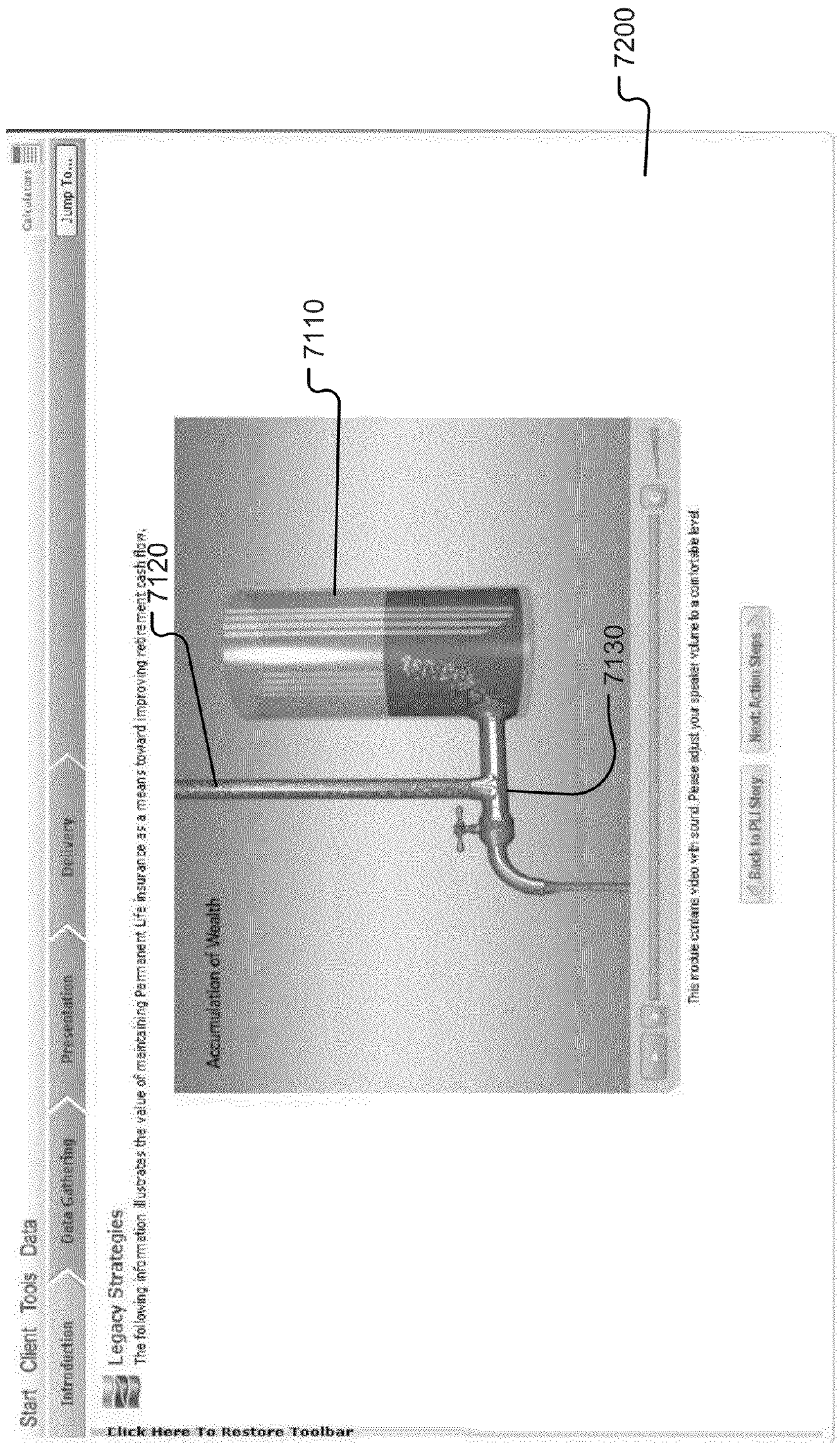

FIG. 72 shows an example of the display page 7200 after the video is commenced by actuation of the play button 7140 in display page 7100.

Figure 73:
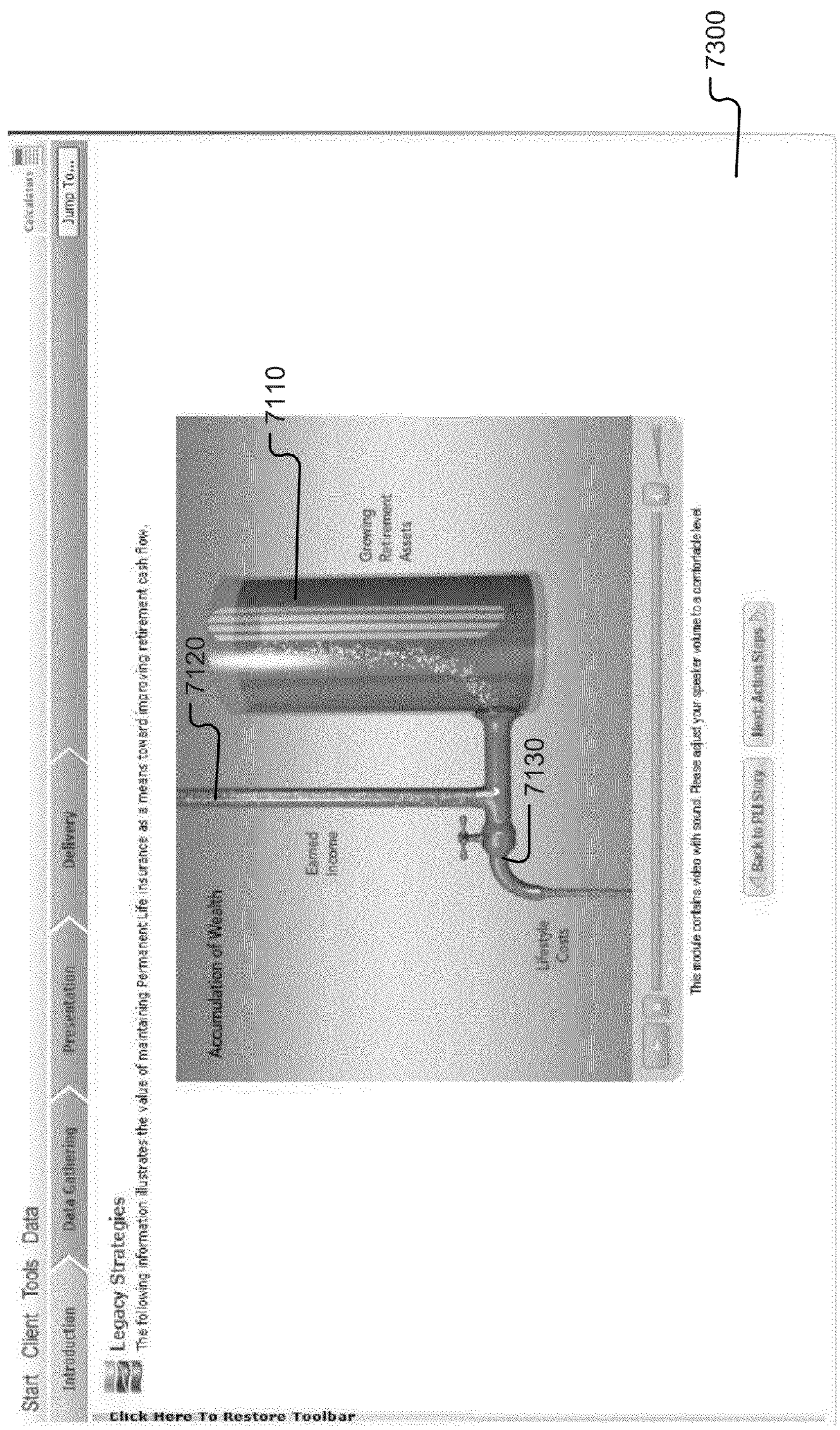

FIG. 73 shows an example of the display page 7300, which may be displayed after display page 7200. The display page 7300 may include legends, such as, e.g., "growing retirement assets" in association with the container 7110, "earned income" in association with the inflow channel 7120, and "lifestyle costs" in association with the outflow channel 7130.

Figure 74:
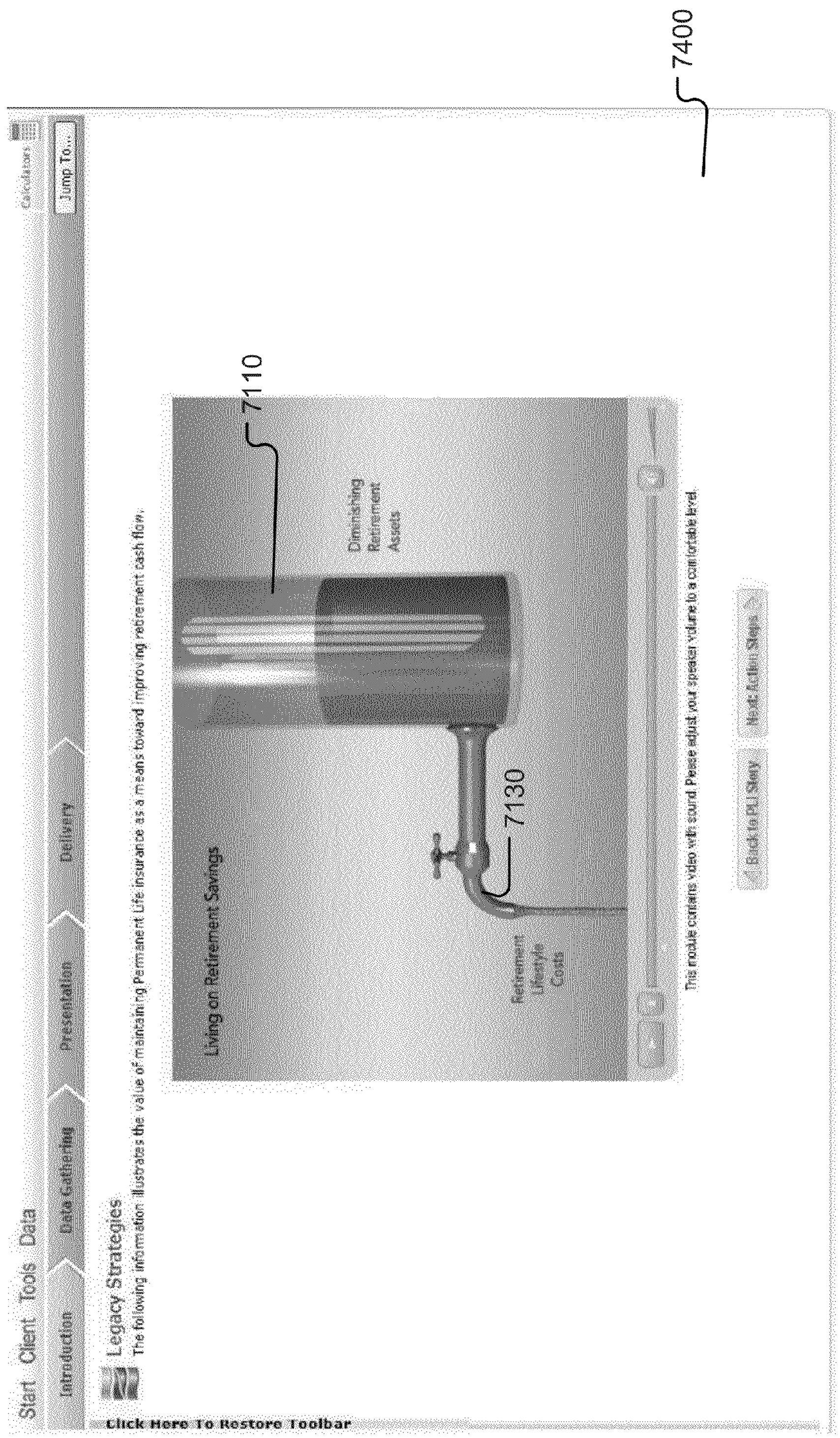

FIG. 74 shows an example of the display page 7400, which may be displayed after display page 7300. The display page 7400 may illustrate diminishing retirement assets in the container 7110 as retirement lifestyle costs continue to flow out of the outflow channel 7130, without any inflow of income in the inflow channel 7120.

Figure 75:
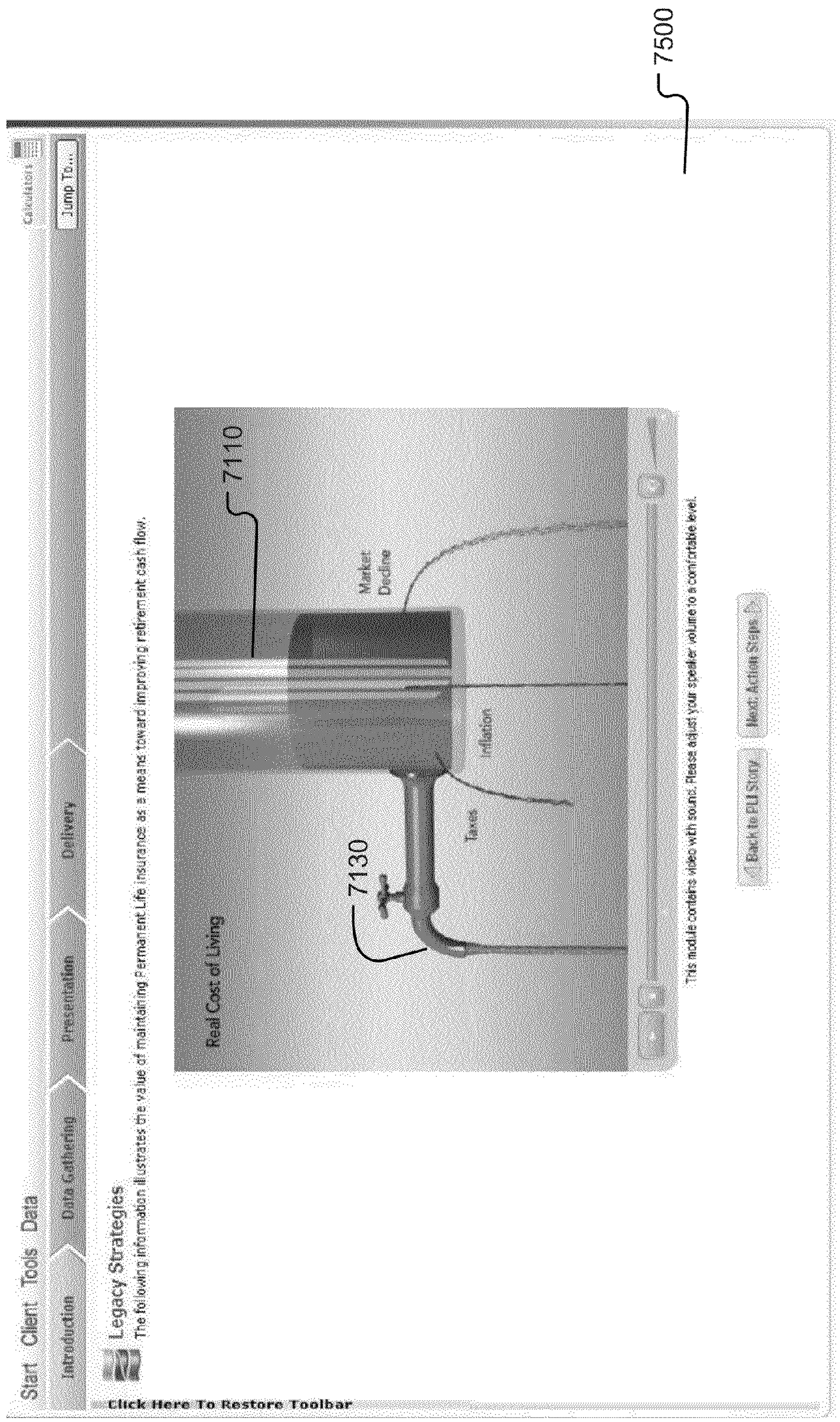

FIG. 75 shows an example of the display page 7500, which may be displayed after the display page 7400. The display page 7500 may illustrate a real cost of living example, including outflow from the retirement assets in the container 7110 related to taxes, inflation, market decline, and the like.

Figure 76:
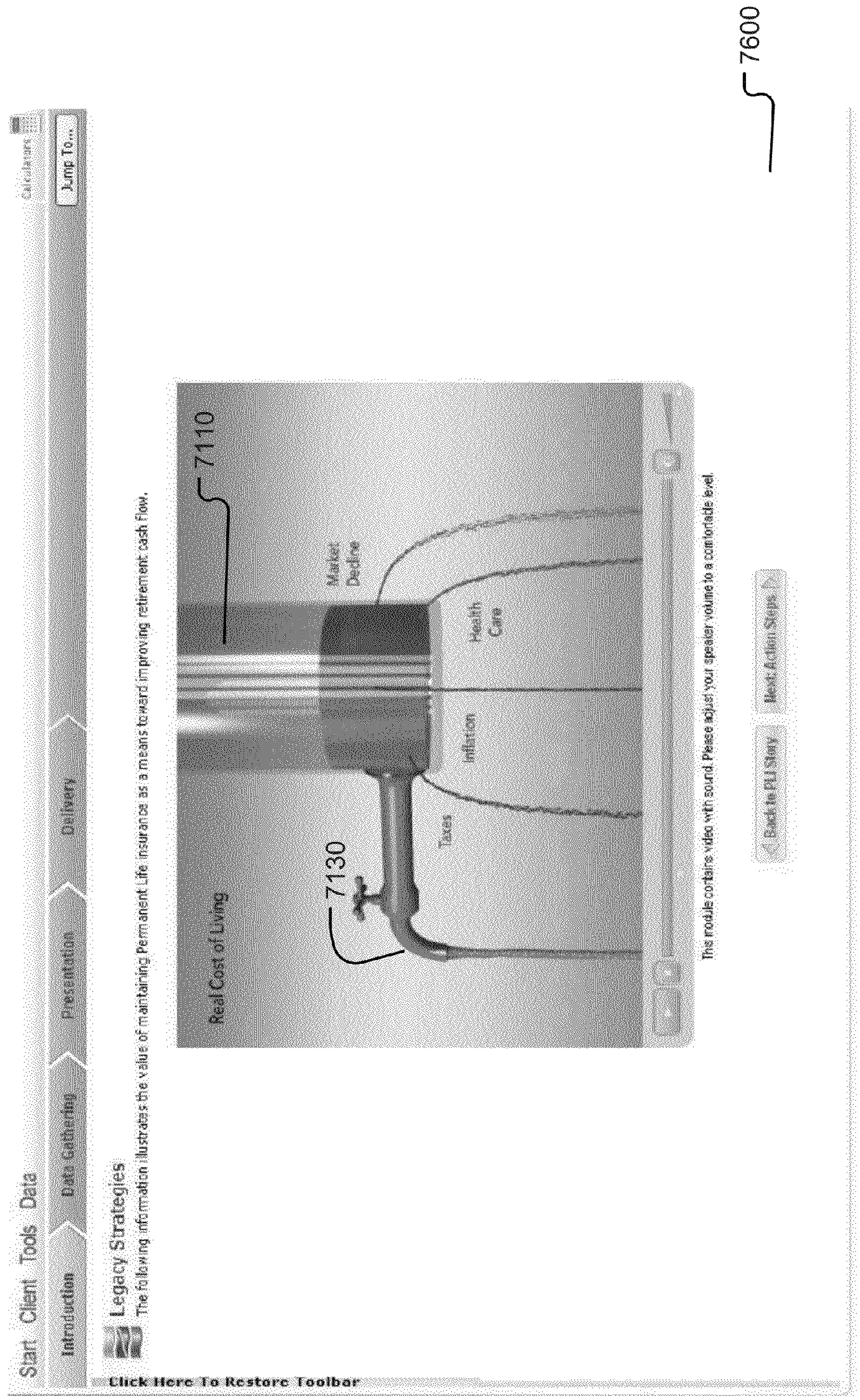

FIG. 76 shows an example of the display page 7600, which may be displayed after display page 7500. The display page 7600 may illustrate a further example of a real cost of living, including further outflow from the retirement assets in the container 7110 related to health care.

Figure 77:
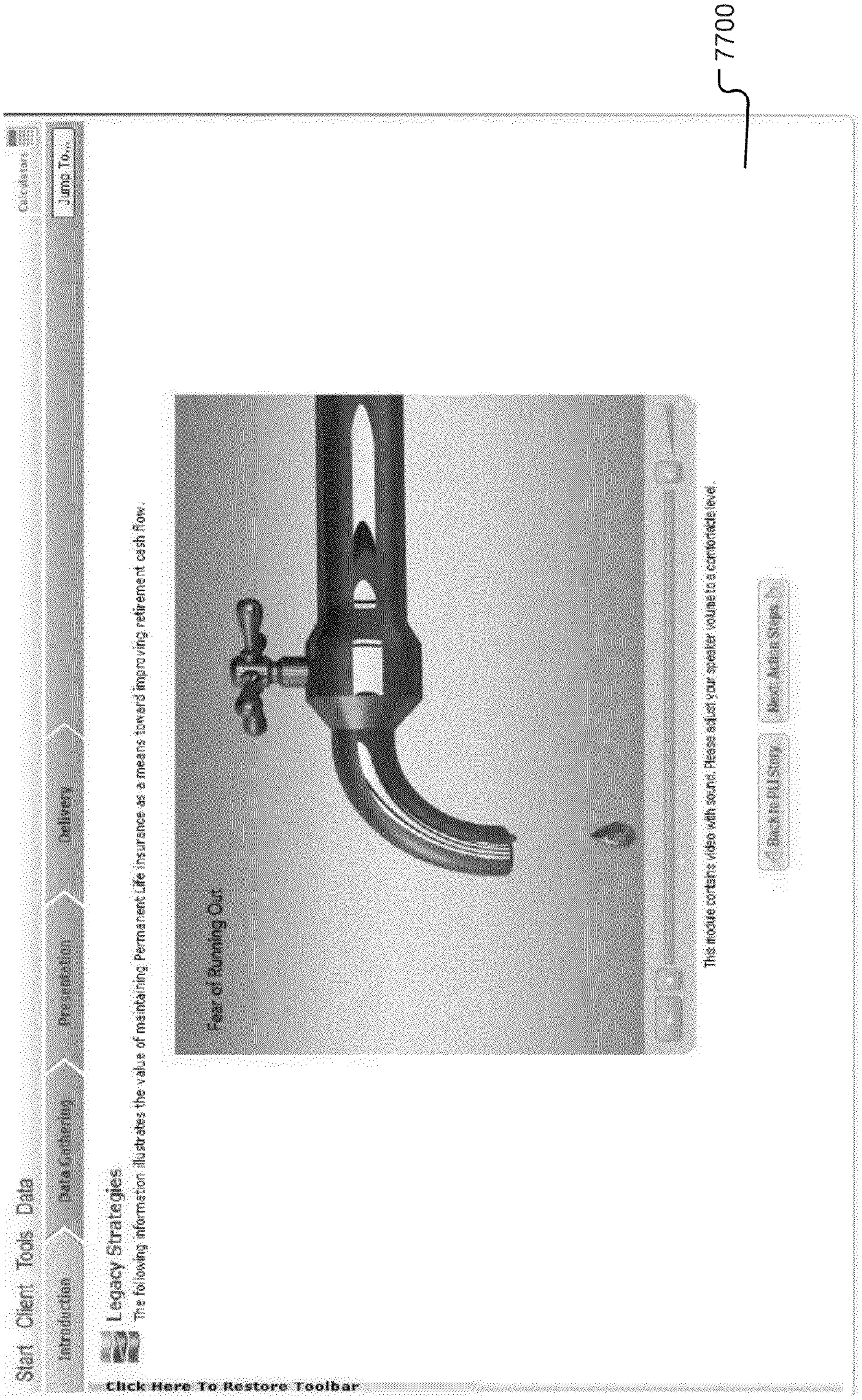

FIG. 77 shows an example of the display page 7700, which may be displayed after display page 7600. The display page 7700 may illustrate an example of where retirement assets run out. As a result, container 7110 (not shown in FIG. 77), which may be representative of retirement assets, may be shown as completely drained.

As seen in FIGS. 71-77, the disclosure therefore provides a novel method and system for displaying financial information. The disclosure utilizes videos and/or moving graphics to represent financial information that may conventionally only be presented by, e.g., a spreadsheet. The disclosure may provide that such videos and/or moving graphics may be generated, based at least in part, upon, e.g., a default financial data set and used as an educational tool. Alternatively, however, the disclosure may provide that such videos and/or moving graphics may be generated, based at least in part, upon, e.g., a specific client's current financial assets stored by, e.g., web host 110, web server 118, database server 120, storage 126, or any other entity in system 100 (see FIG. 1).

Figure 78:
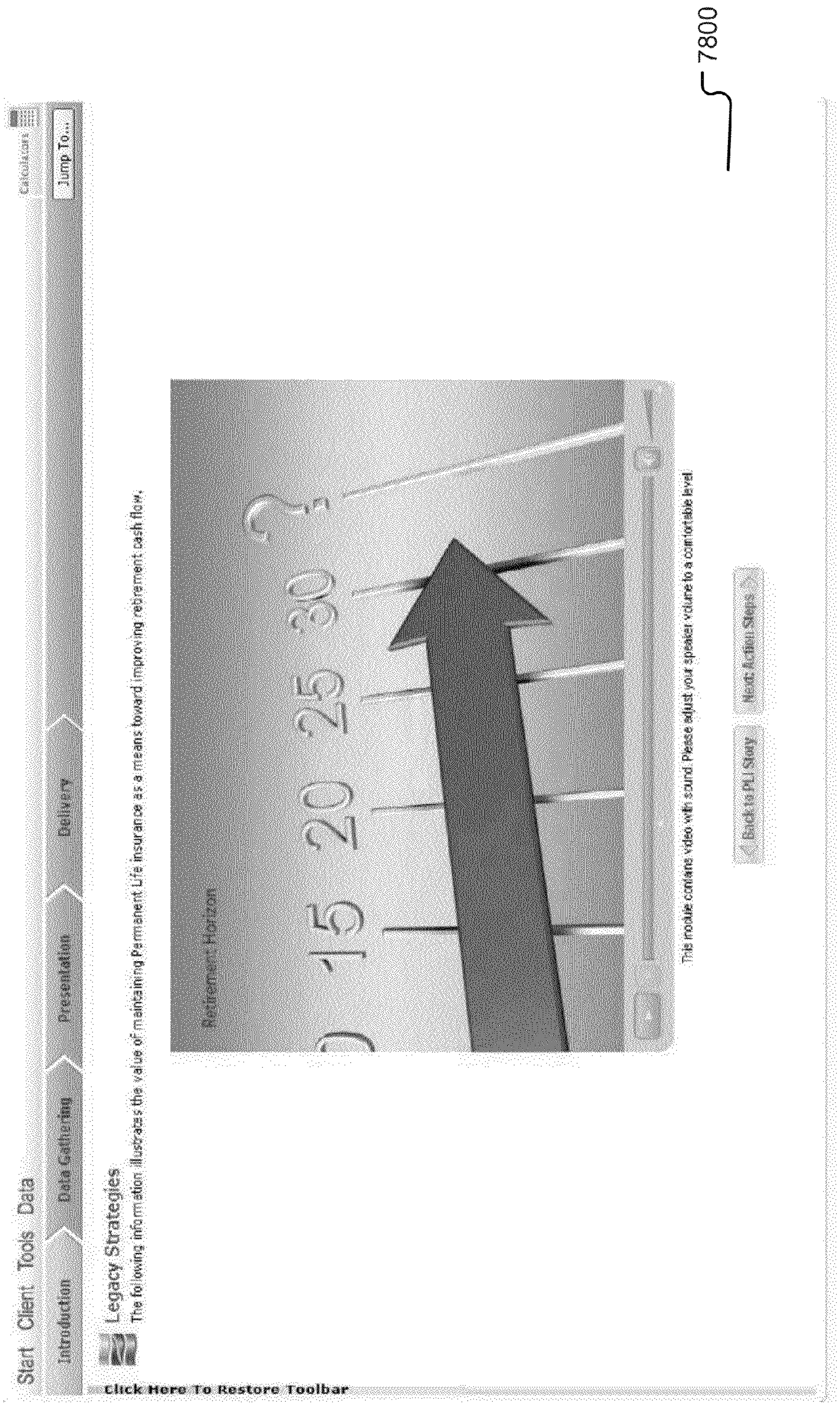

FIG. 78 shows an example of the display page 7800, which may be displayed after display page 7700. The display page 7800 may illustrate an example of a retirement horizon.

Figure 79:
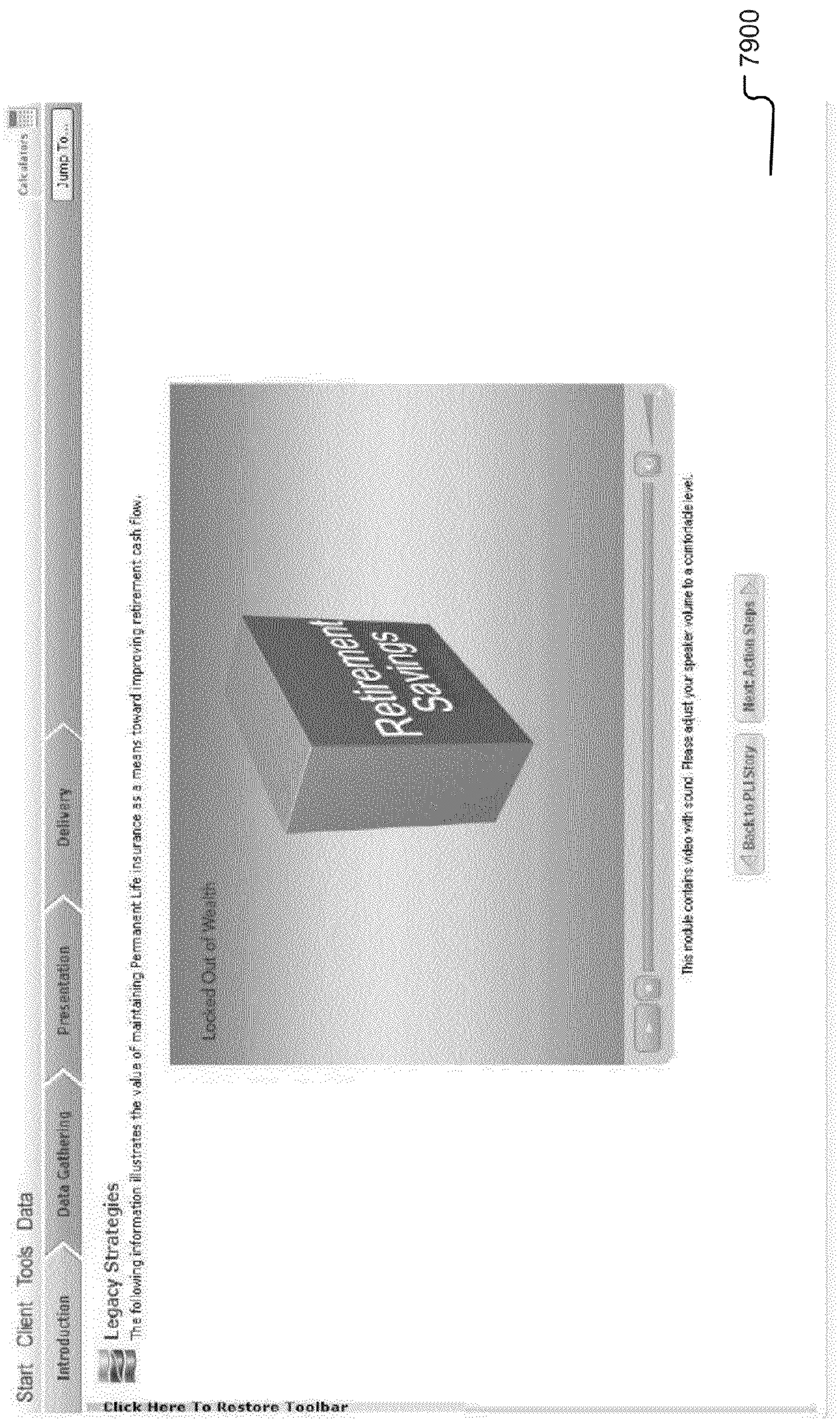
Figure 80:
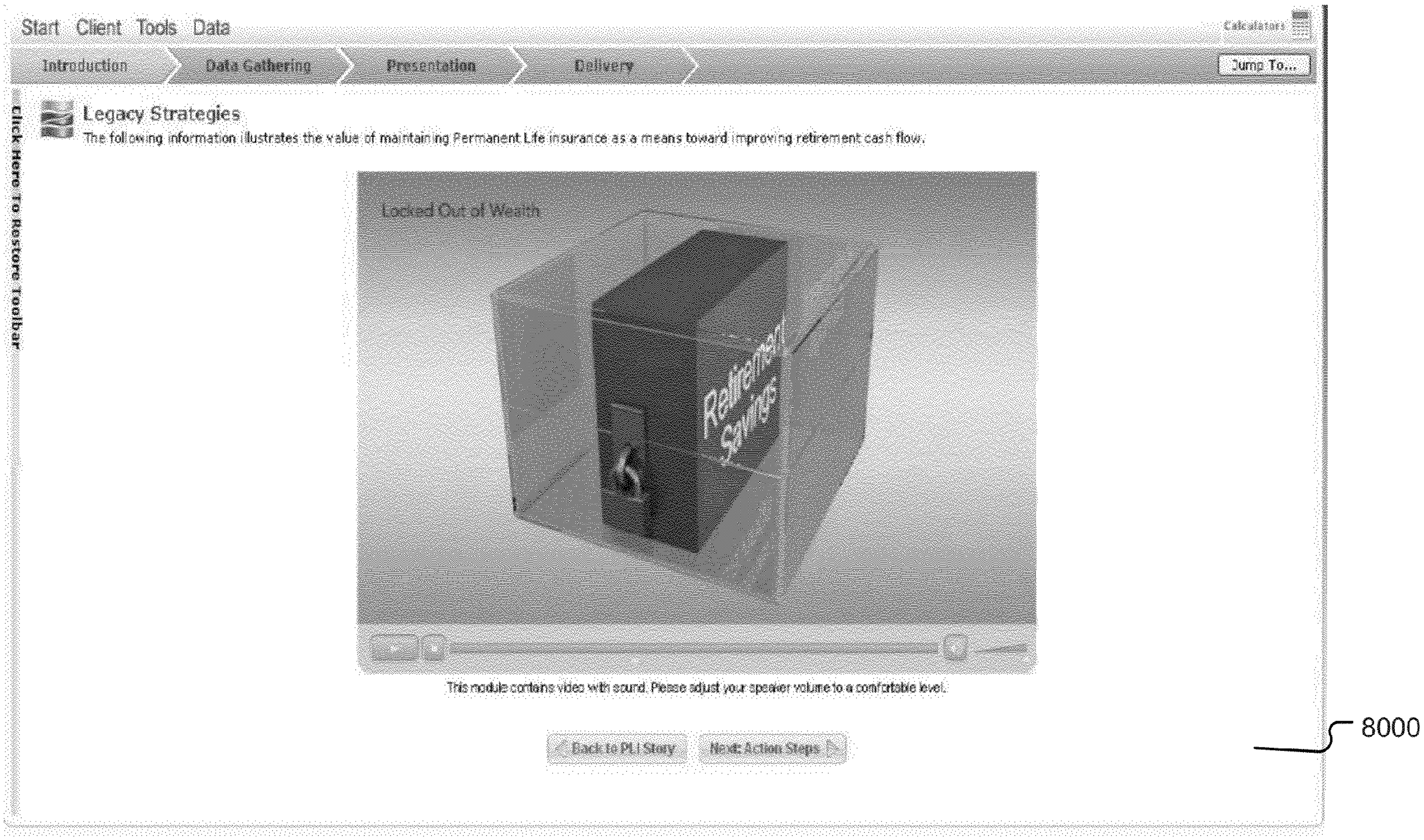
Figure 81:

FIGS. 79-81 show examples of the display pages 7900-8100, respectively, which may be displayed after display page 7800. The display pages 7900-8100 may illustrate examples of being locked out of wealth during retirement.

Figure 82:
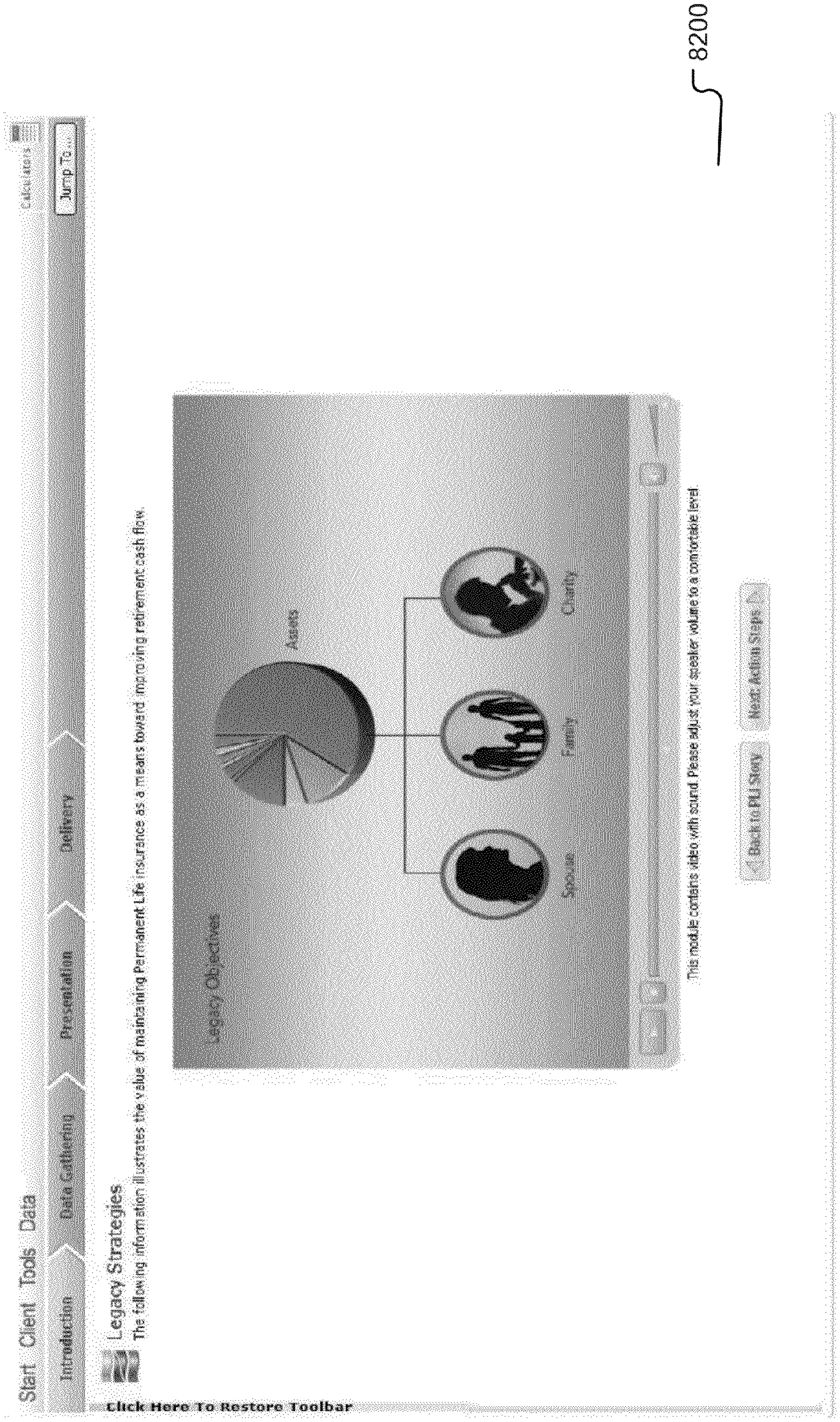

FIG. 82 shows an example of the display page 8200, which may be displayed after the display pages 7900-8100. The display page 8200 may illustrate a plurality of legacy objectives, including, e.g., assets, spouse, family, charity, and the like.

Figure 83:
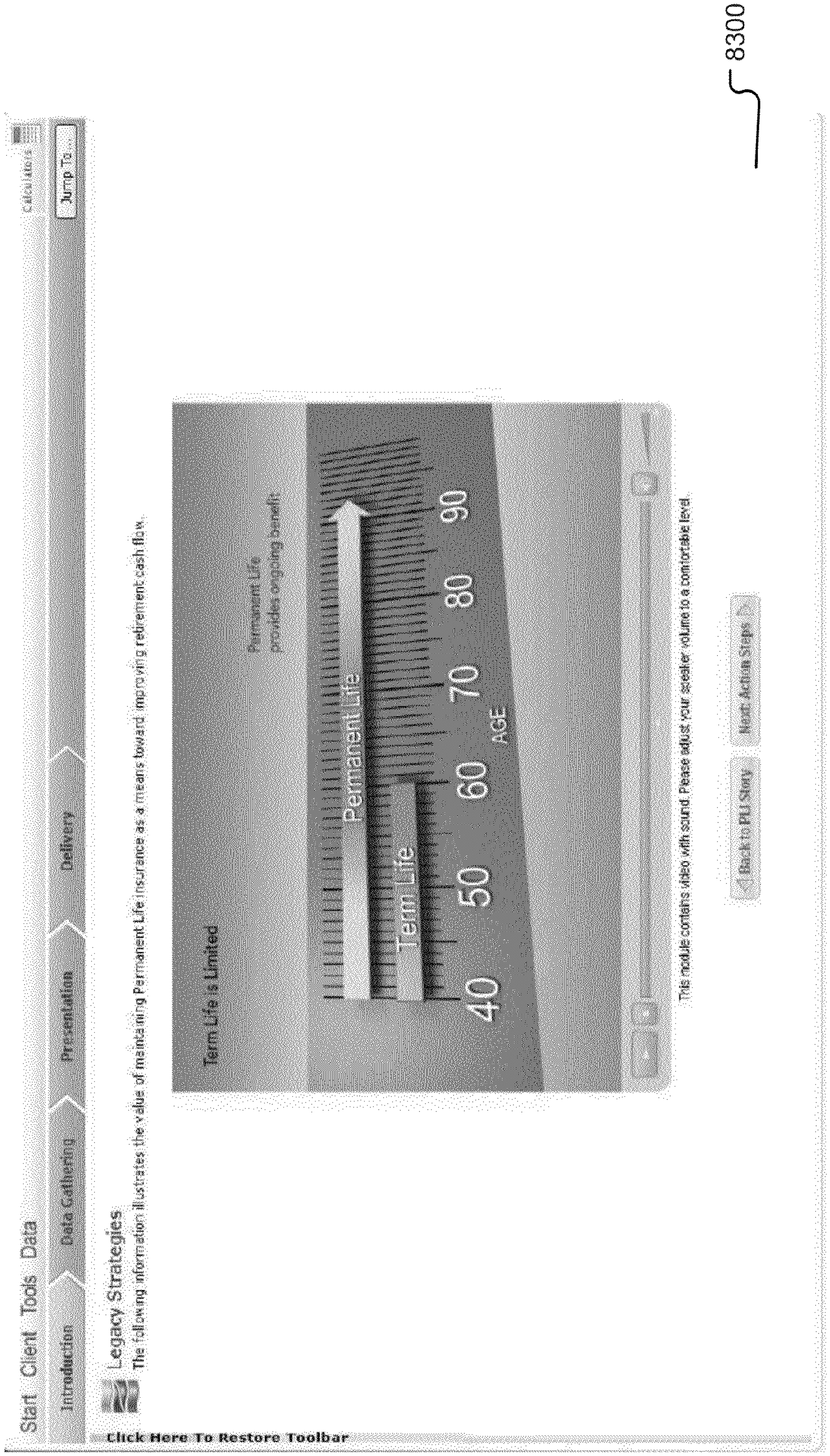

FIG. 83 shows an example of the display page 8300, which may be displayed after the display page 8200. The display page 8300 may illustrate an example comparing term life insurance to permanent life insurance, thereby showing limitations to term life insurance.

Figure 84:
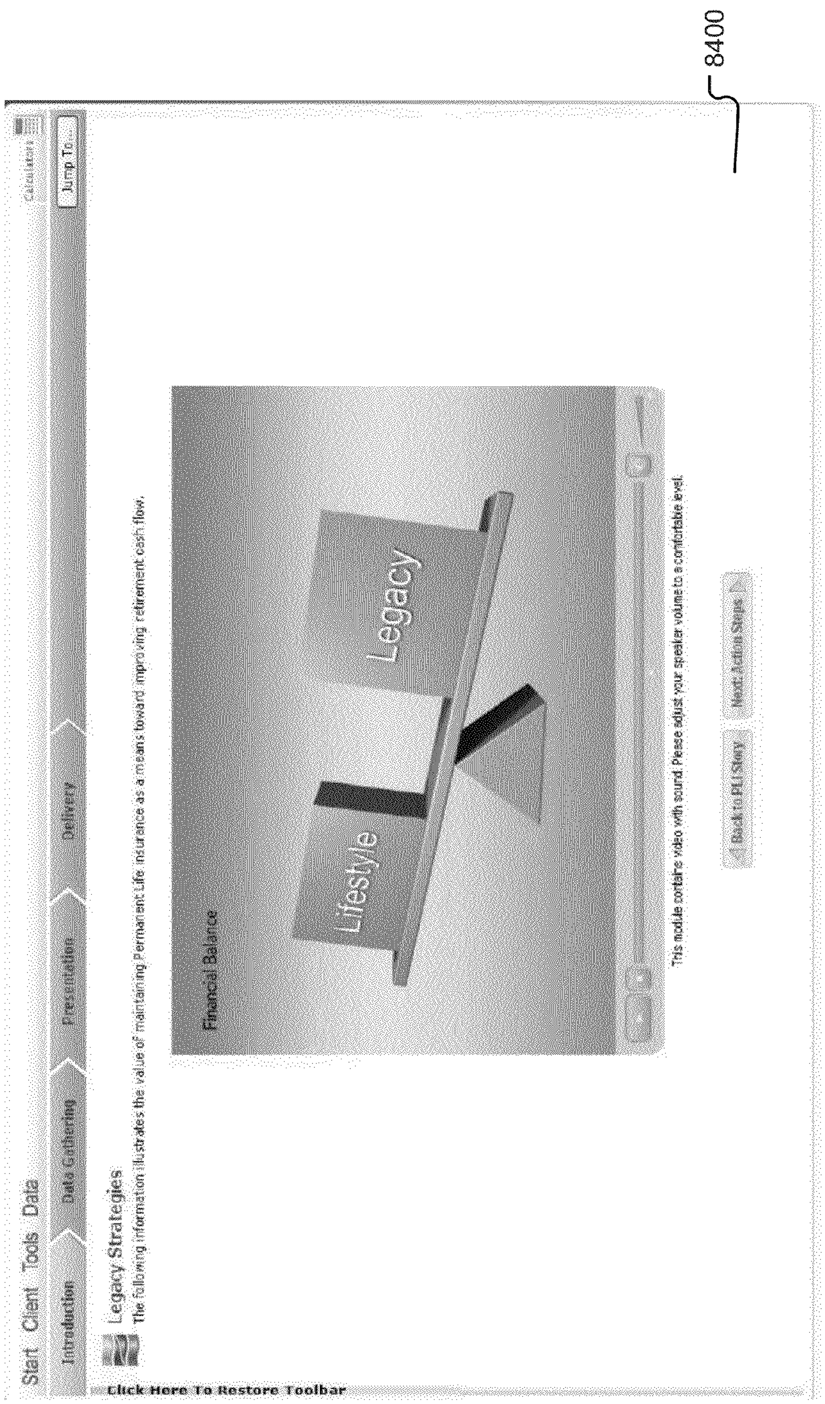

FIG. 84 shows an example of the display page 8400, which may be displayed after the display page 8300. The display page 8400 may illustrate an example of imbalance in the financial balance between lifestyle and legacy.

Figure 85:
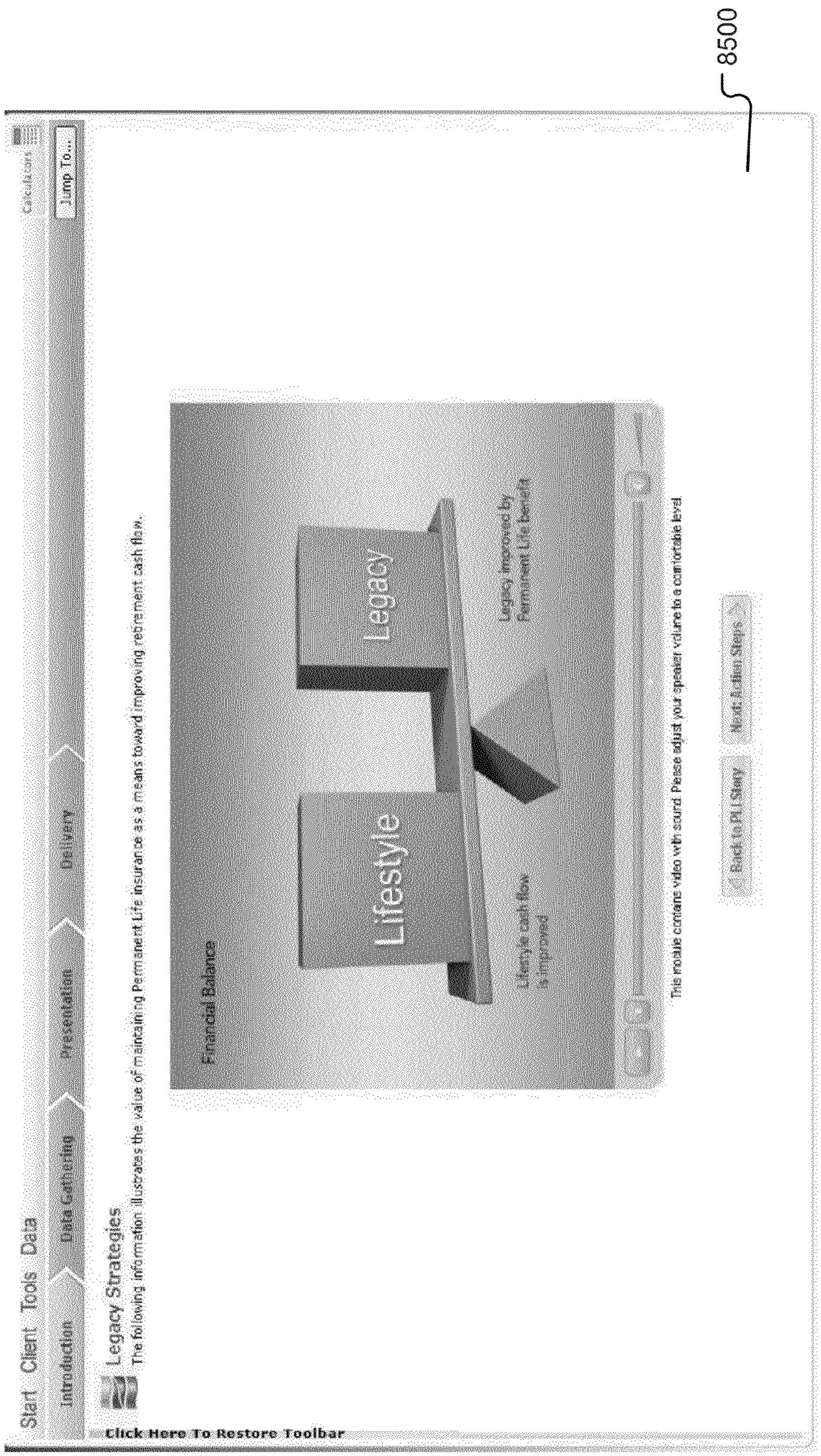

FIG. 85 shows an example of the display page 8500, which may be displayed after the display page 8400. The display page 8500 may illustrate an example of near balance in the financial balance between lifestyle cash flow and legacy. The display page 8500 provides an example whereby the financial balance between lifestyle cash flow and legacy may be improved by the addition of a permanent life insurance benefit.

Figure 86:

FIG. 86 shows an example of the display page 8600, which may be displayed after the display page 8500. The display page 8600 may illustrate examples of distribution strategies, including, e.g., spending down assets, annuitizing assets, reverse mortgages, pension distribution options, conservative asset allocation, and the like.

Figure 87:
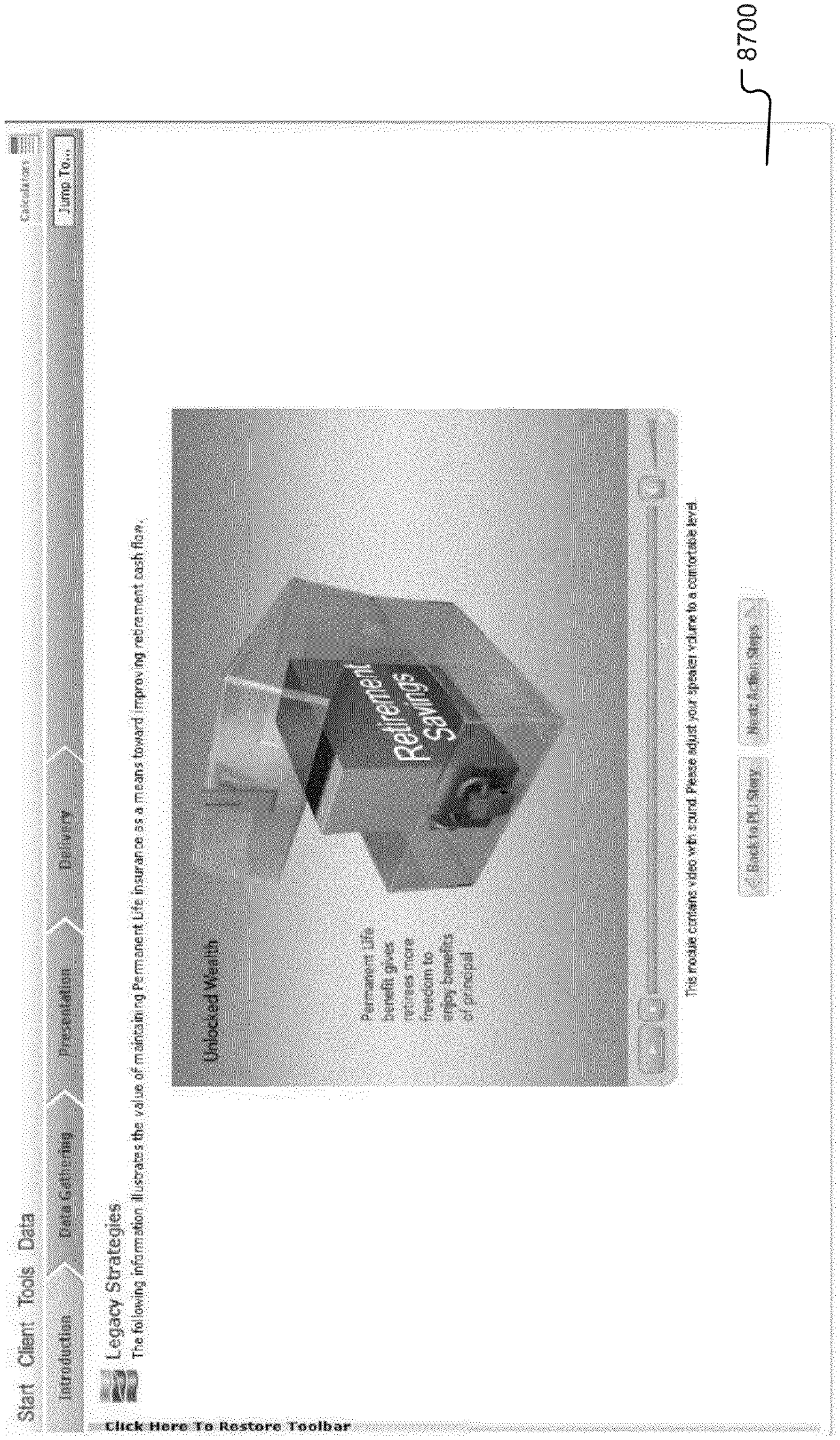

FIG. 87 shows an example of the display page 8700, which may be displayed after the display page 8600. The display page 8700 may illustrate an example of a representation of unlocked wealth in retirement savings where permanent life benefit gives retirees more freedom to enjoy benefits of principal.

Figure 88:
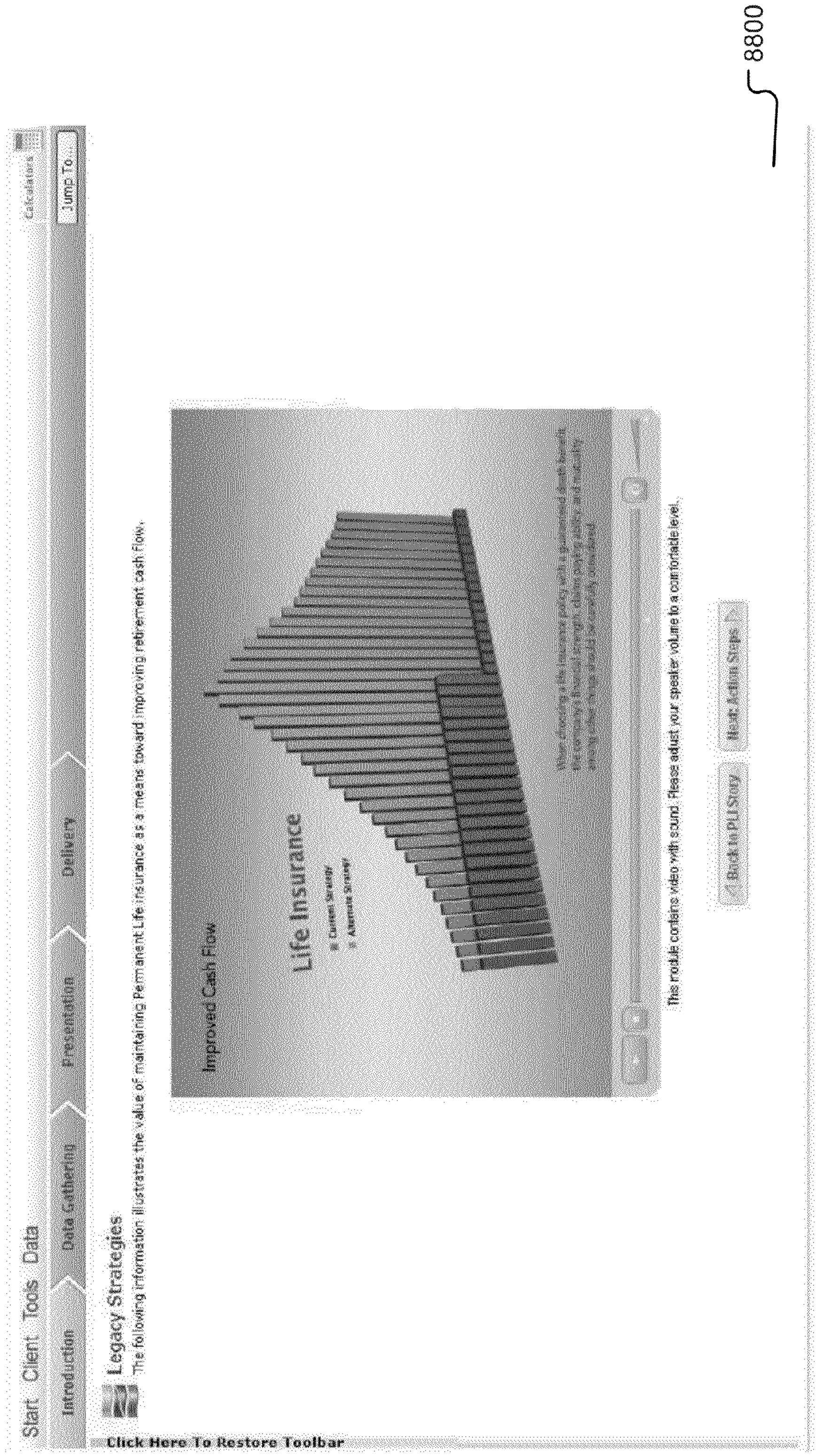
Figure 89:
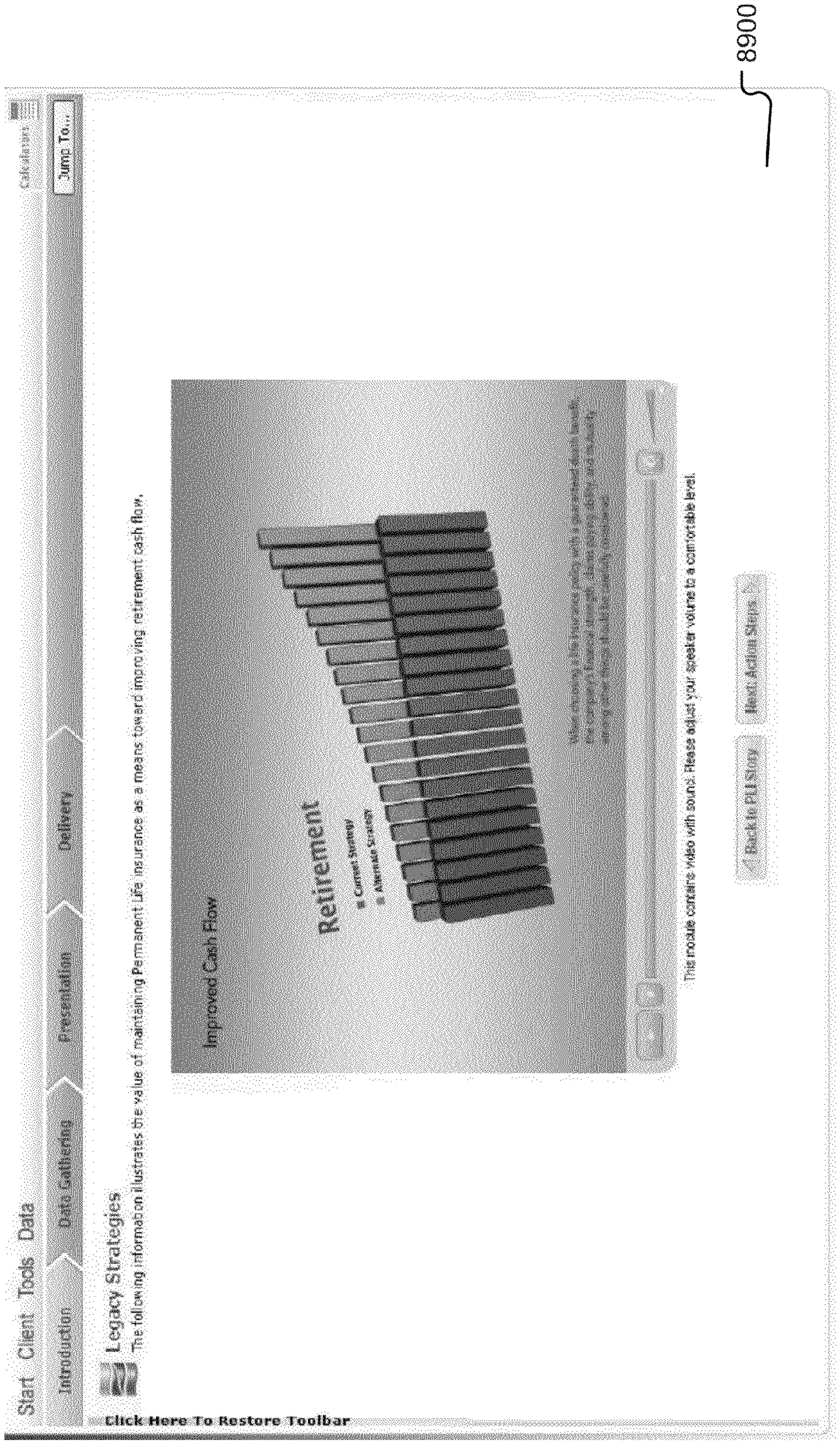

FIGS. 88-89 show examples of the display pages 8800 and 8900, respectively, which may be displayed after the display page 8700. The display pages 8800 and 8900 may illustrate an example of improving retirement cash flow through maintaining permanent life insurance. The display pages 8800 and 8900 may include a current strategy graph and an alternate strategy graph.

Figure 90:
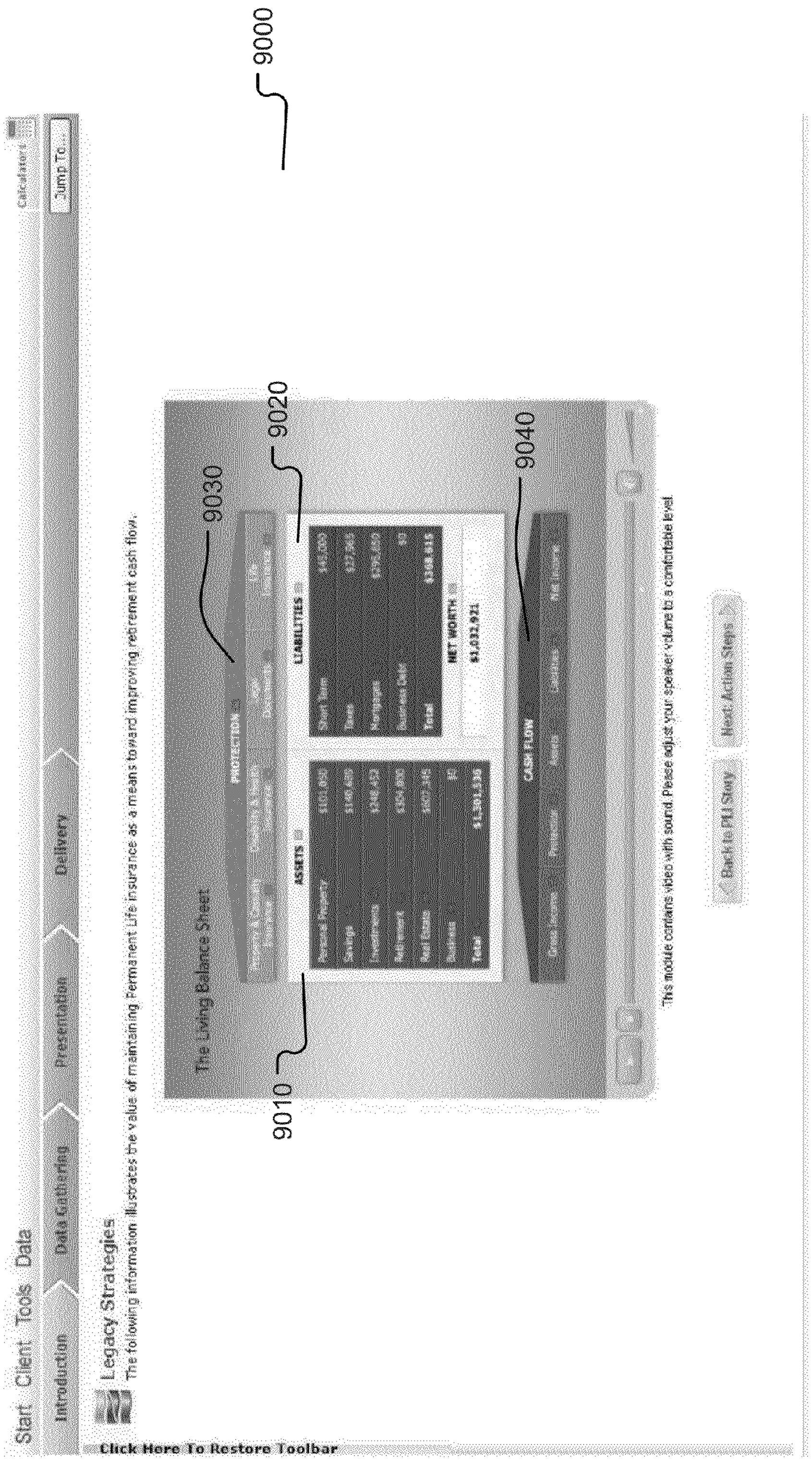

FIG. 90 shows an example of the display page 9000, which may be displayed after the display pages 8800 and 8900. The display page 9000 may illustrate an example of the four interdependent financial domains, including the assets domain 9010, the liabilities domain 9020, the protection domain 9030, and the cash flow domain 9040.

Figure 91:
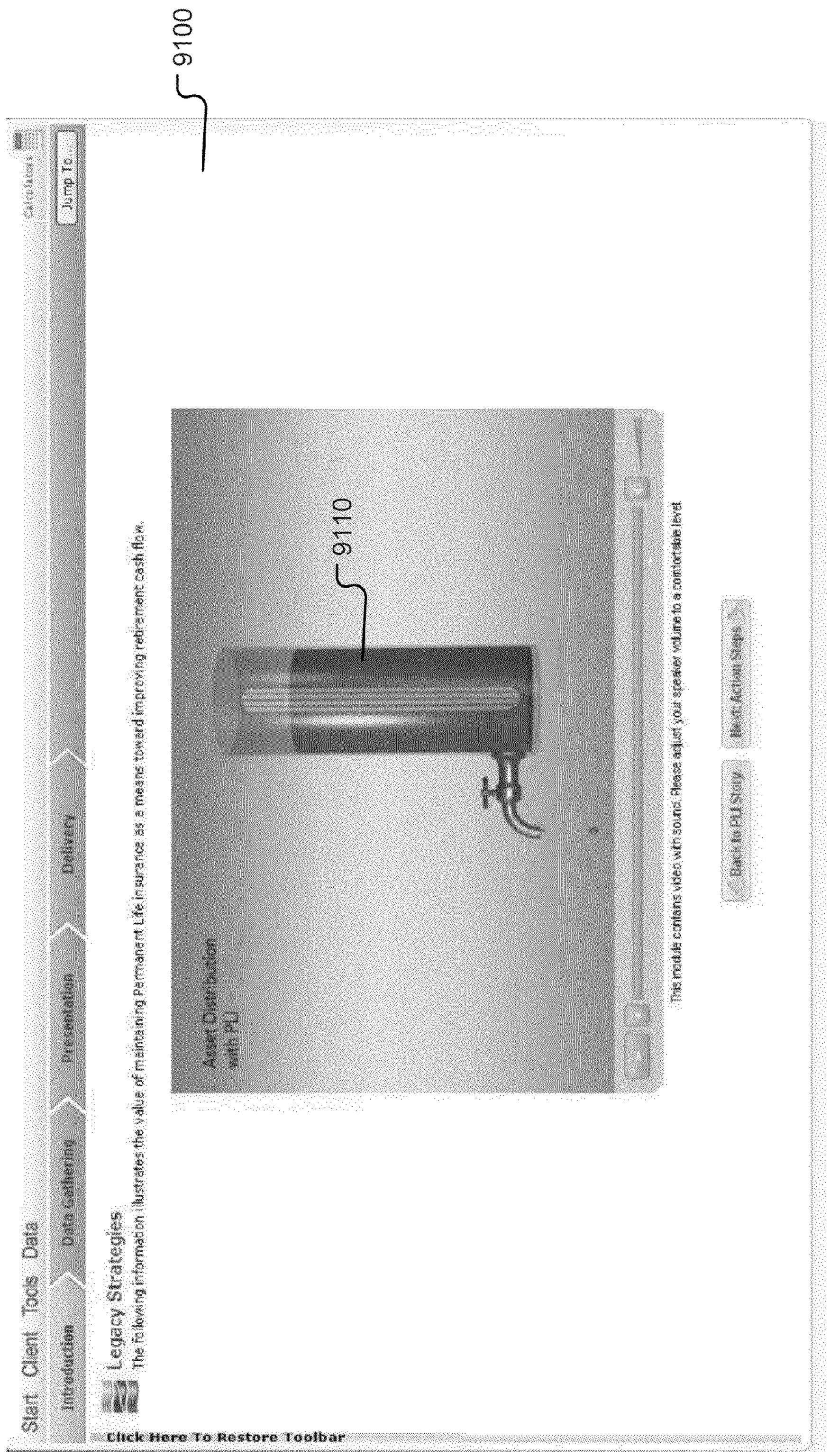

FIG. 91 shows an example of the display page 9100, which may be displayed after the display page 9000. The display page 9100 may represent asset distribution with PLI. For example, the display page 9100 may include a container 9110 to represent assets.

Figure 92:
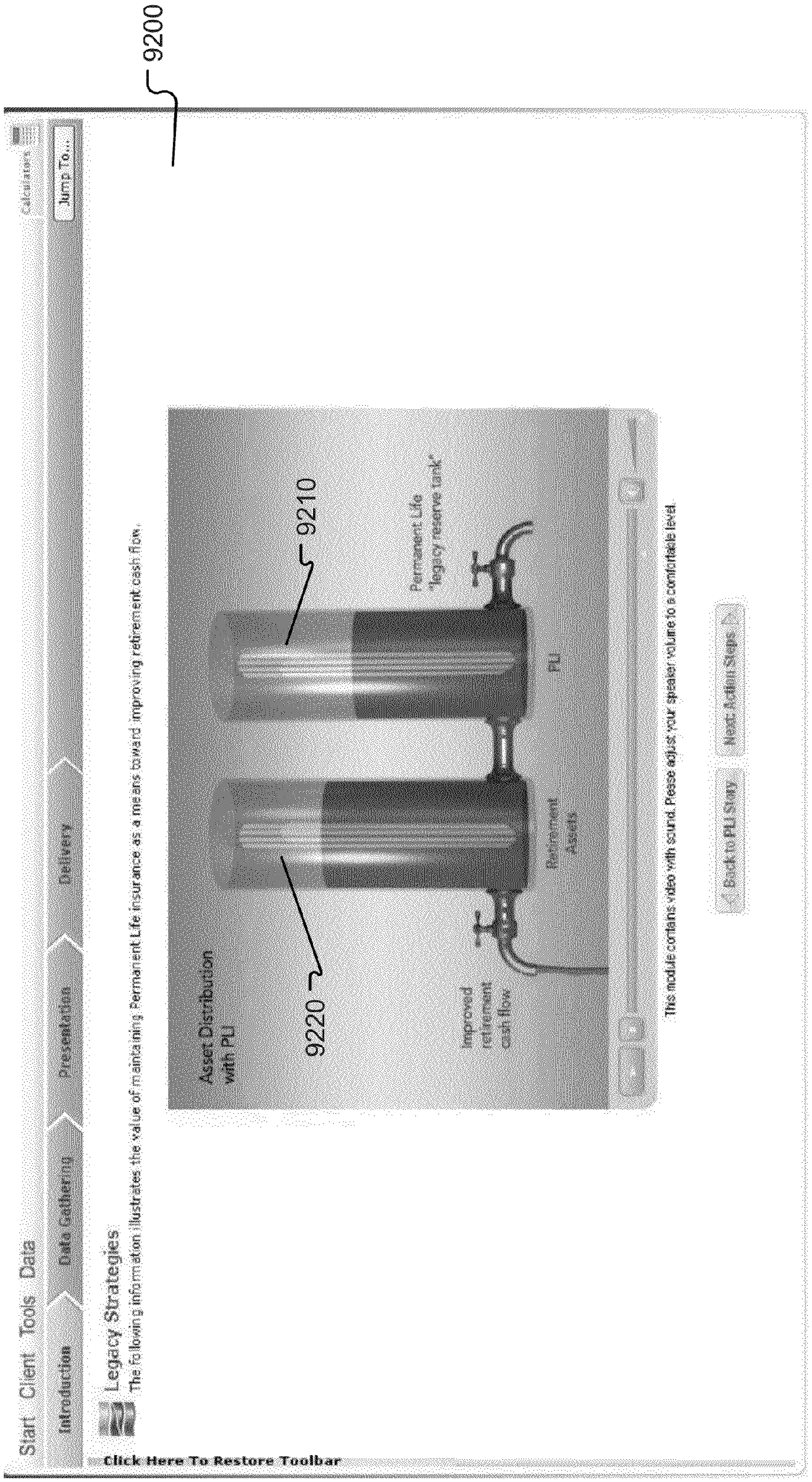

FIG. 92 shows an example of the display page 9200, which may be displayed after the display page 9100. The display page 9200 also may represent asset distribution with PLI, illustrating improved retirement cash flow. The display page 9200 may include a PLI tank (or container) 9210 and a retirement assets tank (or container) 9220. The PLI tank 9210 may represent a legacy reserve tank.

Figure 93:
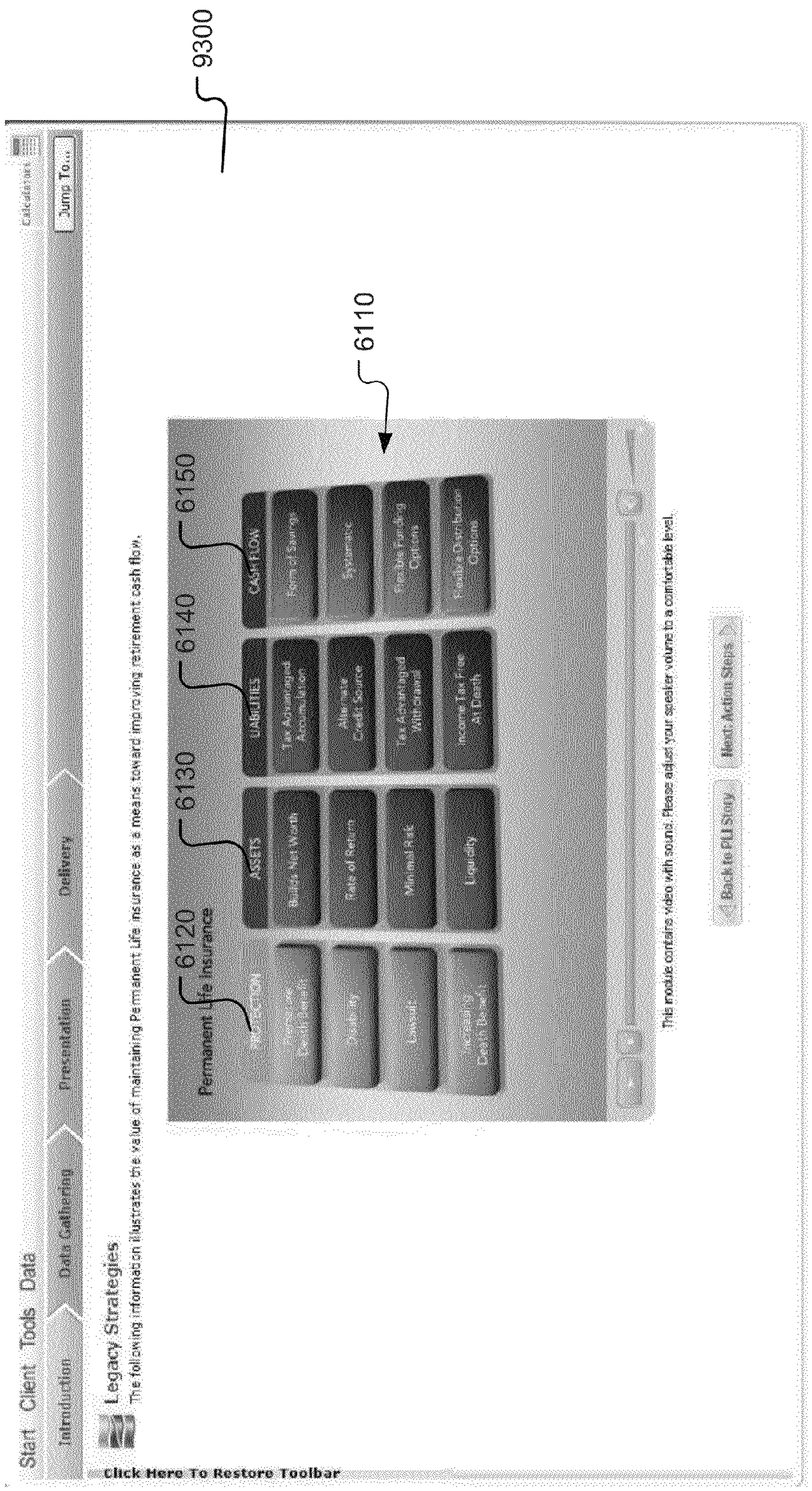

FIG. 93 shows an example of the display page 9300, which may be displayed after the display page 9200. The display page 9300 may illustrate a plurality of examples of benefits and primary features 6110 that are associated with permanent life insurance with regard to the four interdependent financial domains 6120, 6130, 6140, and 6150. As noted earlier, the benefits and primary features 6110 may include, e.g., premature death benefit, disability, lawsuit, increasing death benefit, builds net worth, rate of return, minimal risk, liquidity, tax advantaged accumulation, alternate credit source, tax advantaged withdrawal, income tax free at death, form of savings, systematic, flexible funding options, flexible distribution options, and the like.

FIG. 94 illustrates an example of a display page 9400 that shows aspects of an action steps portion of the introduction module of the workflow wizard tool. The display page 9400 may include a plurality of examples of actions steps that maybe applicable to an estate and that may be completed for a particular client. The display page 9400 may include the following examples of action steps, including an establish personal financial website 9410, begin underwriting process for life/disability insurance to determine insurability 9420, complete fact finder and gather financial documents 9430, conduct comprehensive protection analysis 9440, complete living expense report 9450, identify cash flow redeployment options 9460, and the like. Each of the action steps 9410-9460 may be displayed proximate a respective selector, which may include, e.g., a selectable field, a radio button, or the like. The display page 9400 may include navigation tool bars 9470, 9480 to facilitate navigation to other tools, interfaces, displays, and the like, including, for example, a "Back to Legacy Strategies" interface and a "Next: Data Gathering" interface.

FIGS. 95-100 illustrate examples of display pages 9500-10000 that show aspects of a side-by-side pop-up portion of a calculators tool, in accordance with one embodiment of the disclosure. The calculators tool presents hypothetical information that illustrates a present and/or future value of an asset.

Figure 95:
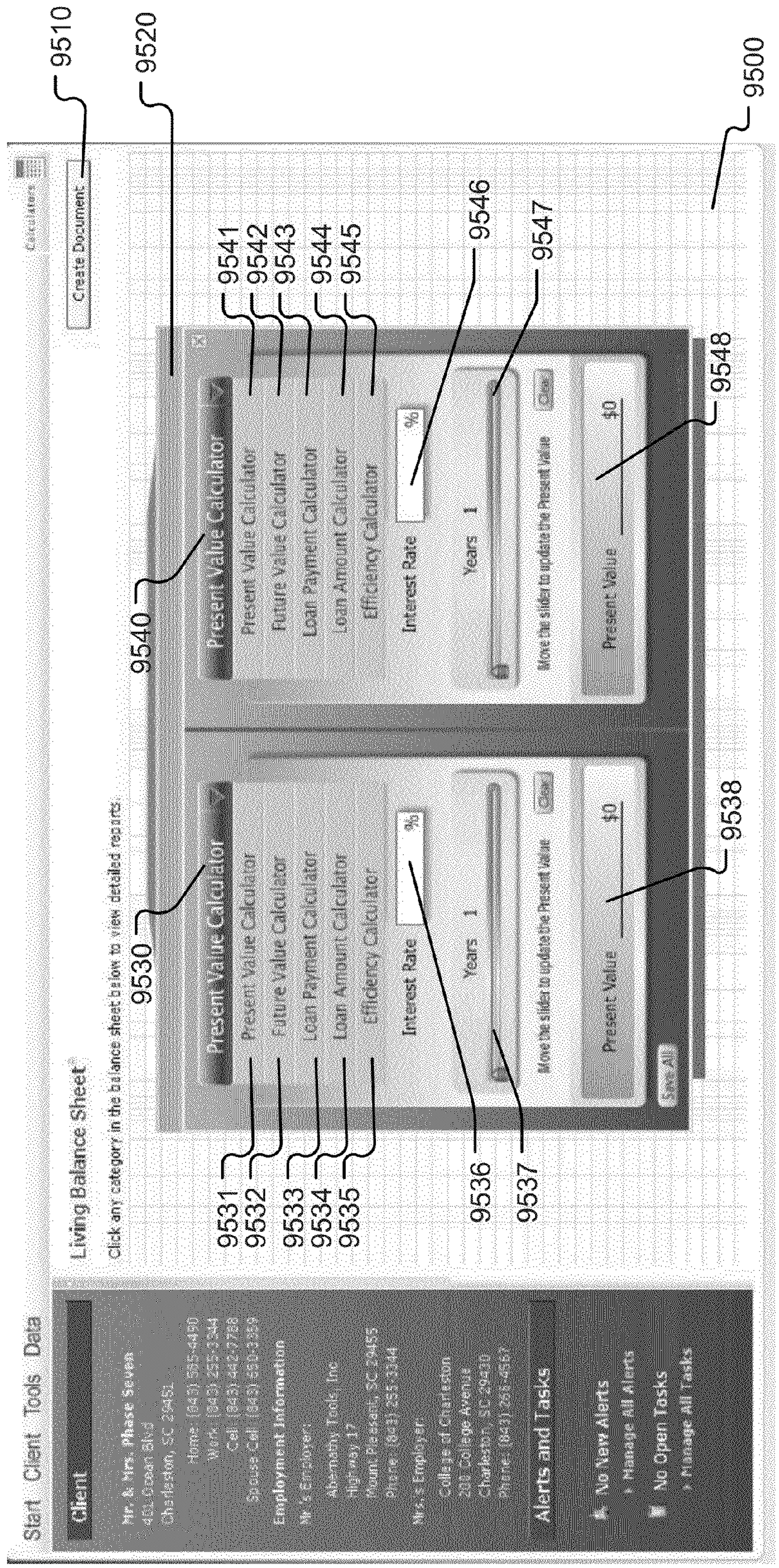
FIGS. 95-100 illustrate examples of display pages that show aspects of a side-by-side pop-up portion of a calculator tool, in accordance with one embodiment of the disclosure.

Referring to FIG. 95, the display page 9500 may include a calculator initiate selector 9510 and a comparative calculator 9520. The comparative calculator 9520 may be initialized and displayed (e.g., pop-up) in response to selection of the calculator initiate selector 9510. The comparative calculator 9520 may include a pair of calculator windows 9530, 9540, which may be configured in a side-by-side arrangement to facilitate comparative display of the values provided in the calculator windows 9530, 9540. The comparative calculator 9520 may include only a single calculator window 9530 (or 9540), or three or more calculator windows (not shown).

The calculator windows 9530 and 9540 may each include a plurality of calculators 9531-9535 and 9541-9545, respectively, which may be displayed in the form of, e.g., a drop-down list or menu. For example, the calculator window 9530 (or 9540) may include a drop-down list or menu that includes a present value calculator 9531 (or 9541), a future value calculator 9532 (or 9542), a loan payment calculator 9533 (or 9543), a loan amount calculator 9534 (or 9544), and an efficiency calculator 9535 (or 9545). As seen in FIG. 95, the present value calculator 9531 (or 9541) may include an interest rate field 9536 (or 9546), a year slider 9537 (or 9547), and a present value field 9538 (or 9548). The interest rate field 9536 (or 9546) may be configured to receive a hypothetical interest rate percentage and the year slider 9537 (or 9547) may be configured to be set to a particular year, which may range from, e.g., 1 to 50 years. The present value field 9538 (or 9548) may display a selected year value (i.e., a value of an asset at the year selected by the year slider 9537 (or 9547).

Figure 96:
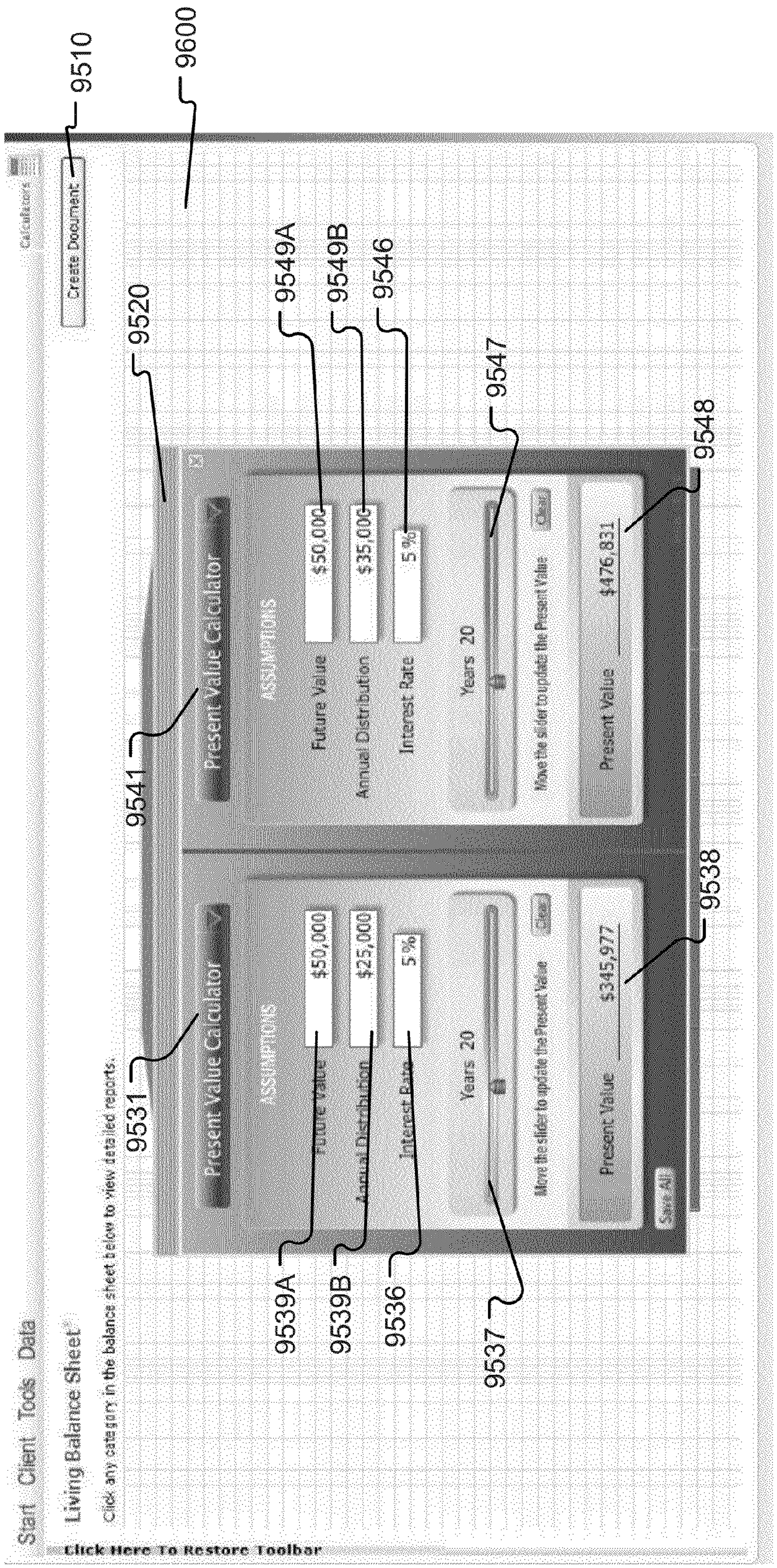

FIG. 96 illustrates an example of the display page 9600, which may be displayed when the present value calculators 9531, 9541 are selected on the display page 9500 (shown in FIG. 95). The present value calculator 9531 (or 9541) may further include a future value field 9539A (or 9549A) and an annual distribution field 9539B (or 9549B), each of which may be configured to receive entered data. The calculator 9531 (or 9541) will receive the data entered in the future value field 9539A (or 9549A), the annual distribution field 9539B (or 9549B), the interest rate field 9536 (or 9546), and the year slider 9537 (or 9547), and calculate the present value of the asset at the year that is selected by year slider 9537 (or 9547) and output the result in the present value field 9538 (or 9548).

As seen in the comparative calculator 9520 in FIG. 96, when the same values are entered in the data entry fields 9536/9546 (e.g., 5%), 9537/9547 (e.g., 20 years), and 9539A/9549A (e.g., $50,000), but different values are entered in the annual distribution fields 9539B (e.g., $25,000) and 9549B (e.g., $35,000), the present value calculators 9531 and 9541 will calculate substantially different present values for year 20—e.g., the present value field 9538 will output a value of $345,977 and the present value field 9548 will output a value of $476,831.

Figure 97:
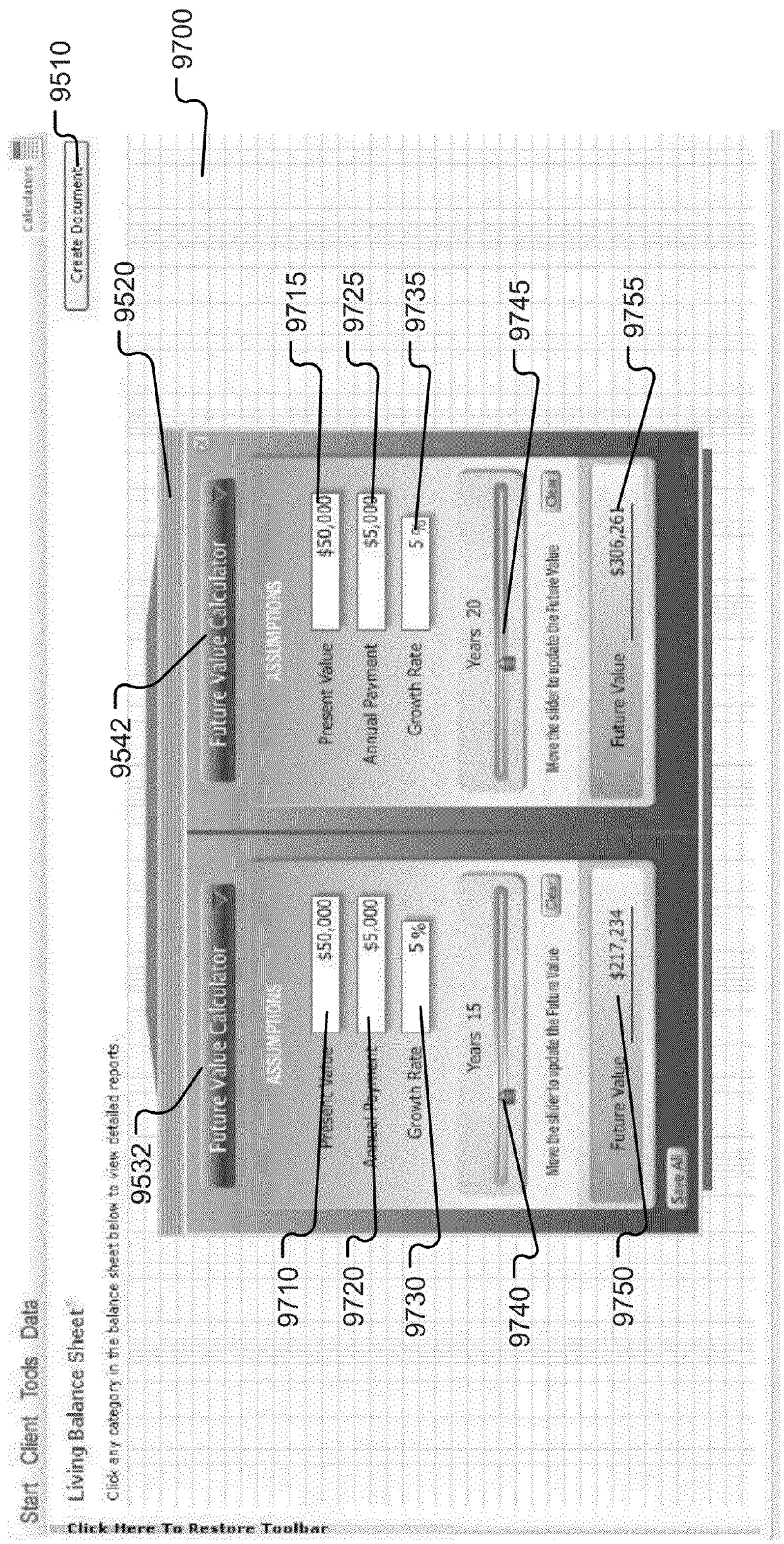

FIG. 97 illustrates an example of the display page 9700, which may be displayed when the future value calculators 9532, 9542 are selected on the display page 9500 (shown in FIG. 95). The future value calculator 9532 (or 9542) may include a present value field 9710 (or 9715), an annual payment field 9720 (or 9725), a growth rate field 9730 (or 9735), a future value year slider 9740 (or 9745), and a future value output field 9750 (or 9755). The fields 9710 (or 9715) and 9720 (or 9725) may be configured to receive a dollar amount and the fields 9730 (or 9735) and 9740 (or 9745) may be configured to receive a percentage amount and year, respectively. The future value calculator 9532 (or 9542) is configured to process the data received in the fields 9710 (or 9715), 9720 (or 9725), 9730 (or 9735), and 9740 (or 9745), calculate a future value based on the processed data and output a future value in the field 9750 (or 9755) based on the processed data.

In FIG. 97, the comparative calculator 9520 shows an example where the future value fields 9750 and 9755 display future value output values that are substantially different for years 15 and 20, respectively, based on entry of the same data in the fields 9710/9715, 9720/9725, and 9730/9735, but a different selection for the year on the year sliders 9740/9745.

Figure 98:
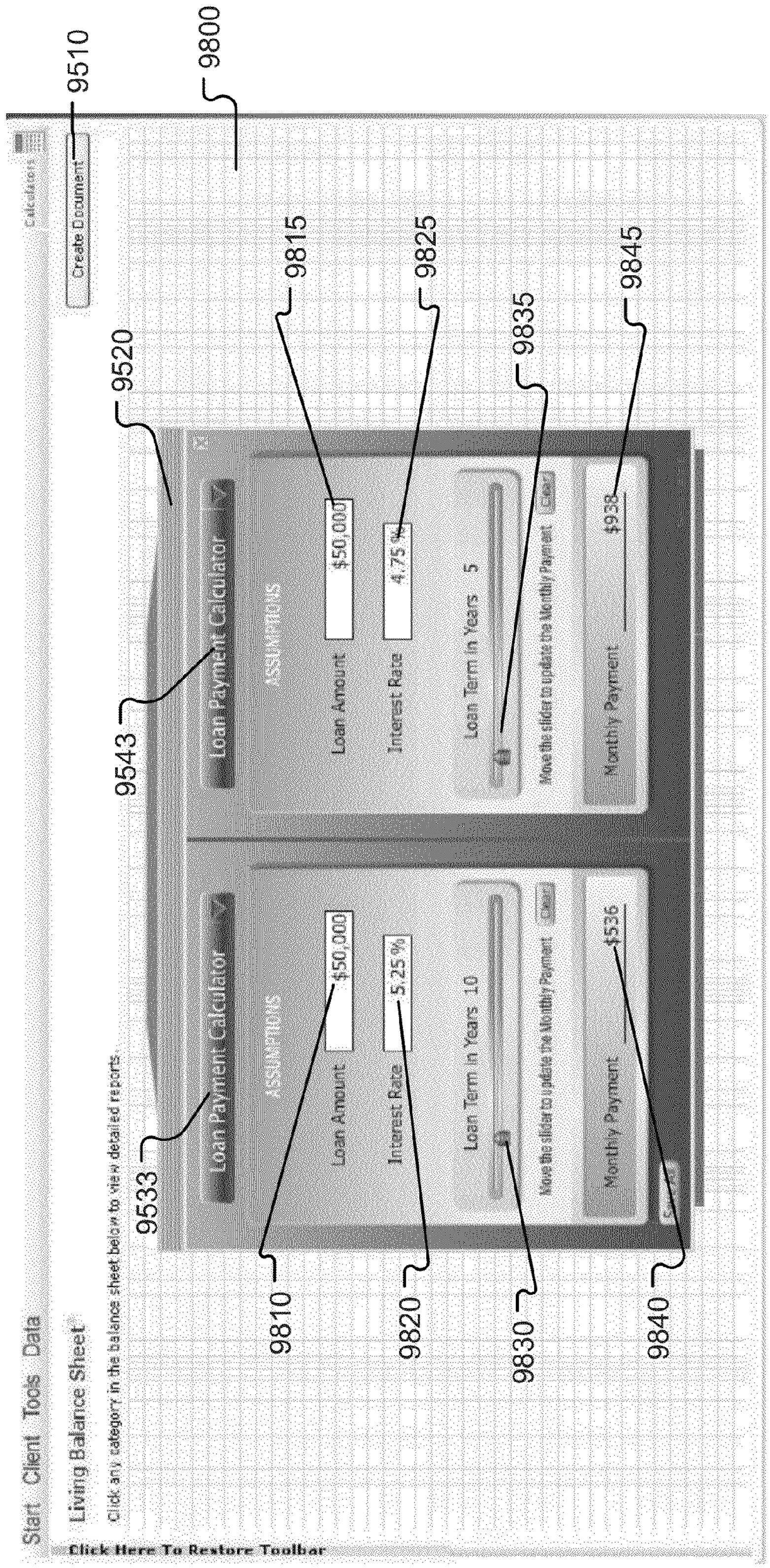

FIG. 98 illustrates an example of the display page 9800, which may be displayed when the loan payment calculators 9533, 9543 are selected on the display page 9500 (shown in FIG. 95). The loan payment calculator 9533 (or 9543) may include a loan amount field 9810 (or 9815), an interest rate field 9820 (or 9825), a loan term in years slider 9830 (or 9835), and a monthly payment amount output field 9840 (or 9845). The fields 9810, 9815 may be configured to receive a dollar amount. The fields 9820, 9825 may be configured to receive a percentage amount. The fields 9830, 9835 may be configured to receive a year, such as, e.g., a year between 1 and 50. The loan payment calculator 9533 (or 9543) is configured to process the data received in the fields 9810 (or 9815), 9820 (or 9825), and 9830 (or 9835), calculate a monthly payment based on the processed data and output the monthly payment in the monthly payment amount output field 9840 (or 9845).

In FIG. 98, the comparative calculator 9520 shows examples of monthly payments (e.g., $536 and $938) in the monthly payment amount output fields 9840, 9845 for different interest rates (e.g., 5.25% and 4.75%) and different loan terms (e.g., 10 years and 5 years) for the same loan amount (e.g., $50,000).

Figure 99:
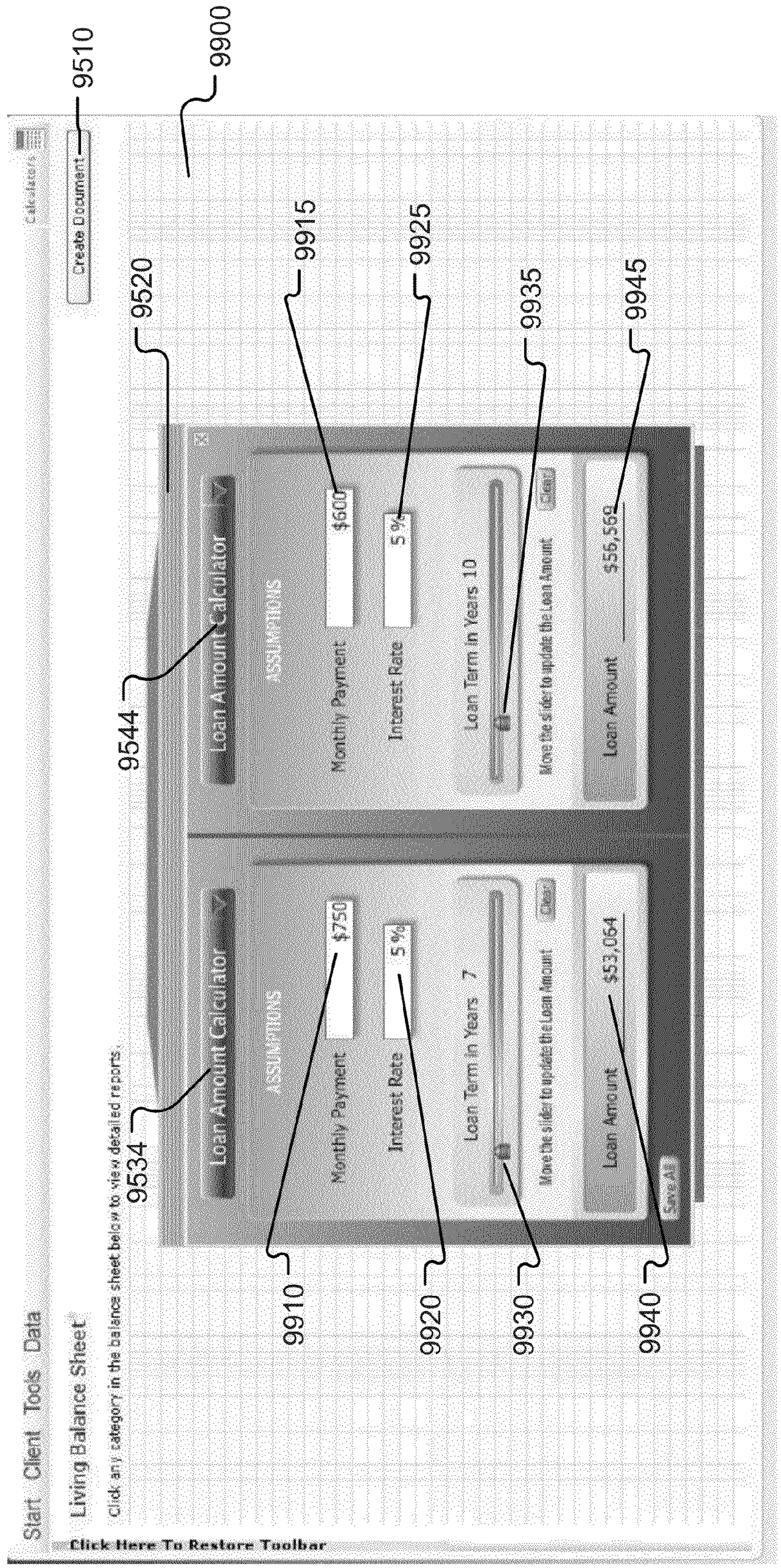

FIG. 99 illustrates an example of the display page 9900, which may be displayed when the loan amount calculators 9534, 9544 are selected on the display page 9500 (shown in FIG. 95). The loan amount calculator 9534 (or 9544) may include a monthly payment field 9910 (or 9915), an interest rate field 9920 (or 9925), a loan term in years slider 9930 (or 9935), and a loan amount output field 9940 (or 9945). The fields 9910, 9915 may be configured to receive a dollar amount. The fields 9920, 9925 may be configured to receive a percentage amount. The fields 9930, 9935 may be configured to receive a year, such as, e.g., a year between 1 and 50. The loan amount calculator 9534 (or 9544) is configured to process the data received in the fields 9910 (or 9915), 9920 (or 9925), and 9930 (or 9935), calculate a loan amount based on the processed data and output the loan amount in the loan amount output field 9940 (or 9945).

In FIG. 99, the comparative calculator 9520 shows examples of loan amounts (e.g., $53,064 and $56,569) in the loan amount output fields 9940, 9945 for the same interest rate (e.g., 5%), but different loan terms (e.g., 7 years and 10 years) and different monthly payments (e.g., $750 and $600).

Figure 100:
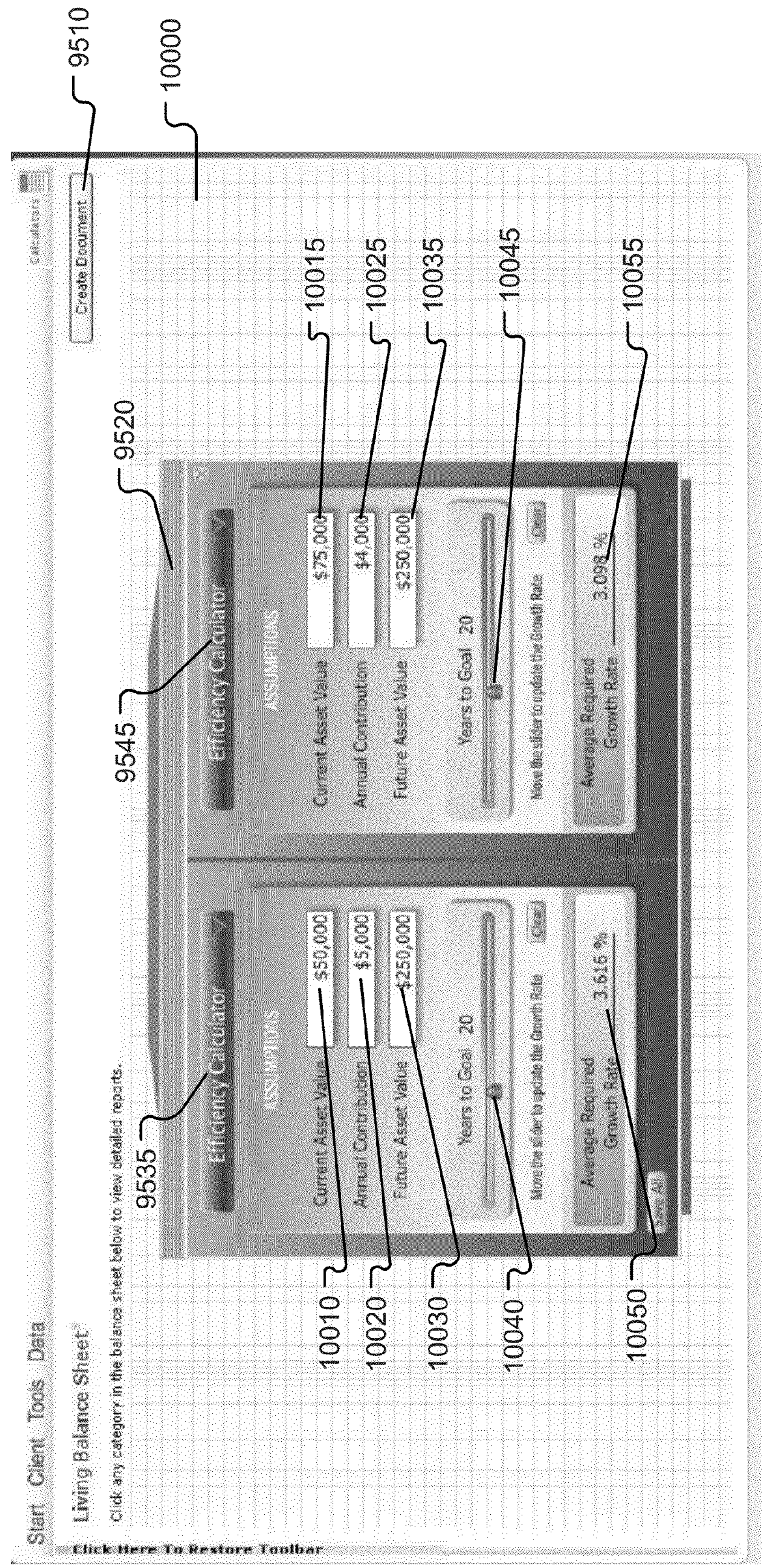

FIG. 100 illustrates an example of the display page 10000, which may be displayed when the efficiency calculators 9535, 9545 are selected on the display page 9500 (shown in FIG. 95). The efficiency calculator 9535 (or 9545) may include a current asset value field 10010 (or 10015), an annual contribution field 10020 (or 10025), a future asset value field 10030 (or 10035), a years to goal slider 10040 (or 10045), and an average required growth rate output field 10050 (or 10055). The fields 10010-10035 may be configured to receive a dollar amount. The fields 10040, 10045 may be configured to receive a year, such as, e.g., a year between 1 and 50. The efficiency calculator 9535 (or 9545) is configured to process the data received in the fields 10010 (or 10015), 10020 (or 10025), 10030 (or 10035), and 10040 (or 10045), calculate an average required growth rate, and output the average required growth rate percentage in the average required growth rate output field 10050 (or 10055).

In FIG. 100, the comparative calculator 9520 shows examples of average required growth rates (e.g., 3.616% and 3.098%) in the average required growth rate output fields 10050, 10055 for the same future asset value (e.g., $250,000) and the same years to goal (e.g., 20), but different current asset values (e.g., $50,000 and $75,000) and different annual contributions (e.g., $5,000 and $4,000).

Figure 101:
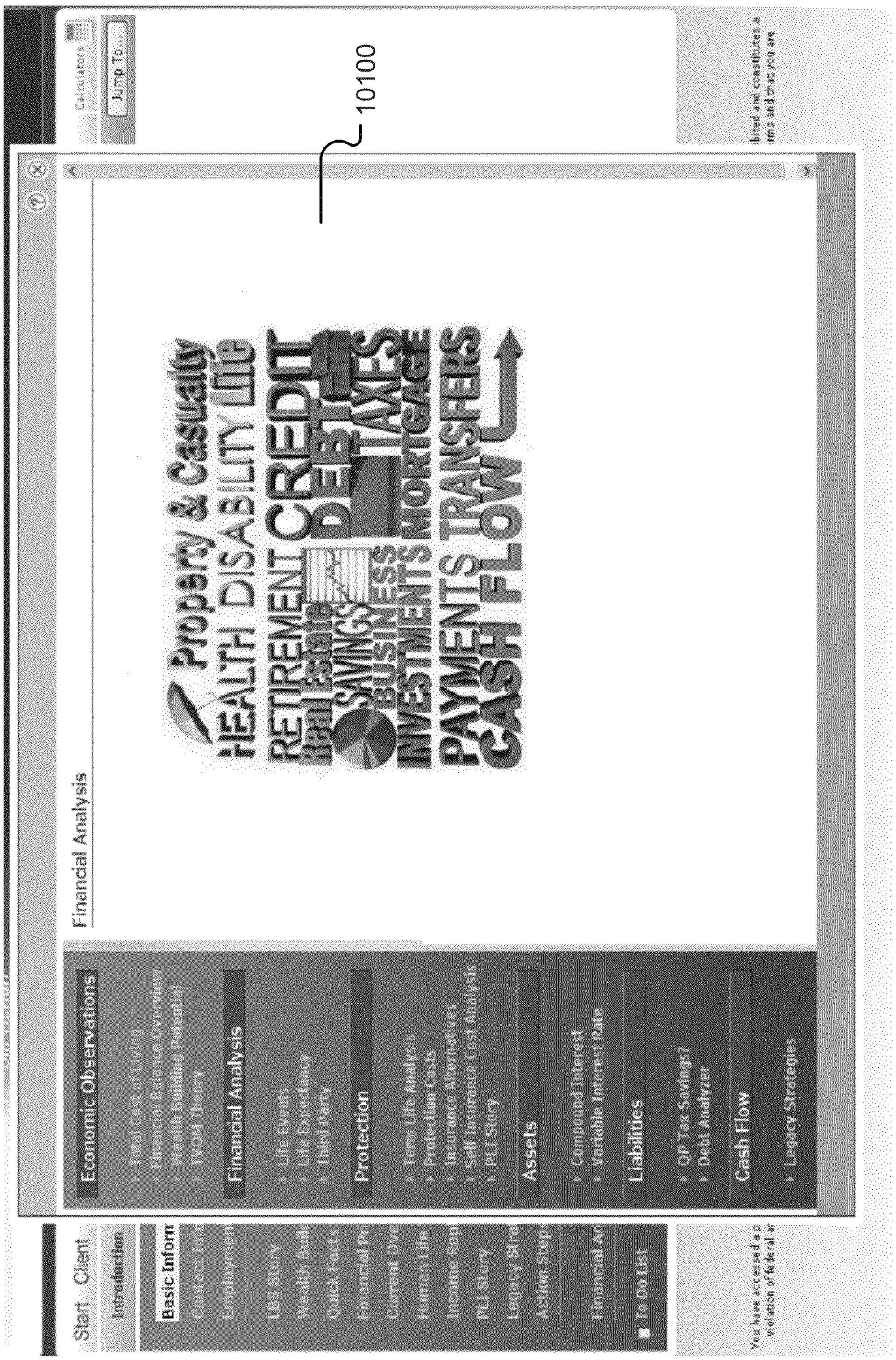
FIG. 101 illustrates an example of a display page that shows a representation of examples of financial issues that may be considered in a financial analysis tool, in accordance with one embodiment of the disclosure.

FIG. 101 illustrates an example of the display page 10100 that shows a representation of examples of financial issues that may be considered in a financial analysis tool, in accordance with one embodiment of the disclosure.

FIGS. 102-113 illustrate examples of display pages 10200-11200 that show aspects of a time value of money (TVOM) theory portion of the financial analysis tool, in accordance with one embodiment of the disclosure. The TVOM theory portion of the financial analysis tool may illustrate a hypothetical impact of opportunity costs over time and a corresponding impact on wealth building results.

Figure 102:
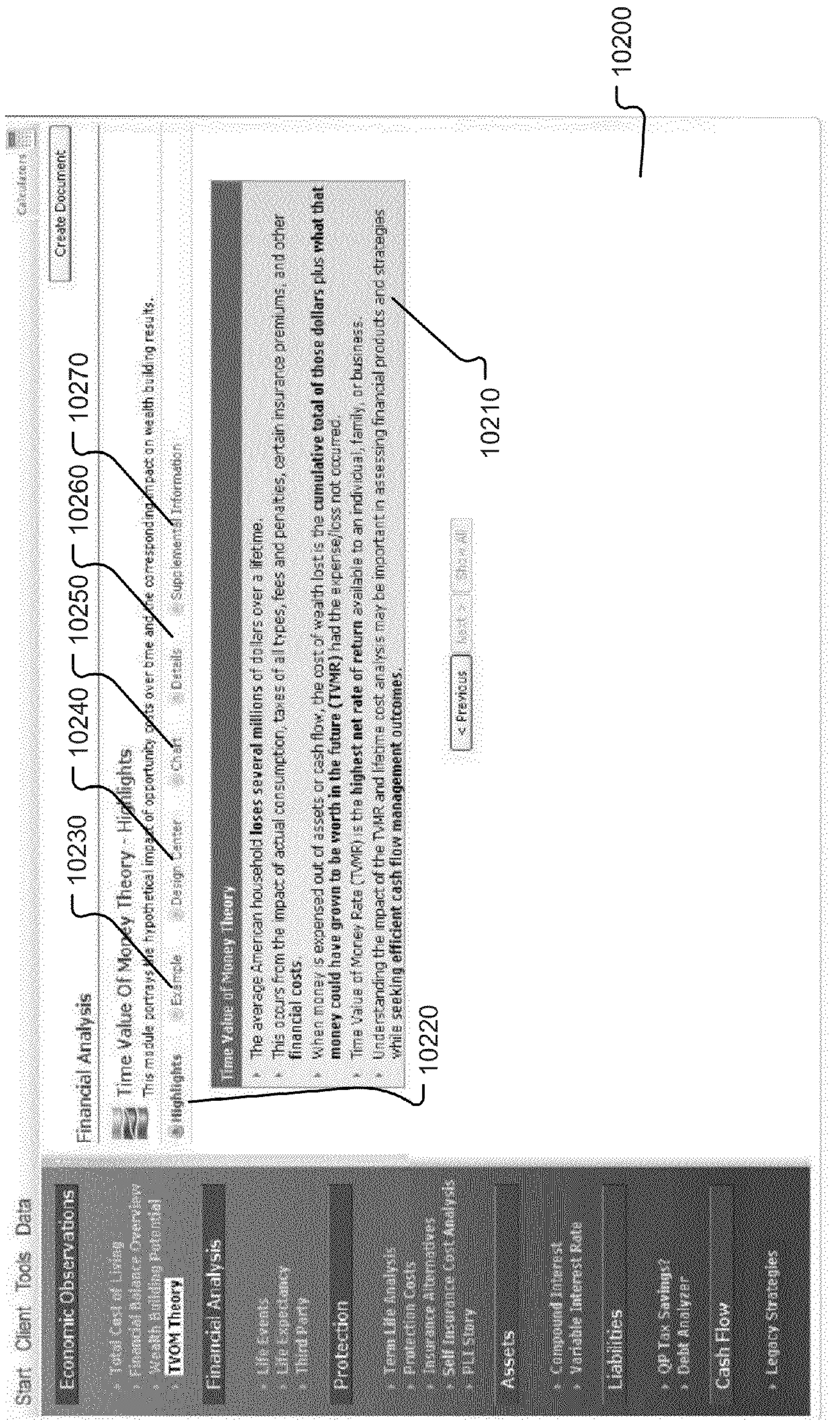

FIG. 102 illustrates an example of the display page 10200, which may include a plurality of TVOM selectors. The plurality of TVOM selectors may include a highlights selector 10220, an example selector 10230, a design center selector 10240, a chart selector 10250, a details selector 10260, and a supplemental income selector 10270. The display page 10200 further includes a highlights message 10210, which may be displayed when the highlights selector 10220 is selected on the display page 10200. The highlights message 10210 may include one or more highlights of TVOM theory, including the particular examples seen in FIG. 102.

Figure 103:
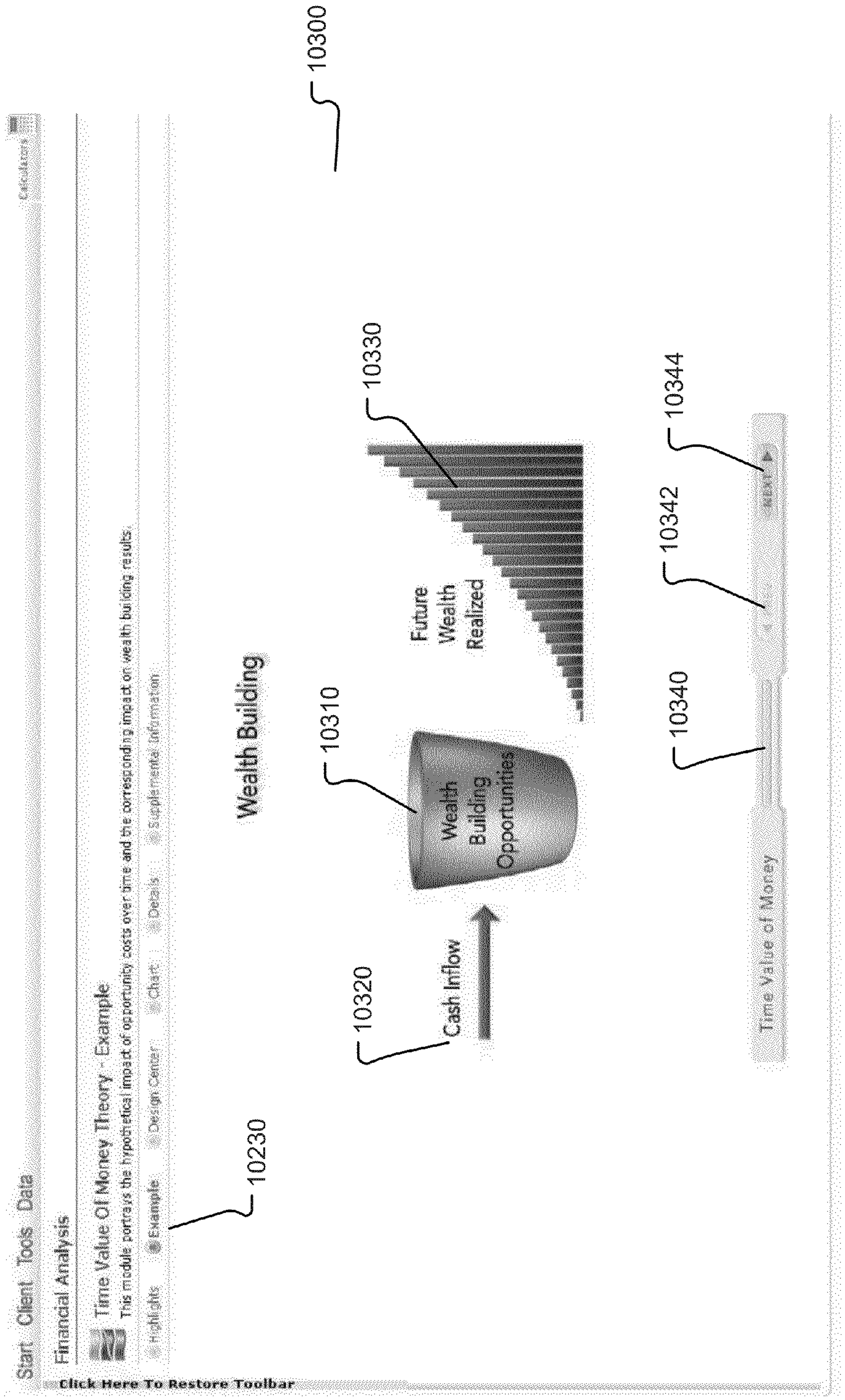

FIG. 103 illustrates an example of the display page 10300, which may be displayed when the example selector 10230 is selected. The display page 10300 may include a wealth building opportunities graphic 10310 (e.g., a container), a cash inflow graphic 10320 (e.g., an arrow), and a future wealth realized graphic 10330 (e.g., a bar graph). The display page 10300 may also include a navigation tool 10340, which may include a “<PREV” selector 10342 and a “NEXT>” selector 10344.

Figure 104:
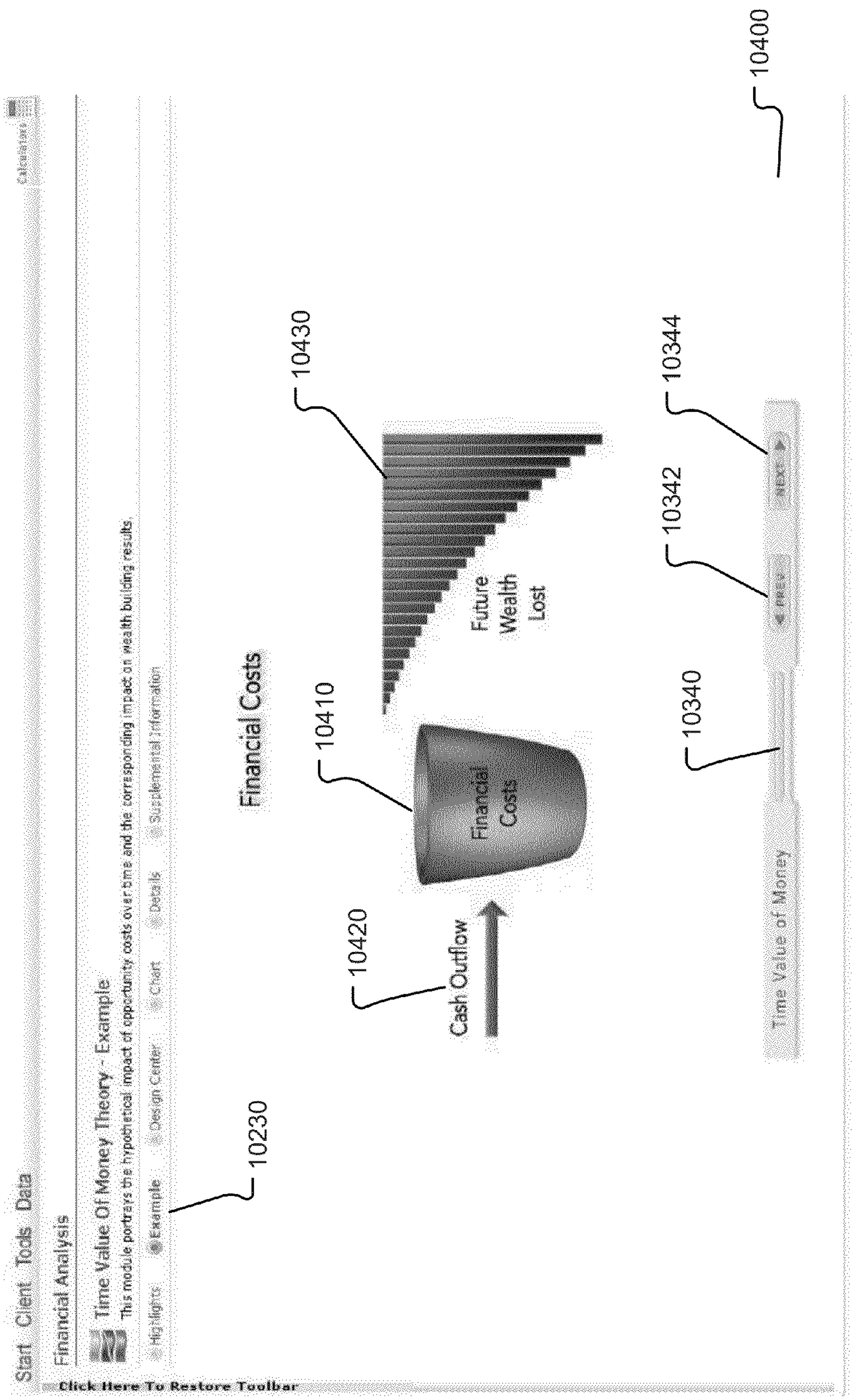

FIG. 104 illustrates an example of the display page 10400, which may be displayed when the example selector 10230 and the “NEXT>” selector 10344 are selected on the display page 10300 (shown in FIG. 103). The display page 10400 may include a financial costs graphic 10410 (e.g., a container), a cash outflow graphic 10420 (e.g., an arrow), and a future wealth lost graphic 10430 (e.g., a bar graph). The display page 10400 may include a navigational tool 10340 to allow a user to transition to a next display page 10300 by selecting, e.g., a button marked “NEXT>” 10344 or a previous display page 10500 by selecting, e.g., a button marked “<PREV” 10342.

Figure 105:
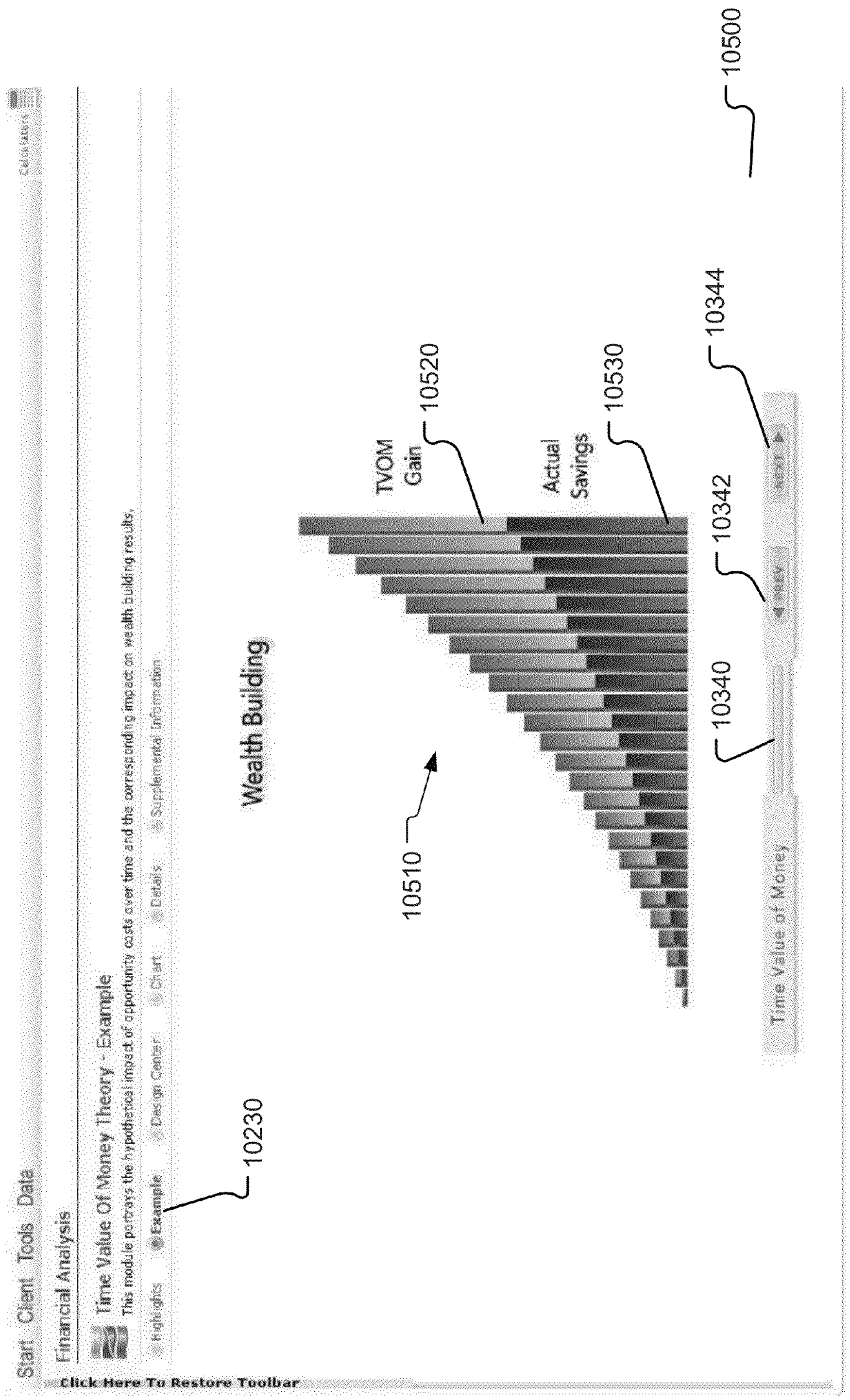

FIG. 105 illustrates an example of the display page 10500, which may be displayed when the example selector 10230 and the “NEXT>” selector 10344 are selected on the display page 10400 (shown in FIG. 104). The display page 10500 may include a wealth building graphic 10510 (e.g., a bar graph), which may include a plurality of graphs. The plurality of graphs may include, e.g., a TVOM gain graphic 10520 (e.g., a bar graph) and an actual savings graphic 10530 (e.g., a bar graph), which may each be presented in a different color, shade, pattern, or the like. The display page 10500 may include a navigational tool 10340 to allow a user to transition to a next display page 10600 by selecting, e.g., a button marked “NEXT>” 10344 or a previous display page 10400 by selecting, e.g., a button marked “<PREV” 10342.

Figure 106:
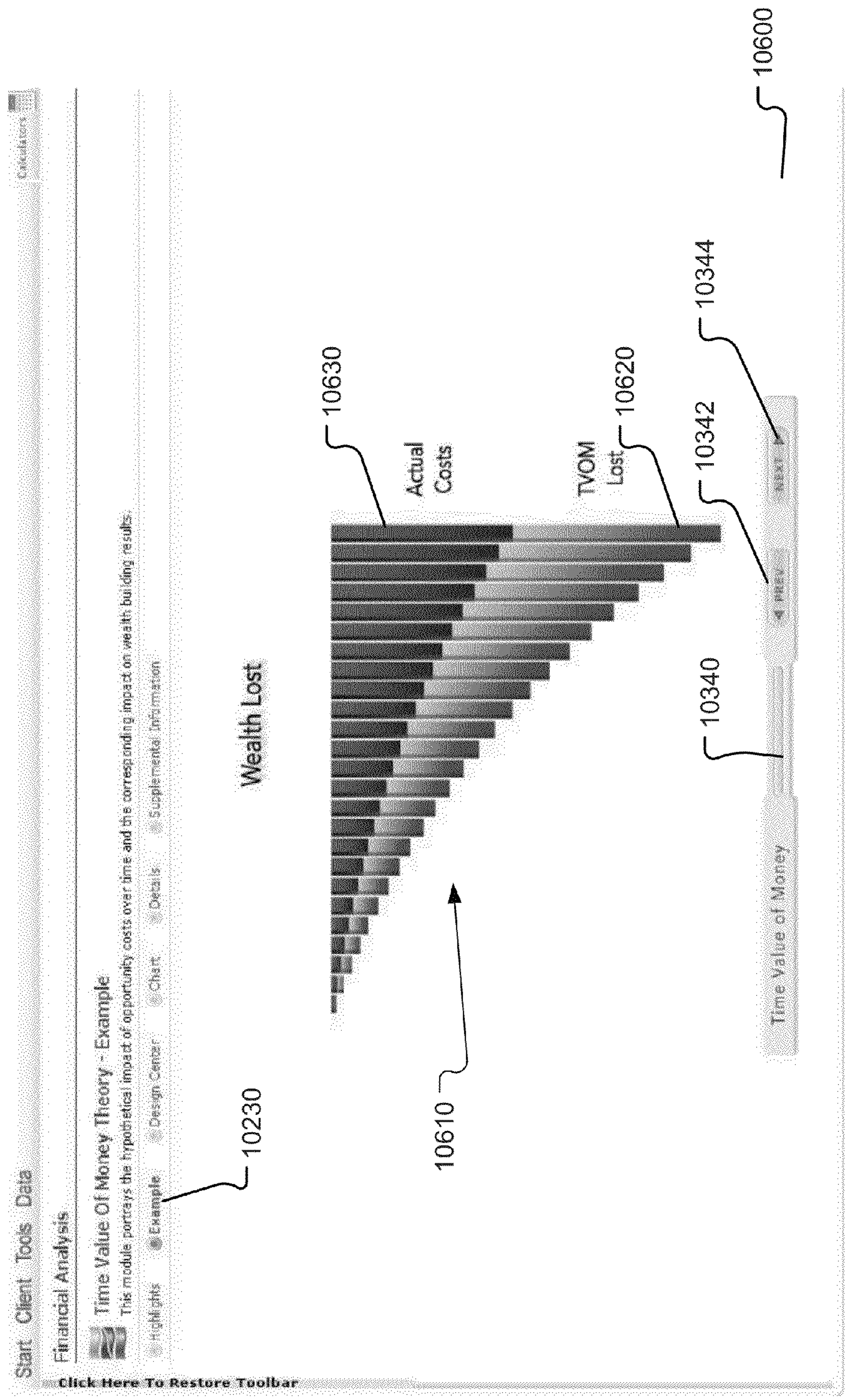

FIG. 106 illustrates an example of the display page 10600, which may be displayed when the example selector 10230 and the “NEXT>” selector 10344 are selected on the display page 10500 (shown in FIG. 105). The display page 10600 may include a wealth lost graphic 10610 (e.g., a bar graph), which may include a plurality of graphs. The plurality of graphs may include, e.g., a TVOM lost graphic 10620 (e.g., a bar graph) and an actual costs graphic 10630 (e.g., a bar graph), which may each be presented in a different color, shade, pattern, or the like. The display page 10600 may include a navigational tool 10340 to allow a user to transition to a next display page 10700 by selecting, e.g., a button marked “NEXT>” 10344 or a previous display page 10500 by selecting, e.g., a button marked “<PREV” 10342.

Figure 107:
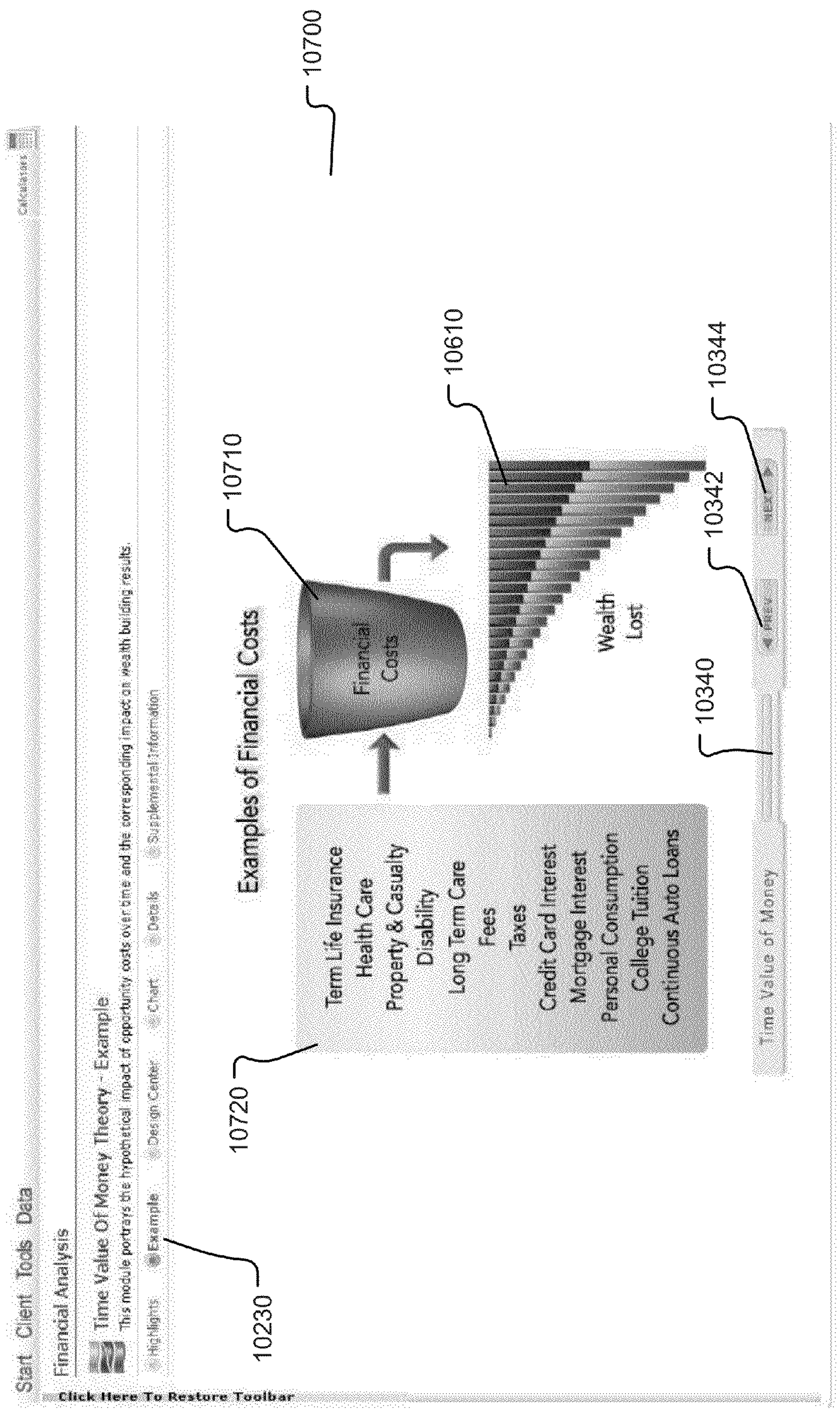

FIG. 107 illustrates an example of the display page 10700, which may be displayed when the example selector 10230 and the “NEXT>” selector 10344 are selected on the display page 10600 (shown in FIG. 106). The display page 10700 may include a financial costs graphic 10710 (e.g., a container), a life expenses graphic 10720 (e.g., a table or a list), and the wealth lost graphic 10610. The life expenses graphic 10720 may include, e.g., term life insurance costs, health care costs, property and casualty costs, disability costs, long term care costs, fees, taxes, credit card interest, mortgage interest, personal consumption, college tuition, continuous auto loans, and the like. The display page 10700 may include a navigational tool 10340 to allow a user to transition to a next display page 10800 by selecting, e.g., a button marked “NEXT>” 10344 or a previous display page 10600 by selecting, e.g., a button marked “<PREV” 10342.

Figure 108:
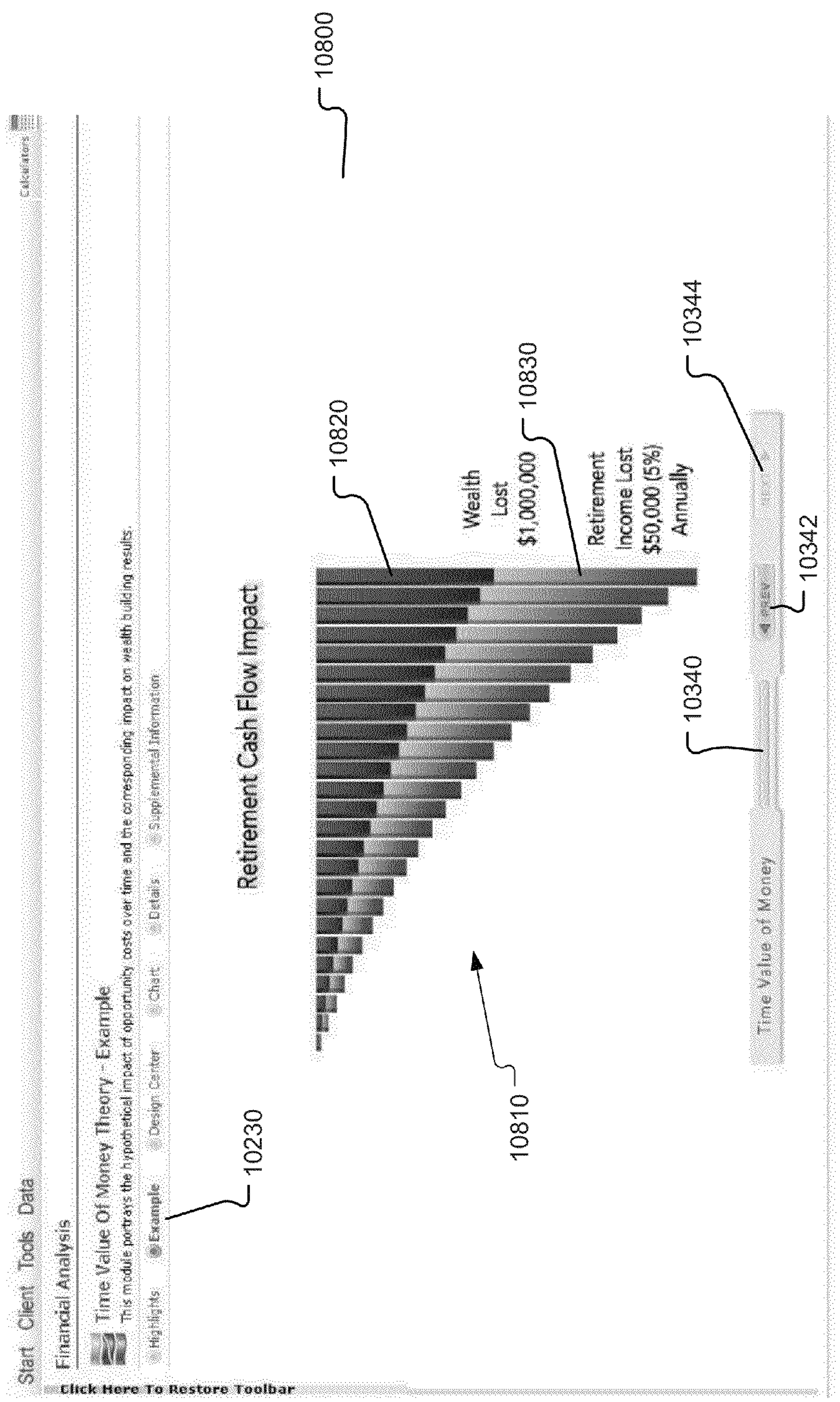

FIG. 108 illustrates an example of the display page 10800, which may be displayed when the example selector 10230 and the “NEXT>” selector 10344 are selected on the display page 10700 (shown in FIG. 107). The display page 10800 may include a retirement cash flow impact graphic 10810 (e.g., a bar graph), which may include a plurality of graphs. The plurality of graphs may include, e.g., a wealth lost graphic 10820 (e.g., a bar graph) and a retirement income lost graphic 10830 (e.g., a bar graph), which may each be presented in a different color, shade, pattern, or the like. In the example shown in FIG. 108, the wealth lost may total, e.g., $1,000,000 and the retirement income lost may be, e.g., $50,000 annually on a return of, e.g., 5%. The display page 10800 may include a navigational tool 10340 to allow a user to transition a previous display page 10700 by selecting, e.g., a button marked “<PREV” 10342.

Figure 109:
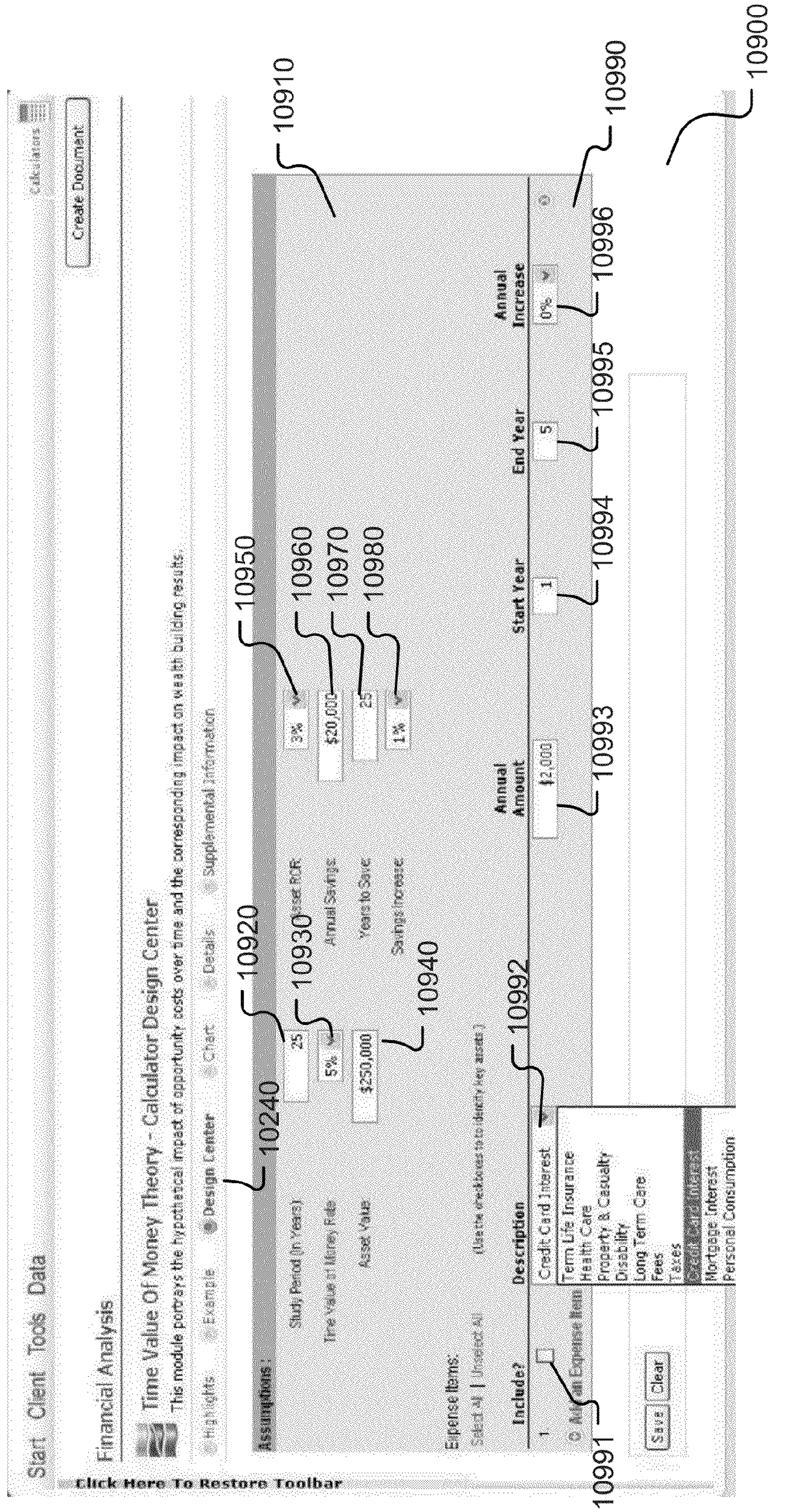

FIG. 109 illustrates an example of the display page 10900, which may be displayed when the design selector 10240 is selected. The display page 10900 may include a calculator design center assumptions region 10910, which may include a study period (e.g., in years) field 10920, a TVOM rate field 10930, an asset value field 10940, an asset rate-of-return (ROR) field 10950, an annual savings field 10960, a years to save field 10970, and a savings increase rate field 10980. The calculator design center assumptions region 10910 may further include an add-an-expense-item region 10990. When the add-an-expense-item region 10990 is selected, a window(s) may be displayed with a plurality of data entry fields, including an include option field 10991, a description field 10992, an annual amount field 10993, a start year field 10994, an end year field 10995, and an annual increase rate field 10996. The description field 10992 may include. e.g., a drop down box. The drop down box may include, e.g., term life insurance, health care, property & casualty, disability, long term care, fees, taxes, credit card interest, mortgage interest, personal consumption, college tuition, continuous auto loans, other, or the like.

Figure 110:
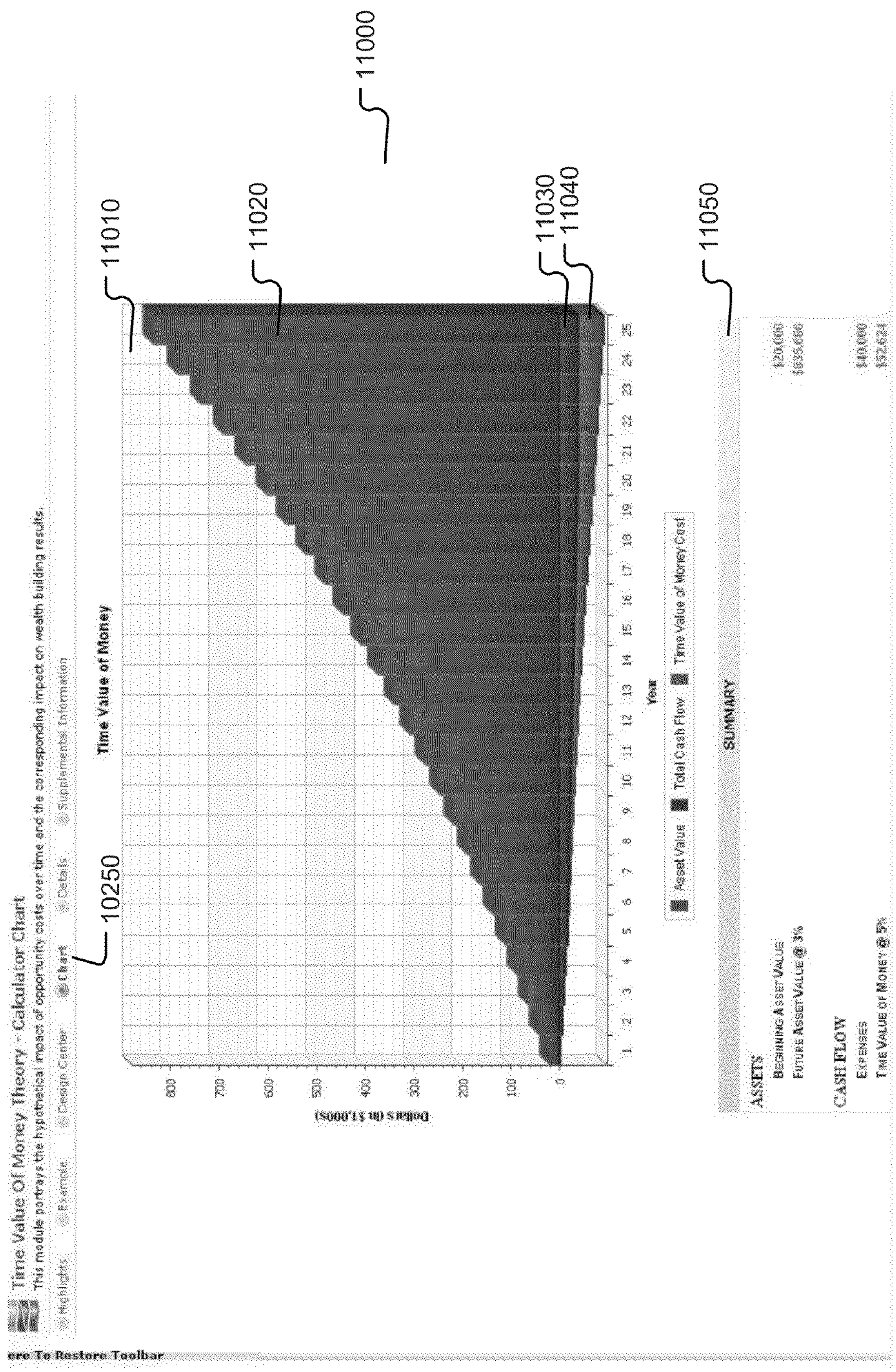

FIG. 110 illustrates an example of the display page 11000, which may be displayed after, e.g., a user has selected chart selector 10250 and completed one or more fields in the calculator design center assumptions region 10910. The display page 11000 may include a TVOM chart 11010, which may include a plurality of graphs (e.g., bar graphs). The plurality of bar graphs may include an asset value graph 11020, a total cash flow graph 11030, and a TVOM cost graph 11040, which may each be presented in a different color, shade, pattern, or the like. The display page 11000 may further include a summary region 11050, which may include a summary of assets (e.g., beginning asset value and a future asset value at defined interest rate, such as, e.g., 3%) and a summary of cash flow (e.g., expenses and TVOM at a defined interest rate, such as, e.g., 5%).

FIG. 111 illustrates an example of the display page 11100, which may be displayed when the details selector 10260 is selected. Display page 11100 may include a detailed view of one or more aspects of the chart data displayed in the chart 11010 on display page 11000. For example, display page 11100 may include an asset value chart (e.g., table or listing) 11120. The asset value chart 11120 may information such as, e.g., a beginning of the year (BOY) asset value 11122, a BOY annual savings 11124, and an end of year (EOY) asset value 11126. The display page 11100 may also include an expense outlay with TVOM Cost chart (e.g., table or listing) 11130. The expense outlay with TVOM Cost chart may include information such as, e.g., a BOY total cash outflows and TVOM cost 11132, an EOY annual expense outflows 11134, an EOY annual expense outflows 11135, an EOY annual TVOM cost 11136, an EOY total TVOM cost 11139, and a total cash outflows and TVOM cost 11138. Every row in each respective chart may be organized by predetermined increments of time 11110 (e.g., daily, weekly, monthly, yearly, etc.).

Figure 112:
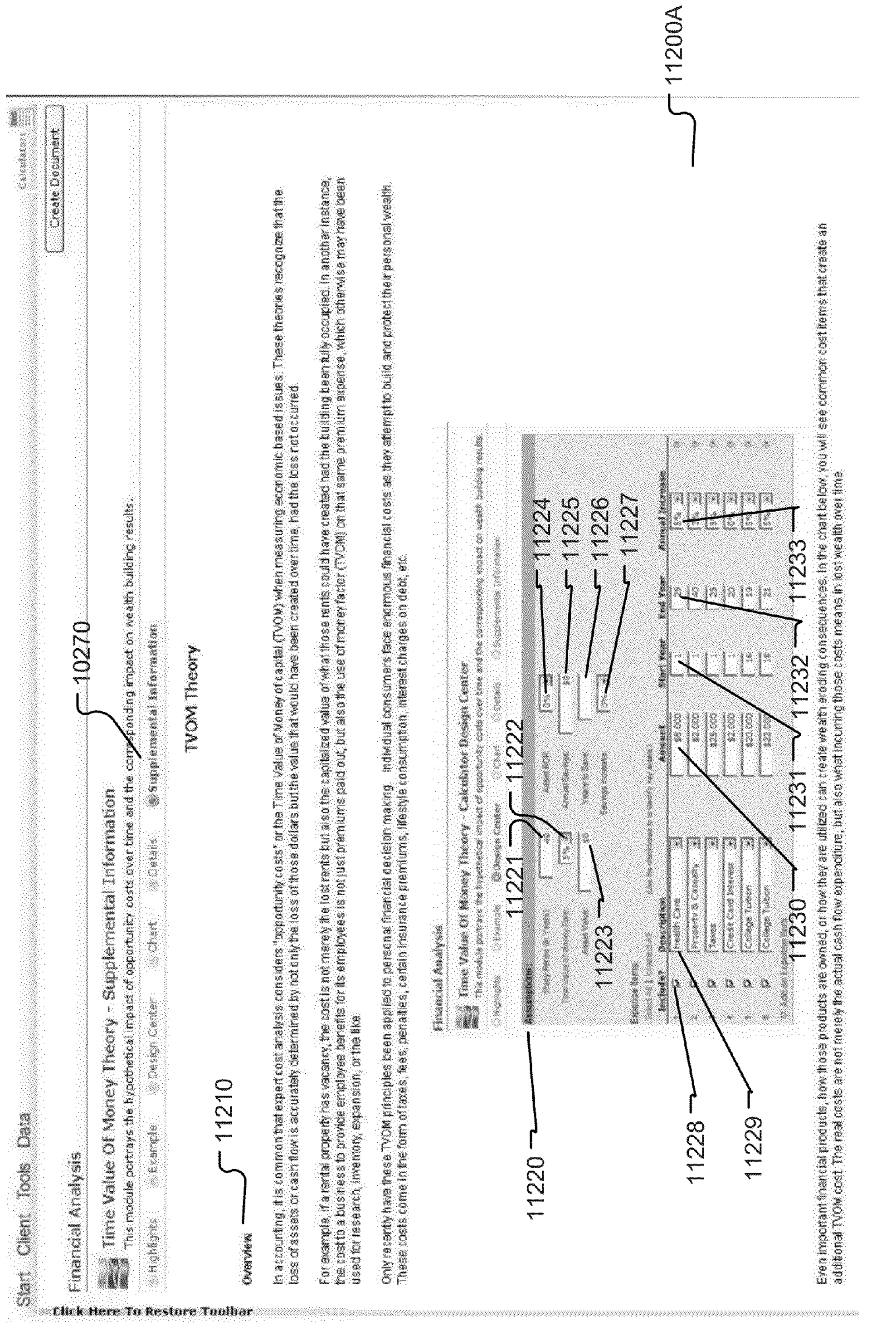

FIG. 112 illustrates an example of the display page 11200A, which may be displayed when the supplemental information selector 10270 is selected. The supplemental information provided on display page 11200A may include an overview of TVOM Theory 11210. The supplemental information may also include a calculator design center assumptions region 11220, which may include a study period (e.g., in years) field 11221, a TVOM rate field 11222, an asset value field 11223, an asset rate-of-return (ROR) field 11224, an annual savings field 11225, a years to save field 11226, and a savings increase rate field 11227. The calculator design center assumptions region 11220 may further include an add-an-expense-item region that includes an option field 11228, a description field 11229, an annual amount field 11230, a start year field 11231, an end year field 11232, and an annual increase rate field 11233. A user may use a device, e.g., a mouse, keyboard, touchscreen, or the like, to interact with display page 11200A. This interaction may include, e.g., a scrolling command which scrolls down display page 11200A to reveal display page 11200B.

FIG. 113 illustrates an example of the display page 11200B, which may be displayed after a user scrolls downwards while viewing display page 11200A. Display page 11200B may provide additional supplemental information regarding TVOM theory. The additional information may include information related to selecting a TVOM Rate 11240, guidance on identifying, calculating, and recovering eroding costs 11242, and may provide specific wealth building choices 11244. In addition, display page 11200B may visually represent principles of TVOM theory by incorporating TVOM chart 11260 into the supplemental information. The TVOM chart may include a plurality of graphs (e.g., bar graphs), which may include a total cash flow graph (e.g., bar graph) 11270, a TVOM graph (e.g., bar graph) 11280, and an asset value bar graph (e.g., bar graph) (not shown), which may each be presented in a different color, shade, pattern, or the like. Display page 11200B may also provide a summary 11290 which provides a summary of assets (e.g., beginning asset value and a future asset value at a defined interest rate, such as, e.g., 0%) and a summary of cash flow (e.g., expenses, TVOM at a defined interest rate, such as, e.g., 5%, and total costs).

FIGS. 114-128 illustrate examples of display pages that show aspects of a term life analysis portion of the financial analysis tool, in accordance with one embodiment of the disclosure. The term life analysis portion of the financial analysis tool may illustrate the value of term life insurance and also identifies the possible costs associated with maintaining this protection over an extended period of time.

Figure 114:
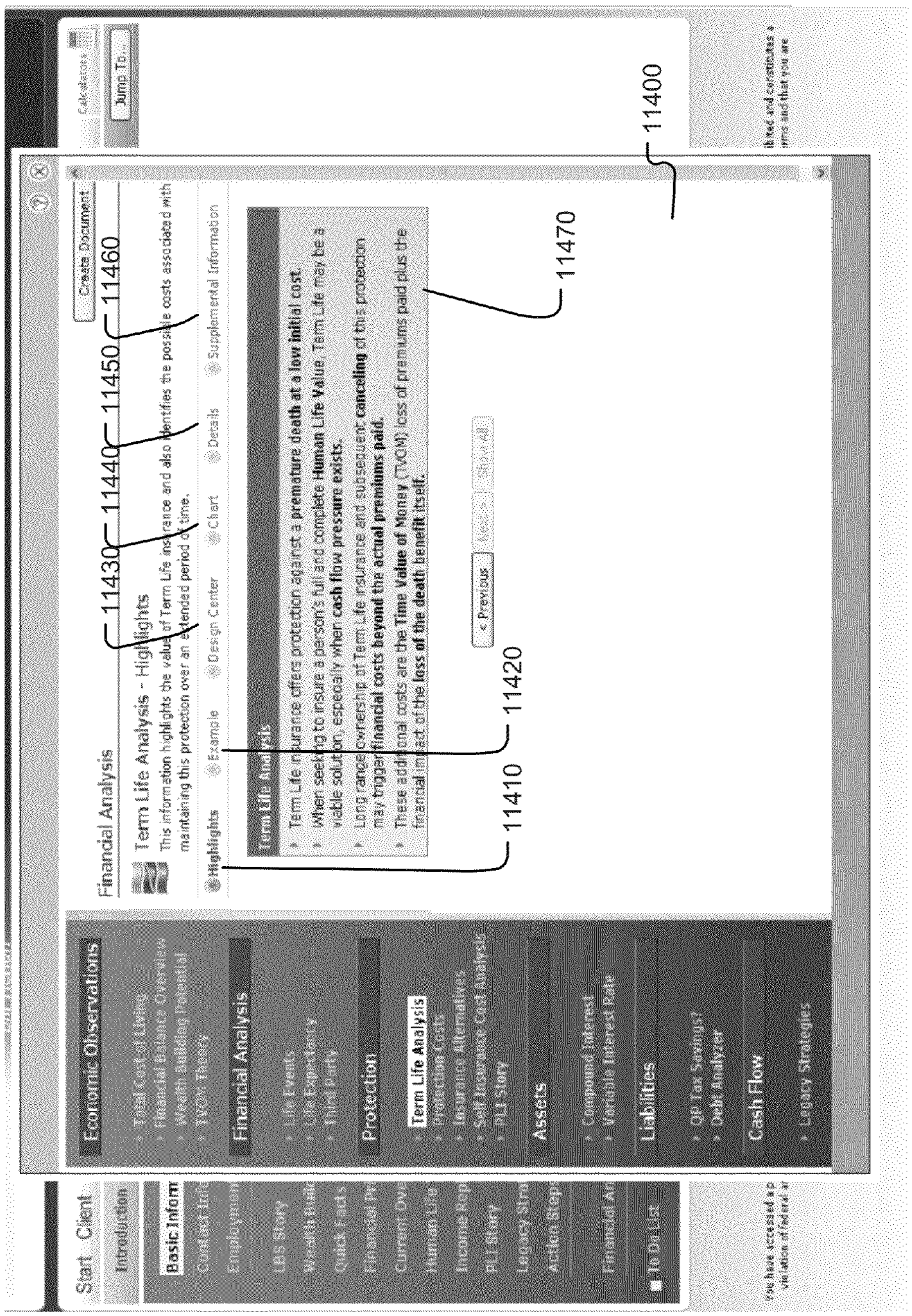
FIGS. 114-128 illustrate examples of display pages that show aspects of a term life analysis portion of the financial analysis tool, in accordance with one embodiment of the disclosure.

FIG. 114 illustrates an example of the display page 11400, which may include a plurality of term life analysis selectors. The plurality of term life analysis selectors may include a highlights selector 11410, an example selector 11420, a design center selector 11430, a chart selector 11440, a details selector 11450, and a supplemental information selector 11460. The display page 11400 may further include a highlights message 11470, which may be displayed when the highlight selector 11410 is selected on the display page 11400. The highlights message 11470 may include one or more highlights of term life analysis, including the particular examples provided in FIG. 114.

Figure 115:
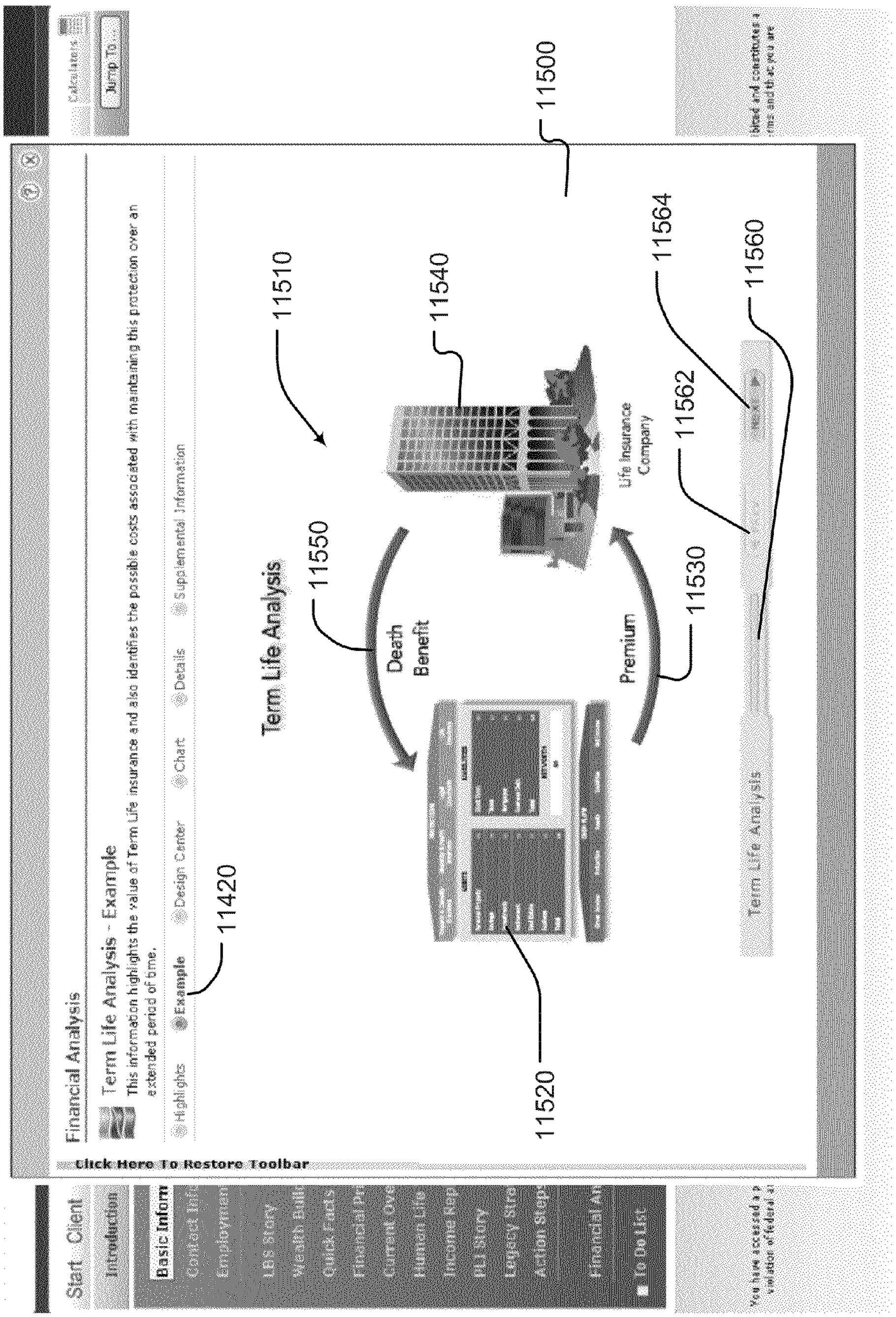

FIG. 115 illustrates an example of the display page 11500, which may be displayed when the example selector 11420 is selected. The display page 11500 may include an example of a visual representation of term life analysis 11510. The visual representation of term life analysis 11510 may include a living balance sheet graphic 11520 (e.g., screen shot showing four interdependent financial domains), a premium graphic 11530 (e.g., an arrow), a life insurance company graphic 11540 (e.g., an office building), and a death benefit graphic 11550 (e.g., an arrow). The display page 11500 may also include a navigation tool 11560, which may include a "<PREV" selector 11562 and a "NEXT>" selector 11564.

Figure 116:
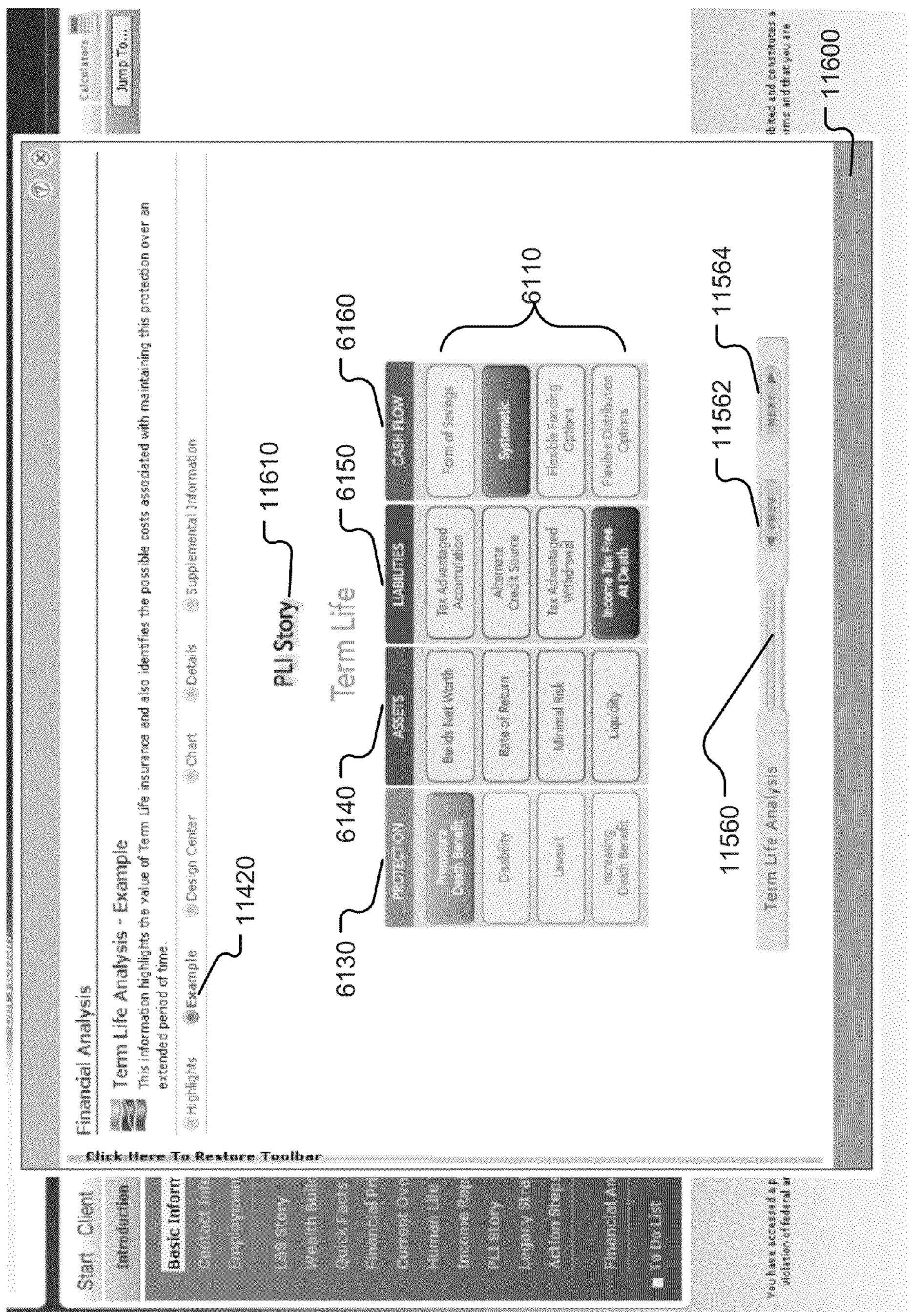

FIG. 116 illustrates an example of the display page 11600, which may be displayed when the example selector 11420 and the "NEXT>" selector 11564 are selected on the display page 11500 (shown in FIG. 115). The display page 11600 may include a personal liability insurance (PLI) story section 11610 of the term life analysis portion of the financial analysis tool. The PLI story portion 11610 may include an overview of the benefits and primary features 6110 of term life insurance for each of the four interdependent financial domains, including the protection domain 6130, the assets domain 6140, the liabilities domain 6150, and the cash flow domain 6160. The benefits and primary features of 6110 may include, e.g., premature death benefit, disability, lawsuit, increasing death benefit, builds net worth, rate of return, minimal risk, liquidity, tax advantaged accumulation, alternate credit source, tax advantaged withdrawal, income tax free at death, form of savings, systematic, flexible funding options, flexible distribution options, or the like. The plurality of benefits and primary features may be displayed in one or more columns of each of the four interdependent domains 6130-6160.

The display page 11600 may also include a navigation tool 11560 to allow a user to transition to a next display page 11700 by selecting, e.g., a button marked "NEXT>" 11564 or a previous display page 11500 by selecting, e.g., a button marked "<PREV" 11562.

Figure 117:
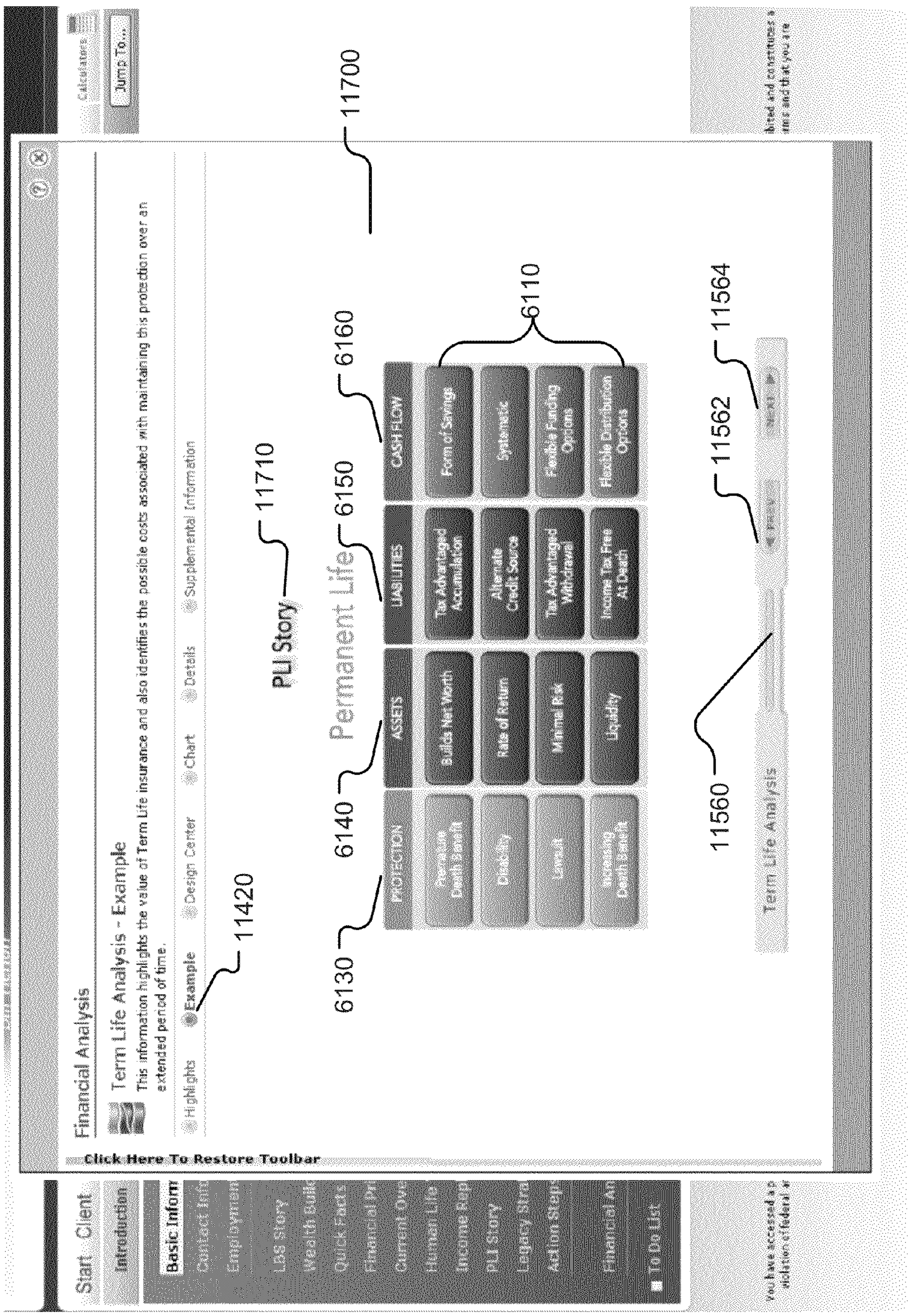

FIG. 117 illustrates an example of the display page 11700, which may be displayed when the example selector 11420 and the "NEXT>" selector 11564 are selected on the display page 11600 (shown in FIG. 116). The display page 11700 may include a personal liability insurance (PLI) story section 11610 of the term life analysis portion of the financial analysis tool. The PLI story portion 11710 may include an overview of the benefits and primary features 6110 of term life insurance for each of the four interdependent financial domains, including the protection domain 6130, the assets domain 6140, the liabilities domain 6150, and the cash flow domain 6160. The benefits and primary features of 6110 include, e.g., premature death benefit, disability, lawsuit, increasing death benefit, builds net worth, rate of return, minimal risk, liquidity, tax advantaged accumulation, alternate credit source, tax advantaged withdrawal, income tax free at death, form of savings, systematic, flexible funding options, flexible distribution options, or the like. The plurality of benefits and primary features may be displayed in one or more columns of each of the four interdependent domains 6130-6160. The display page 11700 may include a navigation tool 11560 to allow a user to transition to a next display page 11800 by selecting, e.g., a button marked "NEXT>" 11564 or a previous display page 11600 by selecting, e.g., a button marked "<PREV" 11562.

Figure 118:
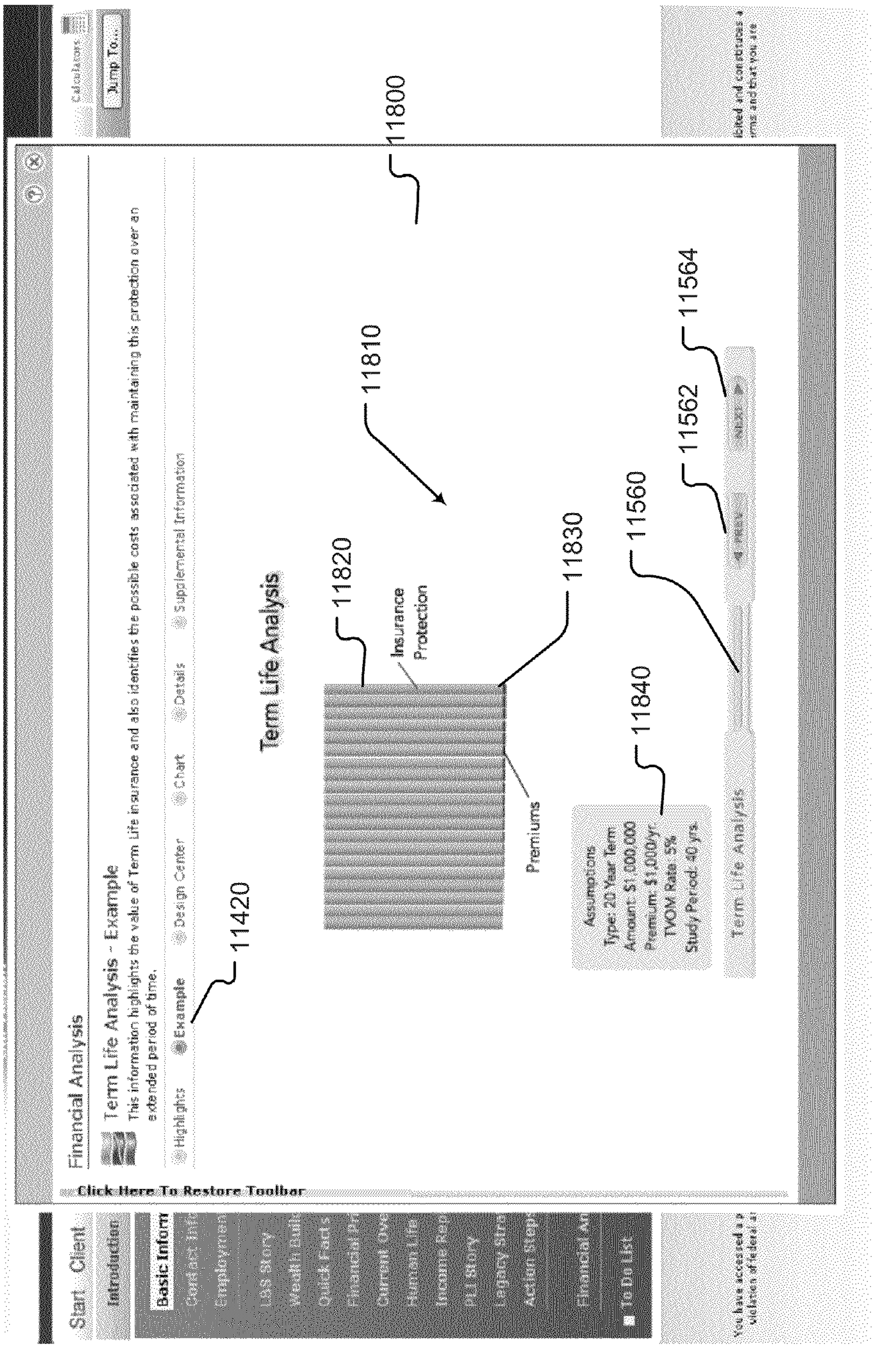

FIG. 118 illustrates an example of the display page 11800, which may be displayed when the example selector 11420 and the "NEXT>" selector 11564 are selected on the display page 11700 (shown in FIG. 117). The display page 11800 may include a visual representation of a term life analysis 11810 which highlights a comparison between insurance protection and the associated premium. The visual representation 11810 displays this comparison by including an insurance protection graph 11820 (e.g., bar graph) and a premium graph 11830 (e.g., bar graph). Each of the graphs may be generated based, at least in part, on the assumptions displayed at 11840. The assumptions may include, e.g., a type (e.g., 20 year term), an amount (e.g., $1,000,000), a premium (e.g., $1,000/yr.), a TVOM rate (e.g., 5%), a study period (e.g., 40 years), or the like. The display page 11800 may include a navigation tool 11560 to allow a user to transition to a next display page 11900 by selecting, e.g., a button marked "NEXT>" 11564 or a previous display page 11700 by selecting, e.g., a button marked "<PREV" 11562.

Figure 119:
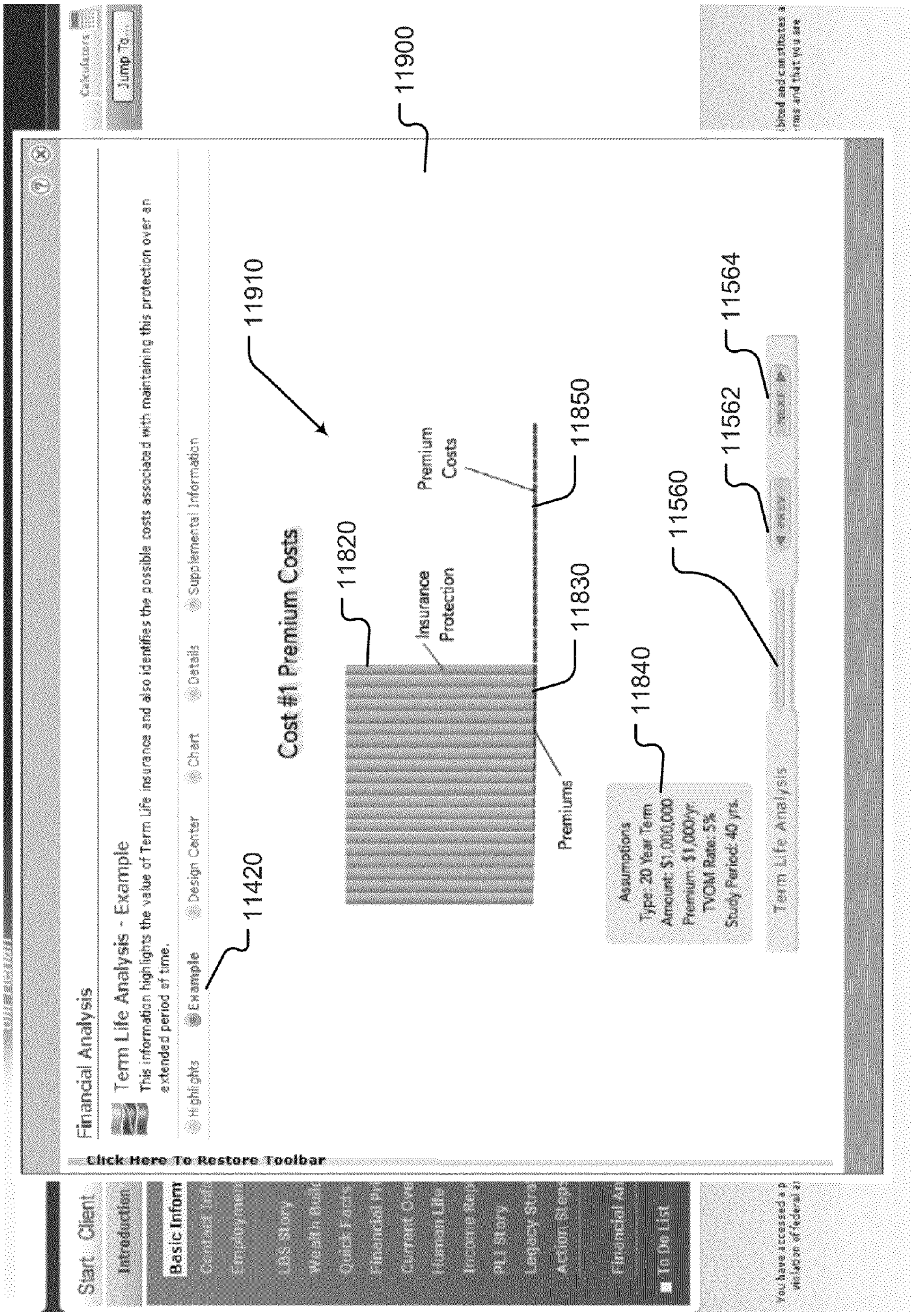

FIG. 119 illustrates an example of the display page 11900, which may be displayed when the example selector 11420 and the "NEXT>" selector 11564 are selected on the display page 11800 (shown in FIG. 118). The display page 11900 may include a visual representation of a term life analysis 11910 which places an emphasis on premium costs. The visual representation 11910 may include an insurance protection graph 11820 (e.g., bar graph), a premium graph 11830 (e.g., bar graph), and a premium cost graph 11850 (e.g., bar graph). Each of the graphs may be generated based, at least in part, on the assumptions provided at 11840. The assumptions may include, e.g., a type (e.g., 20 year term), an amount (e.g., $1,000,000), a premium (e.g., $1,000/yr.), a TVOM rate (e.g., 5%), a study period (e.g., 40 years), or the like. The display page 11900 may include a navigation tool 11560 to allow a user to transition to a next display page 12000 by selecting, e.g., a button marked "NEXT>" 11564 or a previous display page 11800 by selecting, e.g., a button marked "<PREV" 11562.

Figure 120:
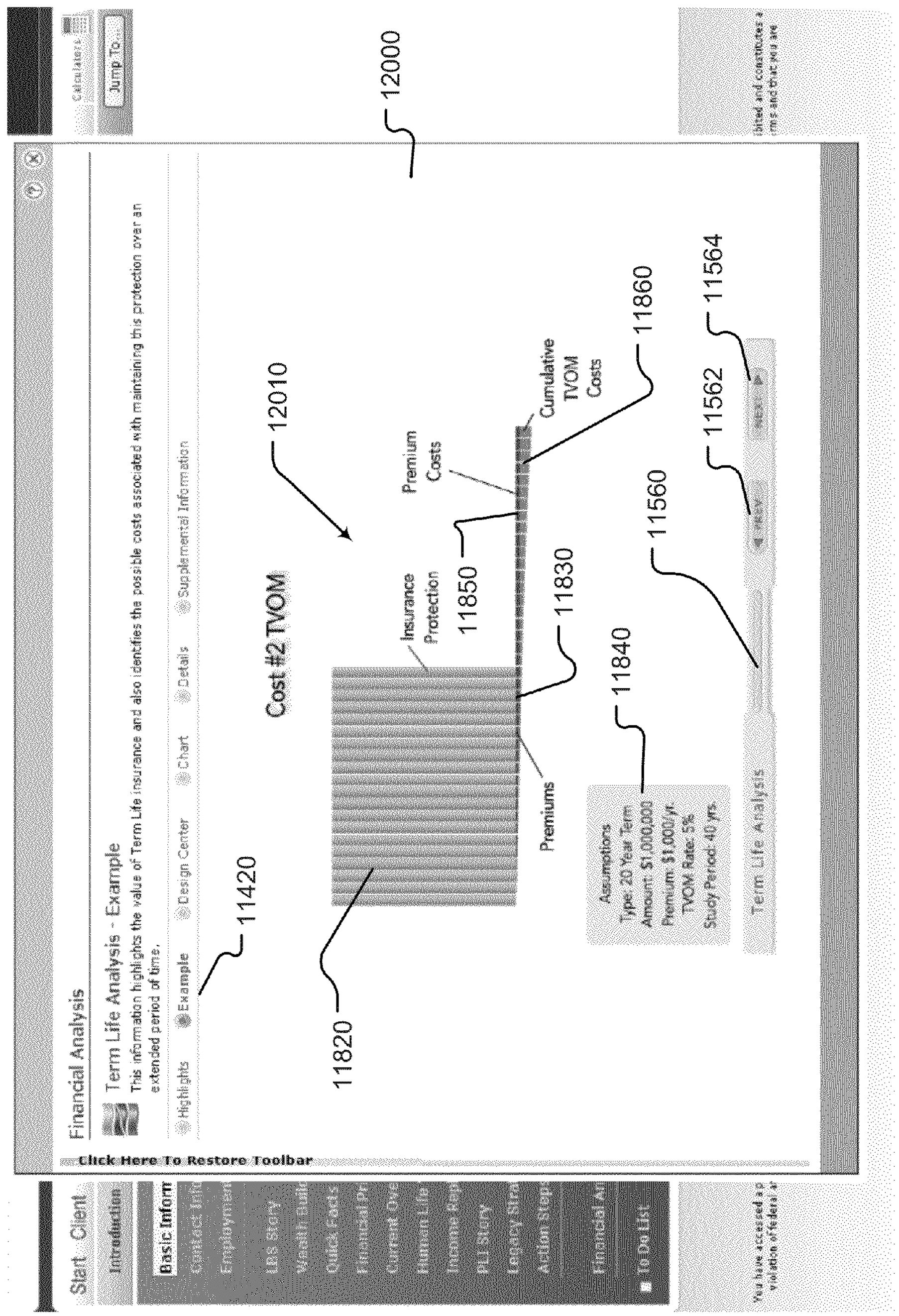

FIG. 120 illustrates an example of the display page 12000, which may be displayed when the example selector 11420 and the "NEXT>" selector 11564 are selected on the display page 11900 (shown in FIG. 119). The display page 12000 may include a visual representation of a term life analysis 12010 which places an emphasis on TVOM costs. The visual representation 12010 includes an insurance protection graph 11820 (e.g., bar graph), a premium graph 11830 (e.g., bar graph), a premium cost graph 11850 (e.g., bar graph), and a cumulative TVOM cost graph 11860 (e.g., bar graph). Each of the graphs is generated based, at least in part, on the assumptions provided at 11840. The assumptions may include, e.g., a type (e.g., 20 year term), an amount (e.g., $1,000,000), a premium (e.g., $1,000/yr.), a TVOM rate (e.g., 5%), a study period (e.g., 40 years), or the like. The display page 12000 may include a navigation tool 11560 to allow a user to transition to a next display page 12100 by selecting, e.g., a button marked "NEXT>" or a previous display page 11900 by selecting, e.g., a button marked "<PREV".

Figure 121:
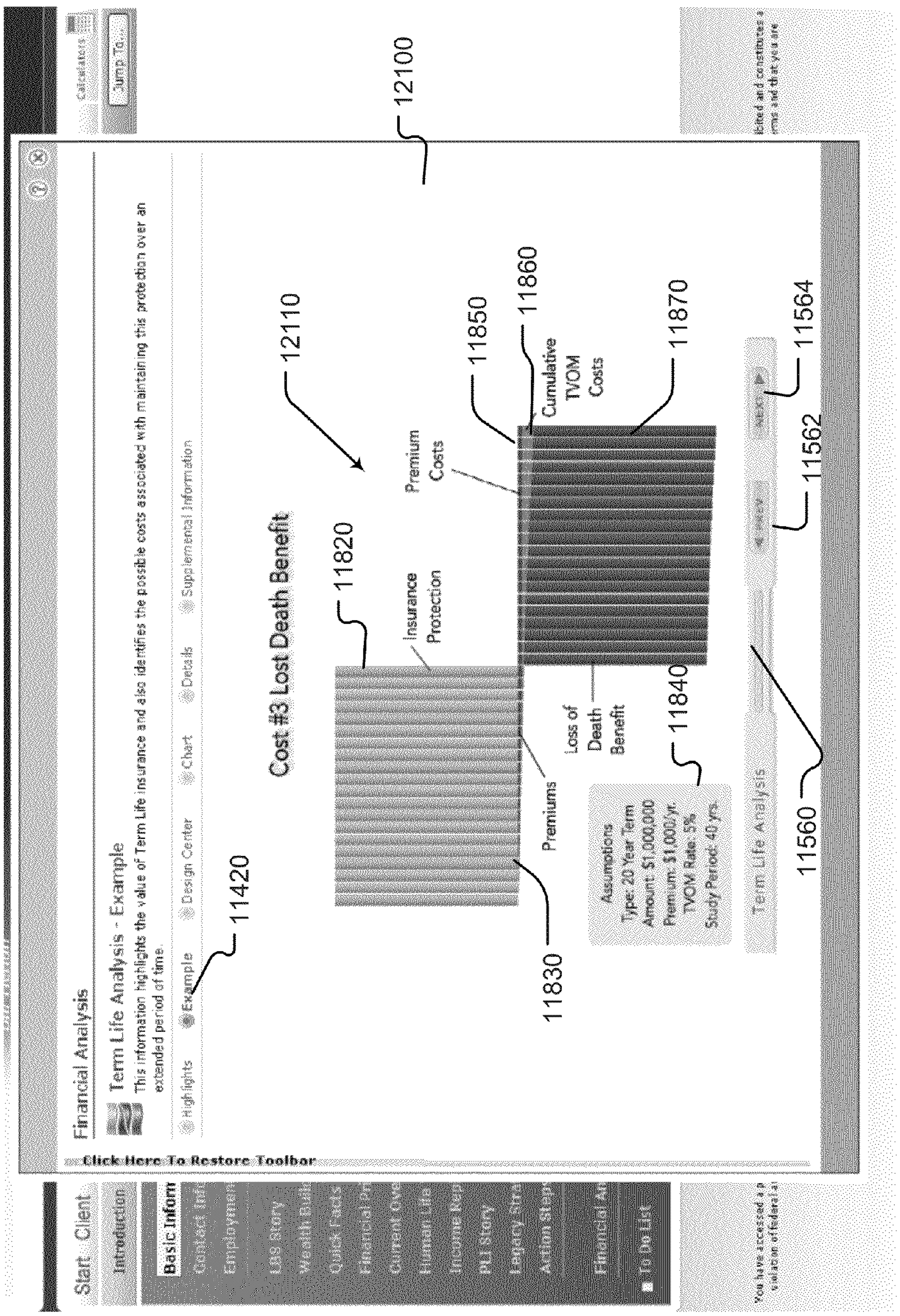

FIG. 121 illustrates an example of the display page 12100, which may be displayed when the example selector 11420 and the "NEXT>" selector 11564 are selected on the display page 12000 (shown in FIG. 120). The display page 12100 may include a visual representation of a term life analysis 12110 which places an emphasis on the loss of death benefits. The visual representation 12110 includes an insurance protection graph 11820 (e.g., bar graph), a premium graph 11830 (e.g., bar graph), a premium cost graph 11850 (e.g., bar graph), a cumulative TVOM cost graph 11860 (e.g., bar graph), and a loss of death benefit graph 11870 (e.g., bar graph). Each of the graphs is generated based, at least in part, on the assumptions provided at 11840. The assumptions may include, e.g., a type (e.g., 20 year term), an amount (e.g., $1,000,000), a premium (e.g., $1,000/yr.), a TVOM rate (e.g., 5%), a study period (e.g., 40 years), or the like. The display page 12100 may include a navigation tool 11560 to allow a user to transition to a next display page 12200 by selecting, e.g., a button marked "NEXT>" 11564 or a previous display page 12000 by selecting, e.g., a button marked "<PREV" 11562.

Figure 122:
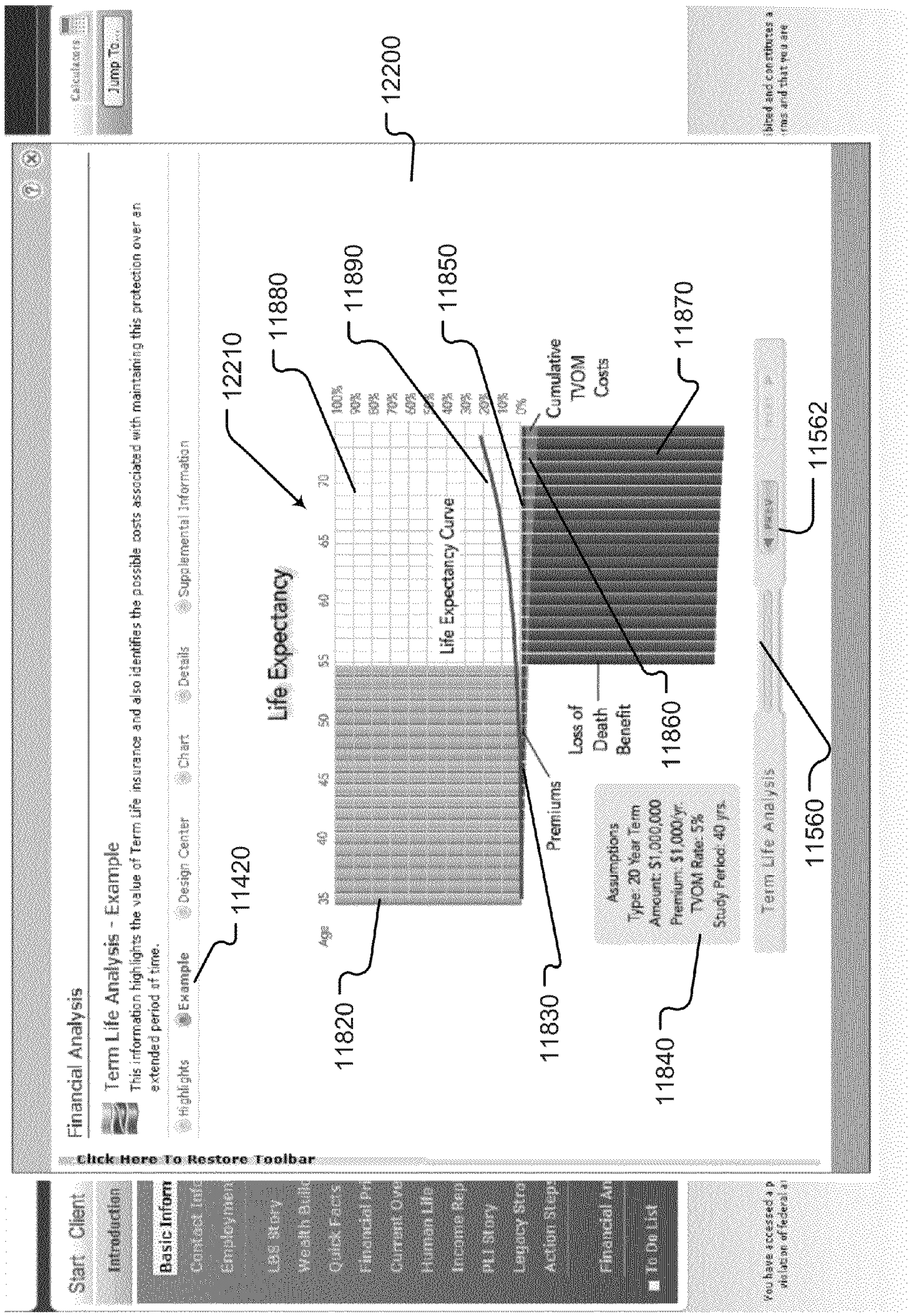

FIG. 122 illustrates an example of the display page 12200, which may be displayed when the example selector 11420 and the "NEXT>" selector 11564 are selected on the display page 12100 (shown in FIG. 121). The display page 12200 may include a visual representation of a term life analysis 12210 which places an emphasis on life expectancy. The visual representation 12210 includes an insurance protection graph 11820 (e.g., bar graph), a premium graph 11830 (e.g., bar graph), a premium cost graph 11850 (e.g., bar graph), a cumulative TVOM cost graph 11860 (e.g., bar graph), a loss of death benefit graph 11870 (e.g., bar graph), and a life expectancy curve 11890. Each of 11820, 11830, 11850, 11860, 11870, 11880, and 11890 are generated based, at least in part, on the assumptions provided at 11840. The assumptions may include, e.g., a type (e.g., 20 year term), an amount (e.g., $1,000,000), a premium (e.g., $1,000/yr.), a TVOM rate (e.g., 5%), a study period (e.g., 40 years), or the like. The display page 12200 may include a navigation tool 11560 to allow a user to transition to a previous display page 12100 by selecting, e.g., a button marked "<PREV" 11562.

Figure 123:
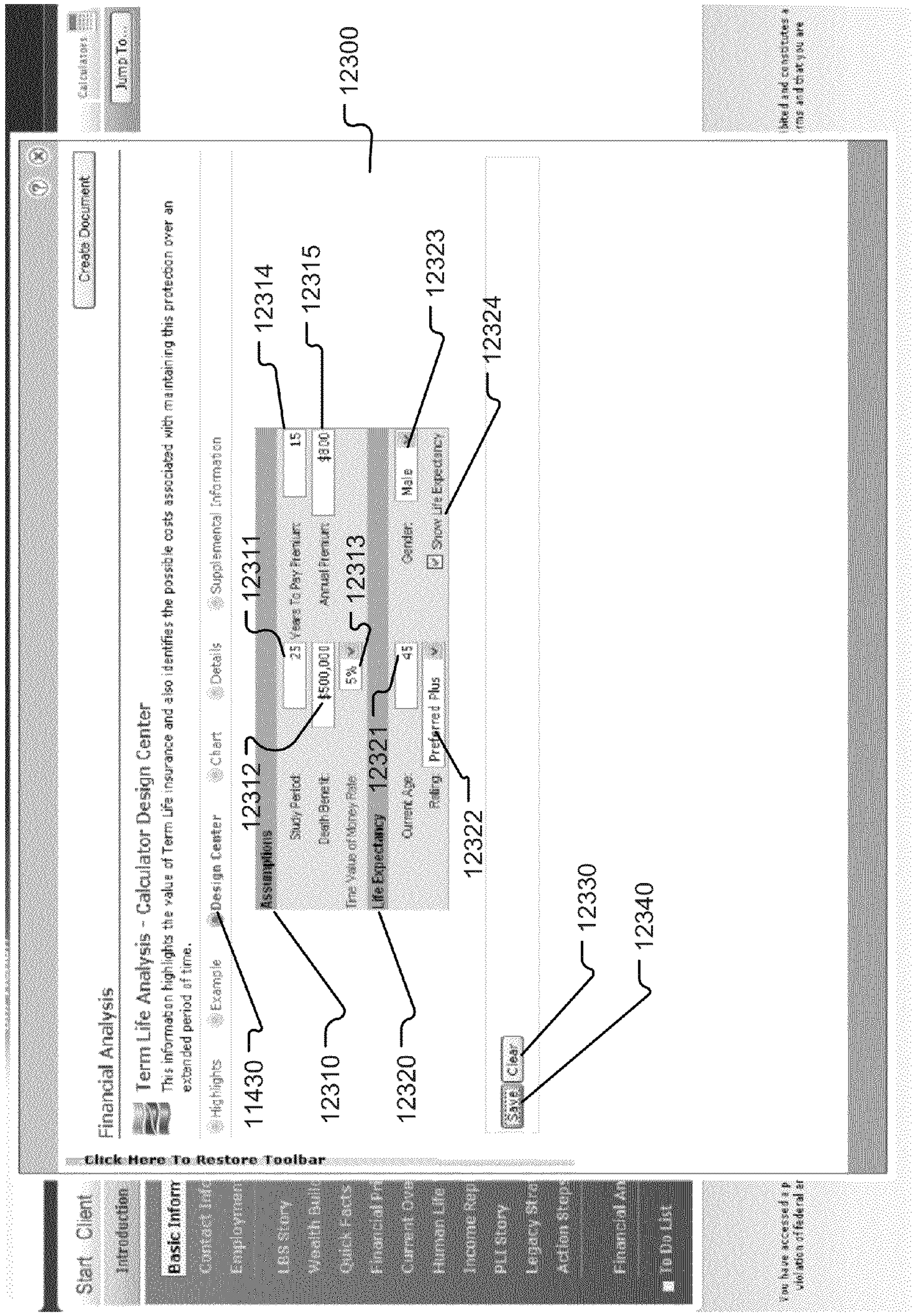

FIG. 123 illustrates an example of the display page 12300, which may be displayed when the design center selector 11430 is selected. The display page 12300 may include a calculator design center assumptions region 12310 and a calculator design center life expectancy region 12320. The calculator design center assumptions region 12310 may include a study period field 12311, a death benefit field 12312, a TVOM rate field 12313, a years to pay premium field 12314, and an annual premium field 12315. The calculator design center life expectancy region 12320 may include a current age field 12321, a rating field 12322, a gender field 12323, and a show life expectancy option field 12324. Each of the fields included in the calculator design center assumptions region 12310 and the calculator design center life expectancy region 12320 may be configured to accept a value associated with the field. The values may be accepted, and therefore received, as the result of user interactions with display page 12300. The user interactions may include, e.g., inputting values using a keyboard, a pointing device (e.g., mouse), a touch screen interface, or the like. The values in each of the fields may either be saved by selecting the "Save" button 12340 or cleared by selecting the "Clear" button 12330.

Figure 124:
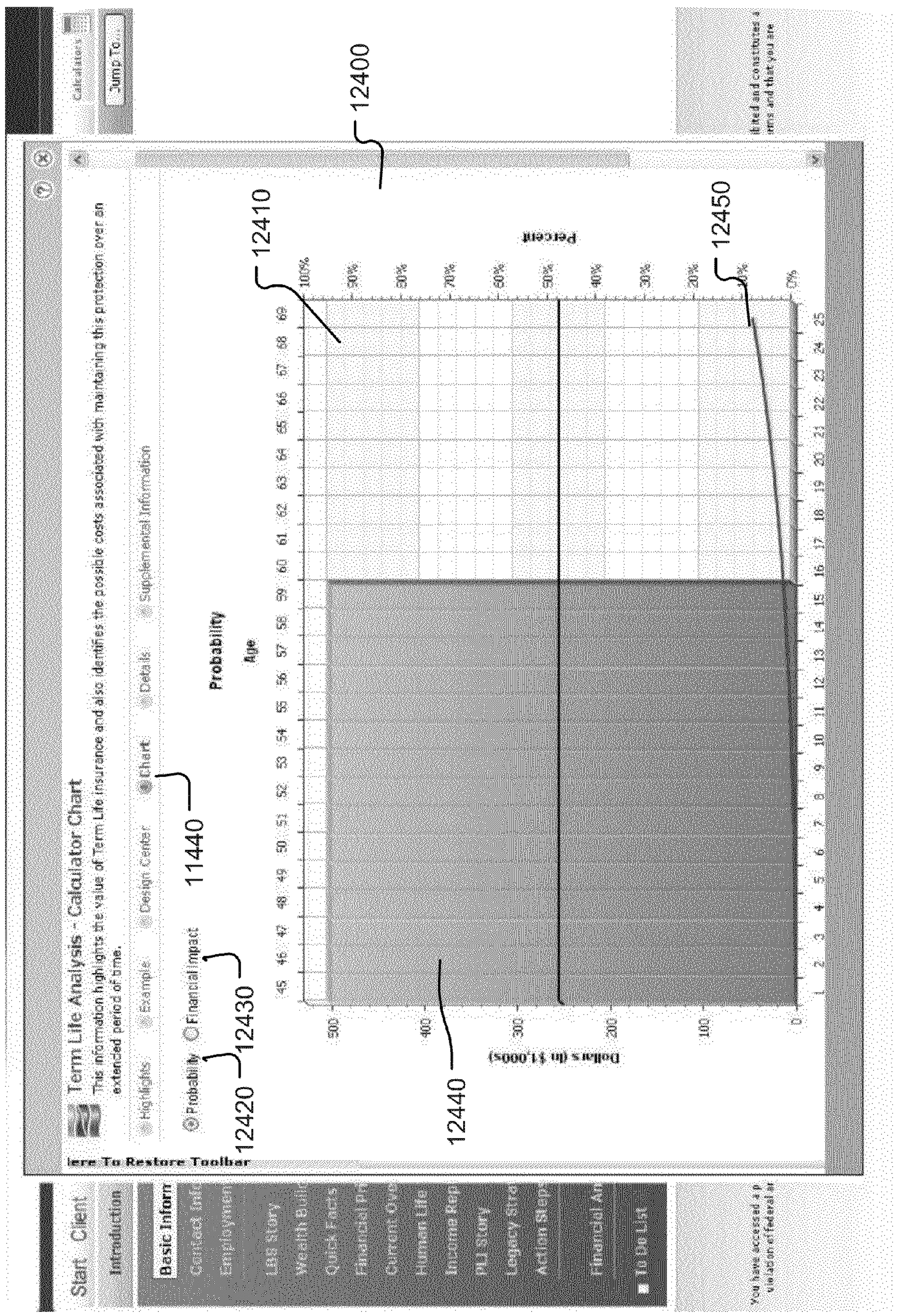

FIG. 124 illustrates an example of the display page 12400, which may be displayed after, e.g., a user has selected chart selector 11440 and completed one or more fields in the assumptions region 12310 and the life expectancy region 12320. In response to the user's selection of the chart selector 11440 and completion of one or more fields in the assumptions region 12310 and the life expectancy region 12320 the display page 12400 may provide, e.g., a chart 12410. The display page 12400 may also include a probability selector 12420 and a financial impact selector 12430. When the probability selector 12420 is selected, the display page 12400 may display a chart 12410 that includes death benefits graph 12440 and a life expectancy curve 12450.

Figure 125:
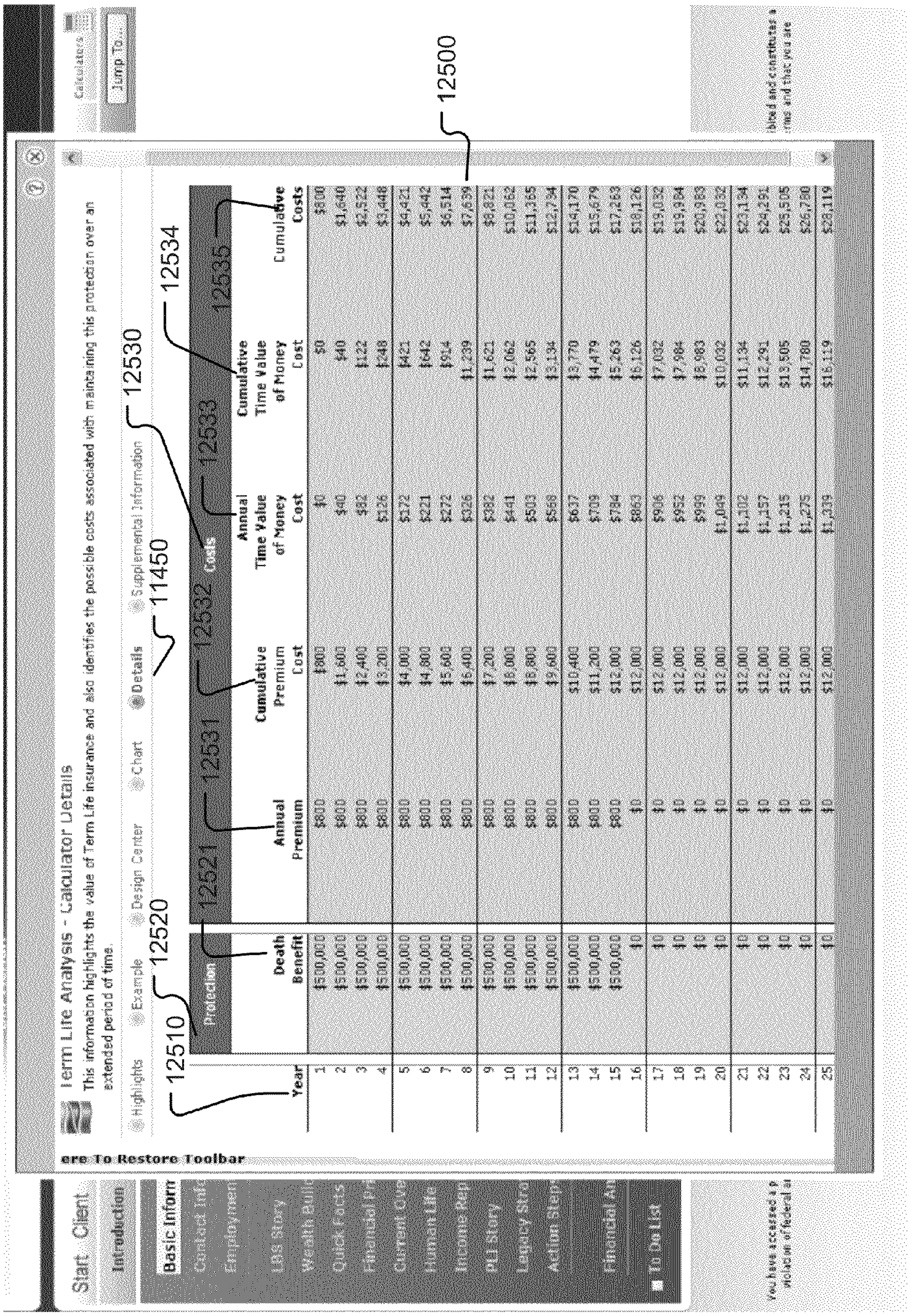

FIG. 125 illustrates an example of the display page 12500, which may be displayed when the details selector 11450 is selected. The display page 12500 may include a detailed view of one or more aspects of the chart data displayed in the chart 12410 on display page 12400. For example, the display page 12500 may include a protection chart (e.g., table or listing) 12520. The protection chart 12520 may include information such as, e.g., a death benefit 12521. The display page 12500 may also include a costs chart (e.g., table or listing) 12530. The cost chart 12530 may include information such as, e.g., an annual premium amount 12531, a cumulative premium cost 12532, an annual TVOM cost 12533, a cumulative TVOM cost 12534, and a cumulative costs 12535. Every row in each respective chart may be organized by predetermined increments of time 12510 (e.g., daily, weekly, monthly, yearly, or the like).

Figure 126:
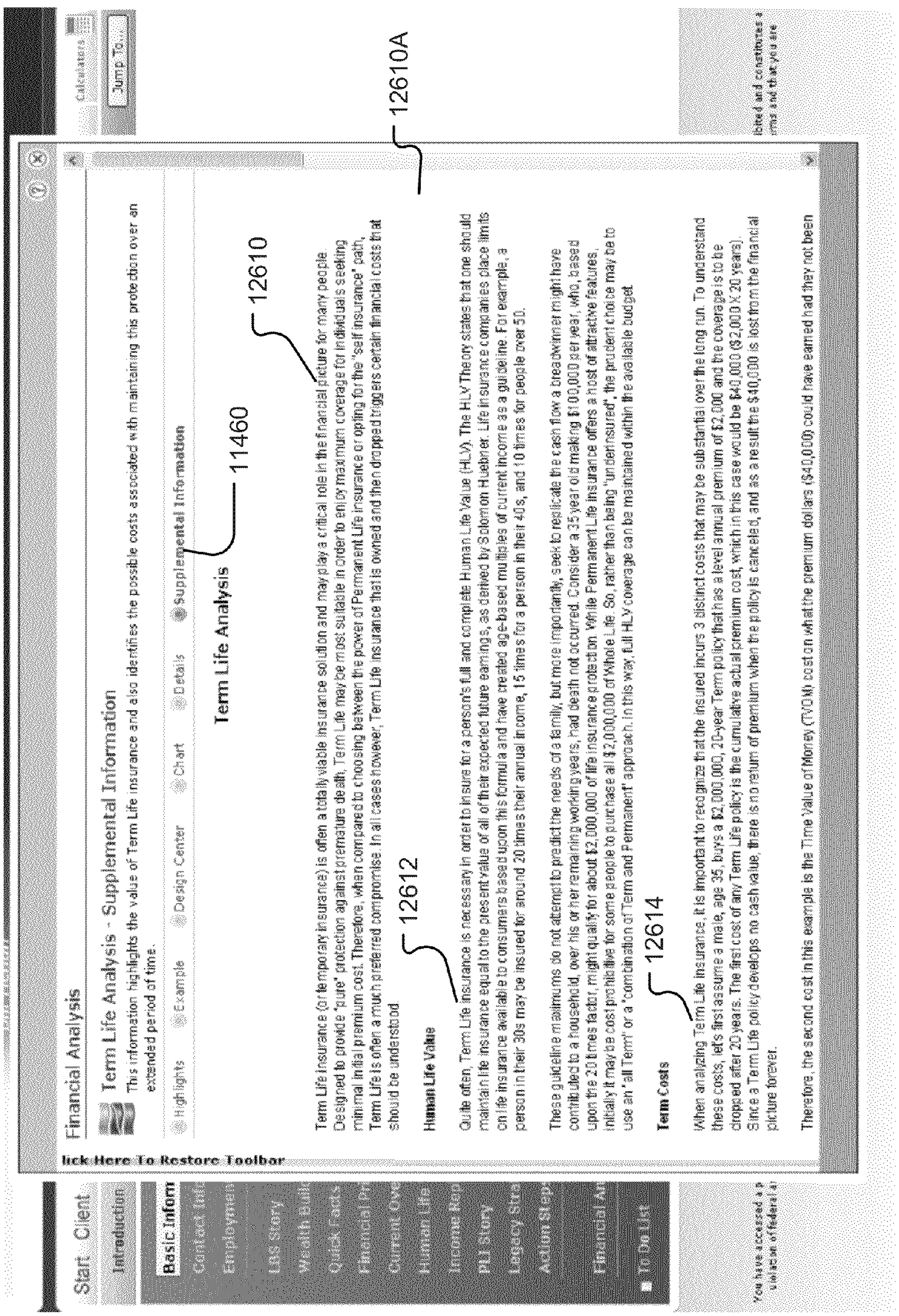

FIG. 126 illustrates an example of the display page 12610A, which may be displayed when the supplemental information selector 11460 is selected. The information provided on display 12610A may include supplemental information regarding term life analysis. The supplemental information may include an overview of term life insurance 12610, an overview of human life value 12612, and an overview of term costs 12614. A user may use a device, e.g., a mouse, keyboard, touchscreen, or the like, on, for example, the consumer interface 104 or agent 108 (shown in FIG. 1) to interact with display page 12610A. This interaction may include, e.g., a scrolling command which scrolls down display page 12610A to reveal display page 12610B.

Figure 127:
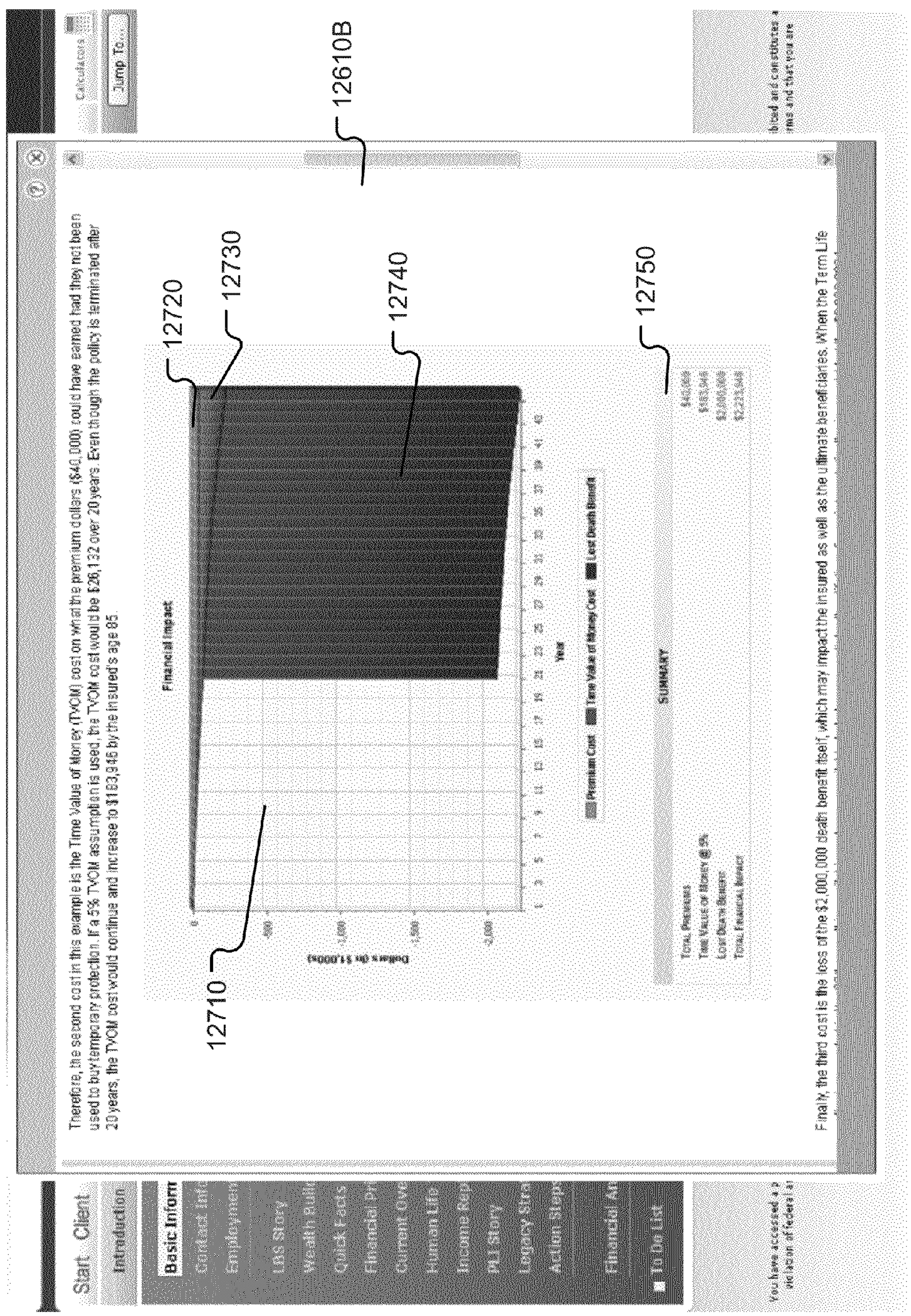

FIG. 127 illustrates an example of the display page 12610B, which may be displayed after a user scrolls downwards while viewing display page 12610A. Display page 12610B provides additional supplemental information regarding term life analysis. Display page 12610B may include a chart 12710, which may include a plurality of graphs (e.g., bar graphs), including a premium cost graph 12720, a TVOM cost graph 12730, and a lost death benefit 12740. Each of the graphs may be presented in a different color, shade, pattern, or the like. The display page 12610B may further include a summary region 12750 that includes a summary of the financial impact of term life insurance, which may include, e.g., total premiums, TVOM rate (e.g., 5%), lost death benefit, and a total financial impact. A user may use a device, e.g., a mouse, keyboard, touchscreen, or the like, to interact with display page 12610B. This interaction may include, e.g., a scrolling command which scrolls down display page 12610B to reveal display page 12610C.

Figure 128:
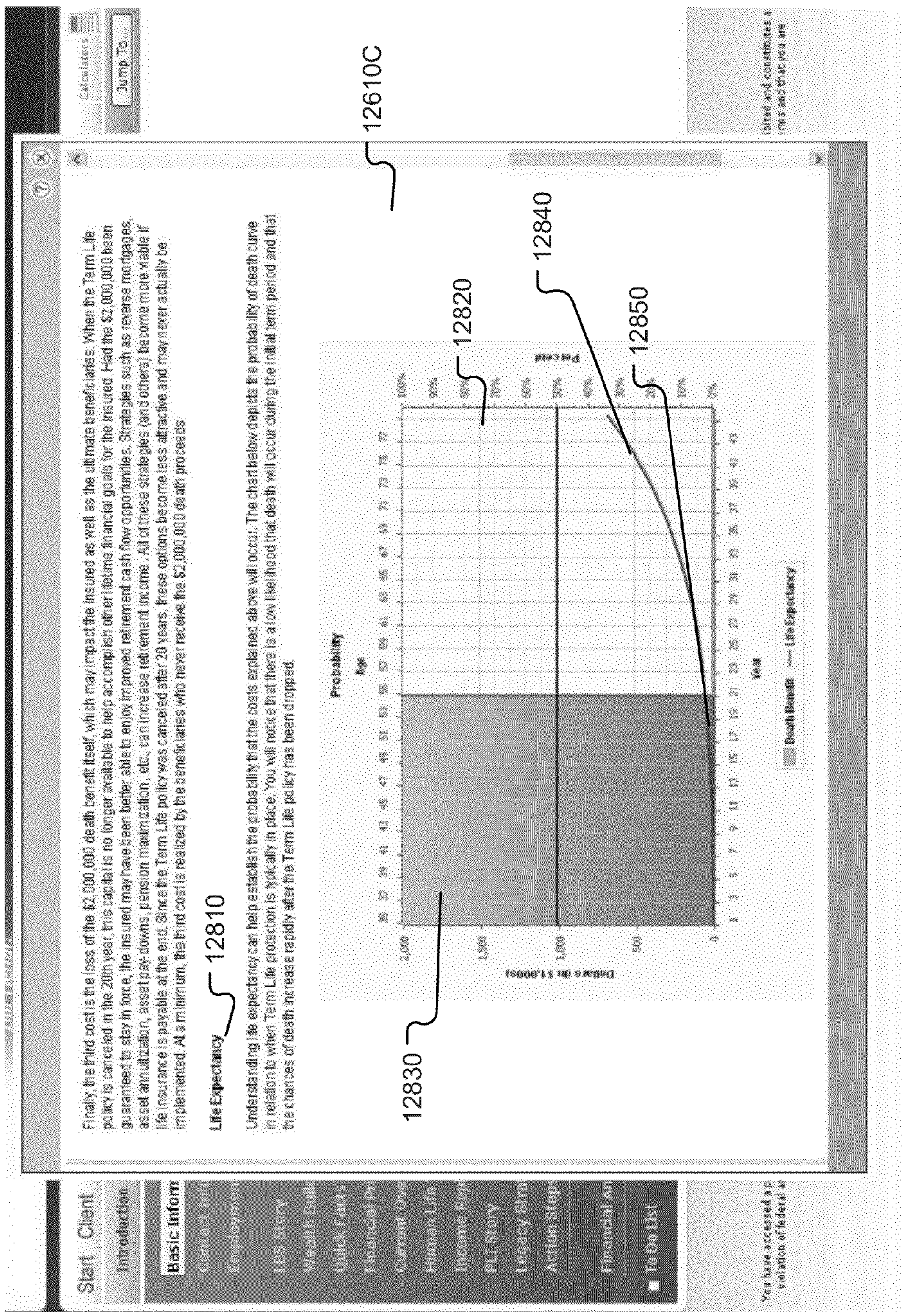

FIG. 128 illustrates an example of the display page 12610C, which may be displayed after a user scrolls downwards while viewing display page 12610B. Display page 12610C provides additional supplemental information regarding term life analysis. Display page 12610C may include an overview of life expectancy's role in term life insurance planning 12810. Display page 12610C may also include a chart 12820 that includes death benefit graph 12830 (e.g., bar graph) and a life expectancy curve 12840. The area under the life expectancy curve 12850 indicates that there is a low likelihood that death will occur during the initial term period. The life expectancy curve 12840 further indicates that the chances of death increase rapidly after the term life policy has been dropped.

FIGS. 129-136 illustrate examples of display pages that show aspects of a protection cost portion of the financial analysis tool, in accordance with one embodiment of the disclosure. The protection cost portion of the financial analysis tool may illustrate the financial impact of maintaining an insurance portfolio over selected time frames.

Figure 129:
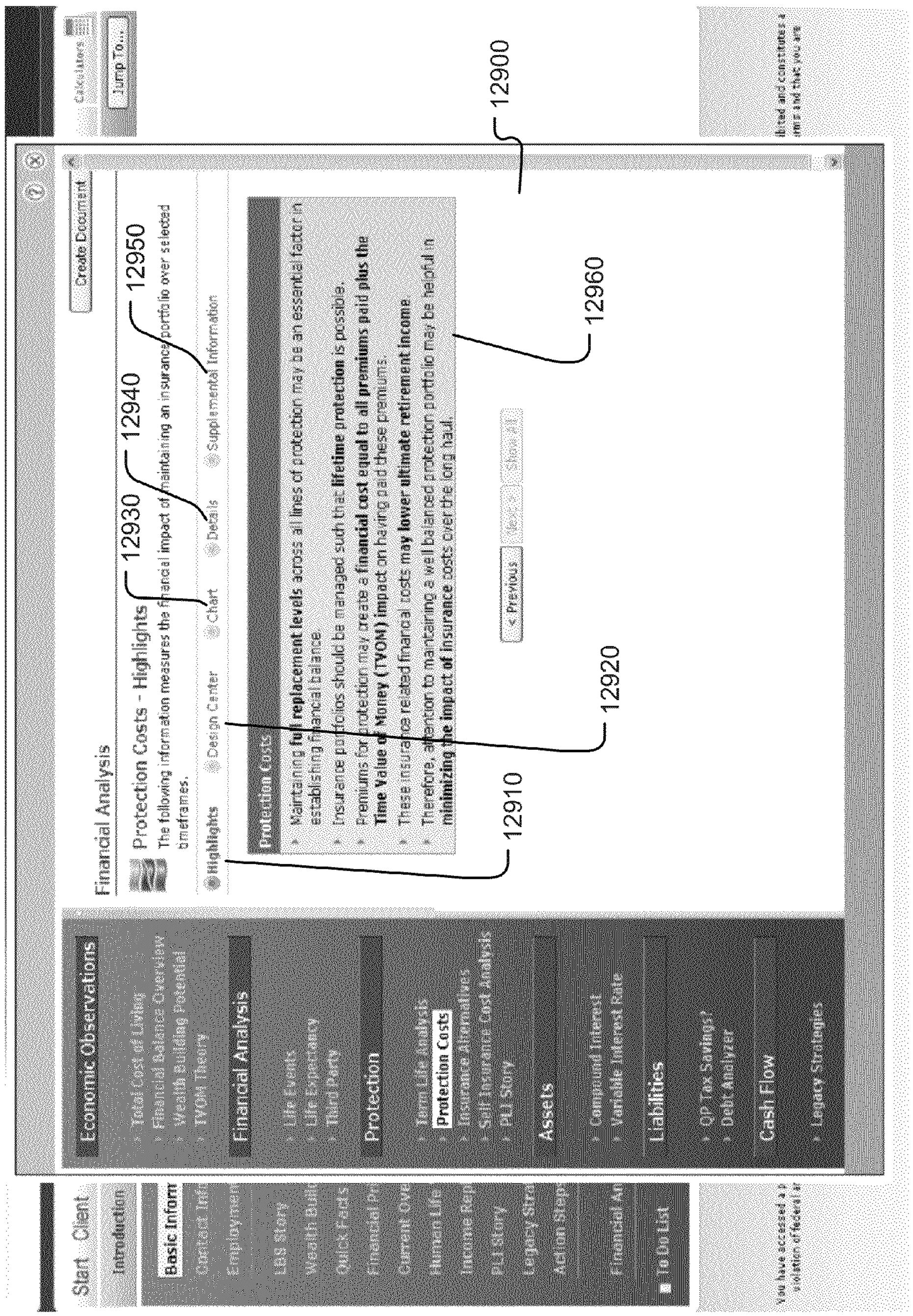
FIGS. 129-136 illustrate examples of display pages that show aspects of a protection cost portion of the financial analysis tool, in accordance with one embodiment of the disclosure.

FIG. 129 illustrates an example of display page 12900, which may include a plurality of protection cost selectors. The plurality of protection cost selectors may include a highlights selector 12910, a design center selector 12920, a chart selector 12930, a details selector 12940, and a supplemental information selector 12950. The display page 12900 may further include a highlights message 12960, which may be displayed when the highlight selector 12910 is selected on the display page 12900. The highlights message 12960 may include one or more highlights of protection costs, including the particular examples provided in FIG. 129.

Figure 130:
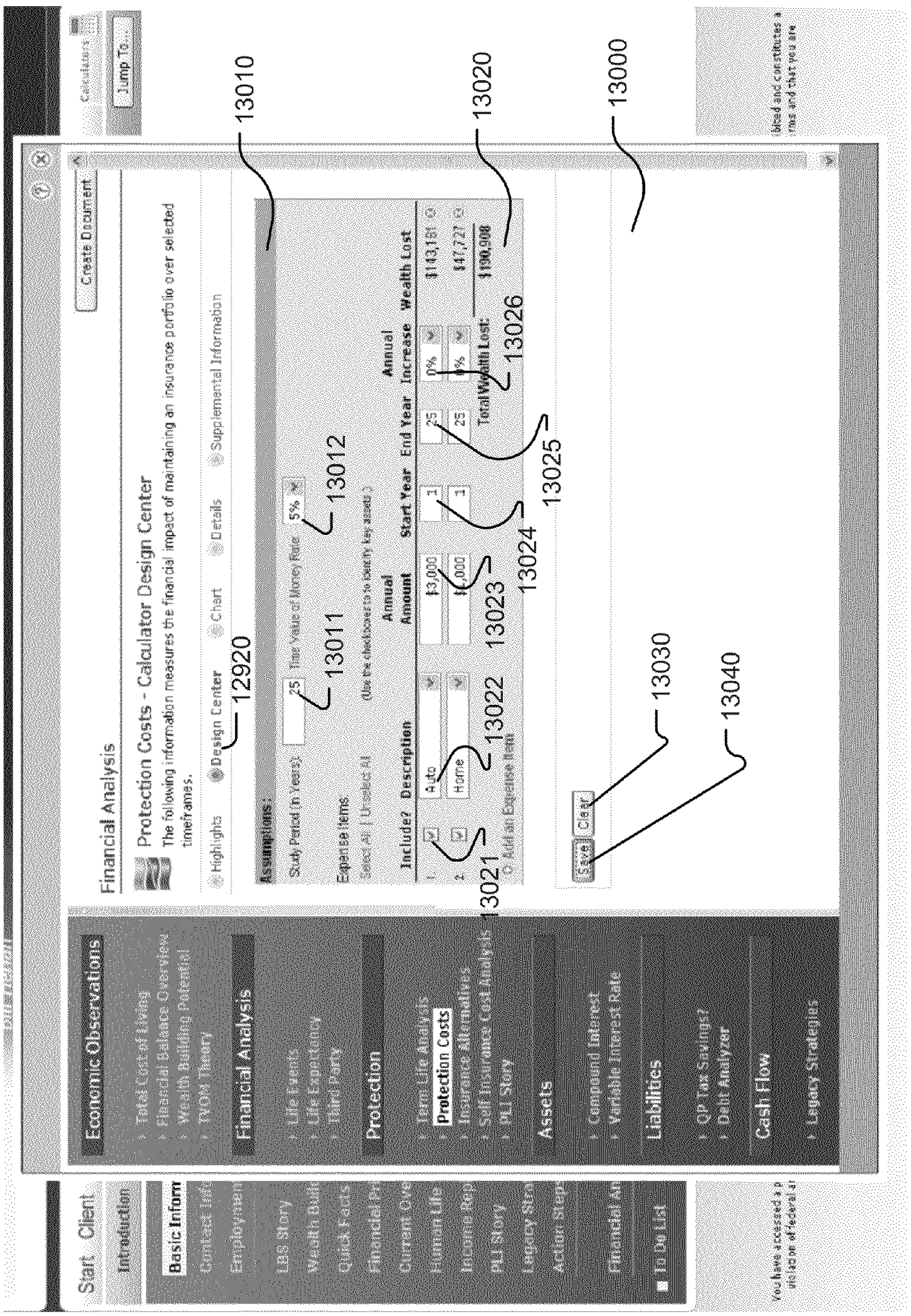

FIG. 130 illustrates an example of display page 13000, which may be displayed when the design selector 12920 is selected. The display page 13000 may include a calculator design center assumptions region 13010, which may include a study period (e.g., in years) field 13011 and a TVOM rate field 13012. The calculator design center assumptions region 13010 may further include an add-an-expense-item region 13020. When the add-an-expense-item region 13020 is selected, a window(s) may be displayed with a plurality of data entry fields, including an include option field 13021, a description field 13022, an annual amount field 13023, a start year field 13024, an end year field 13025, and an annual increase rate field 13026. The values in each of the fields may either be saved by selecting the "Save" button 13040 or cleared by selecting the "Clear" button 13030.

Figure 131:
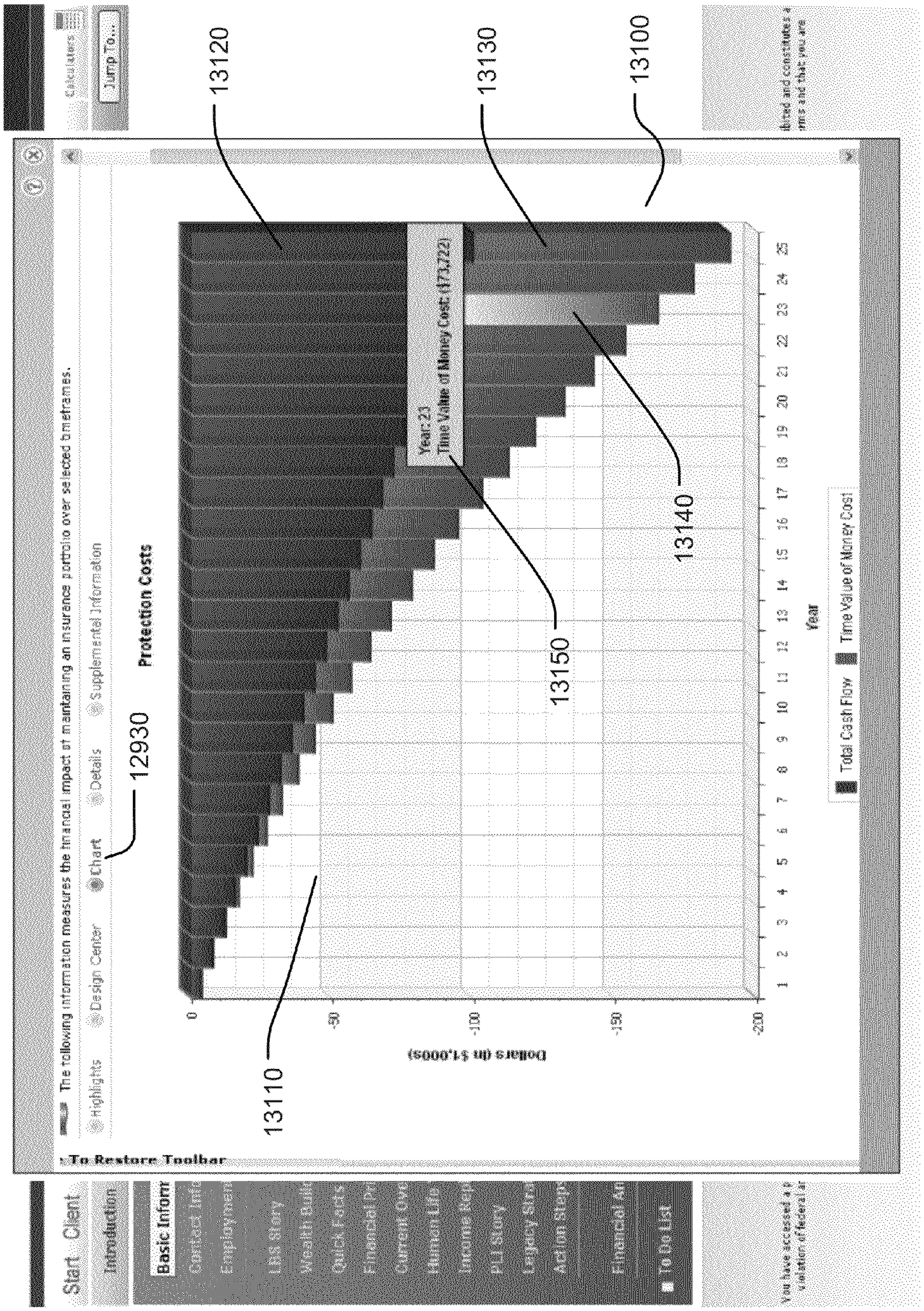

FIG. 131 illustrates an example of display page 13100, which may be displayed after, e.g., a user has selected chart selector 12930 and completed one or more fields in the assumptions region 13010. In response to the user's selection of the chart selector 12930 and completion of one or more fields in the assumptions region 13010, the display page 13100 may present, e.g., a protection cost chart 13110 including a plurality of graphs. The plurality of graphs (e.g., bar graphs) may include, e.g., a total cash flow graph 13120 and a TVOM cost graph 13130. Each of the graphs may be presented in a different color, shade, pattern, or the like According to one aspect of the present disclosure, the charts provided by the disclosure, e.g., chart 13110, may be interactive. A user may interact with the chart by, e.g., selecting one or more aspects of the chart 13110. After a user interacts with the chart 13110 by, e.g., selecting one or more portions of bar graph 13130, the selected portion of the chart may be, e.g., highlighted 13140. In addition, or alternatively, a pop-up window may be provided that displays data associated with the selected portion of the chart 13110. For example, when a portion of the chart is selected 13140, the pop-up window 13150 may be displayed in accordance with a fly-over feature of the present disclosure. The pop-up window 13150 may display the year associated with the selected portion of the chart (e.g., 23), the TVOM associated with the selected portion of the chart (e.g., $73,722), or the like.

Figure 132:
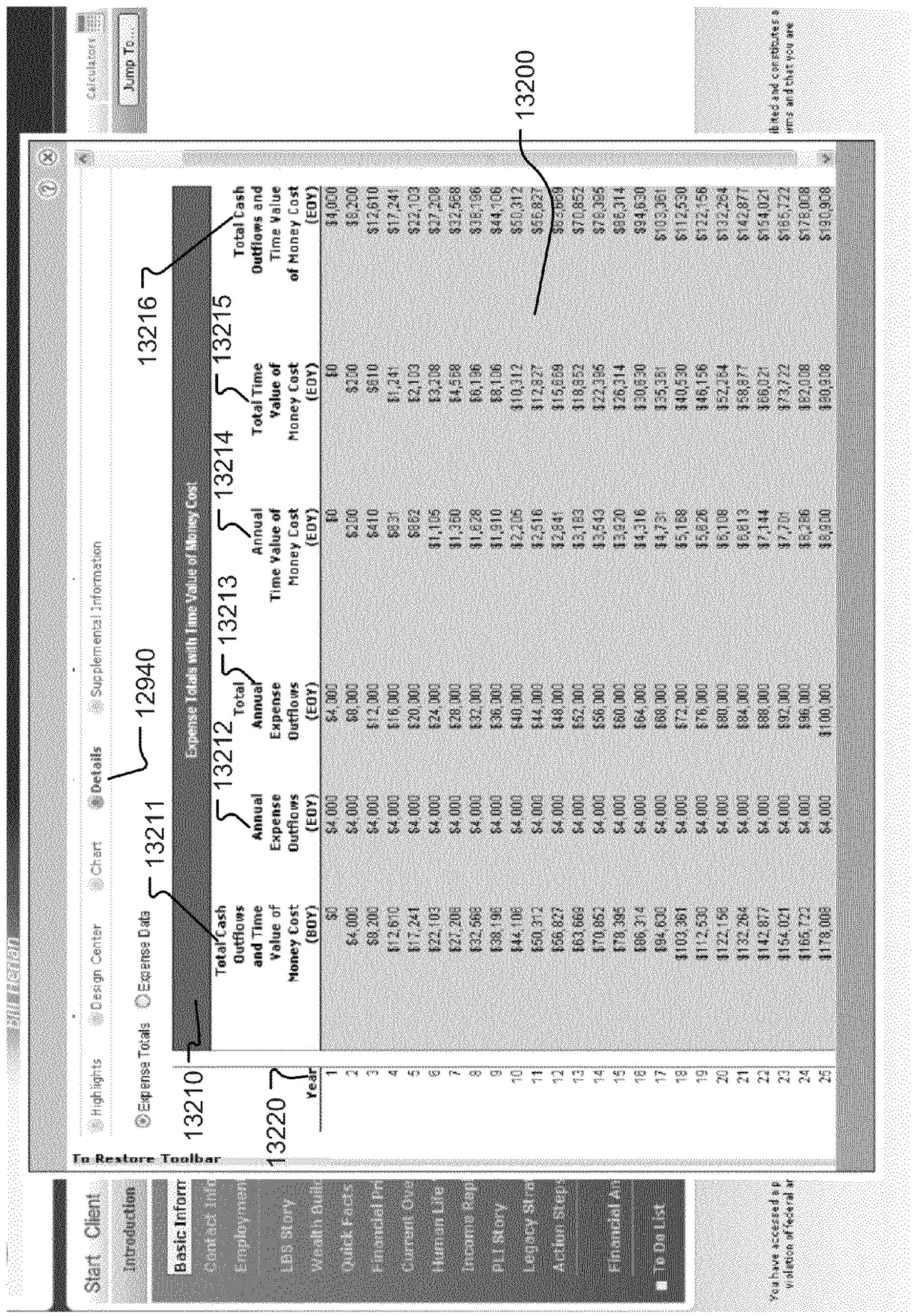

FIG. 132 illustrates an example of the display page 13200, which may be displayed when the details selector 12940 is selected. Display page 13200 may include a detailed view of one or more aspects of the chart data displayed in the chart 13110 on display page 13100. For example, display page 13200 may include an expense totals with TVOM cost chart (e.g., table or listing) 13210. The expense outlay with TVOM cost chart may include information such as, e.g., a BOY total cash outflows and TVOM cost 13211, an EOY annual expense outflows 13212, an EOY total annual expense outflows 13213, an EOY annual TVOM cost 13214, an EOY total TVOM cost 13215, and a total cash outflows and TVOM cost 13216. Every row in each respective chart may be organized by predetermined increments of time 13220 (e.g., daily, weekly, monthly, yearly, or the like).

Figure 133:
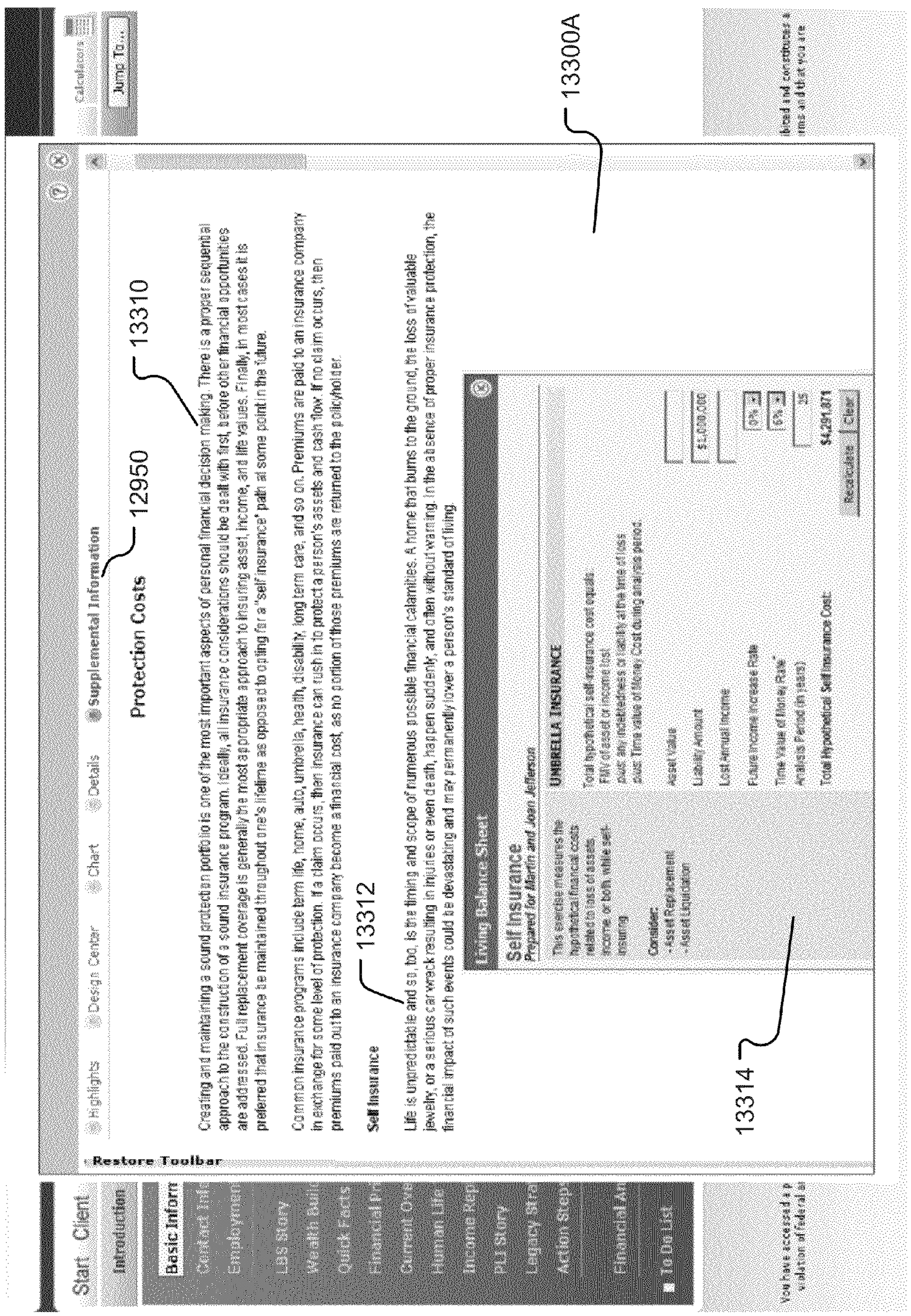

FIG. 133 illustrates an example of the display page 13300A, which may be displayed when the supplemental information selector 12950 is selected. The information provided on display 13300A may include supplemental information regarding protection costs. The supplemental information may include an overview of building a sound protection portfolio 13310, an overview of self insurance 13312 (continues into FIG. 134), and a self insurance estimation tool 13314. The self insurance estimation tool 13314 may be configured to receive user input and calculate a total hypothetical self insurance cost. The calculation of the hypothetical self insurance cost may be based, at least in part, on a variety of input received from a user including, e.g., an asset value, a liability amount, a lost annual income, a future income increase rate, a TVOM rate, and an analysis period. A user may use a device, e.g., a mouse, keyboard, touchscreen, or the like, to interact with display page 13300A. This interaction may include, e.g., a scrolling command which scrolls down display page 13300A to reveal display page 13300B.

Figure 134:
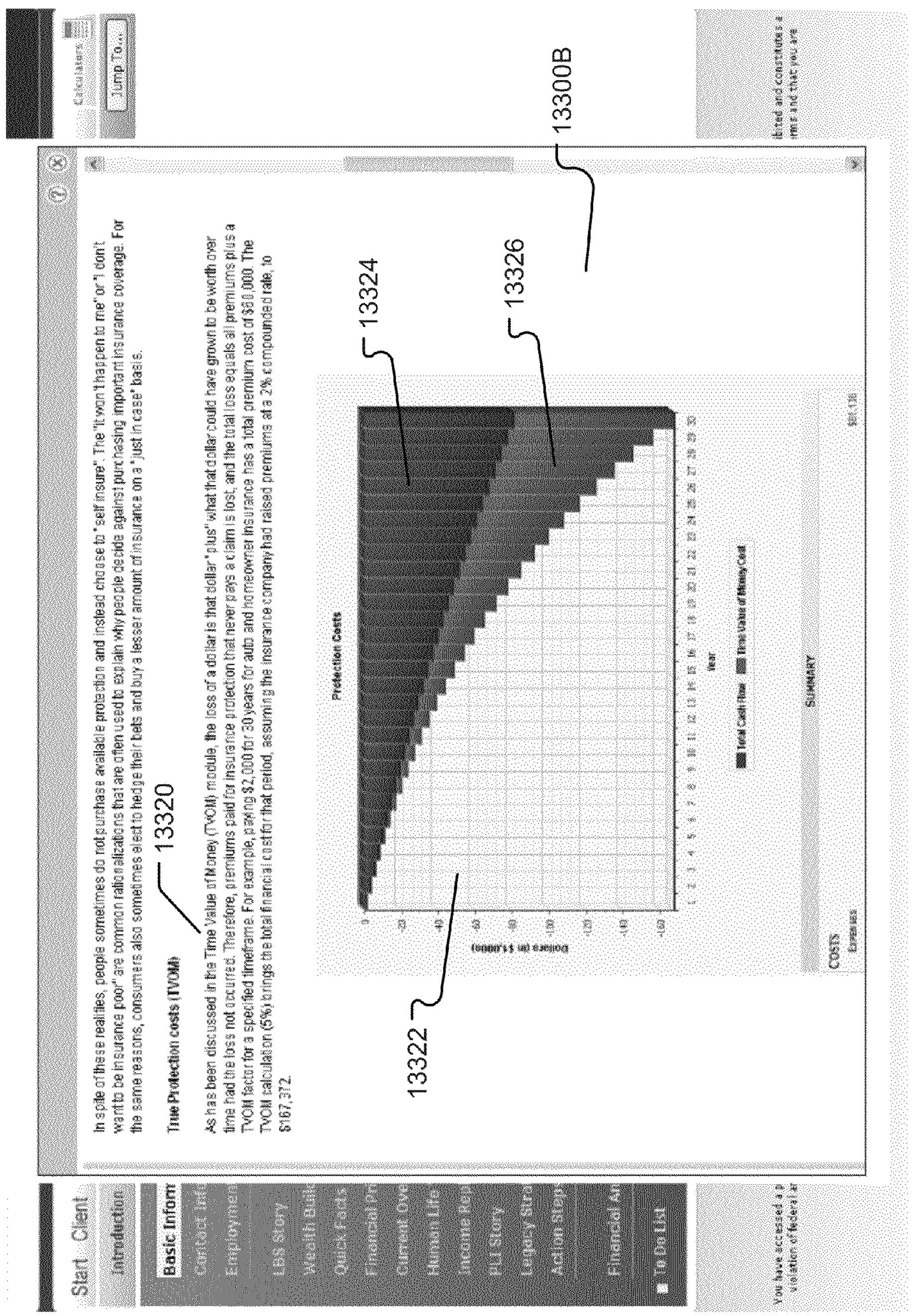

FIG. 134 illustrates an example of the display page 13300B, which may be displayed after a user scrolls downwards while viewing display page 13300A. Display page 13300B may provide additional supplemental information regarding protection costs. Display page 13300B may include a TVOM overview 13320. Display page 13300B may also include a chart 13322, which may include a plurality of graphs (e.g., bar graphs), including a total cash flow graph 13324 and a TVOM cost graph 13326. A user may use a device, e.g., a mouse, keyboard, touchscreen, or the like, to interact with display page 13300B. This interaction may include, e.g., a scrolling command which scrolls down display page 13300B to reveal display page 13300C.

Figure 135:
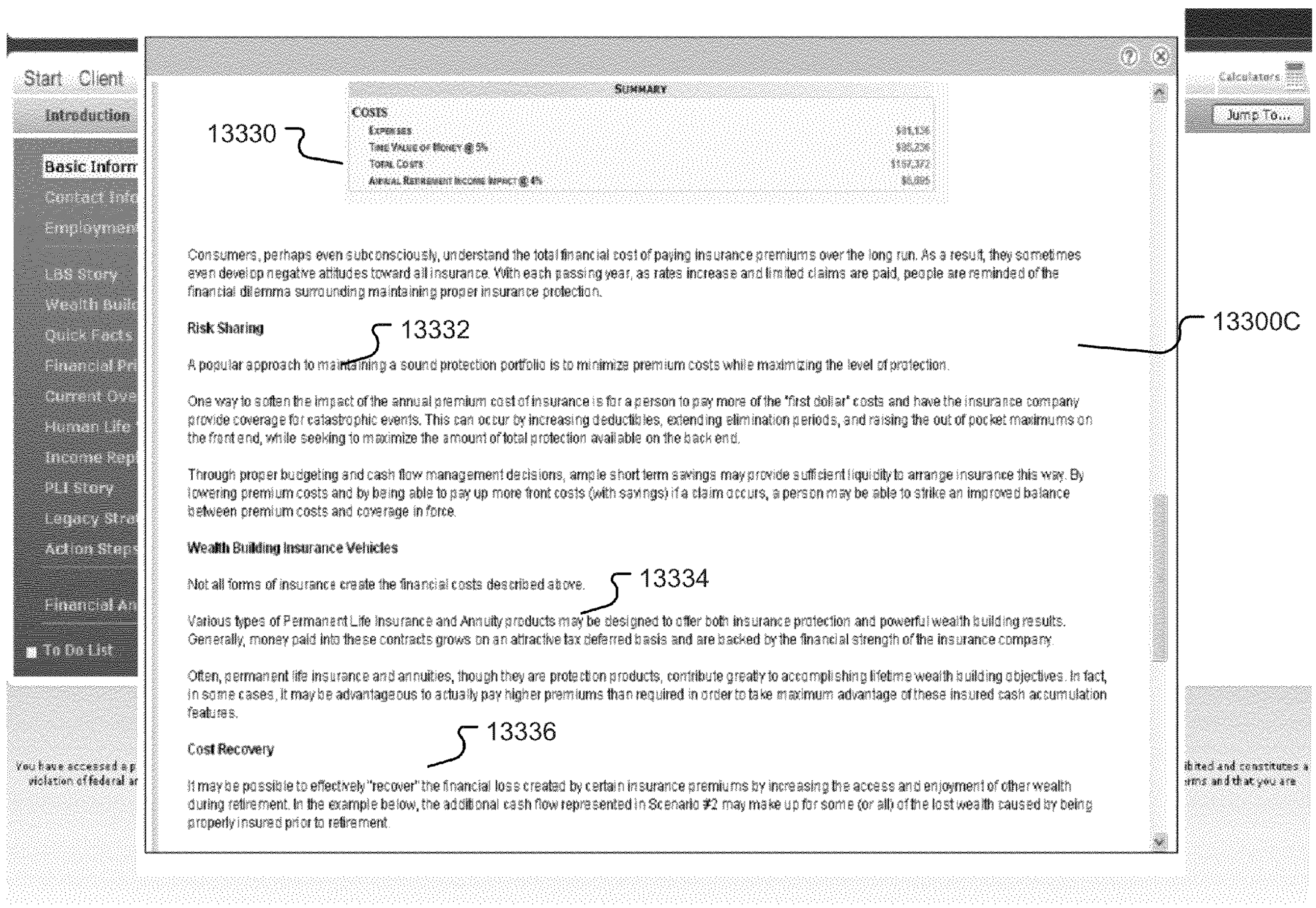

FIG. 135 illustrates an example of the display page 13300C, which may be displayed after a user scrolls downwards while viewing display page 13300B. Display page 13300C may provide additional supplemental information regarding protection costs. The display page 13300C may further include a summary region 13330 that includes a summary of the protection costs, which may include, e.g., expenses, TVOM rate (e.g., 5%), total costs, and an annual retirement income impact rage (e.g., 4%). Display page 13300C may also include an overview of risk sharing 13332, an overview of wealth building insurance vehicles 13334, and an overview of cost recovery 13336. A user may use a device, e.g., a mouse, keyboard, touchscreen, or the like, to interact with display page 13300C. This interaction may include, e.g., a scrolling command which scrolls down display page 13300C to reveal display page 13300D.

Figure 136:
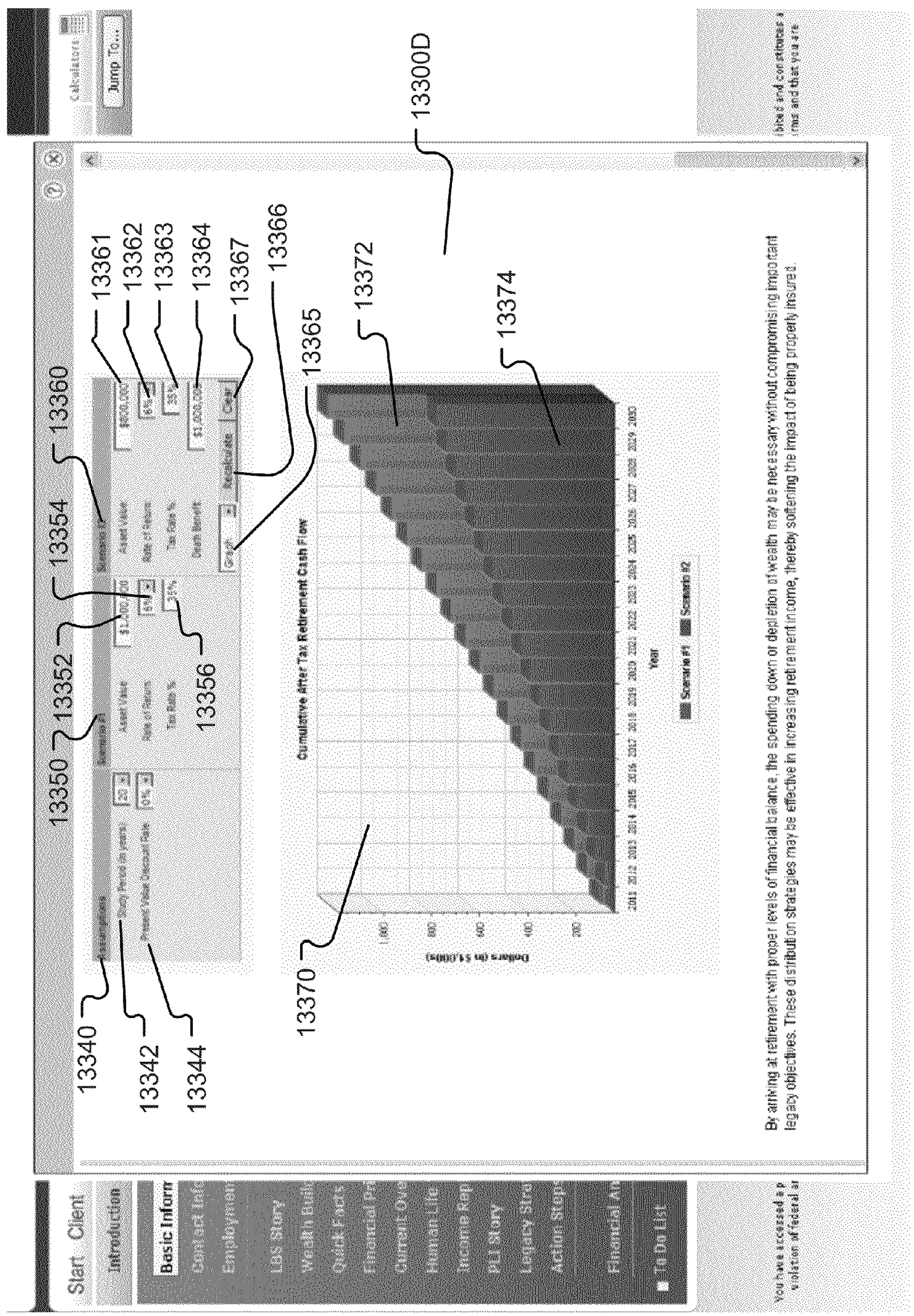

FIG. 136 illustrates an example of the display page 13300D, which may be displayed after a user scrolls downwards while viewing display page 13300C. Display page 13300D may provide additional supplemental information regarding protection costs. Display page 13300D may include a plurality of input regions including, e.g., an assumptions input region 13340, a scenario #1 input region 13350, and a scenario #2 input region 13360. The assumptions input region 13340 is configured to receive input from a user and includes a study period field 13342 and a present value discount rate field 13344. The scenario #1 input region 13350 is configured to receive input from a user and includes an asset value field 13352, a rate of return field 13354, and a tax rate field 13356. The scenario #2 region 13360 includes an asset value field 13361, a rate of return field 13362, a tax rate field 13363, a death benefit field 13364, and an output field 13365. After selecting an option from the output field 13365 and selecting recalculate 13366, a cumulative after tax retirement cash flow chart 13370 may be displayed based, at least in part, on the values received by the assumptions input region 13340, the scenario #1 input region 13350, and/or the scenario #2 input region 13360. The cumulative after tax retirement cash flow chart 13370 may include a plurality of graphs (e.g., bar graphs), including a graph (e.g., bar graph) based upon scenario #1 13372 and a graph (e.g., bar graph) based upon scenario #2 13374. Each graph may be presented in a different color, shade, pattern, or the like FIGS. 137-156 illustrate examples of display pages that show aspects of a compound interest portion of the financial analysis tool, in accordance with one embodiment of the disclosure. The compound interest portion of the financial analysis tool may illustrate a holistic analysis of the strategy of compounding tax free and taxable interest.

Figure 137:
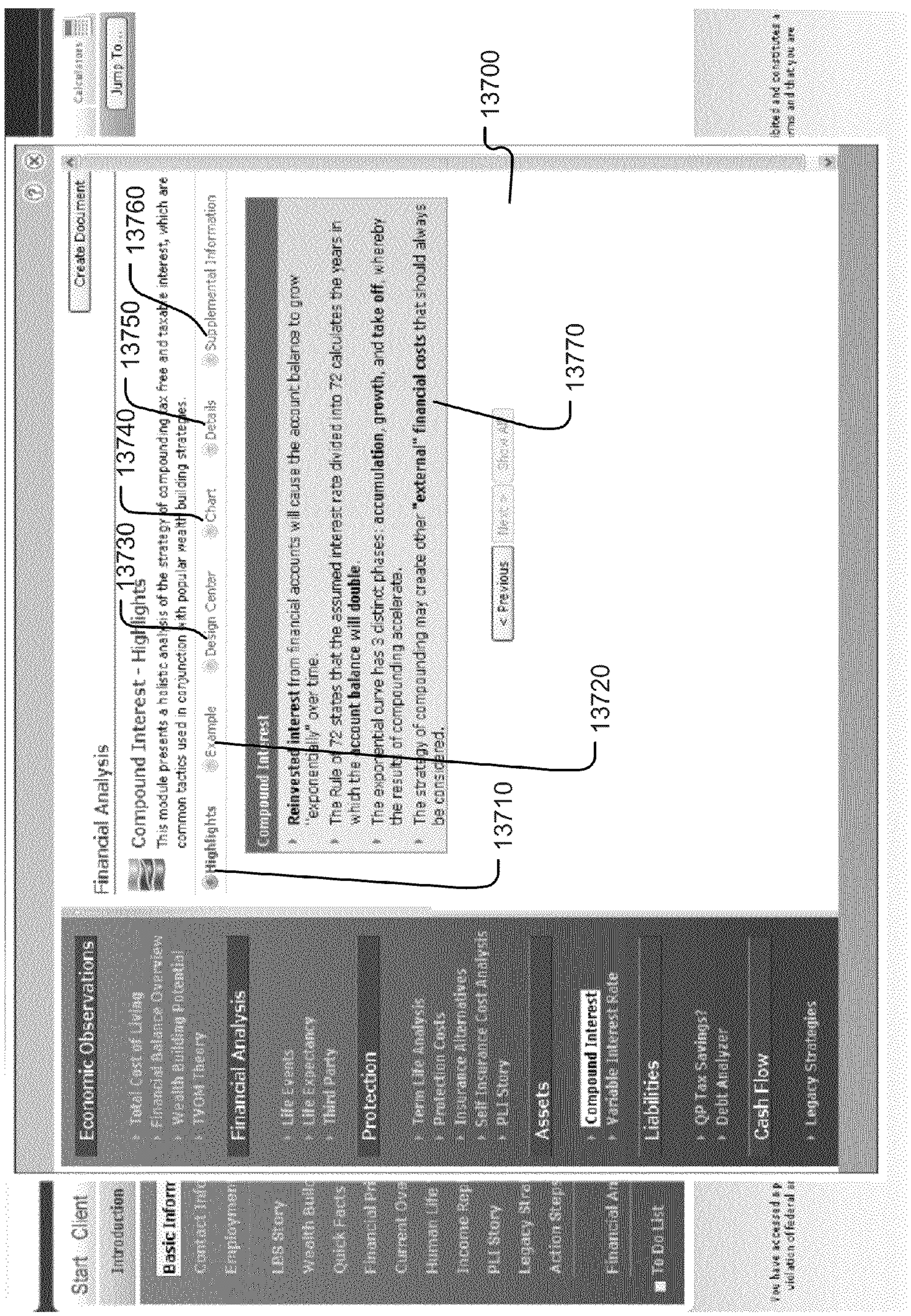
FIGS. 137-156 illustrate examples of display pages that show aspects of a compound interest portion of the financial analysis tool, in accordance with one embodiment of the disclosure.

FIG. 137 illustrates an example of display page 13700, which may include a plurality of compound interest selectors. The compound interest selectors may include, e.g., a highlights selector 13710, an example selector 13720, a design center selector 13730, a chart selector 13740, a details selector 13750, and a supplemental information selector 13760. The display page 13700 further includes a highlights message 13770, which may be displayed when the highlight selector 13710 is selected on the display page 13700. The highlights message 13770 may include one or more highlights of compound interest, including the particular examples provided in FIG. 137.

Figure 138:
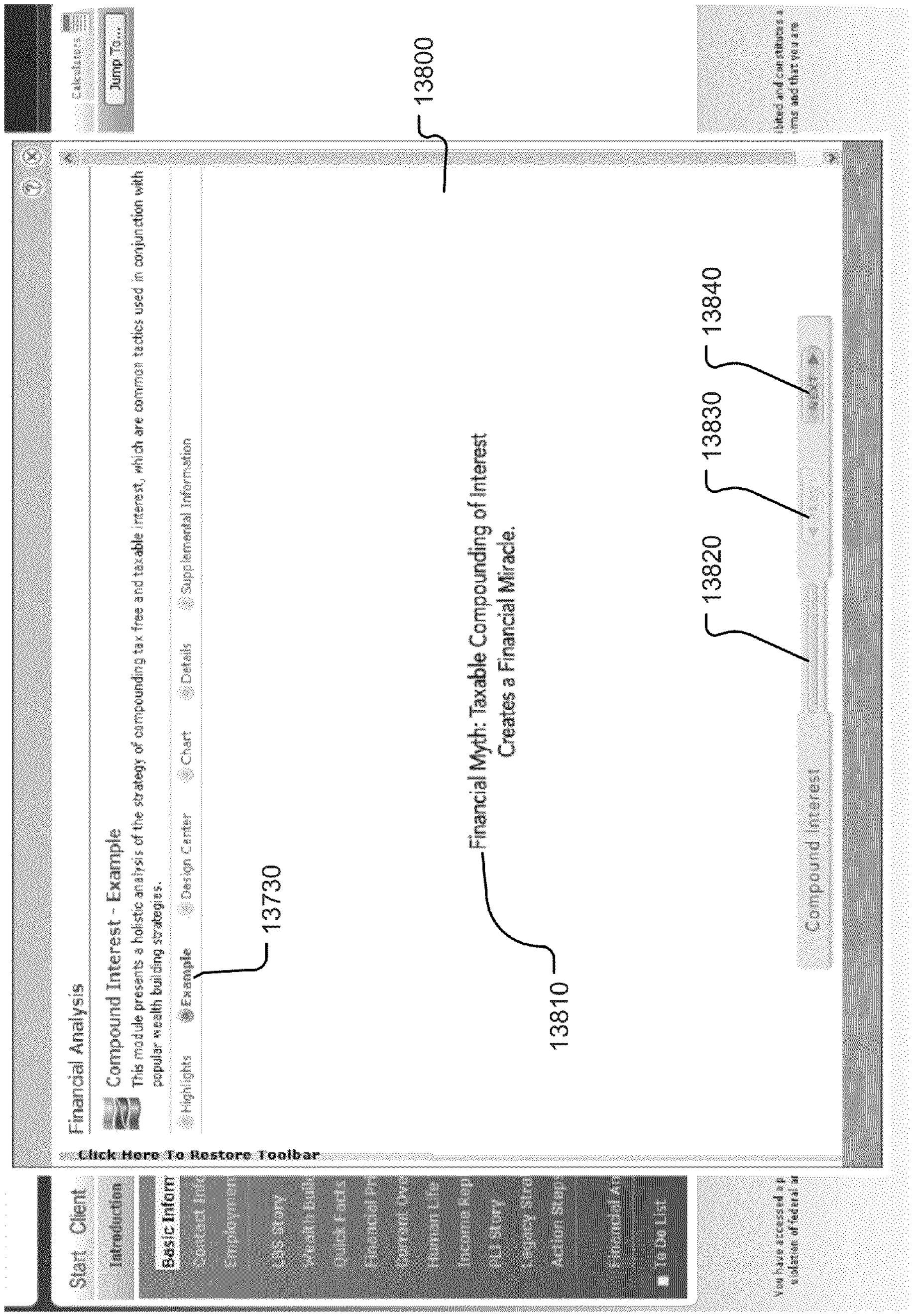

FIG. 138 illustrates an example of the display page 13800, which may be displayed when the example selector 13730 is selected. The display page 13800 may include an example of one or more financial myths 13810. The display page 13800 may include, e.g., the financial myth that taxable compounding of interest creates a financial miracle. The display page 13800 may also include a navigation tool 13820, which may include a "<PREV" selector 13830 and a "NEXT>" selector 13840.

Figure 139:
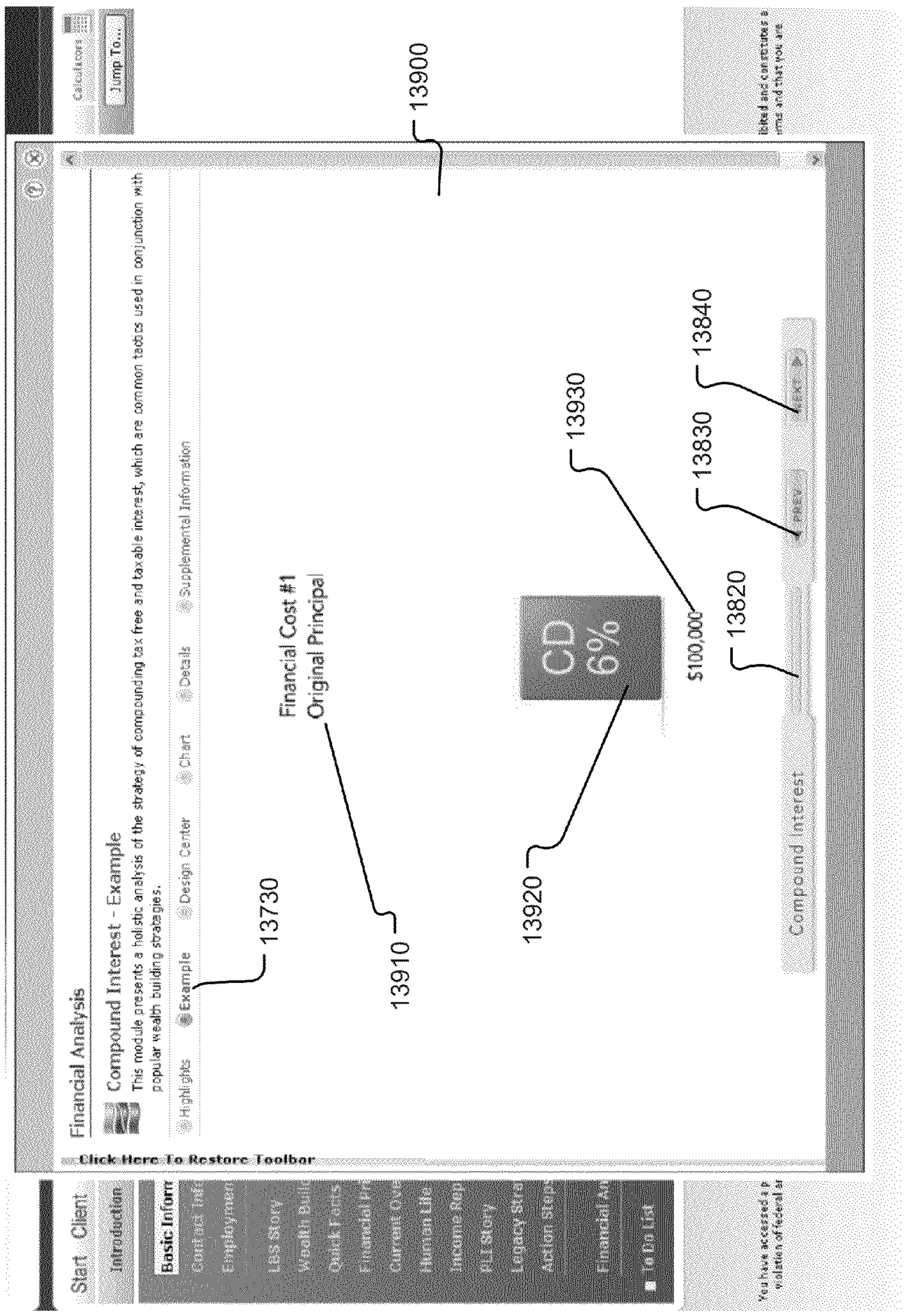

FIG. 139 illustrates an example of the display page 13900, which may be displayed when the example selector 13730 and the "NEXT>" selector 13840 are selected on the display page 13800 (shown in FIG. 138). The display page 13900 may provide a message 13910 conveying the financial principle that an original principal investment may be a financial cost. The display page may also provide a graphical representation of an original principal investment 13920. The graphical representation may be, e.g., a colored rectangle with a label indicating the type of investment (e.g., CD) and the interest rate that the investment yields (e.g., 6%). The display page may also include the amount of the original principal investment 13930 (e.g., $100,000). The display page 13900 may also include a navigation tool 13820 to allow a user to transition to a next display page 14000 by selecting, e.g., a button marked "NEXT>" 13840 or a previous display page 13800 by selecting, e.g., a button marked "<PREV" 13830.

Figure 140:
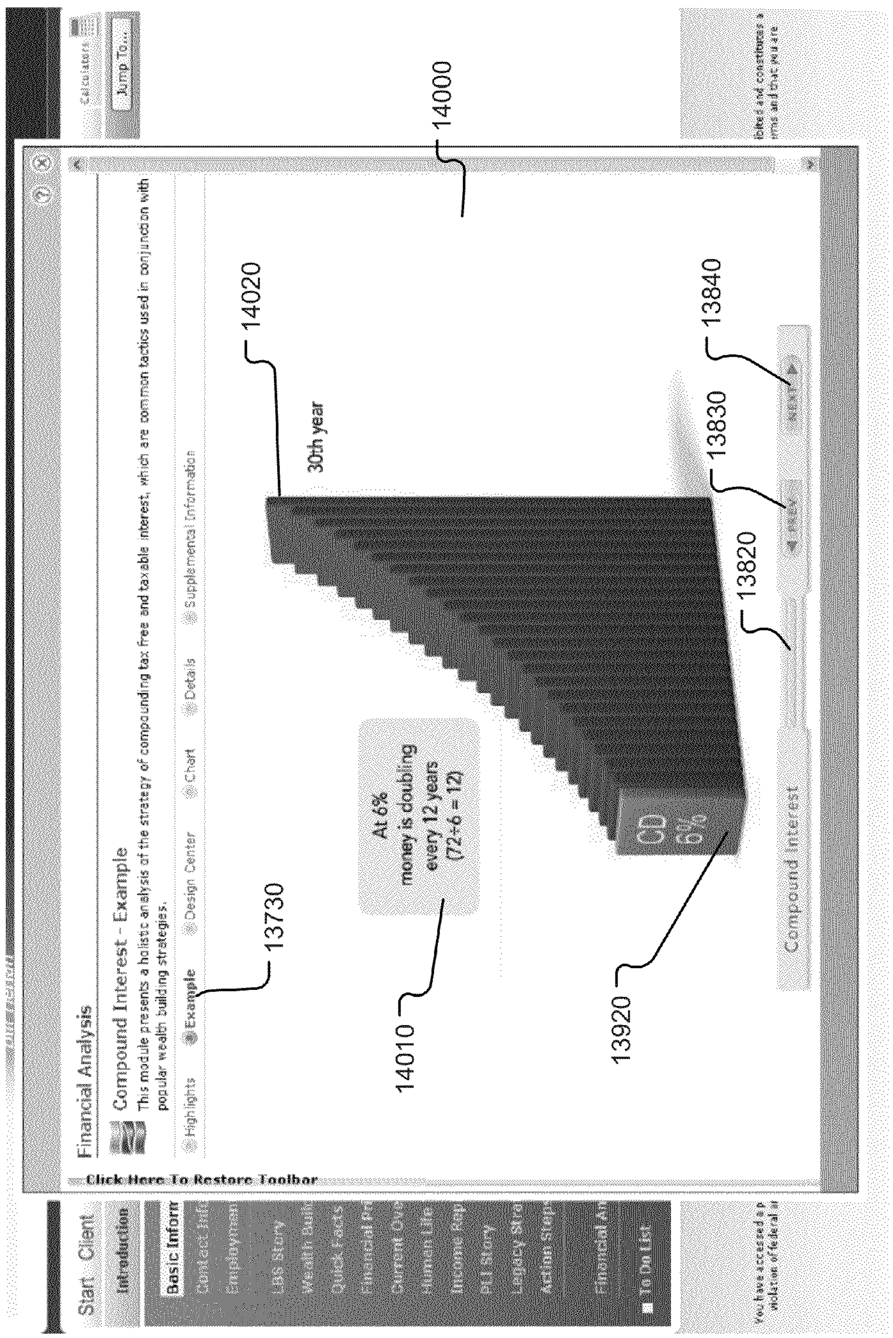

FIG. 140 illustrates an example of the display page 14000, which may be displayed when the example selector 13730 and the "NEXT>" selector 13840 are selected on the display page 13900 (shown in FIG. 139). The display page 14000 may include a graphical representation of the projected growth of an original principal investment 13920 over a period of time (e.g., 30 years). The projected growth may be estimated based upon the assumptions provided in pop-up display 14010 (e.g., at 6% money is doubling every 12 years (e.g., 72/6=12)). According to this projected growth, the original principal investment 13920 may grow to a value represented by a graphic 14020. The graphic 14020 may be, e.g., a large blue rectangle. However, the disclosure need not be limited to such examples. As a result, it will be readily apparent to one of ordinary skill in the art that any graphic may be used, as long as the graphic provides a graphical representation that, e.g., clearly indicates that the investment at 14020 is larger than the original principal investment 13920 because of the projected growth that occurred based upon the assumptions provided in pop-up display 14010. The display page 14000 may include a navigation tool 13820 to allow a user to transition to a next display page 14100 by selecting, e.g., a button marked "NEXT>" 13840 or a previous display page 13900 by selecting, e.g., a button marked "<PREV" 13830.

Figure 141:
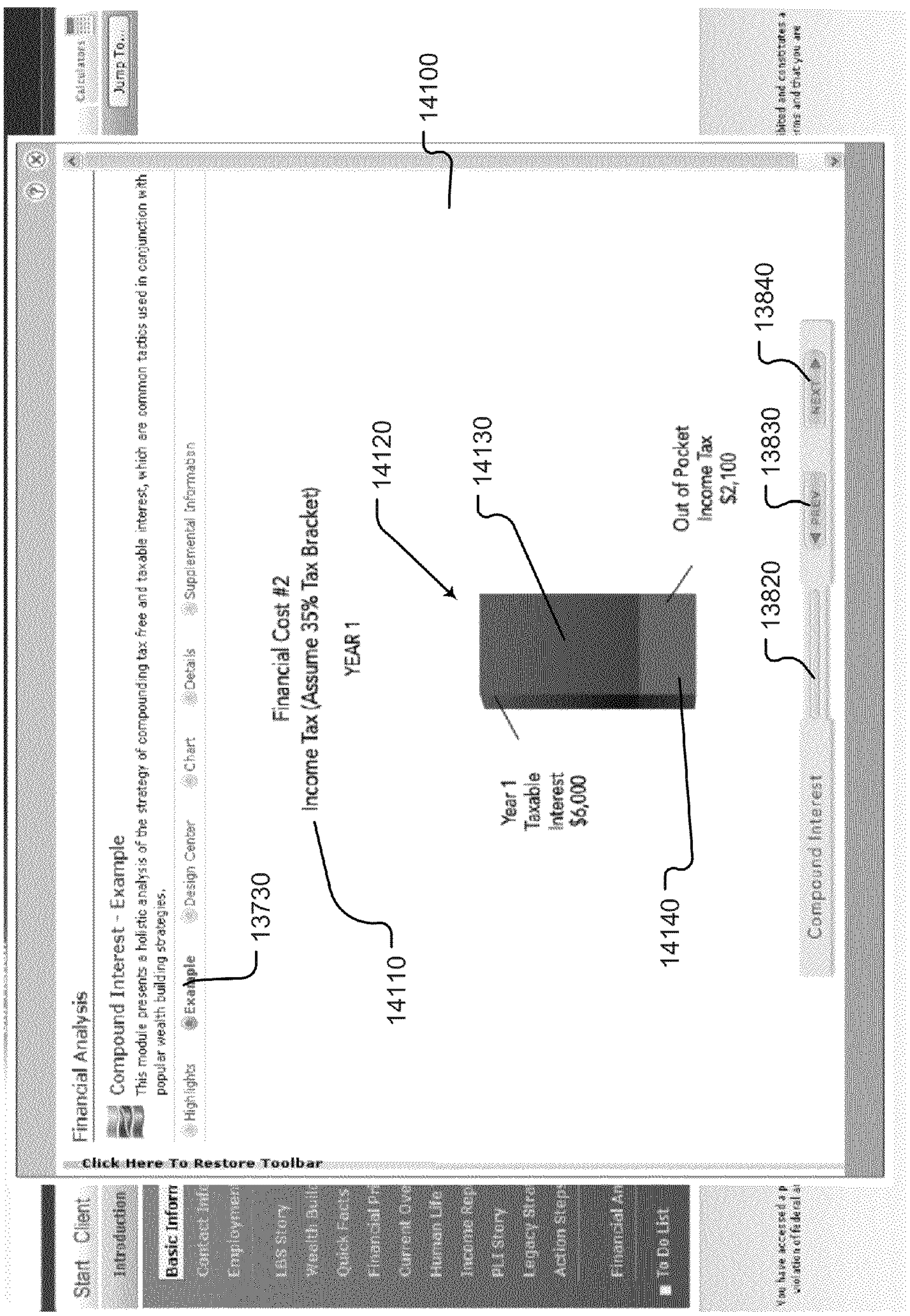

FIG. 141 illustrates an example of the display page 14100, which may be displayed when the example selector 13730 and the "NEXT>" selector 13840 are selected on the display page 14000 (shown in FIG. 140). The display page 14100 may provide a message 14110 conveying the financial principle that income tax may be a financial cost. The display page 14100 may include a graphical representation 14120 that associates a year 1 taxable interest 14130 (e.g., $6,000) with out of pocket income tax 14140 (e.g., $2,100). The graphical representation 14120 may be based, at least in part, on one or more assumptions including, e.g., an original principal investment (e.g., $100,000), a rate of return (e.g., 6%), and an income tax rate (e.g., 35%). The display page 14100 may include a navigation tool 13820 to allow a user to transition to a next display page 14200 by selecting, e.g., a button marked "NEXT>" 13840 or a previous display page 14000 by selecting, e.g., a button marked "<PREV" 13830.

Figure 142:
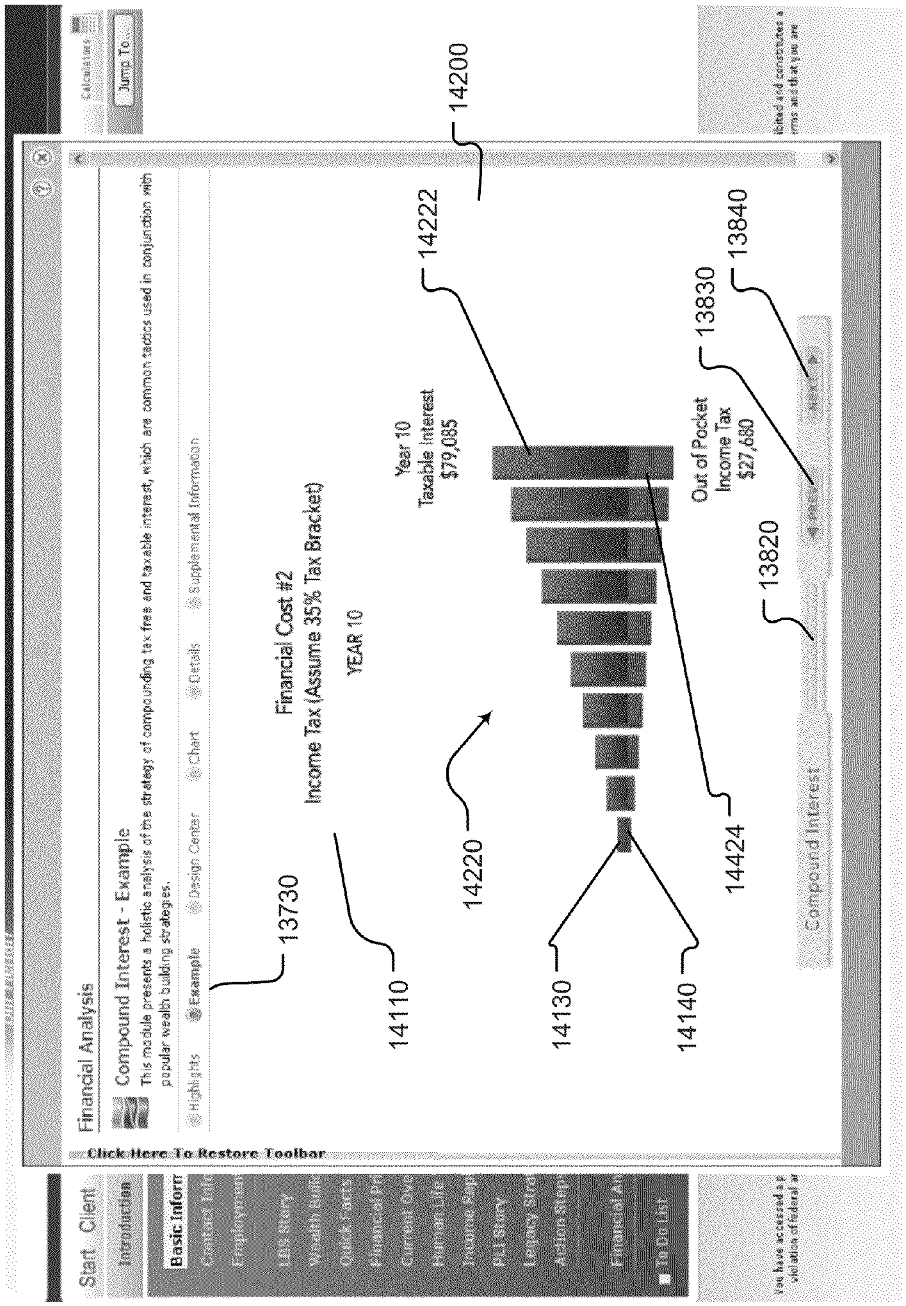

FIG. 142 illustrates an example of display page 14200, which may be displayed when the example selector 13730 and the "NEXT>" selector 13840 are selected on the display page 14100 (shown in FIG. 141). The display page 14200 may provide a message 14110 conveying the financial principle that income tax may be a financial cost. The display page 14200 may include a graphical representation 14220 (e.g., bar graph) that associates the 10 year projected growth of taxable interest 14130 (e.g., $6,000) and the out of pocket income tax 14140 (e.g., $2,100). The graphical representation 14220 may also indicate the value of the taxable interest after 10 years 14222 (e.g., $79,085) and the value of the out of pocket income tax after 10 years 14424 (e.g., $27,680). Each portion of the graphical representation may be presented in a different color, shade, pattern, or the like. The graphical representation 14220 may be based, at least in part, on one or more assumptions including, e.g., an original principal investment (e.g., $100,000), a rate of return (e.g., 6%), and an income tax rate (e.g., 35%). The display page 14200 may include a navigation tool 13820 to allow a user to transition to a next display page 14300 by selecting, e.g., a button marked "NEXT>" 13840 or a previous display page 14100 by selecting, e.g., a button marked "<PREV" 13830.

Figure 143:
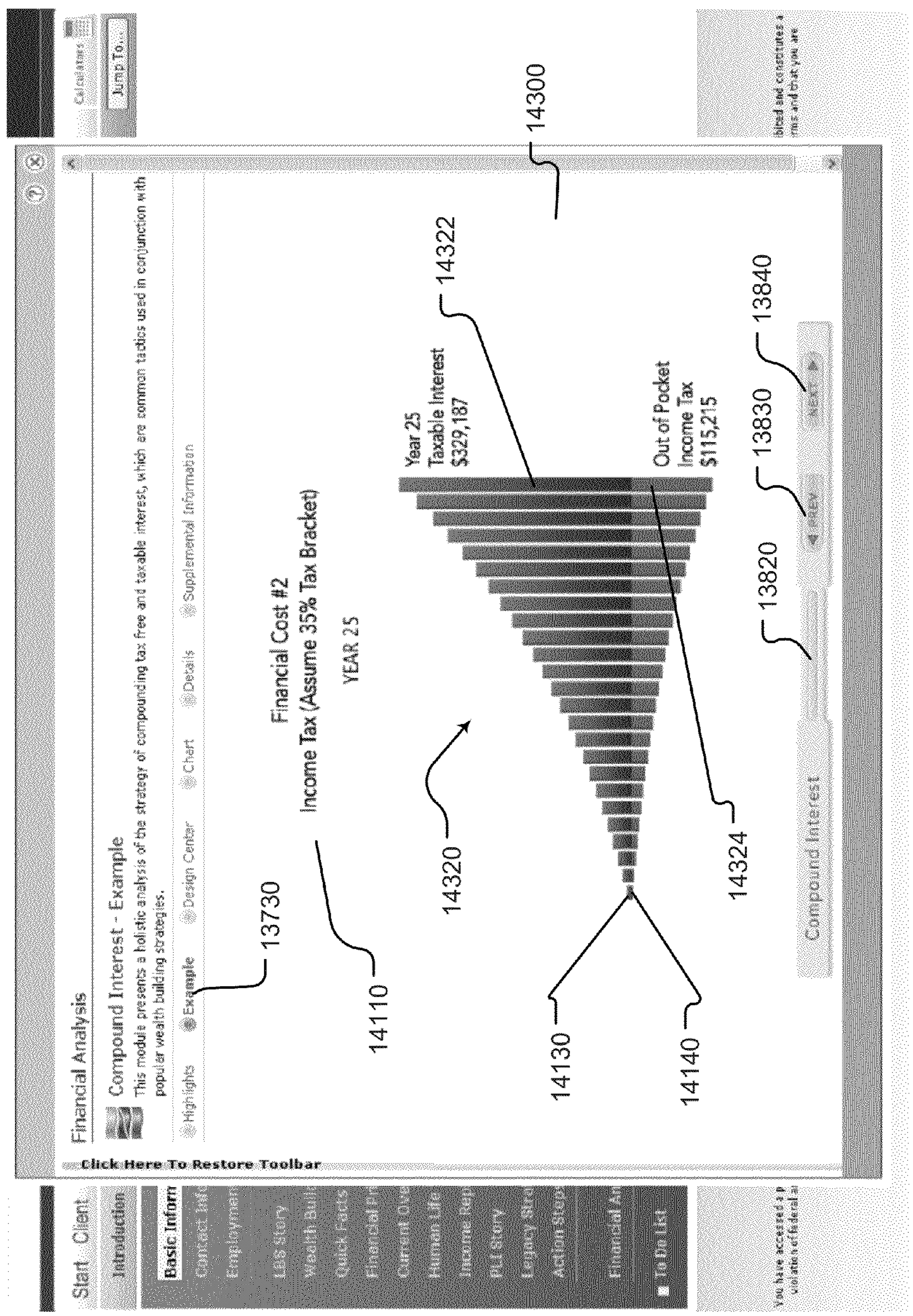

FIG. 143 illustrates an example of display page 14300, which may be displayed when the example selector 13730 and the "NEXT>" selector 13840 are selected on the display page 14200 (shown in FIG. 142). The display page 14300 may provide a message 14110 conveying the financial principle that income tax may be a financial cost. The display page 14300 may include a graphical representation 14320 (e.g., bar graph) that associates the 25 year projected growth of taxable interest 14130 (e.g., $6,000) and the out of pocket income tax 14140 (e.g., $2,100). The graphical representation 14320 may also indicate the value of the taxable interest after 25 years 14322 (e.g., $329,187) and the value of the out of pocket income tax after 25 years 14324 (e.g., $115,215). Each portion of the graphical representation may be presented in a different color, shade, pattern, or the like. The graphical representation 14320 may be based, at least in part, on one or more assumptions including, e.g., an original principal investment (e.g., $100,000), a rate of return (e.g., 6%), and an income tax rate (e.g., 35%). The display page 14300 may include a navigation tool 13820 to allow a user to transition to a next display page 14400 by selecting, e.g., a button marked "NEXT>" 13840 or a previous display page 14200 by selecting, e.g., a button marked "<PREV" 13830.

Figure 144:
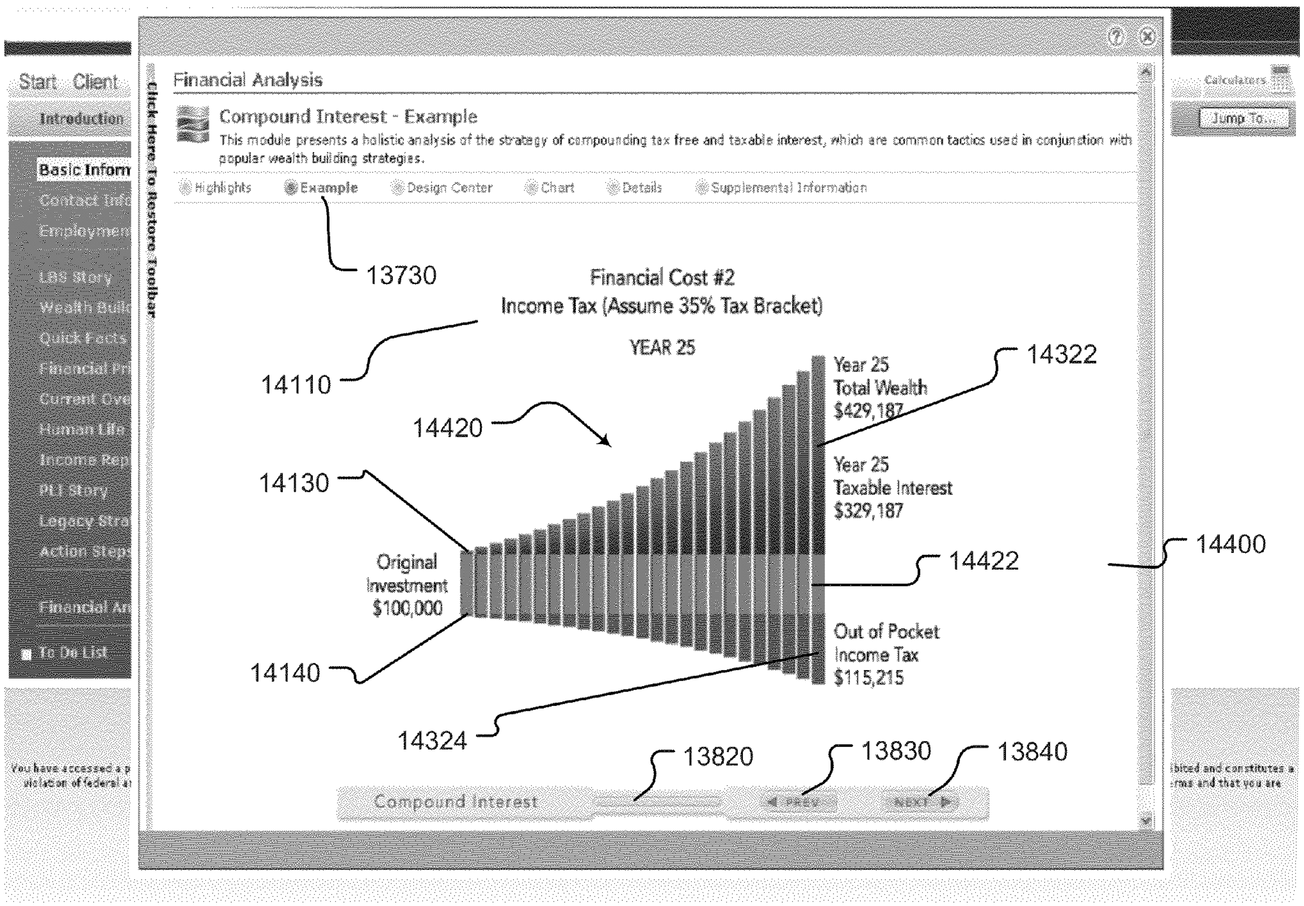

FIG. 144 illustrates an example of display page 14400, which may be displayed when the example selector 13730 and the "NEXT>" selector 13840 are selected on the display page 14300 (shown in FIG. 143). The display page 14400 may provide a message 14110 conveying the financial principle that income tax may be a financial cost. The display page 14400 may include a graphical representation 14420 (e.g., bar graph) that associates the 25 year projected growth of taxable interest 14130 (e.g., $6,000) and the out of pocket income tax 14140 (e.g., $2,100). The graphical representation 14420 may also indicate the value of the taxable interest after 25 years 14322 (e.g., $329,187) and the value of the out of pocket income tax after 25 years 14324 (e.g., $115,215). The graphical representation 14420 may also indicate the original investment amount 14422 (e.g., $100,000). Each portion of the graphical representation may be presented in a different color, shade, pattern, or the like. The graphical representation 14420 may be based, at least in part, on one or more assumptions including, e.g., an original principal investment (e.g., $100,000), a rate of return (e.g., 6%), and an income tax rate (e.g., 35%). The display page 14400 may include a navigation tool 13820 to allow a user to transition to a next display page 14500 by selecting, e.g., a button marked "NEXT>" 13840 or a previous display page 14300 by selecting, e.g., a button marked "<PREV" 13830.

Figure 145:
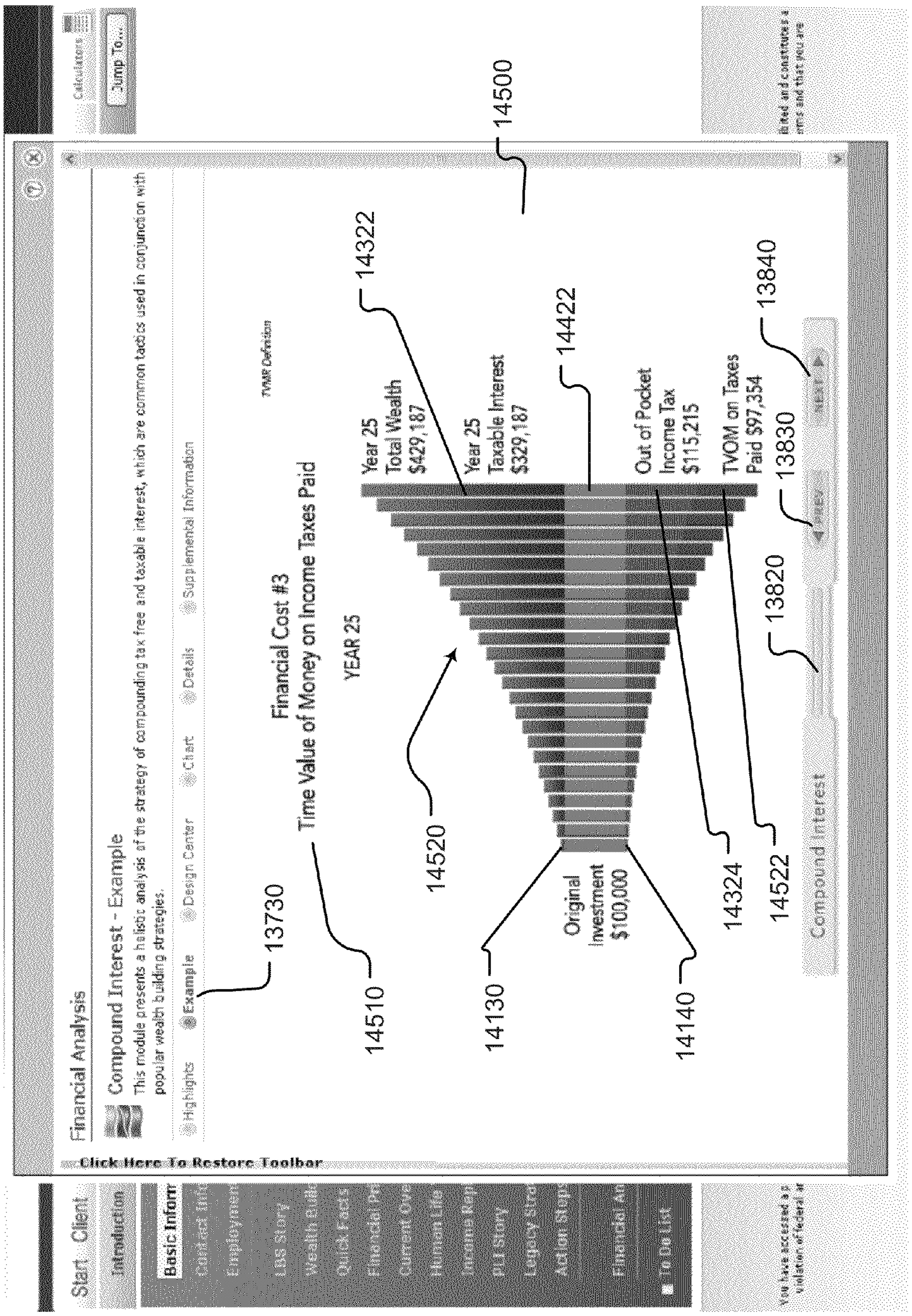

FIG. 145 illustrates an example of display page 14500, which may be displayed when the example selector 13730 and the "NEXT>" selector 13840 are selected on the display page 14400 (shown in FIG. 144). The display page 14500 may provide a message 14510 conveying the financial principle that TVOM on income taxes paid may be a financial cost. The display page 14500 may include a graphical representation 14520 (e.g., bar graph) that associates the 25 year projected growth of taxable interest 14130 (e.g., $6,000) and the out of pocket income tax 14140 (e.g., $2,100). The graphical representation 14520 may also indicate the value of the taxable interest after 25 years 14322 (e.g., $329,187) and the value of the out of pocket income tax after 25 years 14324 (e.g., $115,215). The graphical representation 14520 may also indicate the original investment amount 14422 (e.g., $100,000). The graphical representation 14520 may also indicate a TVOM on taxes paid 14522 (e.g., $97,354). Each portion of the graphical representation may be presented in a different color, shade, pattern, or the like. The graphical representation 14520 may be based, at least in part, on one or more assumptions including, e.g., an original principal investment (e.g., $100,000), a rate of return (e.g., 6%), an income tax rate (e.g., 35%), and a TVOM rate. The display page 14500 may include a navigation tool 13820 to allow a user to transition to a next display page 14600 by selecting, e.g., a button marked "NEXT>" 13840 or a previous display page 14400 by selecting, e.g., a button marked "<PREV" 13830.

Figure 146:
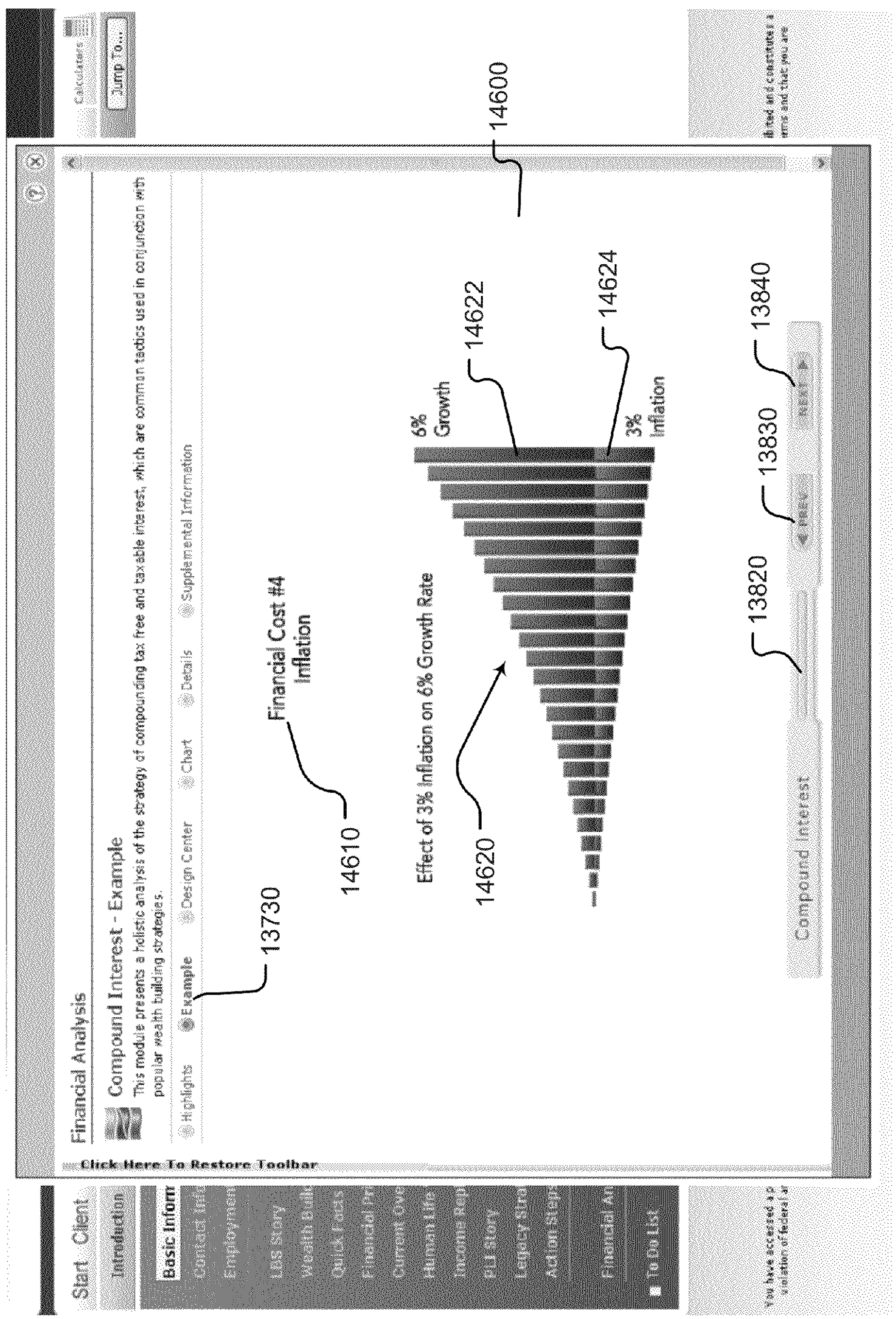

FIG. 146 illustrates an example of display page 14600, which may be displayed when the example selector 13730 and the "NEXT>" selector 13840 are selected on the display page 14500 (shown in FIG. 145). The display page 14600 may provide a message 14610 conveying the financial principle that inflation may be a financial cost. The display page 14600 may also include a graphical representation 14620 (e.g., a bar graph) that associates the effect of 3% inflation 14624 on 6% growth 14622. Each portion of the graphical representation may be presented in a different color, shade, pattern, or the like. The display page 14600 may include a navigation tool 13820 to allow a user to transition to a next display page 14700 by selecting, e.g., a button marked "NEXT>" 13840 or a previous display page 14500 by selecting, e.g., a button marked "<PREV" 13830.

Figure 147:
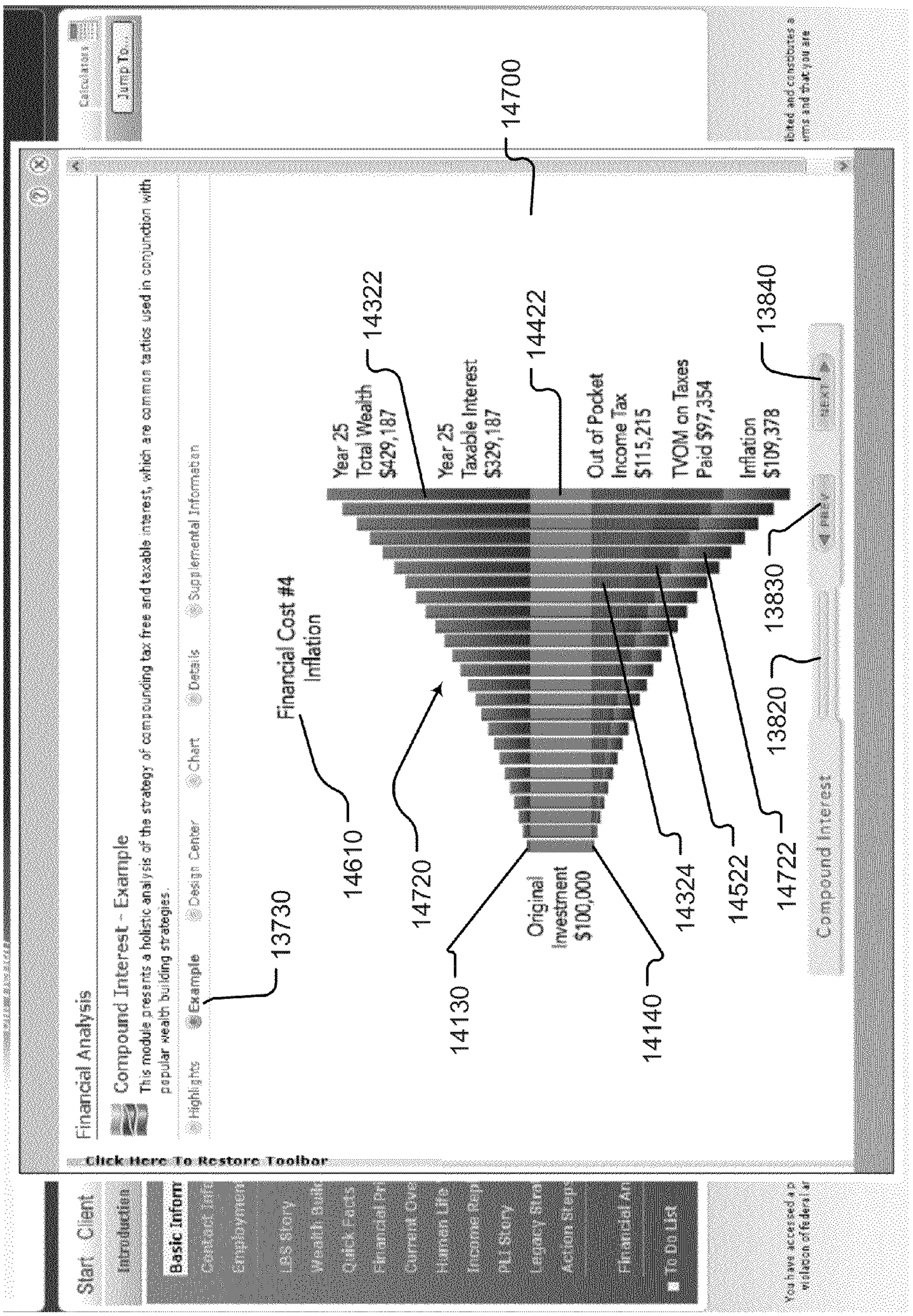

FIG. 147 illustrates an example of display page 14700, which may be displayed when the example selector 13730 and the "NEXT>" selector 13840 are selected on the display page 14600 (shown in FIG. 146). The display page 14700 may provide a message 14610 conveying the financial principle that inflation may be a financial cost. The display page 14700 may include a graphical representation 14720 (e.g., bar graph) that associates the 25 year projected growth of taxable interest 14130 (e.g., $6,000) and the out of pocket income tax 14140 (e.g., $2,100). The graphical representation 14720 may also indicate the value of the taxable interest after 25 years 14322 (e.g., $329,187) and the value of the out of pocket income tax after 25 years 14324 (e.g., $115,215). The graphical representation 14720 may also indicate the original investment amount 14422 (e.g., $100,000). The graphical representation 14720 may also indicate a TVOM on taxes paid 14522 (e.g., $97,354). The graphical representation 14720 may also indicate the effect of inflation 14722 (e.g., $109,378) on investment growth rate. Each portion of the graphical representation may be presented in a different color, shade, pattern, or the like. The graphical representation 14720 may be based, at least in part, on one or more assumptions including, e.g., an original principal investment (e.g., $100,000), a rate of return (e.g., 6%), an income tax rate (e.g., 35%), and a TVOM on taxes paid (e.g., $97,354). The display page 14700 may include a navigation tool 13820 to allow a user to transition to a next display page 14800 by selecting, e.g., a button marked "NEXT>" 13840 or a previous display page 14600 by selecting, e.g., a button marked "<PREV" 13830.

Figure 148:
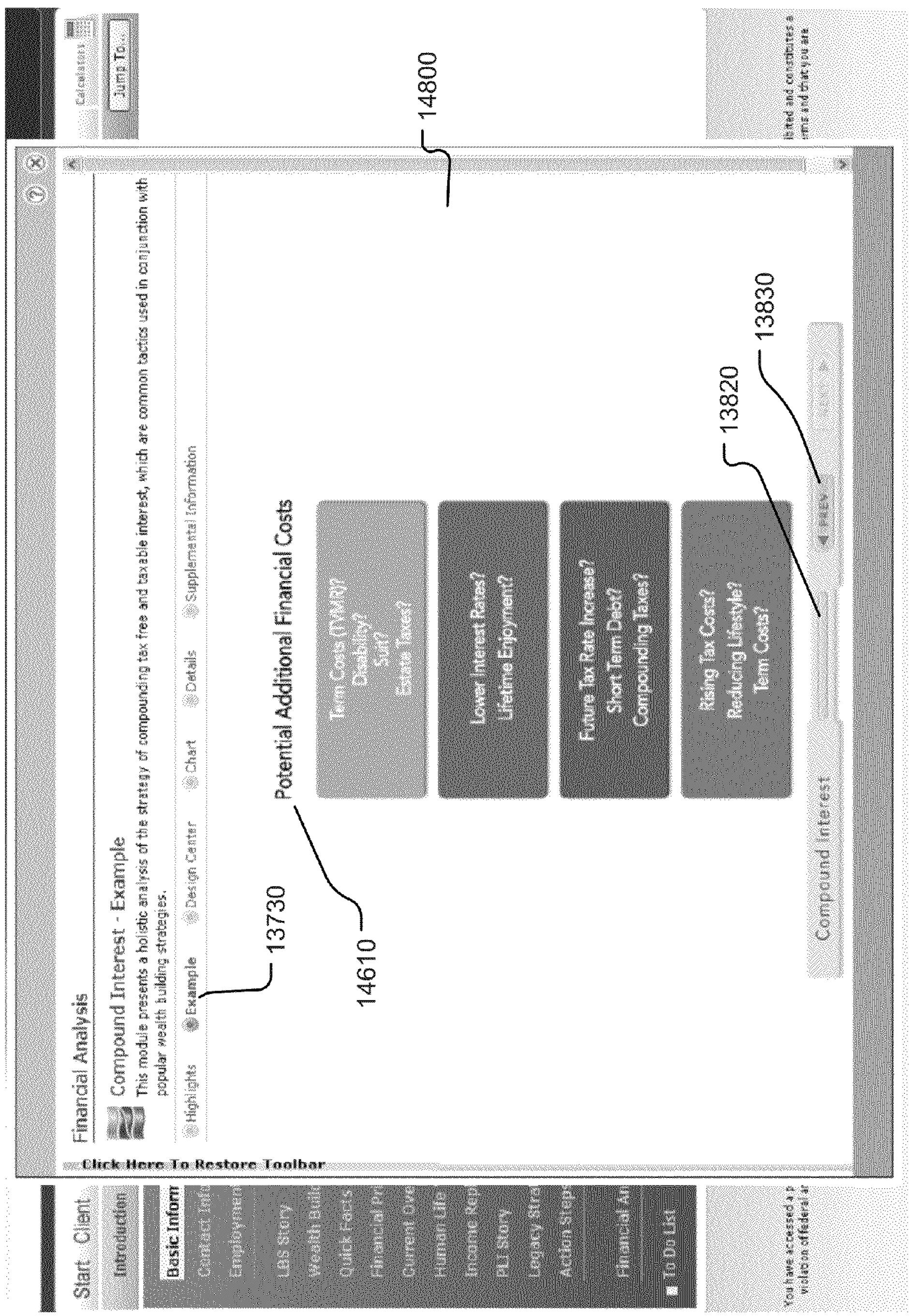

FIG. 148 illustrates an example of display page 14800, which may be displayed when the example selector 13730 and the "NEXT>" selector 13840 are selected on the display page 14700 (shown in FIG. 147). Display page 14800 may include a potential additional financial costs graphic 14610. The graphic may indicate a plurality of potential additional financial costs. The plurality of potential additional financial costs may include, e.g., term costs (TVMR), disability, suit, estate taxes, lower interest rates, lifetime enjoyment, future tax rate increase, short term debt, compounding taxes, rising tax costs, reducing lifestyle, term costs, or the like. The display page 14800 may include a navigation tool 13820 to allow a user to transition to a previous display page 14700 by selecting, e.g., a button marked "<PREV" 13830.

Figure 149:
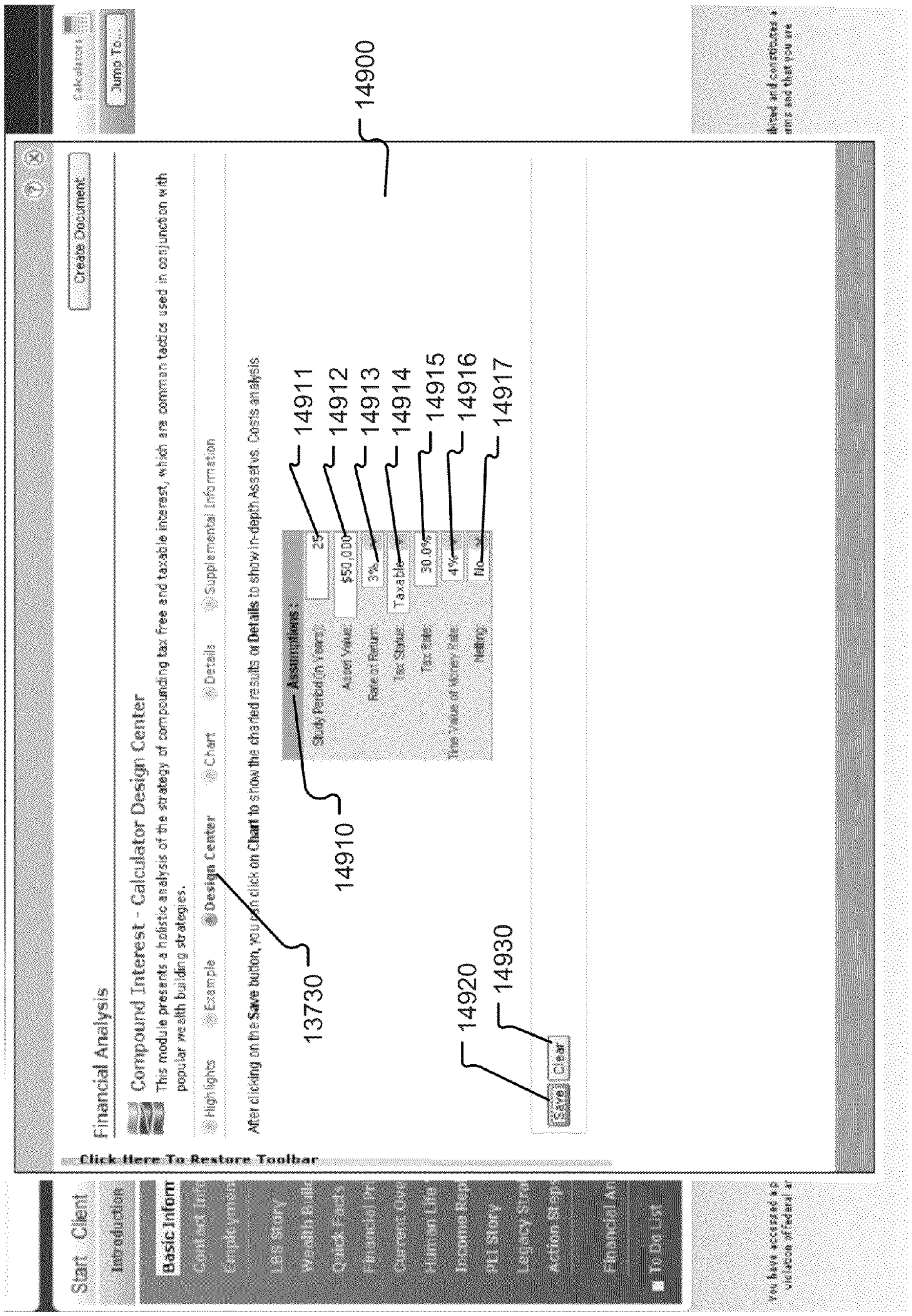

FIG. 149 illustrates an example of the display page 14900, which may be displayed when the design center selector 13730 is selected. The display page 14900 may include a calculator design center assumptions region 14910. The calculator design center assumptions region 14910 may include a study period field 14911, an asset value field 14912, a rate of return field 14913, a tax status field 14914, a tax rate field 14915, a TVOM rate field 14916, and a netting field 14917. Each of the fields included in the calculator design center assumptions region 14910 may be configured to accept a value associated with the field. The values may be accepted, and therefore received, as the result of user interactions with display page 14900. The user interactions may include, e.g., inputting values using a keyboard, a pointing device (e.g., mouse), a touch screen interface, or the like. The values in each of the fields may either be saved by selecting the "Save" button 14920 or cleared by selecting the "Clear" button 14930.

Figure 150:
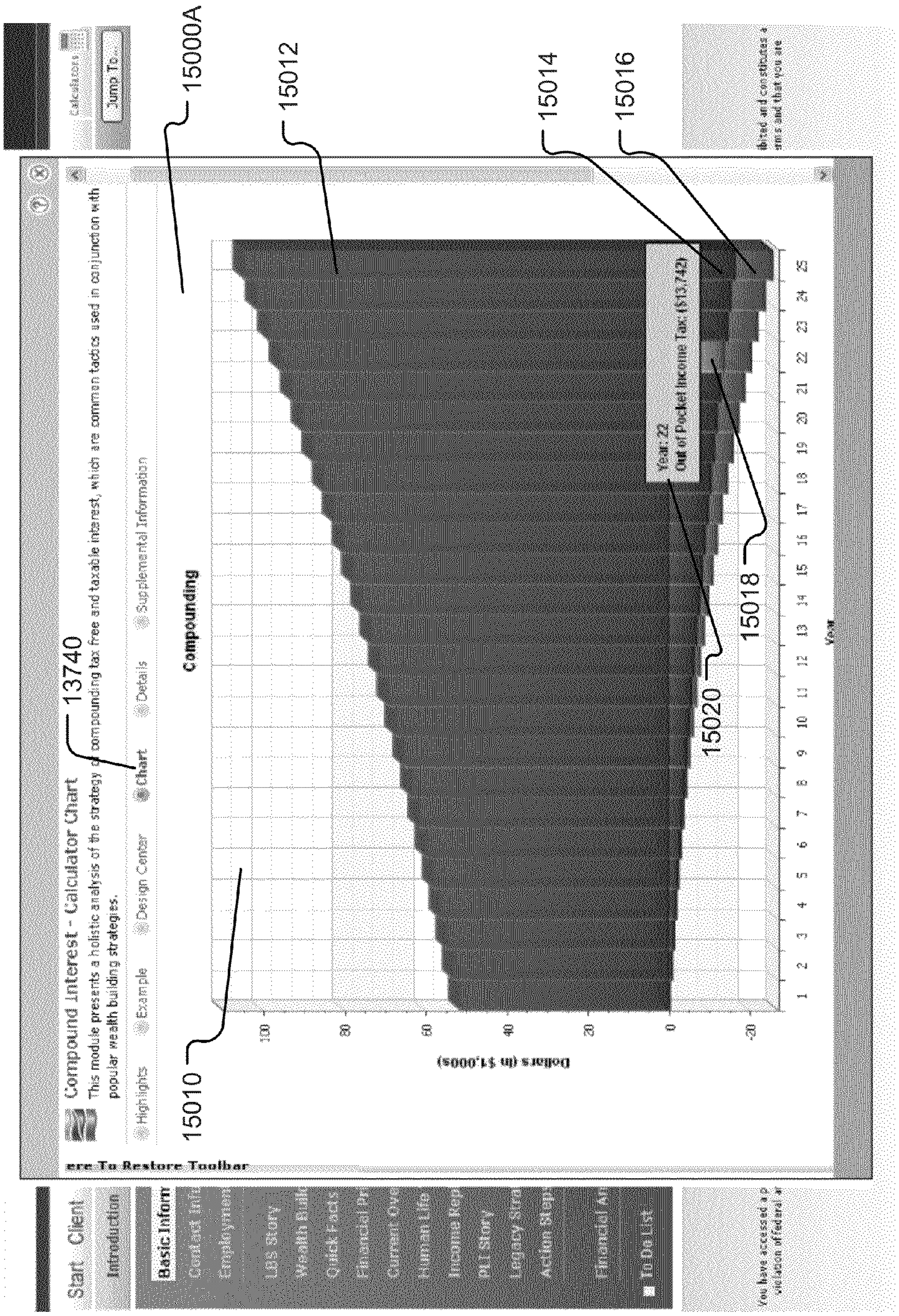

FIG. 150 illustrates an example of the display page 15000A, which may be displayed after, e.g., a user has selected chart selector 13740 and completed one or more fields in the assumptions region 14910. In response to the user's selection of the chart selector 13740 and completion of one or more fields in the assumptions region 14910, the display page 15000A may present, e.g., a compounding interest chart including a plurality of graphs. The plurality of graphs (e.g., bar graphs) may include, e.g., an asset value graph 15012, an out of pocket income tax 15014, and a TVOM chart 15016. Each graph may be presented in a different color, shade, pattern, or the like.

According to one aspect of the present disclosure, the charts provided by the disclosure, e.g., chart 15010, may be interactive. A user may interact with the chart by, e.g., selecting one or more aspects of the chart 15010. After a user interacts with the chart 15010 by, e.g., selecting one or more portions of bar graph 15014, the selected portion of the chart may be, e.g., highlighted 15018. In addition, or alternatively, a pop-up window may be provided that displays data associated with the selected portion of the chart 15010. For example, when a portion of the chart is selected 15018, the pop-up window 15020 may be displayed in accordance with a fly over feature of the present disclosure. The pop-up window 15020 may display the year associated with the selected portion of the chart (e.g., 22), the out of pocket income tax associated with the selected portion of the chart (e.g., $13,742), or the like. A user may use a device, e.g., a mouse, keyboard, touchscreen, or the like, to interact with display page 15000A. This interaction may include, e.g., a scrolling command which scrolls down display page 15000A to reveal display page 15000B.

Figure 151:
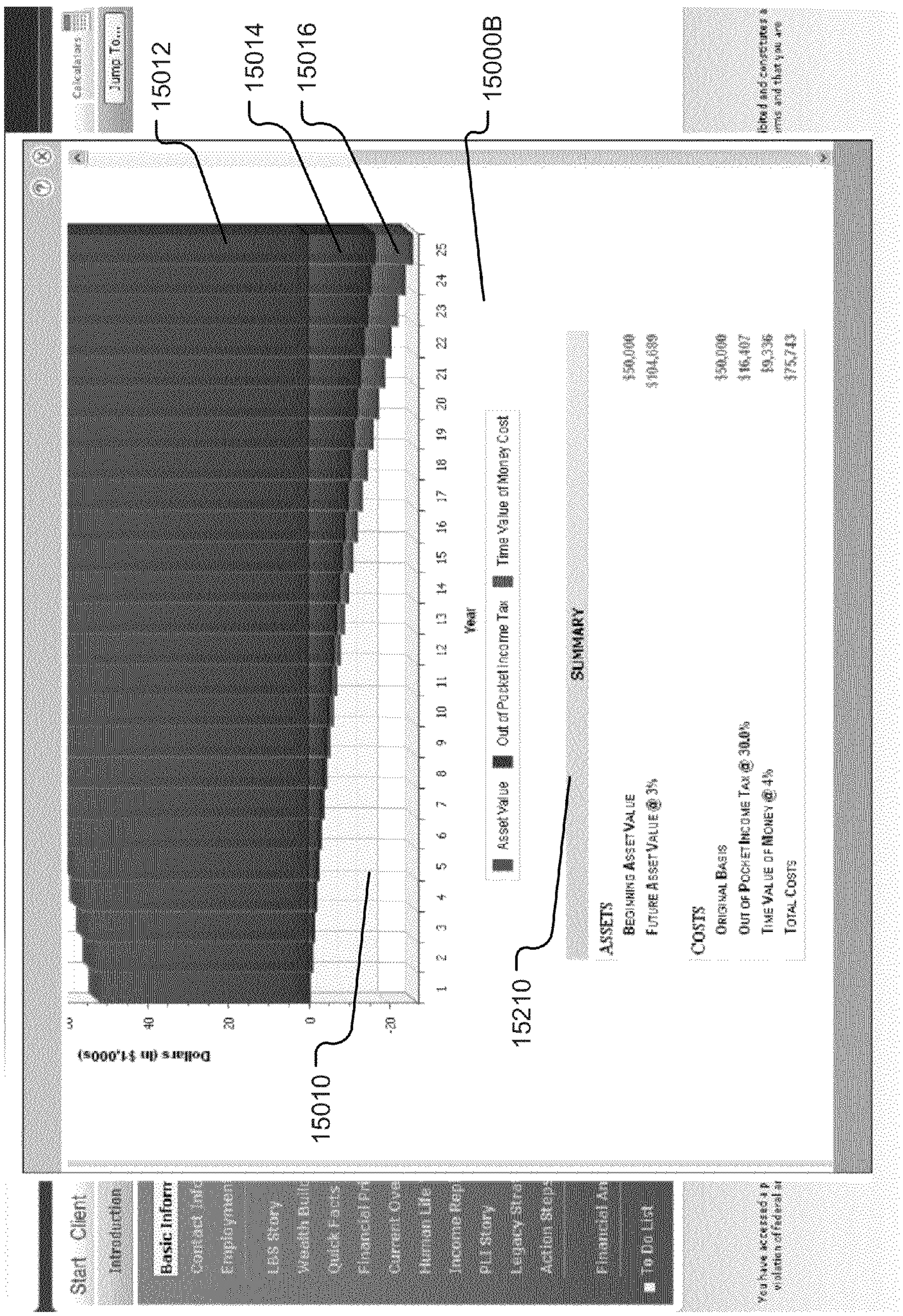

FIG. 151 illustrates an example of the display page 15000B, which may be displayed after a user scrolls downwards while viewing display page 15000A. In addition to a portion of chart 15010 from display page 15000A, display page 15000B may also disclose a summary region 15210. The summary region may include, e.g., a summary of assets (e.g., beginning asset value and a future asset value at a defined interest rate, such as, e.g., 3%) and a summary of costs (e.g., original basis, out of pocket income tax at a defined interest rate, such as, e.g., 30.0%, a TVOM at a defined interest rate, such as, e.g., 4%, and total costs).

Figure 152:
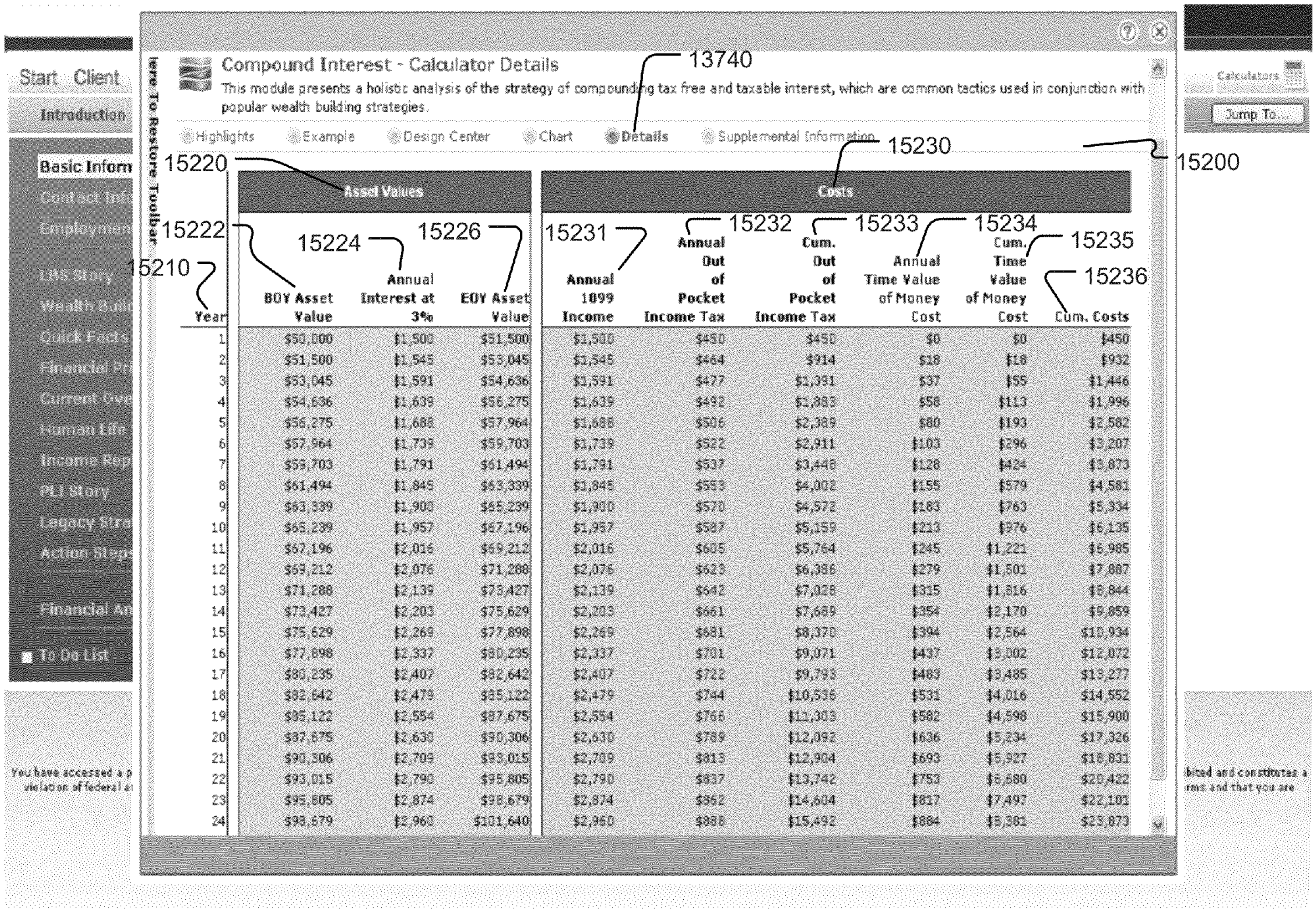

FIG. 152 illustrates an example of the display page 15200, which may be displayed when the details selector 13740 is selected. Display page 15200 may include a detailed view of one or more aspects of the chart data displayed in the chart 15010 on display page 15000A (in FIG. 150). For example, display page 15200 may include an asset value chart (e.g., table or listing) 15220. The asset value chart 15220 may include information such as, e.g., a beginning of the year (BOY) asset value 15222, a annual interest at 3% value 15224, and an end of year (EOY) asset value 15226. In addition, the display page 15200 may include cost chart (e.g., table or listing) 15230. The cost chart may include information such as, e.g., an annual 1099 income 15231, an annual out of pocket income tax 15232, a cumulative out of pocket income tax 15233, an annual TVOM cost 15234, a cumulative TVOM cost 15235, and a cumulative cost 15236. Every row in each respective chart may be organized by predetermined increments of time 15210 (e.g., daily, weekly, monthly, yearly, or the like).

Figure 153:
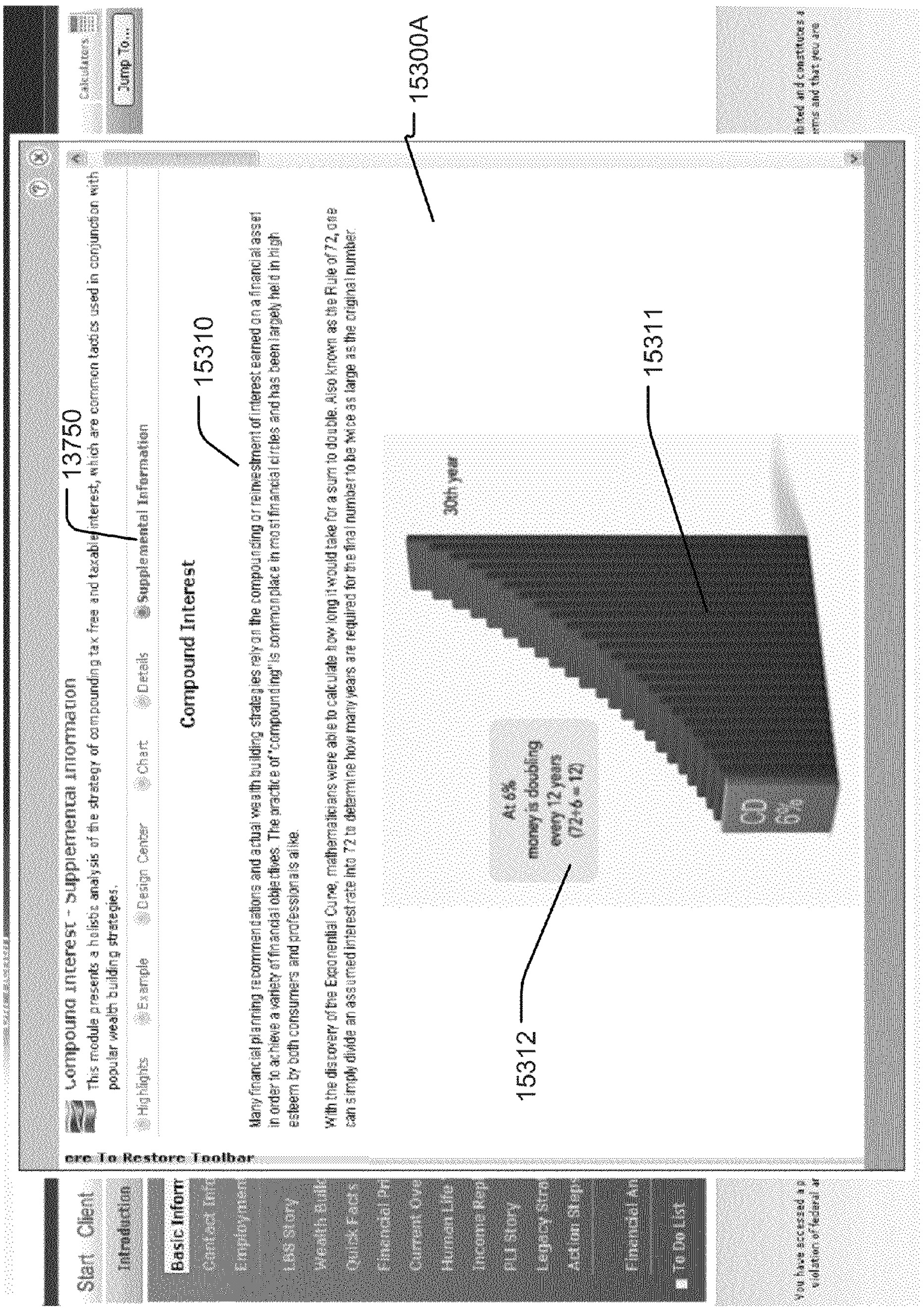

FIG. 153 illustrates an example of the display page 15300A, which may be displayed when the supplemental information selector 13750 is selected. The information provided on display 15300A may include supplemental information regarding compound interest. The supplemental information may include an overview of compound interest 15310. The supplemental information may also include a graphical representation 15311 of the projected growth of an original principal investment over a period of 30 years. The projected growth may be estimated based upon the assumptions provided in pop-up display 15312. A user may use a device, e.g., a mouse, keyboard, touchscreen, or the like, to interact with display page 15300A. This interaction may include, e.g., a scrolling command which scrolls down display page 15300A to reveal display page 15300B.

Figure 154:
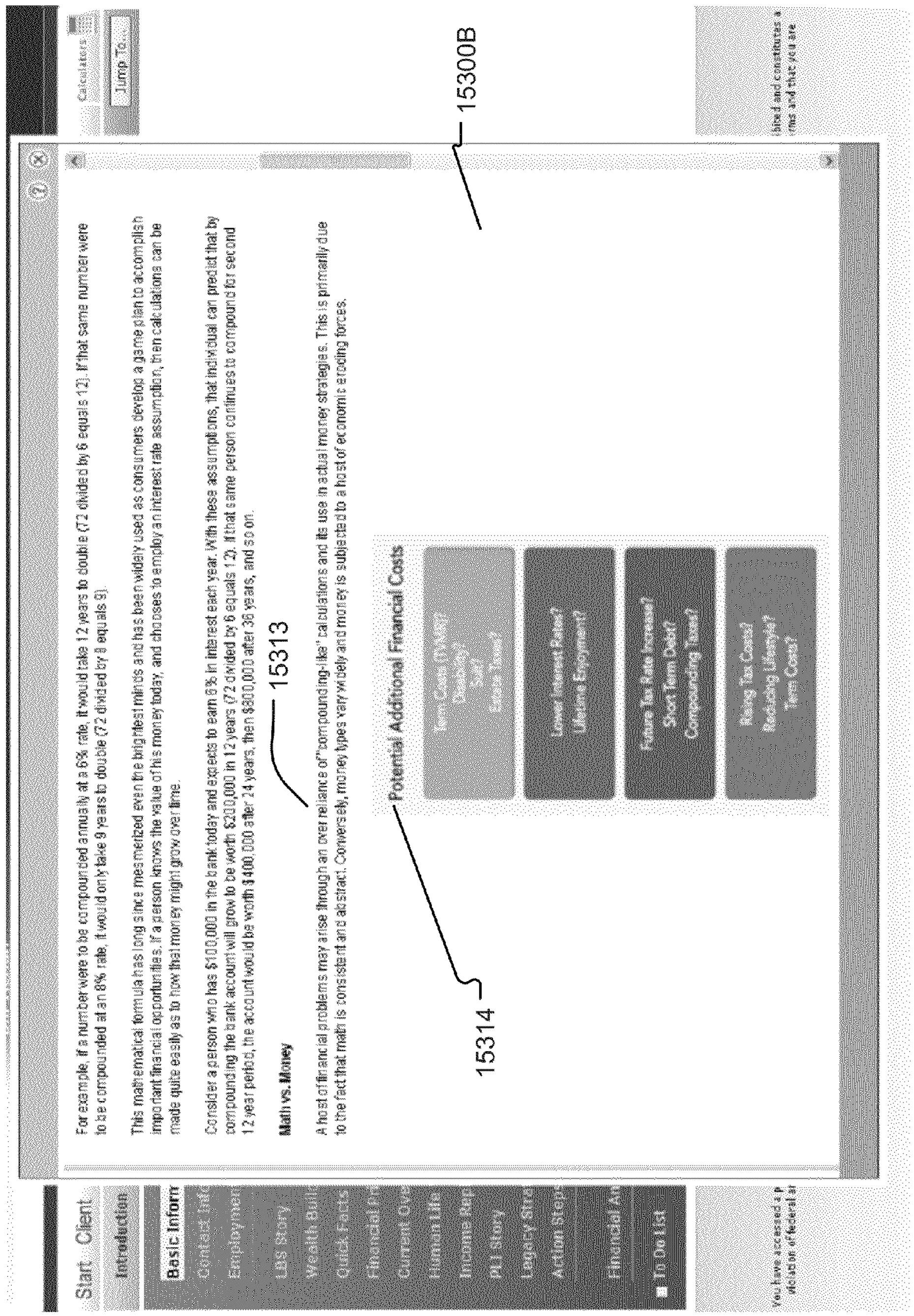

FIG. 154 illustrates an example of the display page 15300B, which may be displayed after a user scrolls downwards while viewing display page 15300A. Display page 15300B provides additional supplemental information regarding compound interest. Display page 15300B may include a math vs. money overview 15313. The display page may also include a potential additional financial costs graphic 15314. The graphic may provide a plurality of potential additional financial costs. The plurality of potential additional financial costs may include, e.g., term costs (TVMR), disability, suit, estate taxes, lower interest rates, lifetime enjoyment, future tax rate increase, short term debt, compounding taxes, rising tax costs, reducing lifestyle, term costs, or the like. A user may use a device, e.g., a mouse, keyboard, touchscreen, or the like, to interact with display page 15300B. This interaction may include, e.g., a scrolling command which scrolls down display page 15300B to reveal display page 15300C.

Figure 155:
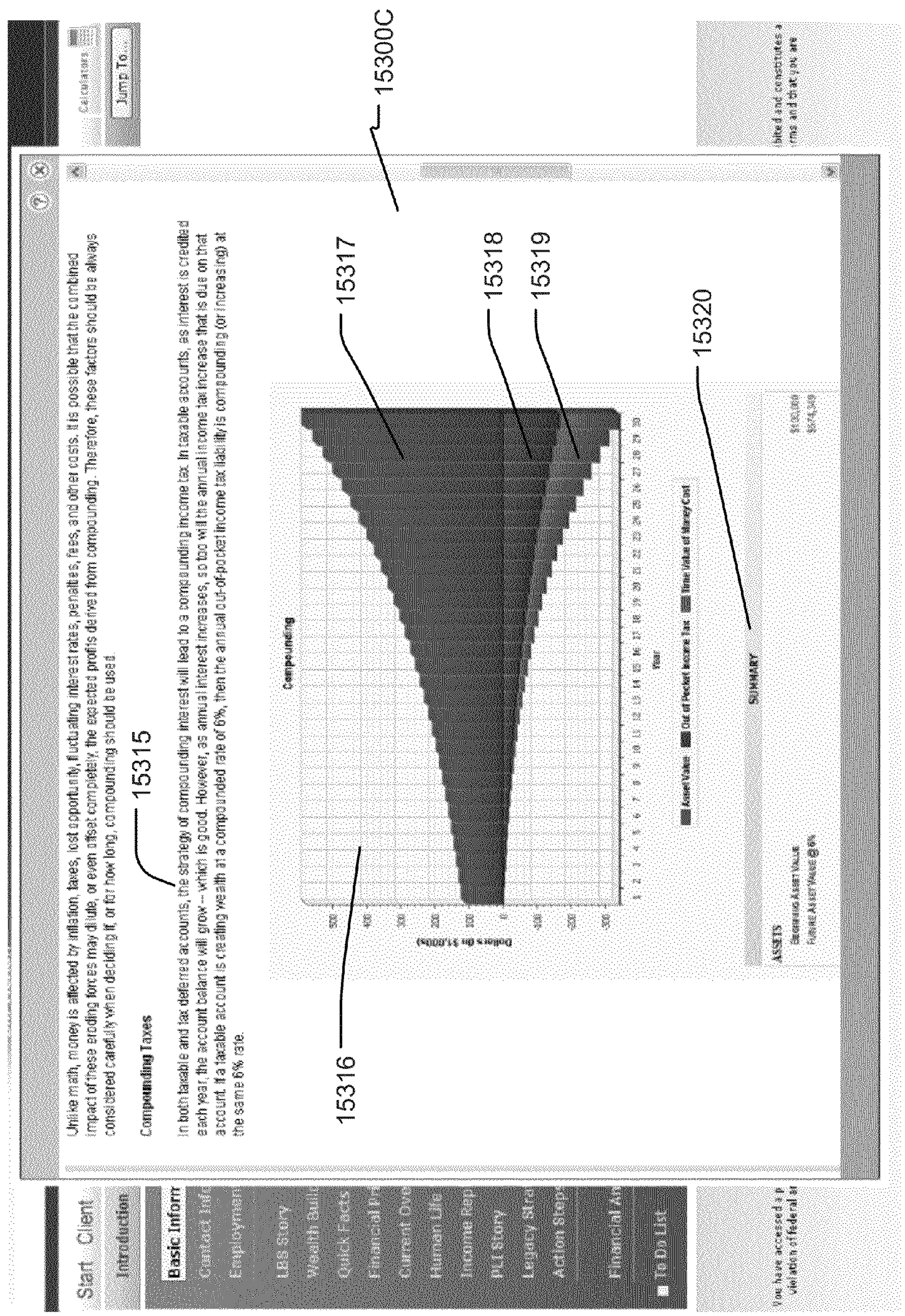

FIG. 155 illustrates an example of the display page 15300C, which may be displayed after a user scrolls downwards while viewing display page 15300B. Display page 15300C provides additional supplemental information regarding compounding interest. Display page 15300C may include an overview of compounding taxes 15315. Display page 15300C may also include a chart 15316 that includes an asset value graph 15317 (e.g., bar graph), an out of pocket income tax graph 15318 (e.g., bar graph), and a TVOM cost graph 15319 (e.g., bar graph). Each graph may be presented in a different color, shade, pattern, or the like. The display page 15300C may further include a summary region 15320 that includes a summary of assets, which may include, e.g., beginning asset value and future asset value (e.g., @ 6%). It should also be contemplated that the summary region 15320 may include other information related to compound interest and chart 15316. A user may use a device, e.g., a mouse, keyboard, touchscreen, or the like, to interact with display page 15300C. This interaction may include, e.g., a scrolling command which scrolls down display page 15300C to reveal display page 15300D.

Figure 156:
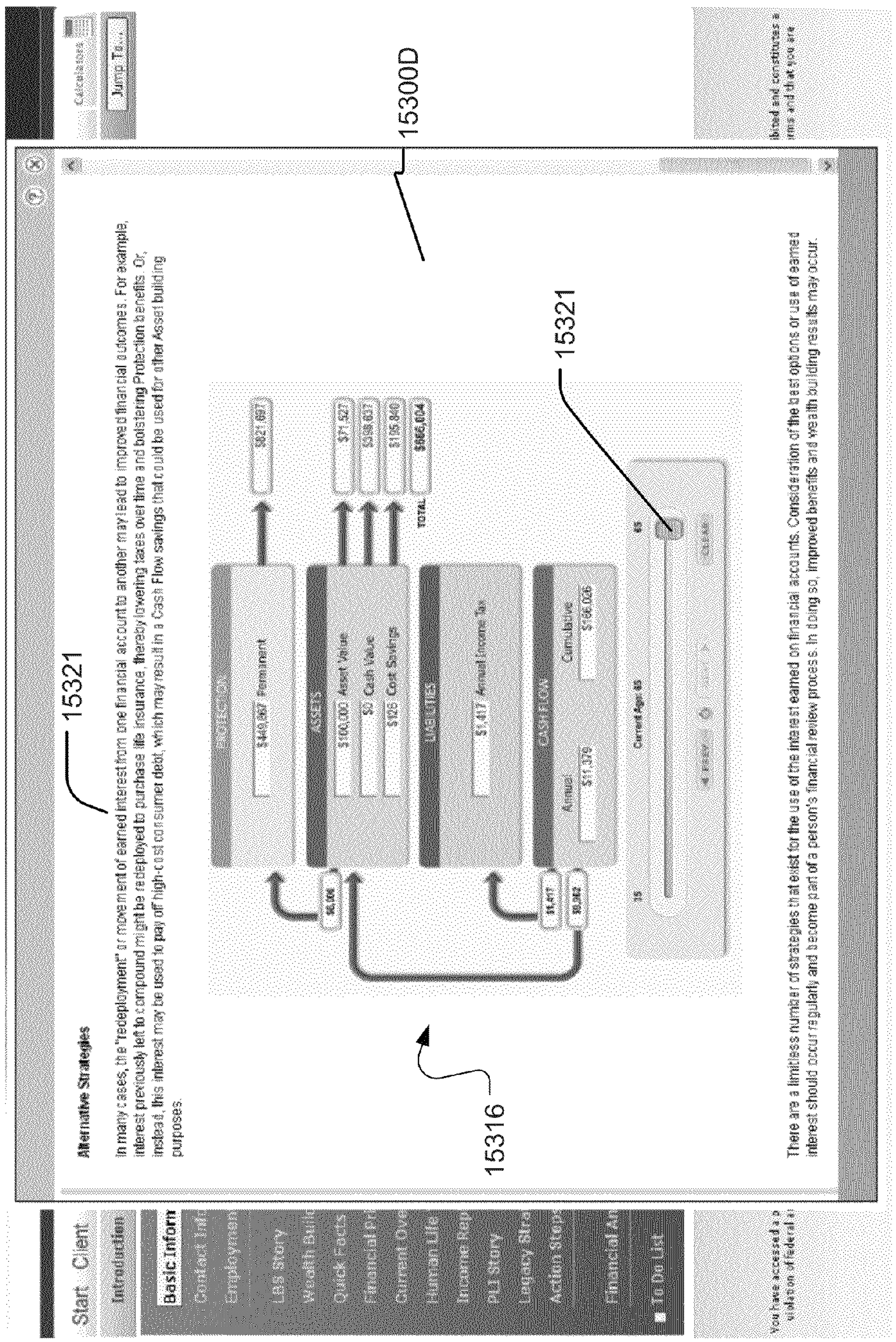

FIG. 156 illustrates an example of the display page 15300D, which may be displayed after a user scrolls downwards while viewing display page 15300C. Display page 15300D provides additional supplemental information regarding compounding interest. Display page 15300D may include an overview of alternative strategies 15321. The display page may also include a current scenario deployment graphic 15316. The current scenario deployment graphic may provide, e.g., a graphical representation of at least one alternative financial allocation strategy. An age slider portion 15321 may be associated with the current scenario deployment graphic 15316. For example, the age slider portion 15321 may be moveable in a range that includes the client's current age (e.g., age 35) at one end and an identified retirement age at the other, opposite end (e.g., age 65). The values in the current scenario deployment graphic 15316 may dynamically recalculate in accordance with the position of the slider portion 15321.

FIGS. 157-162 illustrate examples of display pages that show aspects of a variable interest rate portion of the financial analysis tool, in accordance with one embodiment of the disclosure. The variable interest rate portion of the financial analysis tool may analyze the impact of varying hypothetical interest assumptions on distribution cash flow.

Figure 157:
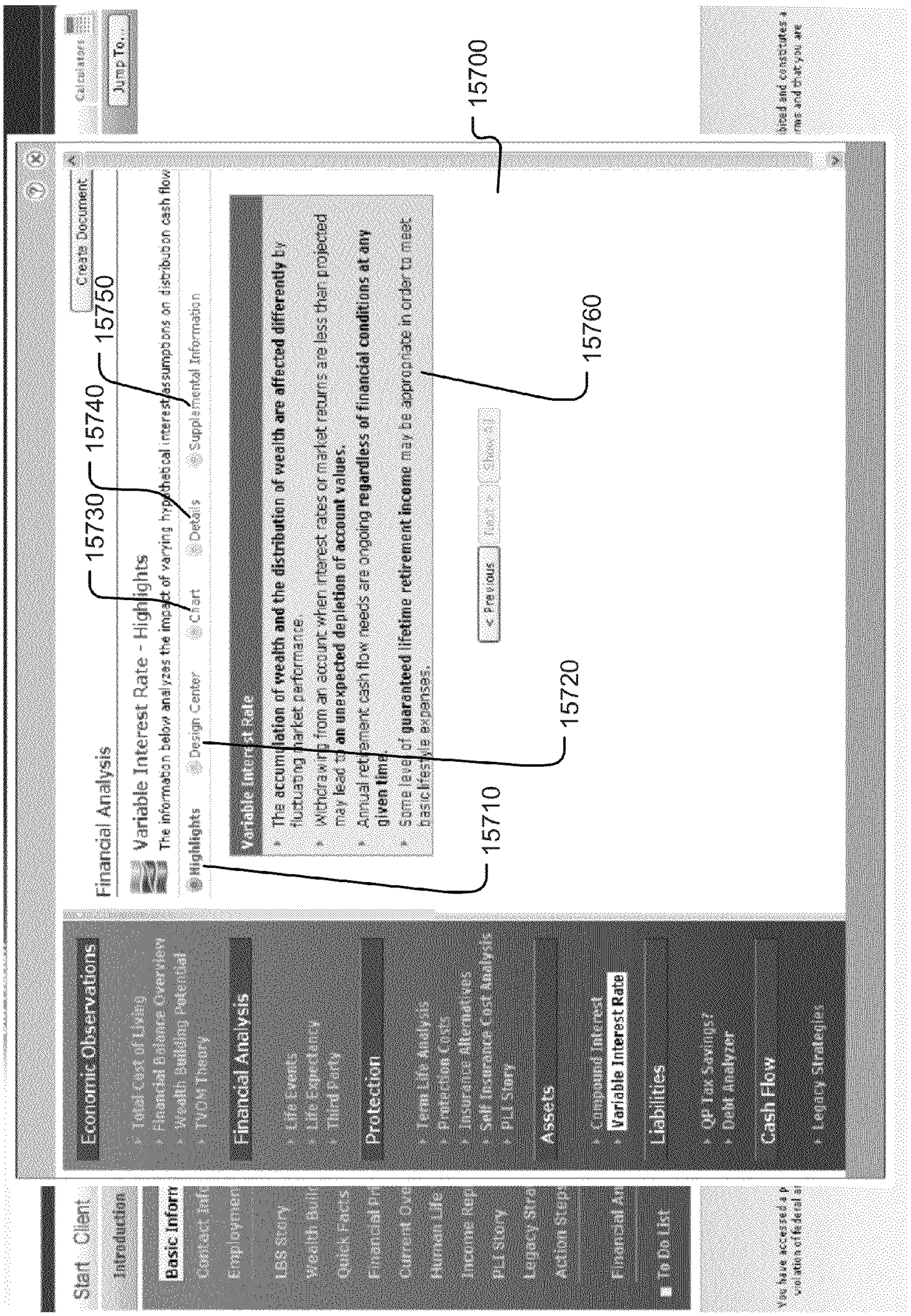

FIG. 157 illustrates an example of the display page 15700, which may include a plurality of variable interest rate selectors. The plurality of interest rate selectors may include a highlights selector 15710, a design center selector 15720, a chart selector 15730, a details selector 15740, and a supplemental information selector 15750. The display page 15700 may further include a highlights message 15760, which may be displayed when the highlight selector 15710 is selected on the display page 15700. The highlights message 15760 may include one or more highlights of variable interest rates, including the particular examples provided in FIG. 157.

Figure 158:
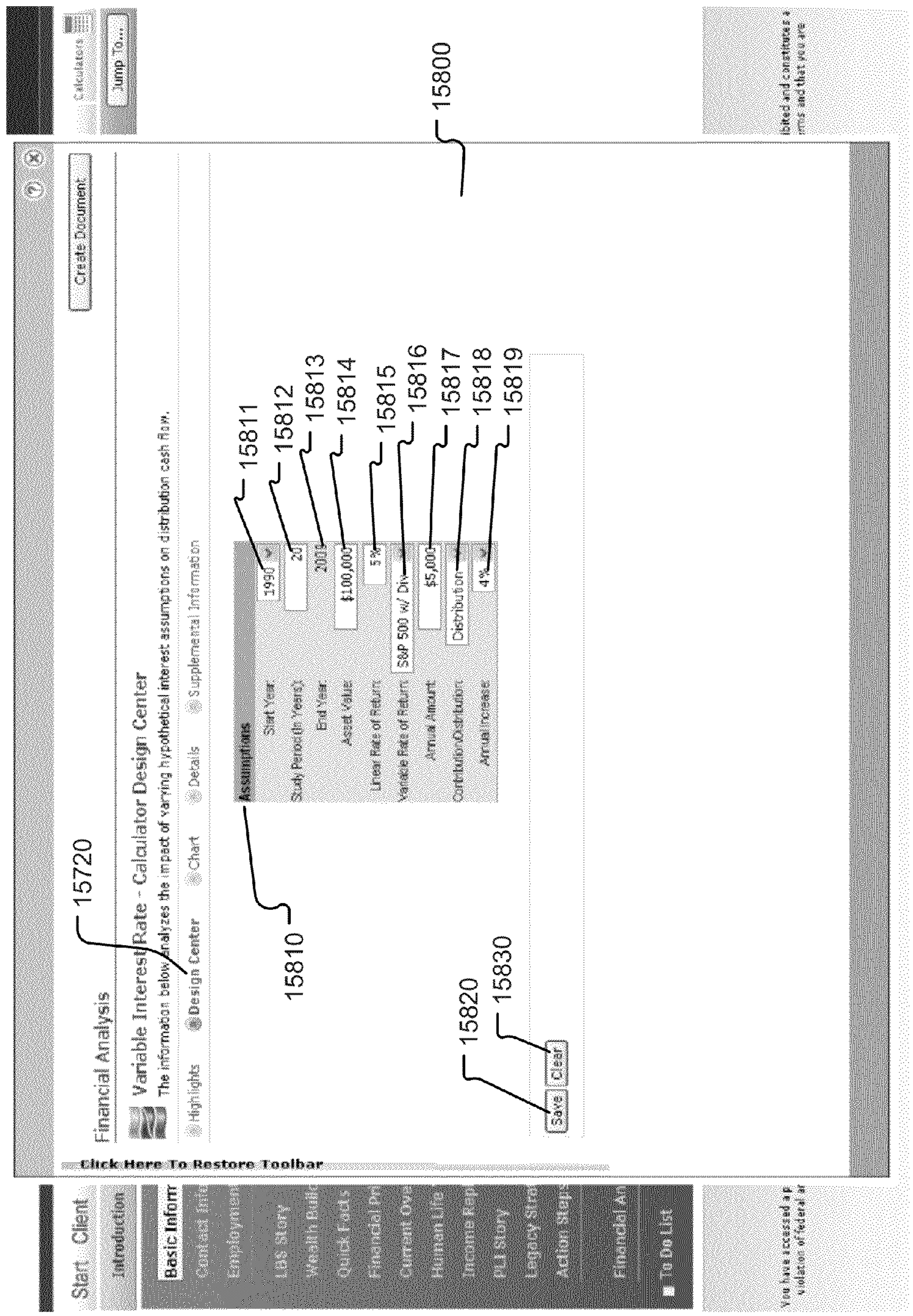

FIG. 158 illustrates an example of the display page 15800, which may be displayed when the design center selector 15720 is selected. The display page 15800 may include a calculator design center assumptions region 15810. The calculator design center assumptions region 15810 may include a start year field 15811, a study period field 15812, an end year field 15813, an asset value field 15814, a linear rate of return field 15815, a variable rate of return field 15816, an annual amount field 15817, a contribution/distribution field 15818, and an annual increase field 15819. Each of the fields included in the calculator design center assumptions region 15810 may be configured to accept a value associated with the field. The values may be accepted, and therefore received, as the result of user interactions with display page 15800. The user interactions may include, e.g., inputting values using a keyboard, a pointing device (e.g., mouse), a touch screen interface, or the like. The values in each of the fields may either be saved by selecting the "Save" button 15820 or cleared by selecting the "Clear" button 15830.

Figure 159:
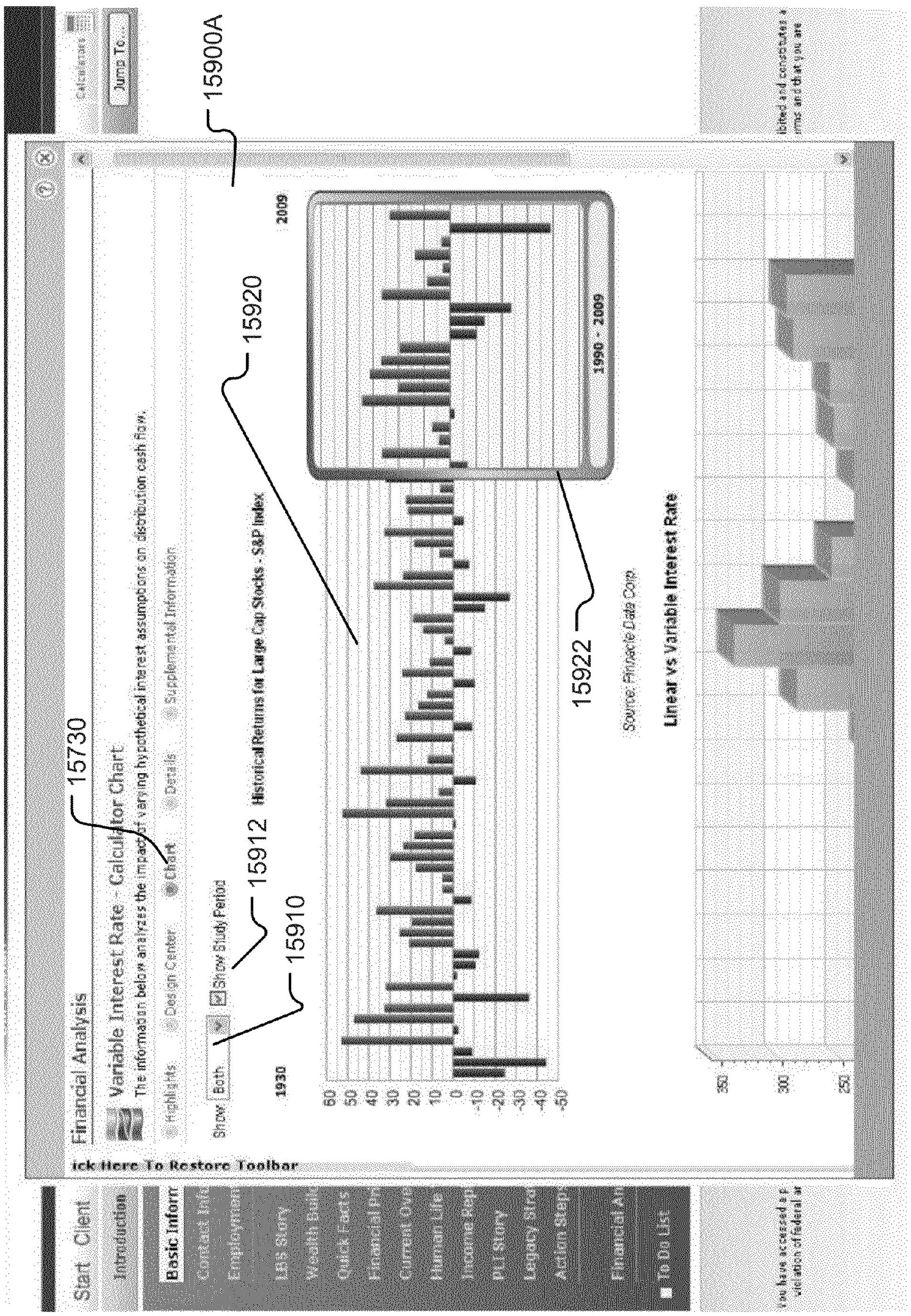

FIG. 159 illustrates an example of the display page 15900A, which may be displayed after, e.g., a user has selected chart selector 15730 and completed one or more fields in the assumptions region 15810. In response to the user's selection of the chart selector 15730 and completion of one or more fields in the assumptions region 15810, the display page 15900A may provide, e.g., a plurality of charts related to variable interest rates. The plurality of charts may include, e.g., a chart 15920 (e.g., bar graph) indicating the historical returns for large cap stocks associated with the S&P Index. Each portion of the chart or graph may be presented in a different color, shade, pattern, or the like. Chart 15920 may be associated with a window 15922 that allows a user to highlight a predetermined time span that may be of interest to the user. A user may position the window to highlight the predetermined time space by using a device, e.g., a mouse, keyboard, touchscreen, or the like, to interact with display page 15900A. The interaction may include, e.g., selecting the window and dragging the window across the chart 15920. However, user interaction with display page 15900A need not be so limited. For example, the user's interaction with 15900A may include, e.g., a scrolling command which scrolls down display page 15900A to reveal display page 15900B.

Figure 160:
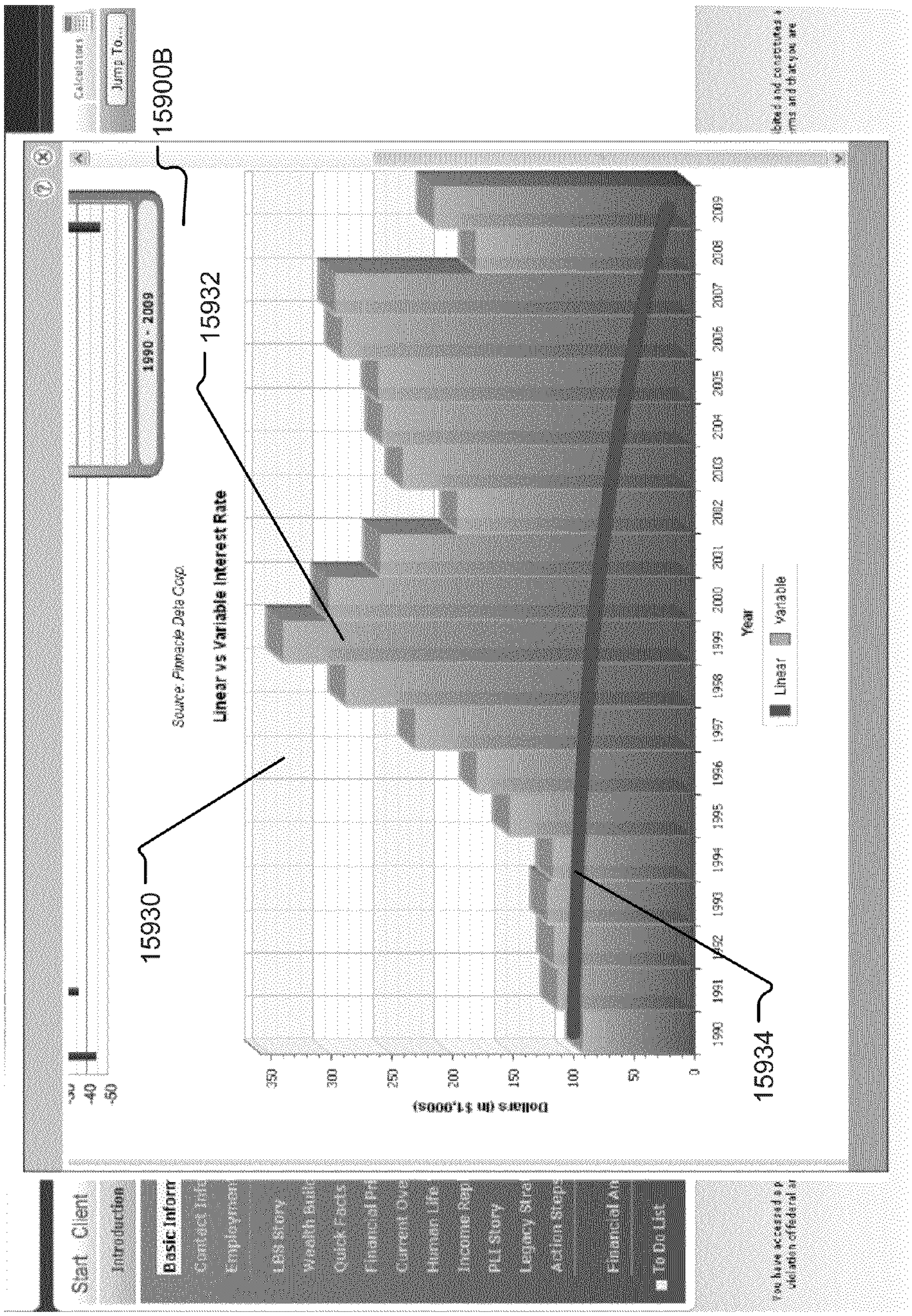

FIG. 160 illustrates an example of the display page 15900B, which may be displayed after a user scrolls downwards while viewing display page 15900A. Display page 15900B displays at least one of a plurality of charts that were generated when a user selected chart selector 15730 and completed one or more fields in the assumptions region 15810. In response to the user's selection of the chart selector 15730 and completion of one or more fields in the assumptions region 15810, the display page 15900B may provide, e.g., a linear vs. variable interest rate chart 15930. The chart 15930 (e.g., bar graph and curve) may indicate yearly variable interest values 15932 and yearly linear interest values 15934.

Figure 161:
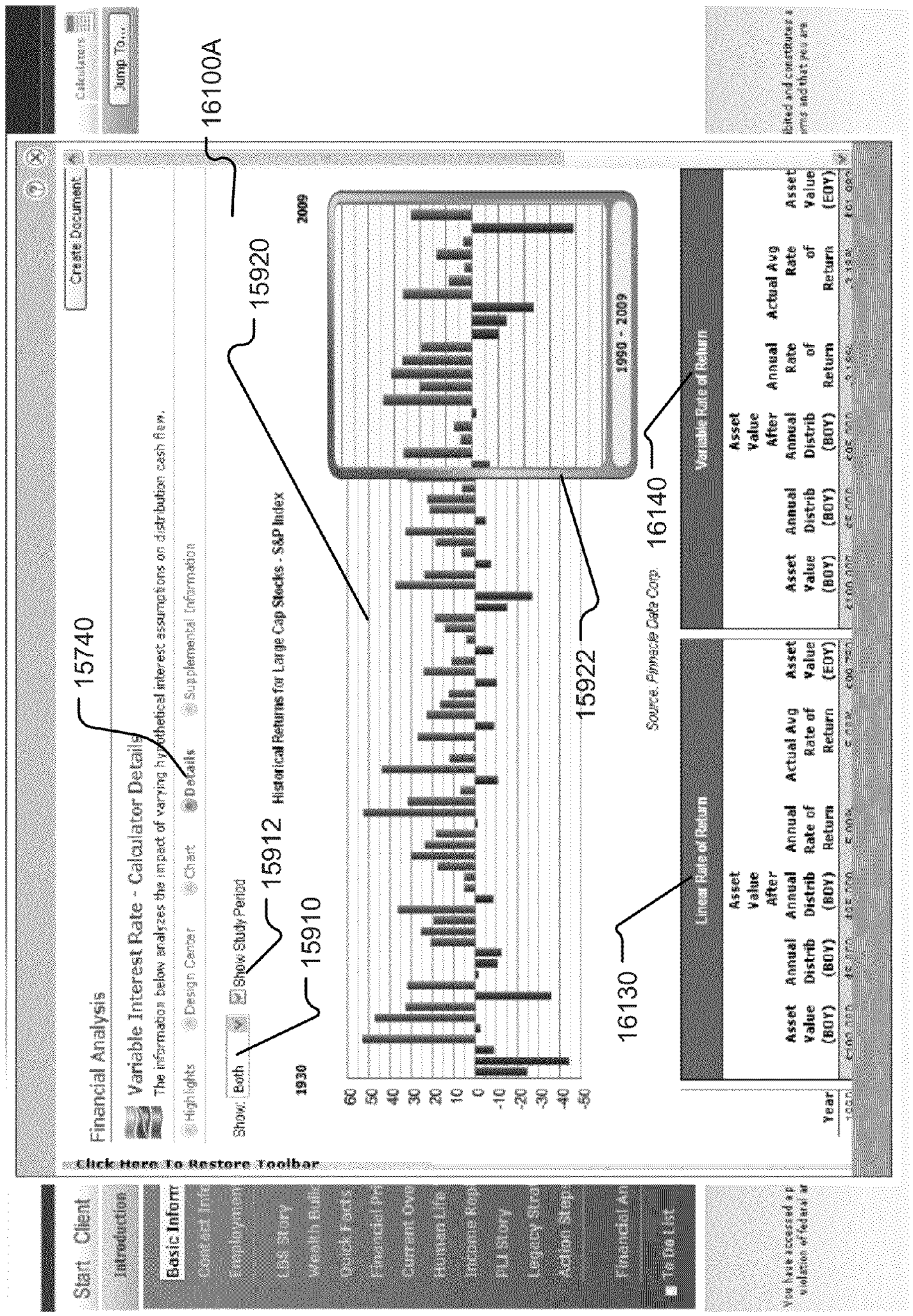

FIG. 161 illustrates an example of the display page 16100A, which may be displayed when the details selector 15740 is selected. The display page 16100A may include a detailed view of one or more aspects of the chart data displayed in the charts 15920 and 15930 on display pages 15900A and 15900B respectively. For example, the display page 16100A may include a linear rate of return chart 16130 (e.g., table or listing) and a variable rate of return chart 16140 (e.g., table or listing). Alternatively, or in addition, details page 16100A may include one or more of charts 15920 or 15930. A user may use a device, e.g., a mouse, keyboard, touchscreen, or the like, to interact with display page 16100A. This interaction may include, e.g., a scrolling command which scrolls down display page 16100A to reveal display page 16100B.

FIG. 162 illustrates an example of the display page 16100B, which may be displayed after a user scrolls downwards while viewing display page 16100A. The linear rate of return chart 16130 may include information such as, e.g., a beginning of the year (BOY) asset value 16131, a BOY annual distribution 16132, a BOY asset value after annual distribution 16133, an annual rate of return 16134, an actual average rate of return 16135, and an end of year (EOY) asset value 16136. The variable rate of return chart 16140 may include information such as, e.g., BOY asset value 16141, BOY annual distribution 16142, BOY asset value after annual distribution 16143, annual rate of return 16144, actual average rate of return 16145, and an EOY asset value 16146. Every row in each respective chart may be organized by predetermined increments of time 16150 (e.g., daily, weekly, monthly, yearly, or the like).

FIGS. 163-179 illustrate examples of display pages that show aspects of a quality plan (QP) tax savings portion of the financial analysis tool, in accordance with one embodiment of the disclosure. The QP tax savings portion of the financial analysis tool may analyze both balance sheet and cash flow consequences of participating in a qualified plan.

Figure 163:
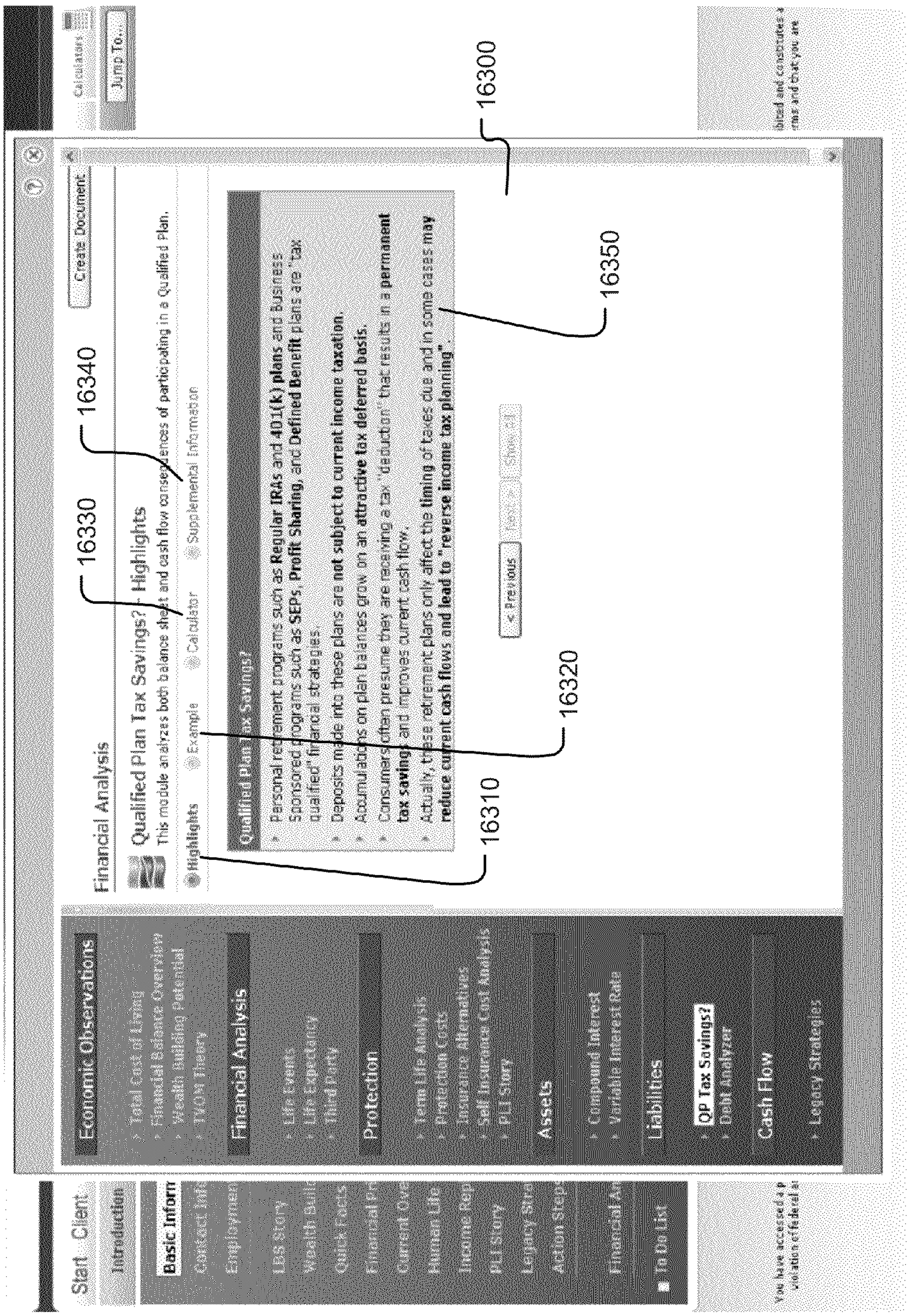
FIGS. 163-179 illustrate examples of display pages that show aspects of a quality plan (QP) tax savings portion of the financial analysis tool, in accordance with one embodiment of the disclosure.

FIG. 163 illustrates an example of a display page 16300, which may include a plurality of QP tax savings selectors. The plurality of QP tax savings selectors include highlights selector 16310, example selector 16320, calculator selector 16330, and supplemental information selector 16340. The display page 16300 further includes a highlights message 16350, which may be displayed when the highlight selector 16310 is selected on the display page 16300. The highlights message 16350 may include one or more highlights regarding QP tax savings, including the particular examples provided in FIG. 163.

FIGS. 164-172 provide a series of display pages that may educate a user with regards to QP tax savings. The display pages 164-172 accomplish this educational purpose by comparing an investment that was placed in a qualified plan with an investment that was placed a plan that was not a qualified plan.

Figure 164:
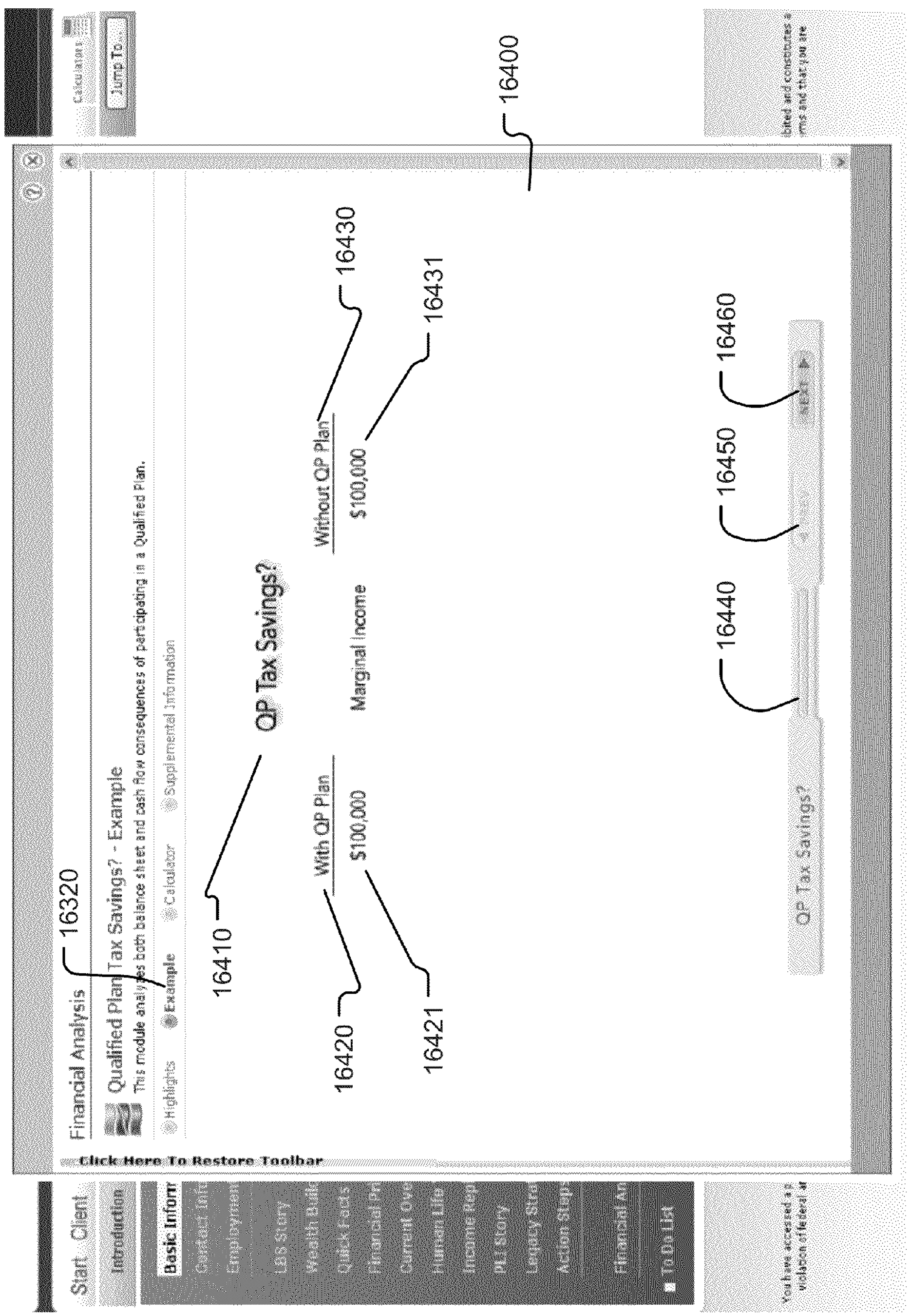

FIG. 164 illustrates an example of a display page 16400, which may be displayed when the example selector 16320 is selected. The display page may be the first in a series of educational displays that aim to answer the question 16410 of how QP tax savings are achieved. Display page 16400 performs a comparison between two types of users. The first type of user is a user "with QP plan" 16420. The second type of user is a user "without QP plan" 16430. Display page 16400 indicates that both types of users have a marginal income of $100,000 16421, 16431. The display page 16400 may include a navigation tool 16440 to allow a user to transition to a next display page 16500 by selecting, e.g., a button marked "NEXT>" 16460.

Figure 165:
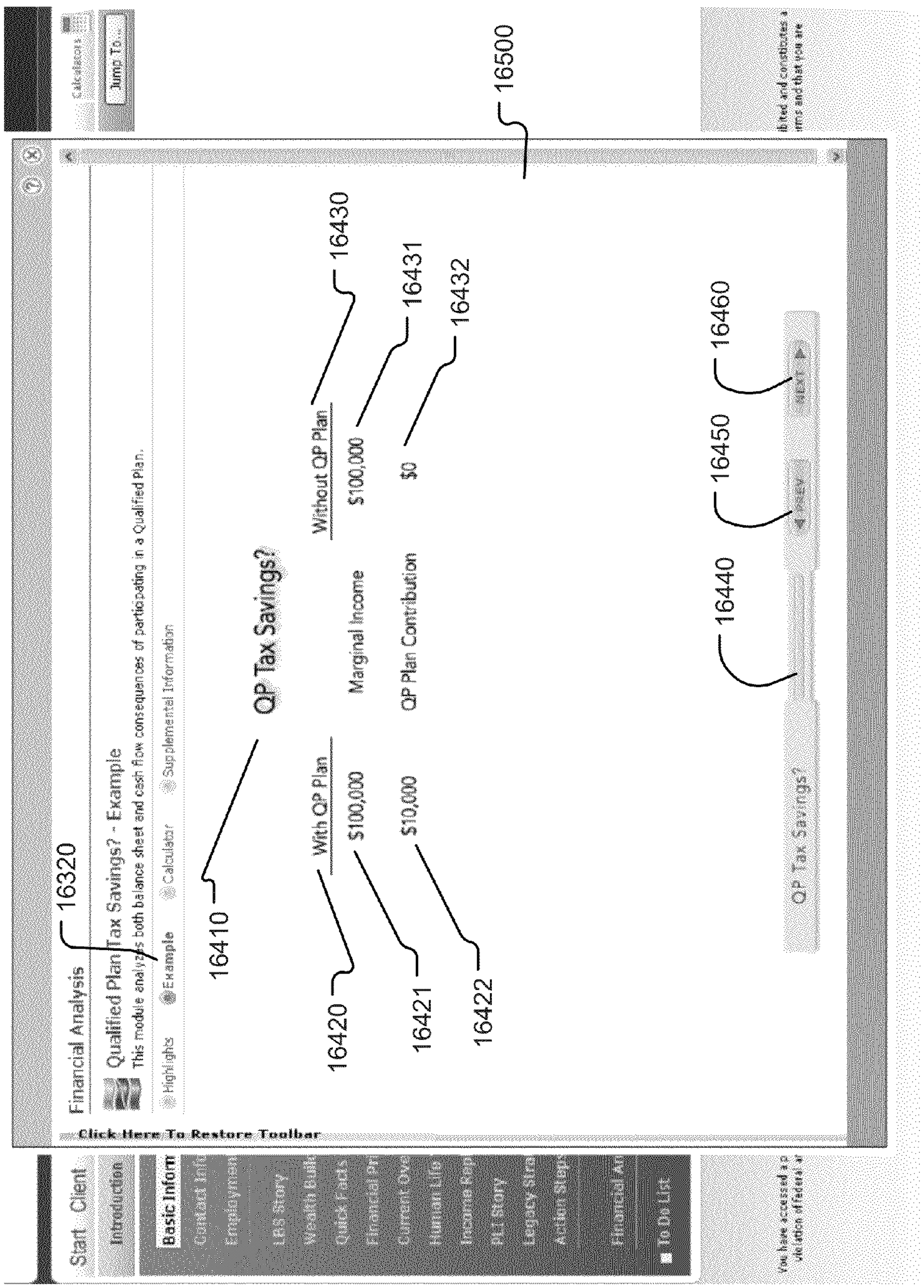

FIG. 165 illustrates an example of the display page 16500, which may be displayed when the example selector 16320 and the "NEXT>" selector 16460 are selected on the display page 16400 (shown in FIG. 164). Display page 16500 may include substantially all the information displayed in display page 16400 (FIG. 164). Display page 16500 may also include a QP plan contribution for each user (e.g., a first user being associated "with QP plan" and a second user being associated "without QP plan"). For example, display page 16500 indicates that the user "with QP Plan" 16420 contributes $10,000 16422 to a QP Plan, while the user "without QP Plan" 16430 contributes $0 16432 to a QP Plan. The display page 16500 may include a navigation tool 16440 to allow a user to transition to a next display page 16600 by selecting, e.g., a button marked "NEXT>" 16460 or a previous display page 16400 by selecting, e.g., a button marked "<PREV" 16450.

Figure 166:
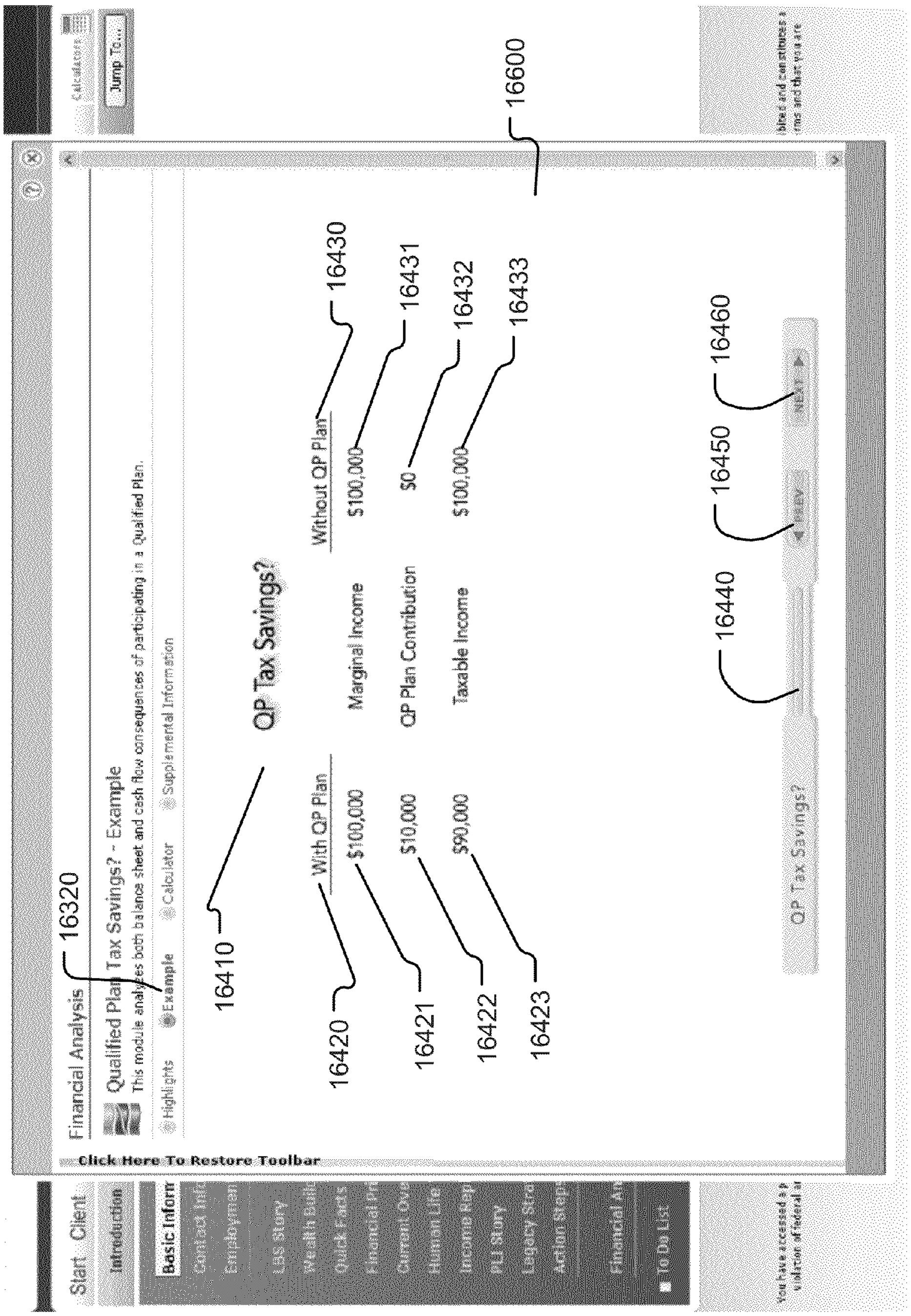

FIG. 166 illustrates an example of the display page 16600, which may be displayed when the example selector 16320 and the "NEXT>" selector 16460 are selected on the display page 16500 (shown in FIG. 165). Display page 16600 may include substantially all the information displayed in display page 16500 (FIG. 165). Display page 16600 may also include a taxable income for each user (e.g., a first user being associated "with QP plan" and a second user being associated "without QP plan"). For example, display 16600 indicates that the user "with QP Plan" 16420 has a taxable income of $90,000 16423, while a user "without QP Plan" 16430 has a taxable income of $100,000 16433. The display page 16600 may include a navigation tool 16440 to allow a user to transition to a next display page 16700 by selecting, e.g., a button marked "NEXT>" 16460 or a previous display page 16500 by selecting, e.g., a button marked "<PREV" 16450.

Figure 167:
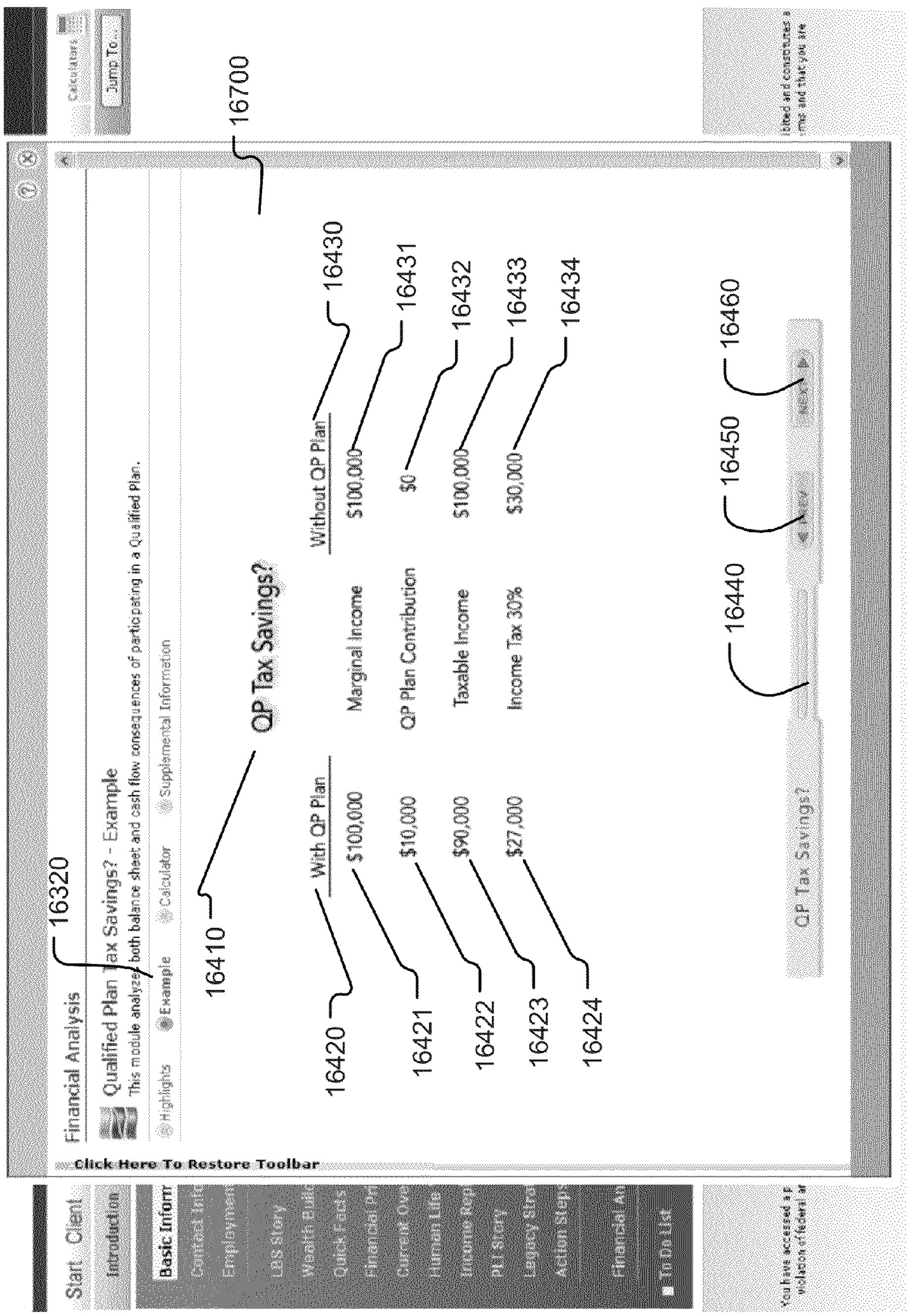

FIG. 167 illustrates an example of the display page 16700, which may be displayed when the example selector 16320 and the "NEXT>" selector 16460 are selected on the display page 16600 (shown in FIG. 166). Display page 16700 may include substantially all the information displayed in display page 16600 (FIG. 166). Display page 16700 may also include the amount of income tax that would be paid by each user (e.g., a first user being associated "with QP plan" and a second user being associated "without QP plan"). For example, display page 16700 may indicate that a user "with QP plan" 16420 who contributed $10,000 16422 to a QP Plan may pay only $27,000 16424 in income tax payments when taxed at a tax rate of, e.g., 30%. In addition, display page 16700 may indicate that a user "without QP Plan" 16430 who did not contribute 16432 to a QP plan may pay $30,000 16434 in income tax payments when taxed at a tax rate of, e.g., 30%. The display page 16700 may include a navigation tool 16440 to allow a user to transition to a next display page 16800 by selecting, e.g., a button marked "NEXT>" 16460 or a previous display page 16600 by selecting, e.g., a button marked "<PREV" 16450.

Figure 168:
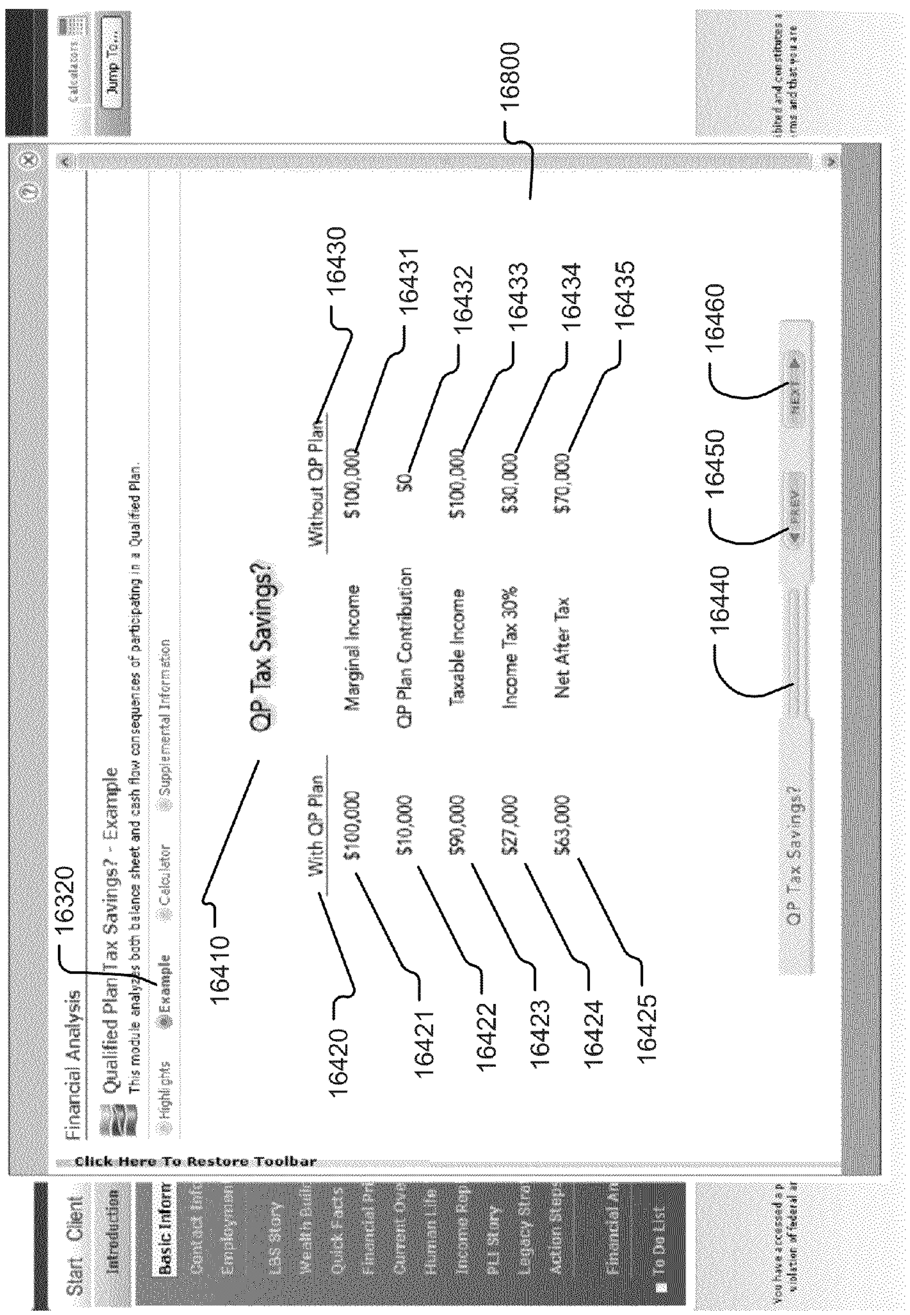

FIG. 168 illustrates an example of the display page 16800, which may be displayed when the example selector 16320 and the "NEXT>" selector 16460 are selected on the display page 16700 (shown in FIG. 167). Display page 16800 may include substantially all the information displayed in display page 16700 (FIG. 167). Display page 16700 may also include a net after tax amount for each user (e.g., a first user being associated "with QP plan" and a second user being associated "without QP plan"). For example, display page 16800 indicates that the user "with QP Plan" 16420 has a net after tax amount of $63,000 16425, while the user "without QP Plan" 16430 has a net after tax amount of $70,000 16435. The display page 16800 may include a navigation tool 16440 to allow a user to transition to a next display page 16900 by selecting, e.g., a button marked "NEXT>" 16460 or a previous display page 16700 by selecting, e.g., a button marked "<PREV" 16450.

Figure 169:
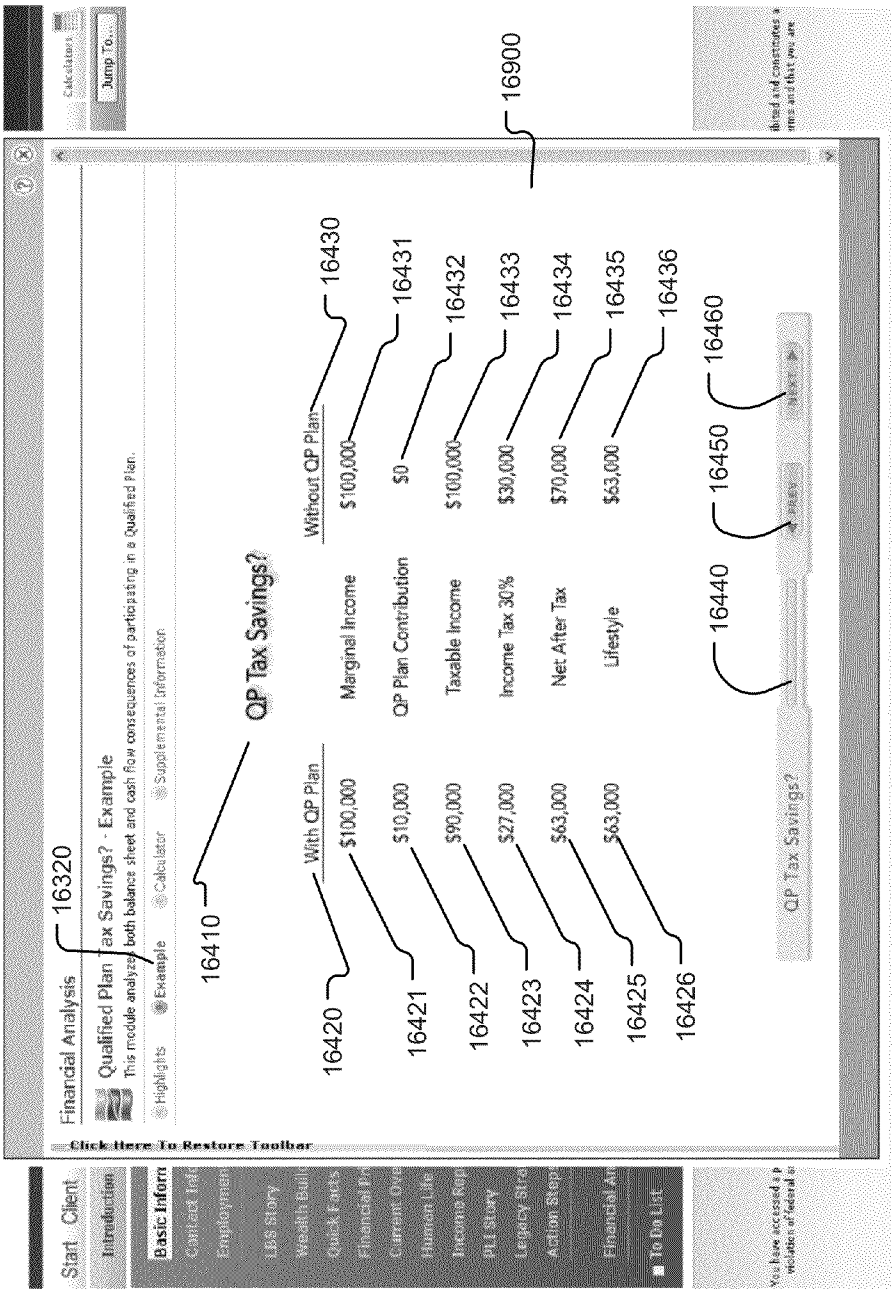

FIG. 169 illustrates an example of the display page 16900, which may be displayed when the example selector 16320 and the "NEXT>" selector 16460 are selected on the display page 16800 (shown in FIG. 168). Display page 16900 may include substantially all the information displayed in display page 16800 (FIG. 168). Display page 16900 may also include a lifestyle amount for each user (e.g., a first user being associated "with QP plan" and a second user being associated "without QP plan"). For example, display page 16900 indicates that both the user "with QP Plan" 16420 and the user "without QP plan" have a lifestyle amount of $63,000 16426, 16436. The display page 16900 may include a navigation tool 16440 to allow a user to transition to a next display page 17000 by selecting, e.g., a button marked "NEXT>" 16460 or a previous display page 16800 by selecting, e.g., a button marked "<PREV" 16450.

Figure 170:
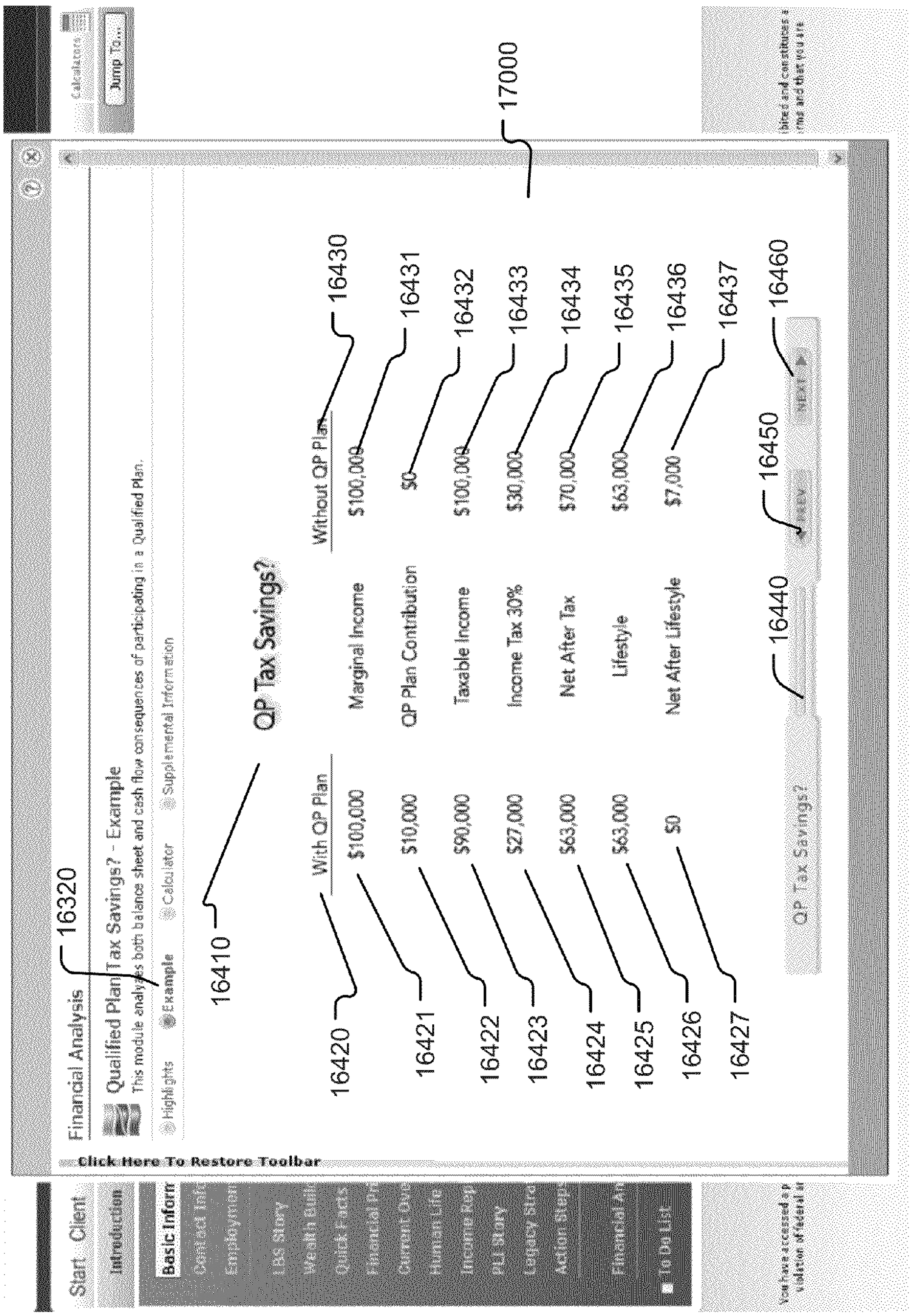

FIG. 170 illustrates an example of the display page 17000, which may be displayed when the example selector 16320 and the "NEXT>" selector 16460 are selected on the display page 16900 (shown in FIG. 169). Display page 17000 may include substantially all the information displayed in display page 16900 (FIG. 169). Display page 17000 may also include a net after lifestyle value for each user (e.g., a first user being associated "with QP plan" and a second user being associated "without QP plan"). For example, display page 17000 indicates that the user "with QP Plan" 16420 has a net after lifestyle amount of $0 16427, while the user "without QP Plan" 16430 has a net after lifestyle amount of $7,000 16437. The display page 17000 may include a navigation tool 16440 to allow a user to transition to a next display page 17100 by selecting, e.g., a button marked "NEXT>" 16460 or a previous display page 16900 by selecting, e.g., a button marked "<PREV" 16450.

Figure 171:
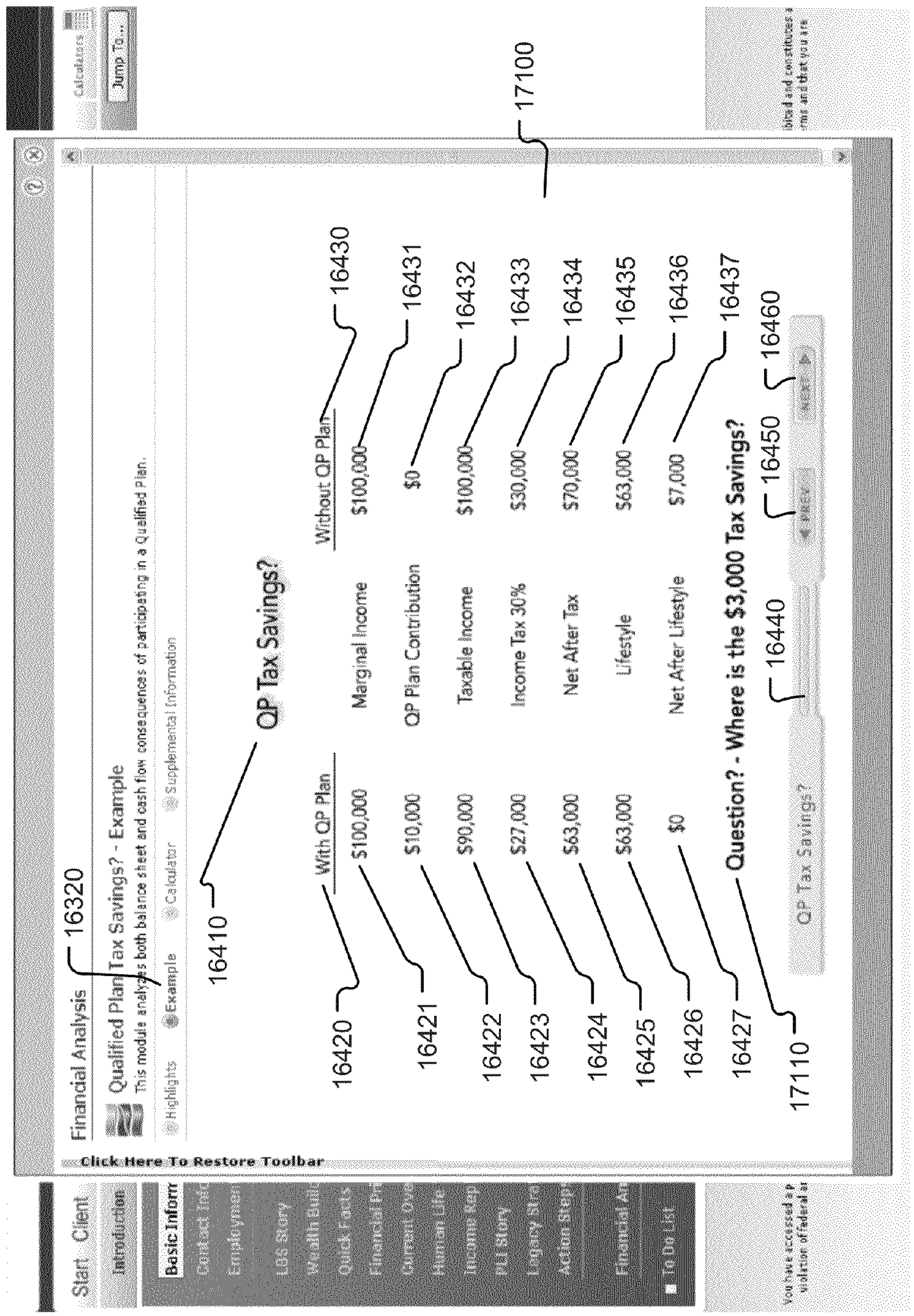

FIG. 171 illustrates an example of the display page 17100, which may be displayed when the example selector 16320 and the "NEXT>" selector 16460 are selected on the display page 17000 (shown in FIG. 170). Display page 17100 may include substantially all the information displayed in display page 17000 (FIG. 170). Display page 17100 may also include a message that may be displayed to a user that reads: "Questions?—Where is the $3,000 Tax Savings?" 17110. Such a message may be displayed, e.g., to prompt a user to analyze and re-think alleged benefits of investing into a QP plan. This is because one alleged benefit of a QP plan is the tax savings indicated at 16424, 16434. The display page 17100 may include a navigation tool 16440 to allow a user to transition to a next display page 17200 by selecting, e.g., a button marked "NEXT>" 16460 or a previous display page 16900 by selecting, e.g., a button marked "<PREV" 16450.

Figure 172:
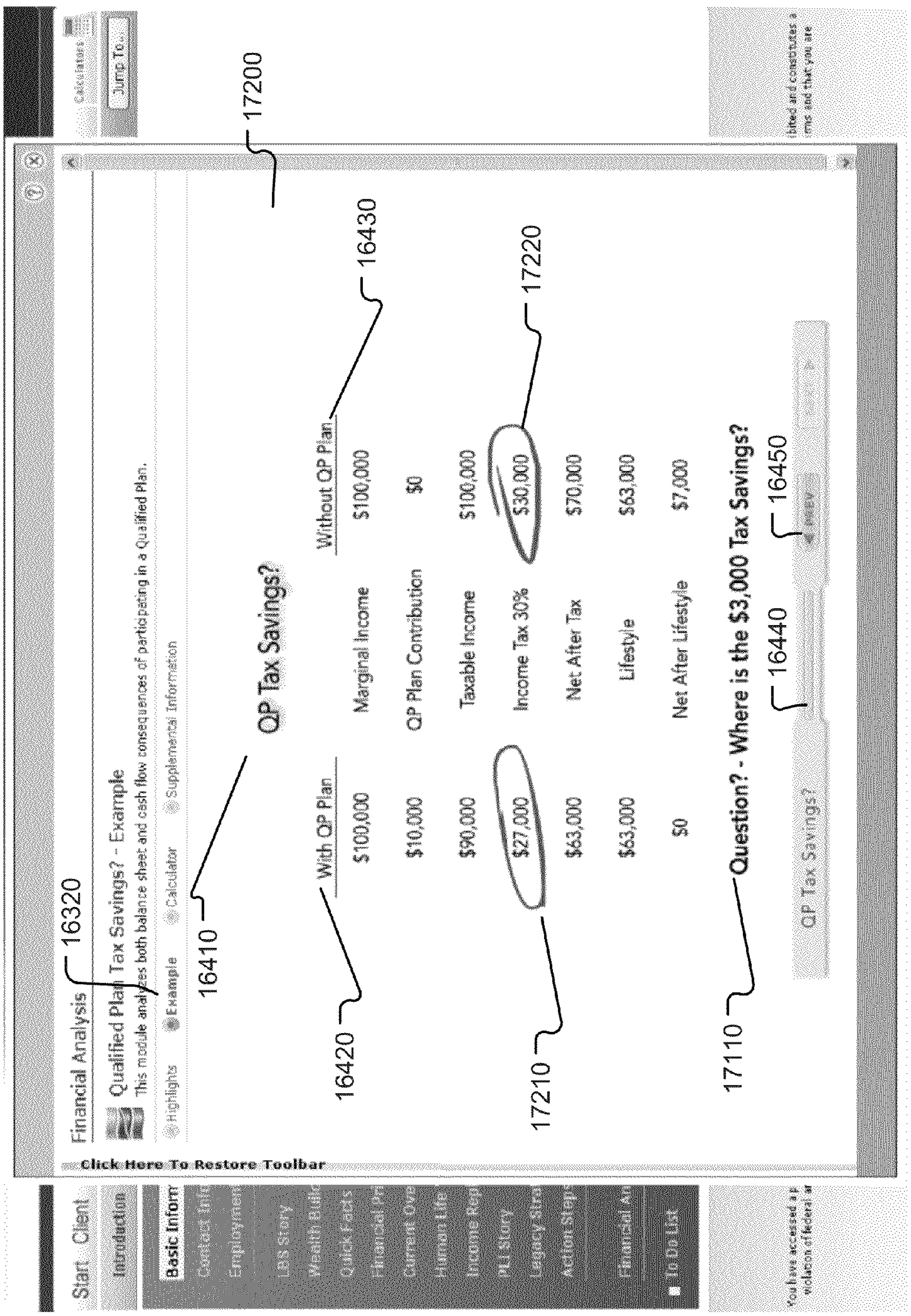

FIG. 172 illustrates an example of the display page 17200, which may be displayed when the example selector 16320 and the "NEXT>" selector 16460 are selected on the display page 17100 (shown in FIG. 171). Display page 17200 may include substantially all the information displayed in display page 17100 (FIG. 171). Display page 17200 may also include a graphic 17210 (e.g., an oval or a circle) and a graphic 17220 (e.g., an oval or a circle), which may be used to highlight the amount of income tax paid by users "with QP plan" 16420 and users "without QP plan" 16430. The display page 17200 may include a navigation tool 16440 to allow a user to transition to a previous display page 17100 by selecting, e.g., a button marked "<PREV" 16450.

Figure 173:
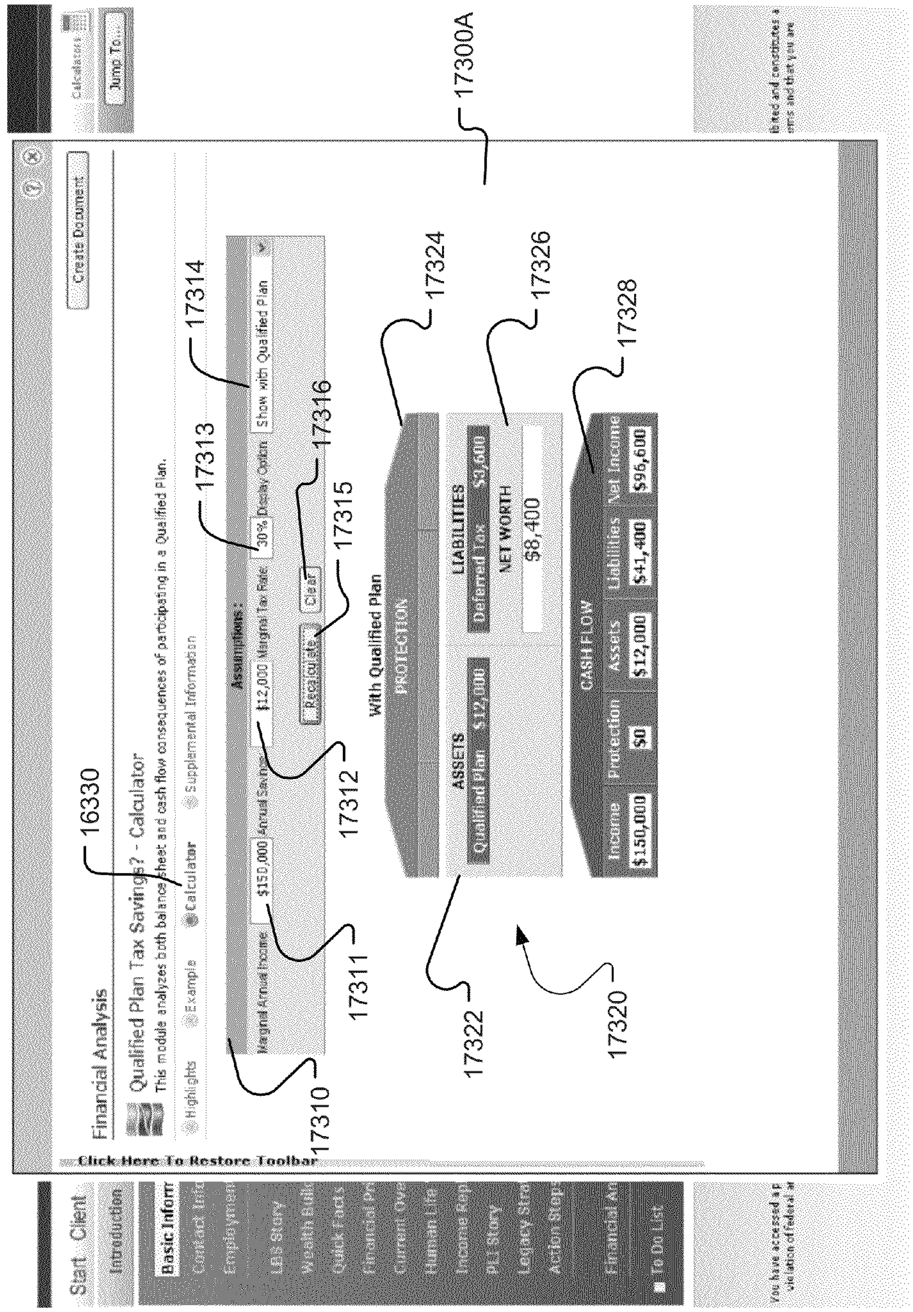

FIG. 173 illustrates an example of the display page 17300A, which may be displayed when the calculator selector 16330 is selected and/or one or more fields provided on display page 17300A are appropriately configured. The display page 17300A may include a calculator assumptions region 17310. The calculator assumptions region 17310 may include a marginal annual income field 17311, an annual savings field 17312, a marginal tax rate field 17313, and a display option field 17314. The display option field 17314 may include a drop down box that presents a plurality of selection options to a user once the display option field 17314 is selected. The plurality of selection options may include, e.g., a show with qualified plan option, a show without qualified plan option, and a show both option.

Each of the fields included in the calculator assumptions region 17310 may be configured to accept a value associated with the field. The values may be accepted, and therefore received, as a result of user interactions with display page 17300A. The user interactions may include, e.g., inputting values using a keyboard, a pointing device (e.g., a mouse), a touch screen interface, or the like.

The values accepted by the calculator summary region may be used to populate, e.g., the living balance sheet graphic 17320. For example, in response to the values being accepted by the calculator assumption region 17310 and the selection of the "recalculate" button 17315, the living balance sheet 17320 may be populated based, at least in part, on the values from the assumptions region 17310. Display page 17300A may display only a single living balance sheet graphic associated with a user "with qualified plan", because, e.g., a user selected "show with qualified plan" in display option field 17314. The living balance sheet graphic may include a plurality of sections, wherein each one of the sections is associated with one of the four interdependent financial domains. The four interdependent financial domains may include, e.g., assets 17322, protection 17324, liabilities 17326, and cash flow 17328. Alternatively, a "clear" button 17316 may be selected to set all fields in the calculator assumptions region 17310 to a default value.

Figure 174:
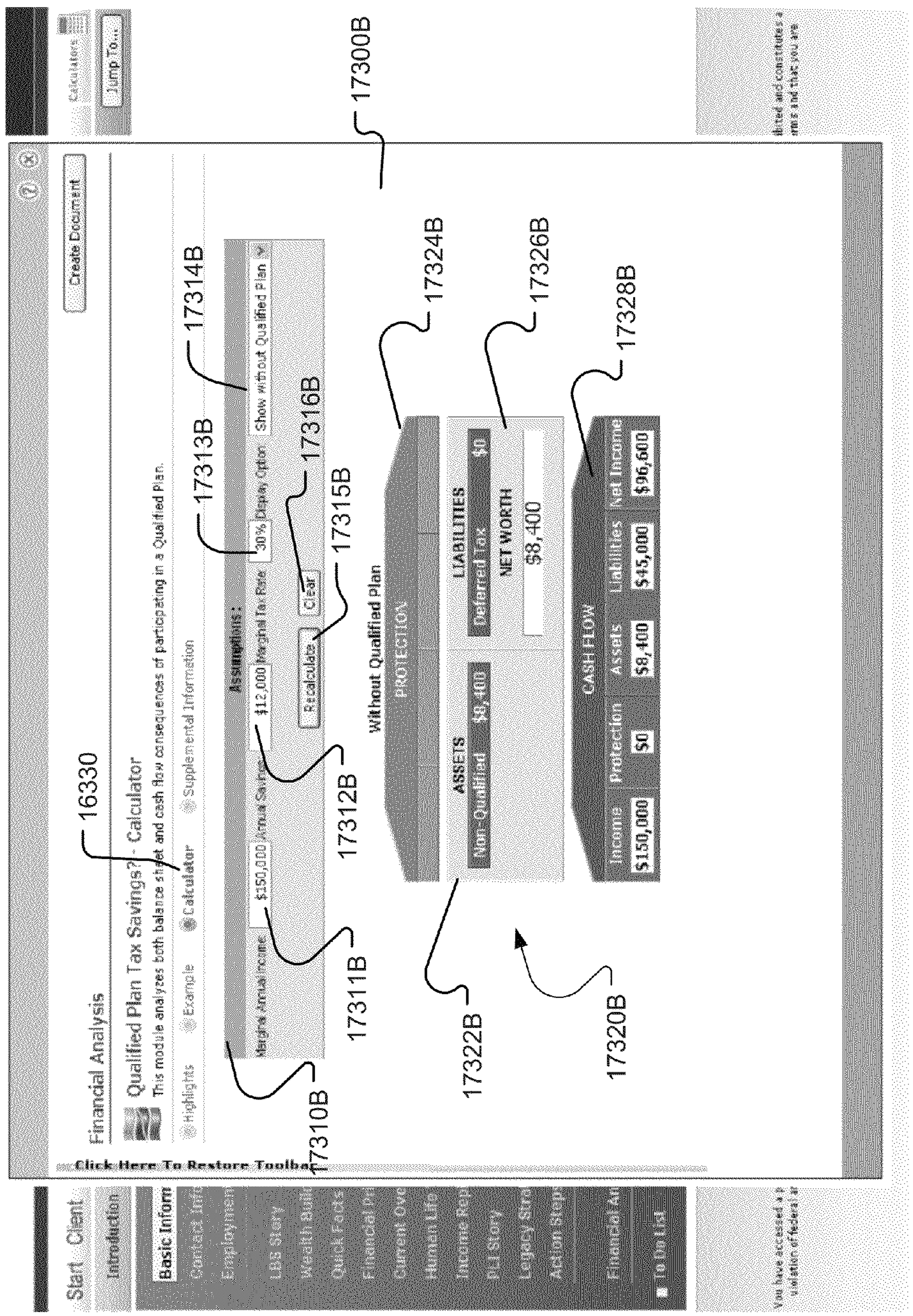

FIG. 174 illustrates an example of the display page 17300B, which may be displayed when the calculator selector 16330 is selected and/or one or more fields provided on display page 17300B are appropriately configured. The display page 17300B may include a calculator assumptions region 17310B. The calculator assumptions region 17310B may include a marginal annual income field 17311B, an annual savings field 17312B, a marginal tax rate field 17313B, and a display option field 17314B. The display option field 17314B may include a drop down box that presents a plurality of selection options to a user once the display option field 17314B is selected. The plurality of selection options may include, e.g., a show with qualified plan option, a show without qualified plan option, and a show both option.

Each of the fields included in the calculator assumptions region 17310B may be configured to accept a value associated with the field. The values may be accepted, and therefore received, as a result of user interactions with display page 17300B. The user interactions may include, e.g., inputting values using a keyboard, a pointing device (e.g., a mouse), a touch screen interface, or the like.

The values accepted by the calculator summary region may be used to populate, e.g., the living balance sheet graphic 17320B. For example, in response to the values being accepted by the calculator assumption region 17310B and the selection of the "recalculate" button 17315B, the living balance sheet 17320B may be populated based, at least in part, on the values from the assumptions region 17310B. Display page 17300B may display only a single living balance sheet graphic associated with a user "without qualified plan", because, e.g., a user selected "show without qualified plan" in display option field 17314B. The living balance sheet graphic may include a plurality of sections, wherein each one of the sections may be associated with one of the four interdependent financial domains. The four interdependent financial domains may include, e.g., assets 17322B, protection 17324B, liabilities 17326B, and cash flow 17328B. Alternatively, a "clear" button 17316B may be selected to set all fields in the calculator assumptions region 17310B to a default value.

Figure 175:
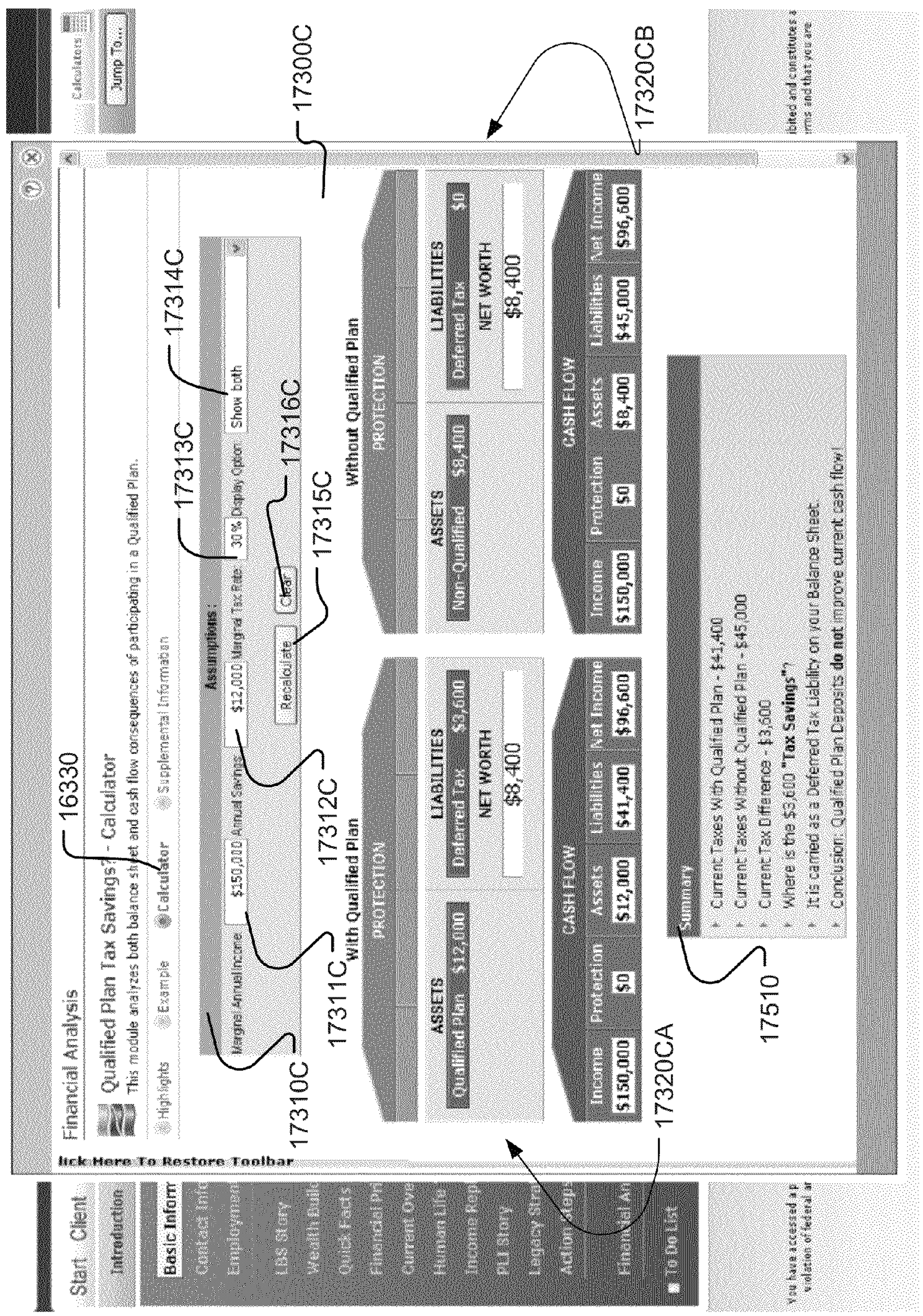

FIG. 175 illustrates an example of the display page 17300C, which may be displayed when the calculator selector 16330 is selected and/or one or more fields provided on display page 17300C are appropriately configured. The display page 17300C may include a calculator assumptions region 17310C. The calculator assumptions region 17310C may include a marginal annual income field 17311C, an annual savings field 17312C, a marginal tax rate field 17313C, and a display option field 17314C. The display option field 17314C may include a drop down box that presents a plurality of selection options to a user once the display option field 17314C is selected. The plurality of selection options may include, e.g., a show with qualified plan option, a show without qualified plan option, and a show both option.

Each of the fields included in the calculator assumptions region 17310C may be configured to accept a value associated with the field. The values may be accepted, and therefore received, as a result of user interactions with display page 17300C. The user interactions may include, e.g., inputting values using a keyboard, a pointing device (e.g., a mouse), a touch screen interface, or the like.

The values accepted by the calculator assumptions region may be used to populate, e.g., one or more living balance sheet graphics. For example, in response to the values being accepted by the calculator assumption region 17310C and the selection of the "recalculate" button 17315C, a plurality of living balance sheets 17320CA and 17320CB may be populated based, at least in part, on values associated with the assumptions region 17310C. Display page 17300C may display a plurality of living balance sheets 17320CA and 17320CB, because, e.g., a user selected "show both" in display option field 17314C. The living balance sheet graphic may include a plurality of sections, wherein each one of the sections may be associated with one of the four interdependent financial domains. The four interdependent financial domains may include, e.g., assets, protection, liabilities, and cash flow. Alternatively, a "clear" button 17316C may be selected to set all fields in the calculator assumptions region 17310C to a default value.

Display page 17300C may also include a summary region 17510. The summary region 17510 may include, e.g., a generated list of key points that summarize the comparison between taxes with qualified tax plans and taxes without qualified tax plans.

Figure 176:
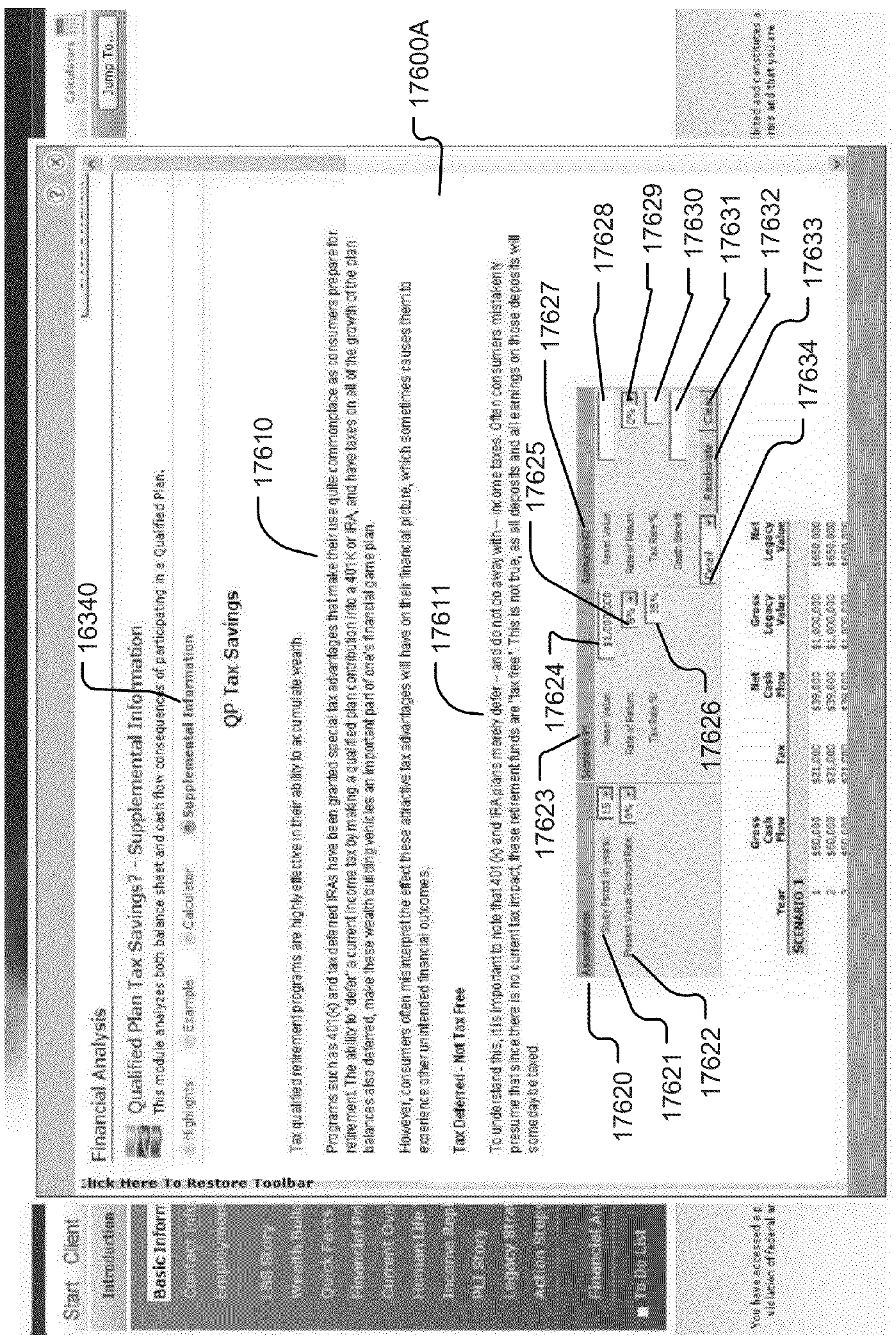

FIG. 176 illustrates an example of a display page 17600A, which may be displayed when the supplemental information selector 16340 is selected. The information provided by display page 17600A may include supplemental information regarding qualified plan tax savings. The supplemental information may include an overview of qualified tax plan savings 17610. The supplemental information may also include an overview of the implications of tax deferred money associated with qualified plan tax savings. Display page 17600A may also include an assumptions region 17620, a scenario #1 region 17623, and a scenario #2 region 17627 that may be used to facilitate generation of chart 17641 (e.g., table or listing), as shown by display page 17600B.

The assumptions region 17620 may include, e.g., a study period field 17621 and a present value discount rate field 17622. The scenario #1 region 17623 may include, e.g., an asset value field 17624, a rate of return field 17625, and a tax rate percentage field 17626. The scenario #2 region 17627 may include, e.g., an asset value field 17628, a rate of return field 17629, a tax rate percentage field 17630, a death benefit field 17631, a detail field, a "recalculate" button 17633, and a "clear button" 17632.

Each of the fields included in the assumptions region 17620, the scenario #1 region 17623, and/or the scenario #2 region 17627 may be configured to accept a value associated with each respective field. The values may be accepted, and therefore received, as a result of user interactions with display page 17600A. The user interactions may include, e.g., inputting values using a keyboard, a pointing device (e.g., a mouse), a touch screen interface, or the like. Once the values are accepted, chart 17641 may be displayed based, at least in part, on one or more of the accepted values. Additional user interactions with display page 17600A may occur. For example, a user may use a keyboard, pointing device (e.g., a mouse), a touch screen interface, or the like in order to perform, e.g., a scrolling command which scrolls down display page 17600A to reveal display page 17600B.

Figure 177:
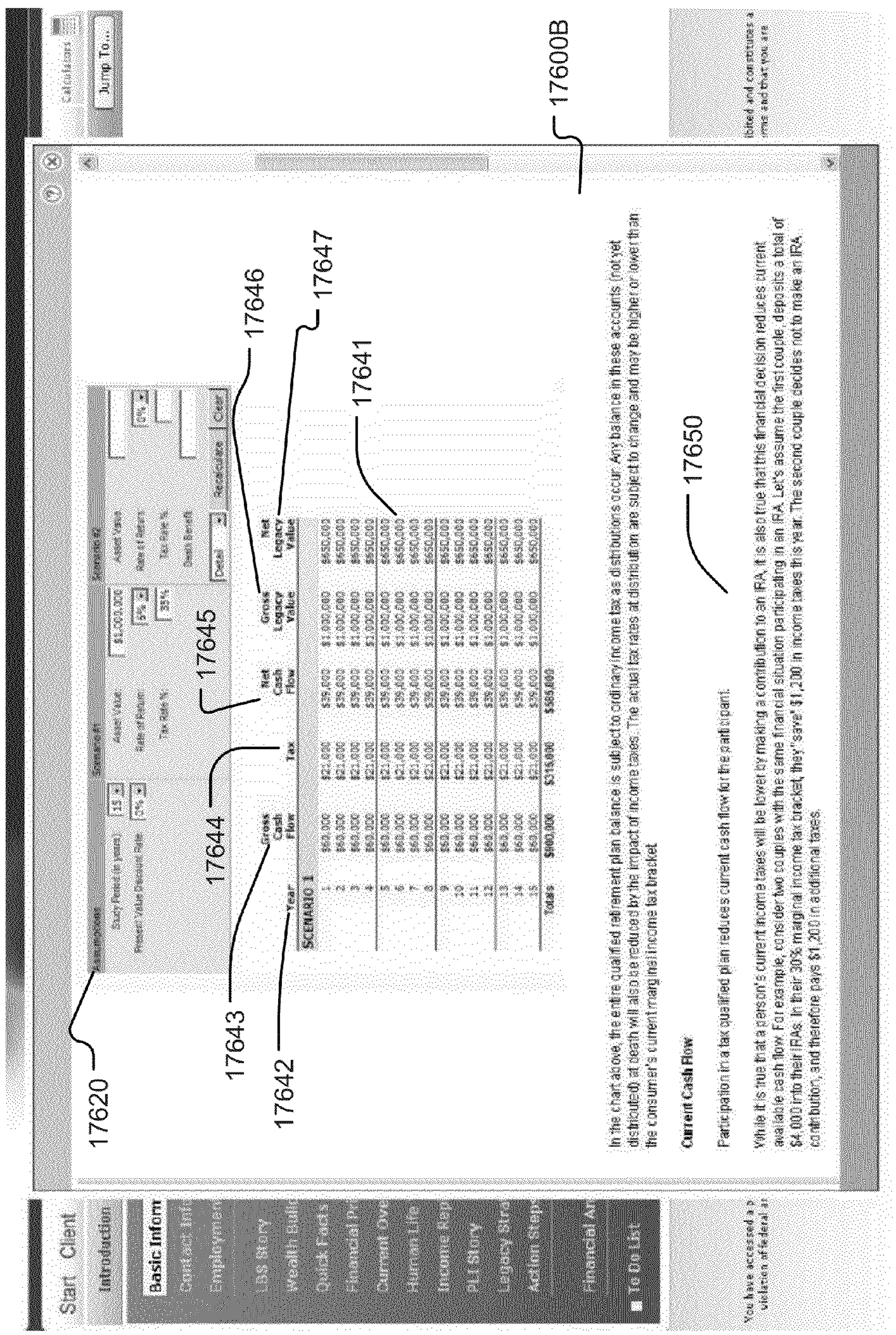

FIG. 177 illustrates an example of the display page 17600B, which may be displayed after a user scrolls downwards while viewing display page 17600A. Display page 17600B may provide additional supplemental information regarding qualified plan tax savings. The additional information may include a chart 17641 (e.g., table or listing) generated by a combination of the users input into, e.g., the assumptions region 17620 and the scenario #1 region 17623 and the selection of the recalculate button 17633. The chart 17641 may providing information including, e.g., a year 17642, a gross cash flow 17643, a tax 17644, a net cash flow 17645, a gross legacy value 17646, and a net legacy value 17647. The display page 17600B may also include an overview of the importance of current (e.g., available) cash flow 17650. A user may use a device, e.g., a mouse, keyboard, touchscreen, or the like, to interact with display page 17600B. This interaction may include, e.g., a scrolling command which scrolls down display page 17600B to reveal display page 17600C.

Figure 178:
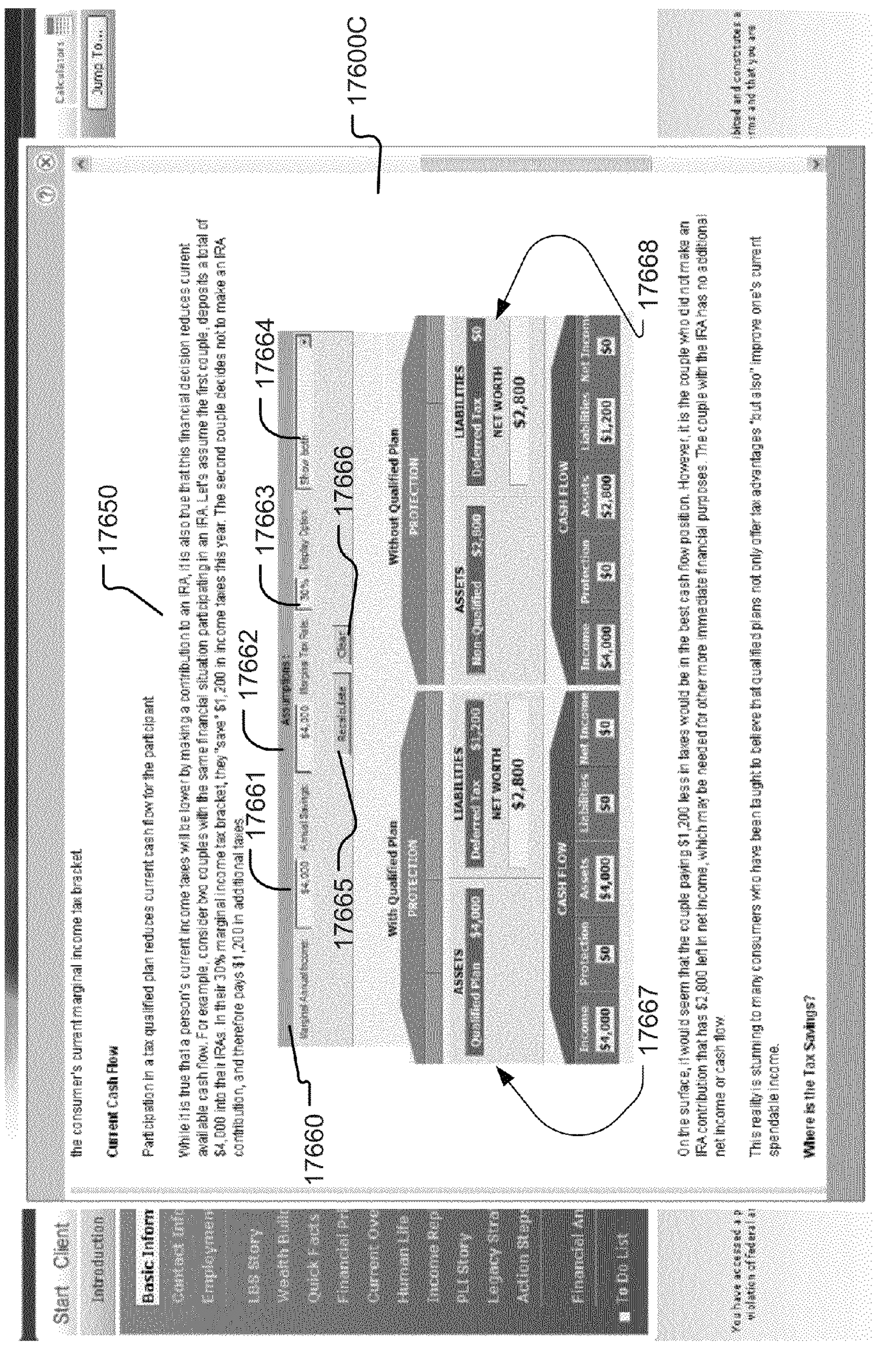

FIG. 178 illustrates an example of the display page 17600C, which may be displayed after a user scrolls downwards while viewing display page 17600B. Display page 17600C may provide additional supplemental information regarding qualified plan tax savings. The additional information may include a calculator assumptions region 17660. The calculator assumptions region 17660 may include a marginal annual income field 17661, an annual savings field 17662, a marginal tax rate field 17663, and a display option field 17664. The display option field 17664 may include a drop down box that presents a plurality of selection options to a user once the display option field 17664 is selected. The plurality of selection options may include, e.g., a show with qualified plan option, a show without qualified plan option, and a show both option.

Each of the fields included in the calculator assumptions region 17660 may be configured to accept a value associated with each respective field. The values may be accepted, and therefore received, as a result of user interactions with display page 17600C. The user interactions may include, e.g., inputting values using a keyboard, a pointing device (e.g., a mouse), a touch screen interface, or the like.

The values accepted by the assumption region 17660 may be used to populate, e.g., one or more living balance sheet graphics. For example, in response to the values being accepted by the assumption region 17660 and the selection of the "recalculate" button 17665, a plurality of living balance sheets 17667 and 17668 may be populated based, at least in part, on values associated with the assumptions region 17660. Display page 17600C may display a plurality of living balance sheets 17667 and 17668, because, e.g., a user selected "show both" in display option field 17664. Each living balance sheet graphic may include a plurality of sections, wherein each one of the sections may be associated with one of the four interdependent financial domains. The four interdependent financial domains may include, e.g., assets, protection, liabilities, and cash flow. Alternatively, a "clear" button 17666 may be selected to set all fields in the calculator assumptions region 17660 to, e.g., a default value. A user may use a device, e.g., a mouse, keyboard, touchscreen, or the like, to interact with display page 17600C. This interaction may include, e.g., a scrolling command which scrolls down display page 17600C to reveal display page 17600D.

FIG. 179 illustrates an example of the display page 17600D, which may be displayed after a user scrolls downwards while viewing display page 17600C. Display page 17600D may provide additional supplemental information regarding qualified plan tax savings. The additional information may include an overview of the alleged tax savings 17670 achieved by utilizing a qualified plan. Display page 17600D may also include a summary region 17680. The summary region 17680 may include, e.g., a generated list of key points that summarize the comparison between taxes with qualified tax plans and taxes without qualified tax plans. Display page 17690 may also include an overview of external financial factors 17690.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed:

1. A system for displaying financial data, the system comprising:

a module configured to obtain financial data;

a module configured to display a first visual representation, wherein the first visual representation includes a container, wherein the container includes a second visual representation associated with a value of a client's retirement assets; and a module configured to display a third visual representation, wherein the third visual representation includes an inflow channel, wherein the inflow channel provides a fourth visual representation of an inflow associated with a value of a client's earned income; and, a module configured to display a fifth visual representation, wherein the fifth visual representation includes an outflow channel, wherein the outflow channel provides a sixth visual representation of an outflow associated with a value of a client's lifestyle costs, wherein each module is executed by a computer.

2. The system of claim 1, wherein one or more of the visual representations include a video or moving picture graphic.

3. The system of claim 1, wherein financial data includes a cash flow associated with a financial domain.

4. The system of claim 3, wherein the financial domain includes one or more of assets, protections, liabilities, or cash flow.

5. The system of claim 1, wherein the system further comprises:

a module configured to adjust the second visual representation associated with a value of a client's retirement assets based at least in part on a difference between the flow in the inflow channel and the flow in the outflow channel.

6. The system of claim 1, wherein the system further comprises:

a module configured to decrease the second visual representation associated with a value of a client's retirement assets if the outflow is greater than the inflow.

7. The system of claim 1, wherein the system further comprises:

a module configured to increase the second visual representation associated with a value of a client's retirement assets if the inflow is greater than the outflow.

8. A method of displaying financial data, the method comprising:

obtaining financial data;

associating at least a portion of the financial data with a feature of a visual display; and generating a display that includes a video of financial data flowing from a first financial domain into a second financial domain, wherein the obtaining step, the associating step and the generating step are performed by a computer.

9. The method of claim 8, wherein financial data includes a cash flow associated with a financial domain.

10. The method of claim 8, wherein the first financial domain and the second financial domain include one or more of a protections domain, a liabilities domain, an assets domain, and a cash flow domain.

11. The method of claim 10, wherein each of the financial domains are interdependent.

12. The method of claim 8, wherein the step of associating further comprises:

displaying a first visual representation, wherein the first visual representation includes a container, wherein the container includes a second visual representation associated with a value of a client's retirement assets;

displaying a third visual representation, wherein the third visual representation includes an inflow channel, wherein the inflow channel provides a fourth visual representation of an inflow associated with a value of a client's earned income; and, displaying a fifth visual representation, wherein the fifth visual representation includes an outflow channel, wherein the outflow channel provides a sixth visual representation of an outflow associated with a value of a client's lifestyle costs.

13. The method of claim 12, wherein the method further comprises:

adjusting the second visual representation based at least in part on a difference between the flow in the inflow channel and the flow in the outflow channel.

14. A method of displaying financial data, the method comprising:

obtaining financial data;

associating at least a portion of the financial data with a feature of a visual display; and generating a display that includes financial data flowing from a first financial domain into a second financial domain, wherein the obtaining step, the associating step and the generating step are performed by a computer and wherein the step of associating further comprises:

displaying a first visual representation, wherein the first visual representation includes a container, wherein the container includes a second visual representation associated with a value of a client's retirement assets;

displaying a third visual representation, wherein the third visual representation includes an inflow channel, wherein the inflow channel provides a fourth visual representation of an inflow associated with a value of a client's earned income; and, displaying a fifth visual representation, wherein the fifth visual representation includes an outflow channel, wherein the outflow channel provides a sixth visual representation of an outflow associated with a value of a client's lifestyle costs.

15. The method of claim 14, wherein the method further comprises:

adjusting the second visual representation based at least in part on a difference between the flow in the inflow channel and the flow in the outflow channel.

16. The method of claim 14, wherein financial data includes a cash flow associated with a financial domain.

17. The method of claim 14, wherein the first financial domain and the second financial domain include one or more of a protections domain, a liabilities domain, an assets domain, and a cash flow domain.

18. The method of claim 17, wherein each of the financial domains are interdependent.

19. The method of claim 8, wherein the video is configured to show a visual volume level change within a first container to represent a change in the first financial domain as financial data flows into or out of the first container.

* * * * *